United States Patent
Saito et al.

(10) Patent No.: US 7,466,705 B2
(45) Date of Patent: *Dec. 16, 2008

(54) DATA TRANSMITTING NODE AND NETWORK INTER-CONNECTION NODE SUITABLE FOR HOME NETWORK ENVIRONMENT

(75) Inventors: Takeshi Saito, Tokyo (JP); Yoshiaki Takabatake, Kanagawa (JP); Mikio Hashimoto, Chiba (JP); Yukio Kamatani, Kanagawa (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 766 days.

This patent is subject to a terminal disclaimer.

(21) Appl. No.: 10/830,020

(22) Filed: Apr. 23, 2004

(65) Prior Publication Data

US 2004/0196853 A1 Oct. 7, 2004

Related U.S. Application Data

(63) Continuation of application No. 09/036,197, filed on Mar. 6, 1998, now Pat. No. 6,751,221, which is a continuation-in-part of application No. 08/943,927, filed on Oct. 3, 1997, now abandoned.

(30) Foreign Application Priority Data

| Oct. 4, 1996 | (JP) | ............... P08-264496 |
| Mar. 6, 1997 | (JP) | ............... P09-052125 |
| Dec. 9, 1997 | (JP) | ............... P09-338895 |

(51) Int. Cl.
*H04L 12/56* (2006.01)

(52) U.S. Cl. ............ 370/392; 370/395.52; 370/401; 370/406

(58) Field of Classification Search ............... None
See application file for complete search history.

(56) References Cited

U.S. PATENT DOCUMENTS

| 5,440,551 A | 8/1995 | Suzuki |
| 5,790,171 A * | 8/1998 | Klopfer et al. ............... 725/147 |
| 5,790,753 A | 8/1998 | Krishnamoorthy et al. |

(Continued)

FOREIGN PATENT DOCUMENTS

JP 7-107119 4/1995

(Continued)

*Primary Examiner*—Chi H. Pham
*Assistant Examiner*—Soon D. Hyun
(74) *Attorney, Agent, or Firm*—Oblon, Spivak, McClelland, Maier & Neustadt, P.C.

(57) ABSTRACT

A data transmitting node and a network inter-connection node suitable for use in the home network environment. In a case of transmitting information data from a data transmitting node connected with a physical network to a receiving node connected with the physical network or another physical network, a data transmitting node transmits the control message including an IP address information of a data transmission destination, a header/channel information dependent on the physical network, and an information indicating that the information data to be transmitted according to the header/channel information is data in an upper layer of an IP layer. The information data is then transmitted to the receiving node, where the information data contains the header/channel information and data of the upper layer without IP packet encapsulation. A network inter-connection node operates similarly.

8 Claims, 82 Drawing Sheets

U.S. PATENT DOCUMENTS

| | | |
|---|---|---|
| 5,822,319 A | 10/1998 | Nagami et al. |
| 5,889,777 A | 3/1999 | Miyao et al. |
| 5,903,559 A | 5/1999 | Acharya et al. |
| 5,930,259 A | 7/1999 | Katsube et al. |
| 5,982,773 A | 11/1999 | Nishimura et al. |
| 5,995,503 A | 11/1999 | Crawley et al. |
| 6,014,381 A | 1/2000 | Troxel et al. |
| 6,014,694 A | 1/2000 | Aharoni et al. |
| 6,021,263 A * | 2/2000 | Kujoory et al. ............ 709/232 |
| 6,028,860 A | 2/2000 | Laubach et al. |
| 6,101,549 A | 8/2000 | Baugher et al. |
| 6,115,392 A | 9/2000 | Nomura |
| 6,172,991 B1 | 1/2001 | Mori |
| 6,219,697 B1 | 4/2001 | Lawande et al. |
| 6,286,142 B1 | 9/2001 | Ehreth |
| 6,584,094 B2 | 6/2003 | Maroulis et al. |

FOREIGN PATENT DOCUMENTS

| | | |
|---|---|---|
| JP | 8-8917 | 1/1996 |

* cited by examiner

FIG.11

| DESTINATION IP ADDRESS | NEXT HOP IP ADDRESS | PHYSICAL PORT | DATALINK PHYSICAL ADDRESS |
|---|---|---|---|
| Nb.1 | Nb.1 | 1394 SIDE | Bb.1 |
| Nb.2 | Nb.2 | 1394 SIDE | Bb.1 |
| Nb.4 | Nb.4 | ATM SIDE | Ab.2 (OR VCI) |
| Na | Nb.4 | ATM SIDE | Ab.2 (OR VCI) |
| default | Nb.4 | ATM SIDE | Ab.2 (OR VCI) |
| ----- | ----- | ----- | ----- |

FIG.19

| INPUT CHANNEL NO. OR REGISTER OFFSET | ATTRIBUTE | OUTPUT PORT | OUTPUT CHANNEL NO. OR DESTINATION ADDRESS WITH REGISTER OFFSET |
|---|---|---|---|
| #1 | MPEG, 4M | B | #5 |
| #3 | MPEG, 4M | B | #7 |
| #5 | AUDIO, 1M | B | #2 |
| ----- | ----- | ----- | ----- |

FIG.20

| HAEDWARE TYPE (ATM) |
| --- |
| PROTOCOL TYPE (IP) |
| OPERATION CODE (propose / propose ACK / NACK) |
| SENDER IP ADDRESS |
| TARGET IP ADDRESS OR FANP TERMINATING NODE IP ADDRESS |
| VCID |

FIG.23

| VERSION NO. | OPERATION CODE | CHECKSUM |
|---|---|---|
| VCID TYPE | FLOW ID TYPE | ERROR CODE / REFRESH INTERVAL |
| LENGTH || RESERVED |
| VCID |||
| FLOW ID |||
| TYPE | LENGTH ||
| VARIABLE |||

FIG.24

| VERSION=2 | OPERATION CODE=1 | RESERVED |
|---|---|---|
| VCID TYPE | FLOW ID TYPE | RERESH INTERVAL |
| LENGTH | | RESERVED |
| VCID | | |
| FLOW ID | | |
| TYPE | LENGTH | COMMUNICATION ATTRIBUTE (MPEG) |
| TYPE | LENGTH | BANDWIDTH (COM-MUNICATION QUALITY) |
| TYPE | LENGTH | e-ACK REQUEST |

FIG.25

| VERSION=2 | OPERATION CODE=6 | RESERVED |
|---|---|---|
| VCID TYPE | FLOW ID TYPE | RESERVED |
| LENGTH || RESERVED |
| VCID |||
| FLOW ID |||

FIG.27

| VERSION=2 | OPERATION CODE=1 | RESERVED |
|---|---|---|
| VCID TYPE | FLOW ID TYPE | RESERVED |
| LENGTH | | RESERVED |
| VCID | | |
| FLOW ID | | |
| OPTION TYPE | LENGTH | e-ACK RESPONSE |

FIG.35

| INPUT CHANNEL NO. OR DESTINATION ADDRESS WITH SPECIFIC REGISTER OFFSET | ATTRIBUTE | OUTPUT PORT | OUTPUT MAC ADDRESS |
|---|---|---|---|
| #1 | MPEG, 4M | B | #A |
| #4 | AUDIO, 1M | B | #B |

FIG.36

| INPUT MAC ADDRESS | ATTRIBUTE | OUTPUT PORT | OUTPUT CHANNEL NO. OR DESTINATION ADDRESS WITH SPECIFIC REGISTER OFFSET |
|---|---|---|---|
| #A | MPEG, 4M | B | #1 |
| #B | AUDIO, 1M | B | #3 |

FIG.62

| SUBSCRIBED MULTICAST ADDRESS | I/F OF TERMINAL | PRIVATE ADDRESS OF TERMINAL |
|---|---|---|
| M | 1 (1ST HOME NETWORK) | P.2 |
|  | 2 | P.5 |
|  | --- | --- |
| --- | --- | --- |

LAYER-3 FLOW REGISTER

FIG.75

FANP OFFER MESSAGE

| VERSION NUMBER |
|---|
| FLOW ID |
|     SOURCE IP ADDRESS (0) |
|     SOURCE PORT NUMBER (0) |
|     DESTINATION IP ADDRESS (IPm) |
|     DESTINATION PORT NUMBER (0) |
| LAYER-2 ID |
|     LAYER-2 TYPE (IEEE 1394) |
|     ID TYPE (ISOCHRONOUS CHANNEL NUMBER) |
|     ID (#x) |
| DIRECTION (INPUT) |

DATA TRANSMITTING NODE AND NETWORK INTER-CONNECTION NODE SUITABLE FOR HOME NETWORK ENVIRONMENT

This application is based upon and claims the benefit of priority under 35 U.S.C. § 120 from U.S. application Ser. No. 09/036,197, filed on Mar. 6, 1998 now U.S. Pat No. 6,751,221 (the parent application), which is a continuation-in-part of U.S. application Ser. No. 08/943,927, filed Oct. 3, 1997, now abandoned and under 35 U.S.C. § 119 from Japanese Patent Application Nos. P08-264496, filed Oct. 4, 1996; P09-052125, filed Mar. 6, 1997; and P09-338895, filed Dec. 9, 1996. The entire content of the parent application is incorporated herein by reference.

BACKGROUND OF THE INVENTION

1. Field of the Invention

The present invention relates to a network system for constructing a home network environment, and more particularly, to a data transmitting node and a network inter-connection node suitable for use in the home network environment.

2. Description of the Background Art

In recent years, there is a rapid trend for digitalizing electronic instruments as exemplified by the term "multi-media", and this trend is already noticeable in the office environment.

More specifically, in terms of hardware, this trend has been materialized in forms of introduction of PCs, digitalization of OA devices and formation of networks among them. Also, in terms of software, this trend has been expanding to cover the basic functions of hosts (which are progressively light-sized and transferred to PCs), the application software such as the word-processing software, the spreadsheet software, etc., and the Internet application such as the WWW.

The similar trend can also be seen in the home environment. Namely, even in the home environment, this trend for digitalization has been steadily progressed in forms of digitalization of AV devices (DVD, digital VTR, digital video camera, etc.), digitalization of broadcasting, and Internet access such as OCN.

Similarly as in a case of the office environment, this trend is expected to progress toward the formation of networks in future. Namely, it is expected that the technologies of various fields such as information processing, communication and broadcasting will be unified by the digitalization, and inter-mixed with each other by the formation of networks.

There are many candidates for the network technologies in this direction. For example, the Ethernet has overwhelming records of the actual use in the office environment and is probably the most promising candidate even for the home PC network. Also, the ATM is another serious contender because of the general consensus among the infra-structure constructors (telephone companies, CATV companies, etc.) to keep constructing the infra-structures based on this technology in view of the advantageous characteristics of the ATM such as its fast, real-time, and wide bandwidth properties.

In addition to these candidates, the network technology (bus technology) called IEEE 1394 has been attracting much attentions recently. This IEEE 1394 has several remarkable characteristics such as its fast, real-time (QOS guaranteed), and plug-and-play properties, so that there is a high expectation especially among the AV industries on the IEEE 1394 as the most promising candidate for a future scheme for inter-connecting digital AV devices. This vogue has also instigated much interests to the IEEE 1394 from the computer industries as well.

In the initial phase, it is expected that the inter-connection of the home use digital devices will be realized by these various network technologies in conjunction with the spread of the home use digital devices, depending on preferences and demands of the users, and in this way prototype digital networks will be gradually built up inside each home.

In the second phase, there will be demands for inter-connecting these digital networks together. For example, there will be a desire to inter-connect an AV device connected to the 1394 network of a guest room on the first floor with another AV device connected to the 1394 network of a private room on the second floor in order to realize the dubbing or the cooperative operation between these AV devices.

However, in order to meet the expected demands of this second phase, the following problems must be addressed and resolved.

(1) The 1394 network is not suited for a large scale installation. For example, its cable length is limited to 4.5 m, so that the wiring across rooms will be difficult. Also, the plug-and-play function of the 1394 has the side-effect that the on-going communication will be instantaneously disconnected whenever someone connects to or disconnects from the 1394. When the wiring of the 1394 across rooms is attempted, there will be an inconveniency in that an action made in one room would affect another room in a form of the instantaneous disconnection of the on-going communication because of its "bus reset".

(2) The standardization of the specification for "1394bridge" as the inter-connection protocol/scheme for the 1394 is currently in progress at the IEEE which is the standardization committee for the 1394. However, the standard specification is expected to be a very complicated one that requires the scalability and incorporates a concept of call set up, and it is also expected that a considerable amount of time will be needed before the standard specification can be solidified.

(3) The home network will not necessarily be limited to just the 1394, so that it is preferable to construct the home network according to a scheme that can inter-connect various types of networks. However, no such a network architecture has been proposed so far.

(4) As a known technique for inter-connecting various networks, there is the Internet protocol. However, this scheme is difficult to set up, manage and maintain for the layman, and it also requires the server management, so that in its currently available form it is not suitable for an inter-connection scheme intended for use in the home network which is expected to deal with a rather limited number of terminals.

On the other hand, in recent years, rapid progresses made in-the communication technology such as Internet are attracting much attentions from various fields, and issues such as introduction of LAN or connection of that to WAN or Internet are much discussed mainly among companies and universities.

These technological innovations are highly likely to change the network environment surrounding our homes. Namely, with the spread of various digital devices such as PC, DVD, digital set-top box and so on in our homes, demands for inter-connecting them through a digital network inevitably arises. Currently, IEEE 1394 bus is attracting much attentions from various fields, especially among AV vendors, as a prime candidate for such a digital network for home use.

This IEEE 1394 bus can be used as a high speed digital network of 100, 200 or 400 Mbps, and has several remarkable characteristics including plug-and-play properties, synchronous transfer function using isochronous channel, etc., as already mentioned above.

Meanwhile, rapid technological innovations are also made in the so called access network for homes. Namely, notable progresses have been made in high speed network technologies such as CATV, ADSL (Asymmetric Digital Subscriber Line) and FTTH (Fiber-To-The-Home) as well as network services such as Internet, and so on. In particular, the Internet technology has promoted many remarkable techniques including its fast implementation, guarantee of QOS (Quality Of Service) using network layer level signaling protocol such as RSVP (Resource Reservation Protocol), multicast, and so on.

In near future where these techniques are realized on Internet, transfer of some information that require high speed and realtime characteristics such as video transfer to homes may very well be carried out through Internet. This is because Internet can store virtually infinite amount of information so that it is only natural for Internet users to come to expect acquisition through Internet of the above noted information which has conventionally been acquired from terrestrial or satellite broadcasting and the like.

However, when exchanges of information through Internet are attempted by-connecting home digital devices through the access network, the following problems will be encountered.

(1) Currently, a scheme for distributing Internet data over IEEE 1394, i.e., IP-over-1394, is discussed by various groups, but these discussions still remain at a level of the so called address resolution scheme. On the other hand, there is a proposition of a signaling protocol such as-RSVP for carrying out data exchanges with guaranteed communication quality on Internet. However, a scheme for operating such a network layer signaling protocol on IEEE 1394 has not been standardized so that mapping to a transfer scheme that does not guarantee communication quality is the only available option for IEEE 1394.

Consequently, even when the above noted signaling protocol is executed, data will be transferred over IEEE 1394 on the best effort basis (more specifically, through asynchronous channel) so that the end-to-end communication quality cannot be guaranteed.

(2) In the case of transmission and reception of IP multicast on IEEE 1394 bus, the use-of isochronous channel or asynchronous stream of IEEE 1394 can be considered in order to minimize traffic on IEEE 1394 bus. However, when two or more devices tries to subscribe for the same IP multicast at the same time, there is a possibility for these two or more devices to reserve different channels separately so that the efficient utilization of communication resource cannot be realized.

Moreover, there is no mechanism for enabling synchronized recognition of correspondence between reserved channel and IP multicast address by a transmitting side and a receiving side.

SUMMARY OF THE INVENTION

It is therefore an object of the present invention to provide a data transmitting node and a network inter-connection node which are capable of resolving the above noted problems and which are therefore suitable for use in the home network environment.

It is another object of the present invention to provide a communication device capable of realizing communication that guarantees communication quality in an inter-connected network environment even on IEEE 1394, by specifying a scheme for applying RSVP to IEEE 1394 bus.

It is another object of the present invention to provide a communication device capable of carrying out IP multicast by utilizing communication resource efficiently, and enabling recognition of correspondence between reserved channel and IP multicast address by a transmitting side and a receiving side in synchronization, in a network of broadcast type such as IEEE 1394.

According to one aspect of the present invention, there is provided a data transmitting node connected with a physical network, comprising: a first transmission unit for transmitting a control message in a case of transmitting information data to a receiving node through connected with the physical network or another physical network, the control message including an IP address information of a data transmission destination, a header/channel information dependent on the physical network, and an information indicating that the information data to be transmitted according to the header/channel information is data in an upper layer of an IP layer; and a second transmission unit for transmitting the information data to the receiving node, the information data containing the header/channel information and data of the upper layer without IP packet encapsulation.

In this aspect of the present invention, it becomes possible to explicitly notify a network connection device on a communication path that the information data that pass through a communication path established by the control message are not IP packets so that they should be forwarded by a datalink layer processing alone without forwarding them to the so called IP processing unit for carrying out the routing processing of IP packets.

Namely, by notifying a header/channel information according to which the information data is to be transmitted later and an IP address of the receiving node to the network connection device, it becomes possible to notify that a transfer destination of the subsequently transmitted information data which has this header/channel information (datalink layer identifier) is the IP address of the receiving node, so that the network connection device on the communication path can establish the communication path (datalink layer communication path) up to the receiving node at the datalink layer level.

In addition, by using the IP address, it becomes -possible to realize an address system which can be commonly used even under an environment in which a plurality of types of physical networks are inter-connected, so that it becomes possible to carry out the data transmission and the control message transmission with respect to nodes belonging to physical networks of different transmission schemes.

Moreover, it is possible to explicitly notify the network connection device that the information data that pass through the communication path are not IP packets but the packets in the upper layer than the IP layer, so that it can be expected that the network connection device will transfer the information data on the communication path to the receiving node without applying the so called IP routing processing, and therefore it becomes possible to realize the transmission of the so called raw data such as MPEG video and speech data.

Also, in this aspect of the present invention, the control message may command to a network inter-connection node for connecting said physical network and a next physical network a registration of a correspondence between the header/channel information dependent on said physical network and a header/channel information dependent on the next physical network.

This defines the operation of the control message in this aspect of the present invention.

Also, in this aspect of the present invention, the data transmitting node may further comprises: a reception unit for receiving digital video and/or digital audio data; wherein the second transmission unit transmits the digital video and/or digital audio data received by the reception unit as the information data, by formatting the digital video and/or digital audio data into a transmission format for said physical network.

In this aspect of the present invention, in a case of receiving the raw or MPEG coded video/speech data and forwarding the received data to a specific receiving node, as in a case of a set-top box for the digital satellite broadcast, the digital CATV, or the digital terrestrial broadcast, it becomes possible to realize this data forwarding by formatting the received data into a format of a physical network.

According to another aspect of the present invention, there is provided a network inter-connection node for transmitting information data received from one physical network to another physical network, comprising: a reception unit for receiving a first control message from said one physical network, the first control message containing an IP address information of a data transmission destination, a first header/channel information dependent on said one physical network, and an information indicating that an information data to be transmitted according to the first header/channel information is data in an upper layer of a protocol layer corresponding to the IP address information; a first transmission unit for transmitting a second control message to said another physical network when the reception unit receives the first control message, the second control message containing the IP address information, a second header/channel information dependent on said another physical network which is obtained from the IP address information, and the information indicating that the information data to be transmitted according to the second header/channel information is data in the upper layer; a memory unit for storing a correspondence between the first header/channel information and the second header/channel information; and a second transmission unit for obtaining the second header/channel information corresponding to the first header/channel information according to the correspondence stored in the memory unit when the information data containing the first header/channel information is received from said one physical network, attaching the second header/channel information to the information data, and transmitting the information data to said another physical network, the information data containing data of the upper layer without IP packet encapsulation.

In this aspect of the present invention, the information data containing the first header/channel information are the packets in the upper layer than the IP layer. Consequently, each network connection device on the communication path can recognize that the information data that pass through a communication path established by the control message are not IP packets so that there should be a setting by which they can be forwarded by a datalink layer processing alone without forwarding them to the so called IP processing unit for carrying out the routing processing of IP packets, and make this setting to the second transmission unit. As a result, it becomes possible to realize a transfer of arbitrary data such as MPEG video and speech data in the IP network environment.

Also, in this aspect of the present invention, the first control message may command a registration of a correspondence between the first header/channel information and the second header/channel information, and the second control message may command to a receiving node or a network inter-connection node for connecting said another physical network and a third physical network a registration of a correspondence between the second header/channel information and a header/channel information dependent on said third physical network.

This defines the operations of the first and second control messages in this aspect of the present invention.

According to another aspect of the present invention, there is provided a data transmitting node connected with a physical network, comprising: a first transmission unit for transmitting a control message in a case of transmitting information data to a receiving node connected with the physical network or another physical network, the control message including an IP address information of a data transmission destination, a header/channel information dependent on the physical network, and an information indicating a required communication resource; and a second transmission unit for transmitting the information data containing the header/channel information for which the required communication resource is reserved, to the receiving node.

In this aspect of the present invention, it becomes possible to explicitly notify a network connection device on a communication path that the information data that pass through a communication path established by the control message are requiring this much of the communication resource amounts so that this communication resource amounts should be reserved in a case of acquiring the communication resources (connections, channels, etc.) of the datalink that constitutes this communication path.

In addition, the IP address is used as an address system so that it can be realized under the inter-connection environment of arbitrary combination of mutually different datalink layers and therefore it becomes possible to establish the communication path while reserving the communication resources under an arbitrary inter-connected network environment.

Also, in this aspect of the present invention, the control message may command to a network inter-connection node for connecting said physical network and a next physical network a registration of a correspondence between the header/channel information dependent on said physical network and a header/channel information dependent on the next physical network for which the required communication resource is reserved.

This defines the operation of the control message in this aspect of the present invention.

Also, in this aspect of the present invention, the data transmitting node may further comprises: a reception unit for receiving digital video and/or digital audio data; wherein the second transmission unit transmits the digital video and/or digital audio data received by the reception unit as the information data, by formatting the digital video and/or digital audio data into a transmission format for said physical network.

In this aspect of the present invention, in a case of receiving the raw or MPEG coded video/speech data and forwarding the received data to a specific receiving node, as in a case of a set-top box for the digital satellite broadcast, the digital CATV, or the digital terrestrial broadcast, it becomes possible to realize this data forwarding by formatting the received data into a format of a physical network.

According to another aspect of the present invention, there is provided a network inter-connection node for transmitting information data received from one physical network to another physical network, comprising: a reception unit for receiving a first control message from said one physical network, the first control message containing an IP address information of a data transmission destination, a first header/channel information dependent on said one physical network, and an information indicating a required communication resource; a first transmission unit for transmitting a second control message to said another physical network when the reception unit receives the first control message, the second control message containing a second header/channel information dependent on said another physical network which is obtained from the IP address information, and the information indicating the required communication resource; an establishing unit for establishing a communication path with respect to a receiving node or a next network inter-connection node for connecting said another physical network and a third physical network, the communication path having the second header/channel information with the required communication resource; a memory unit for storing a correspondence between the first header/channel information and the second header/channel information; and a second transmission unit for obtaining the second header/channel information corresponding to the first header/channel information according to the correspondence stored in the memory unit when the information data containing the first header/channel information is received from said one physical network, attaching the second header/channel information to the information data, and transmitting the information data to said another physical network.

In this aspect of the present invention, each network connection device on the communication path can recognize that the information data that pass through a communication path established by the control message are requiring this much of the communication resource amounts so that this communication resource amounts should be reserved in a case of acquiring the communication resources (connections, channels, etc.) of the datalink that constitutes this communication path, establish the datalink layer connection having this communication resource amounts by the establishing unit, and make a corresponding setting to the second transmission unit.

In addition, the IP address is used as an address system so that it can be realized under the inter-connection environment of arbitrary combination of mutually different datalink layers and therefore it becomes possible to establish the communication path while reserving the communication resources under an arbitrary inter-connected network environment.

Also, in this aspect of the present invention, the first control message may command a registration of a correspondence between the first header/channel information and the second header/channel information, and the second control message may command to the receiving node or the next network inter-connection node a registration of a correspondence between the second header/channel information and a header/channel information dependent on said third physical network.

This defines the operations of the first and second control messages in this aspect of the present invention.

According to another aspect of the present invention, there is provided a data transmitting node-connected with a physical network, comprising: a first transmission unit for transmitting a control message in a case of transmitting information data to a receiving node connected with the physical network or another physical network, the control message including an IP address information of a data transmission destination, a header/channel information dependent on the physical network, and an information on a format of the information data to be transmitted according to the header/channel information; and a second transmission unit for transmitting the information data in said format which contains the header/channel information, to the receiving node.

In this aspect of the present invention, it becomes possible to explicitly notify a network connection device on a communication path that the information data that pass through a communication path established by the control message will be in this format (such as MPEG, JPEG, etc.) so that they should be forwarded by a datalink layer processing alone without forwarding them to the so called IP processing unit for carrying out the routing processing of IP packets, and a transfer according to the format transfer scheme depending on the datalink-layer of a transfer target physical network should be made.

For example, in a case of MPEG, it becomes possible to urge the setting by which the MPEG data can be transferred in a format depending on the datalink layer, such as "MPEG-over-ATM" defined by the ATM forum in while being transferred through the ATM network, and "MPEG-over-1394" defined by the IEC 61883 while being transferred through the IEEE 1394 bus.

Also, in this aspect of the present invention, the control message may command to a network inter-connection node for connecting said physical network and a next physical network a registration of a correspondence between the header/channel information dependent on said physical network and the header/channel information dependent on the next physical network.

This defines the operation of the control message in this aspect of the present invention.

Also, in this aspect of the present invention, the data transmitting node may further comprises: a reception unit for receiving digital video and/or digital audio data; wherein the second transmission unit transmits the digital video and/or digital audio data received by the reception unit as the information data, by formatting the digital video and/or digital audio data into said format.

In this aspect of the present invention, in a case of receiving the raw or MPEG coded video/speech data and forwarding the received data to a specific receiving node, as in a case of a set-top box for the digital satellite broadcast, the digital CATV, or the digital terrestrial broadcast, it becomes possible-to realize this data forwarding by formatting the received data into a format of a physical network.

According to another aspect of the present invention, there is provided a network inter-connection node for transmitting information data received from one physical network to another physical network, comprising: a reception unit for receiving a first control message from said one physical network, the first control message containing an address information of a data transmission destination, a first header/channel information dependent on said one physical network, and an information on a format of the information data to be transmitted according to the first header/channel information; a first transmission unit for transmitting a second control message to said another physical network when the reception unit receives the first control message, the second control message containing the address information, a second header/channel information dependent on said another physical network which is obtained from the address information, and the information on a format of the information data to be transmitted according to the second header/channel information; a memory unit for storing a correspondence between the first header/channel information and the second header/channel information; a conversion unit for converting a transmission format of the information data to be transmitted from a transmission format in the said one physical network to a transmission format in said another physical network; and a second transmission unit for obtaining the second header/channel information corresponding to the first header/channel information according to the correspondence stored in the memory unit when the information data containing the first header/channel information is received from said one physical network, attaching the second header/channel information to the information data, and transmitting the information data to said another physical network.

In this aspect of the present invention, each network connection device on the communication path can recognize that the information data that pass through a communication path established by the control message will be in this format (such as MPEG, JPEG, etc.) so that they should be forwarded by a datalink layer processing alone without forwarding them to the so called IP processing unit for carrying out the routing processing of IP packets, and there is a need to carry out the format conversion in order to transfer according to the format transfer scheme depending on the-datalink layer of a transfer target physical network, and make necessary settings to the conversion unit and the second transmission unit.

Also, in this aspect of the present invention, the first control message may command a registration of a correspondence between the first header/channel information and the second header/channel information, and the second control message may command to a receiving node or a network inter-connection node for connecting said another physical network and a third physical network a registration of a correspondence between the second header/channel information and a header/channel information dependent on said third physical network.

This defines the operations of the first and second control messages in this aspect of the present invention.

Also, in this aspect of the present invention, the information data to be transmitted by the second transmission unit may be MPEG data, and the conversion unit may convert the transmission format of the MPEG data from a transmission format for the MPEG data in said one physical network to a transmission format for the MPEG data in said another physical network.

In this aspect of the present invention, by this format conversion by the conversion unit, it becomes possible to transfer the MPEG data in a format depending on the datalink layer, such as "MPEG-over-ATM" defined by the ATM forum in while being transferred through the ATM network, and "MPEG-over-1394" defined by the IEC 61883 while being transferred through the IEEE 1394 bus.

According to another aspect of the present invention, there is provided a data transmitting node connected with an IEEE 1394 bus, comprising: a first transmission unit for transmitting a control message in a case of transmitting information data to a receiving node connected with another physical network, the control message including an address information of a data transmission destination, and an isochronous channel number or a register offset indicating an isochronous channel of said IEEE 1394 bus; and a second transmission unit for transmitting the information data in forms of IEEE 1394 packets containing the isochronous channel number or the register offset, onto the isochronous channel.

In this aspect of the present invention, it becomes possible to explicitly notify a transfer target of the received data to a network connection device on a communication path connected to the IEEE 1394 bus, in such a manner that the information data entering from that isochronous channel number at the IEEE 1394 interface to which this control message is entered will be data destined to that data transmission destination address.

In addition, it also becomes possible to explicitly notify that the information data that pass through that isochronous channel should be forwarded to a next hop network channel by a datalink layer processing alone without forwarding them to the so called IP processing unit for carrying out the routing processing of IP packets.

Also, in this aspect of the present invention, the control message may command to a network inter-connection node for connecting said IEEE 1394 bus and a next physical network a registration of a correspondence between the isochronous channel number of the register offset and a header/channel information dependent on the next physical network.

This defines the operation of the control message in this aspect of the present invention.

Also, in this aspect of the present invention, the data transmitting node may further comprises: a reception unit for receiving digital video and/or digital audio data; wherein the second transmission unit transmits the digital video and/or digital audio data received by the reception unit as the information data, by formatting the digital video and/or digital audio data into an IEEE 1394 transmission format.

In this aspect of the present invention, in a case of receiving the raw or MPEG coded video/speech data and forwarding the received data to a specific receiving node, as in a case of a set-top box for the digital satellite broadcast, the digital CATV, or the digital terrestrial broadcast, it becomes possible to realize this data forwarding by formatting the received data into a format of a physical network.

According to another aspect of the present invention, there is provided a network inter-connection node-for connecting at least two physical networks including an IEEE 1394 bus and transmitting an information data received from one physical network to another physical network, comprising: a reception unit for receiving a first control message from said one physical network, the first control message containing an address information of a data transmission destination, and a first header/channel information dependent on said one physical network; a first transmission unit for transmitting a second control message to said another physical network when the reception unit receives the first control message, the second control message containing the address information and a second header/channel information dependent on said another physical network which is obtained from the address information; a memory unit for storing a correspondence between the first header/channel information and the second header/channel information, at least one of the first header/channel information and the second header/channel information including an isochronous channel number or a register offset indicating an isochronous channel of the IEEE 1394 bus; and a second transmission unit for obtaining the second header/channel information corresponding to the first header/channel information according to the correspondence stored in the memory unit when the information data containing the first header/channel information is received from said one physical network, attaching the second header/channel information to the information data, and transmitting the information data to said another physical network.

In this aspect of the present invention, it becomes possible to carry out the transmission of arbitrary data with respect to the receiving node belonging to arbitrary distanced network (a physical network to which the transmitting node does not belongs), under the environment in which the 1394 buses or the 1394 bus and arbitrary physical network are inter-connected.

Namely, in the inter-connected networks in which the 1394 buses or the 1394 bus and arbitrary physical network are inter-connected, it is possible to ascertain the destination node ID or channel number and the destination address of the destination node (which can be the network layer address such as IP address or the datalink layer address such as 1394 address or MAC address) which are the header information of the first physical network to which the data will be transferred later, from the neighboring node on the side of the IEEE 1394 bus which is the first physical network. Then, from this information, it is possible to notify a correspondence between the header/channel information to be used at the second physical network (virtual connection identifier, or destination node ID or channel number, or MAC address, etc., in the second physical network) and the destination address (the address information), to the neighboring node on the second physical network side (or conversely, the information from the second physical network side is notified to the first physical network side).

In addition, by referring to the header/channel information (channel number, destination node ID, virtual connection identifier, MAC address, etc.) of one physical network alone, it becomes possible to transfer the data by attaching (or. converting) the header/channel information (channel number, destination node ID, virtual connection identifier, MAC address, etc.) of another physical network, so that the considerably fast processing becomes possible even between the 1394 bus and the other arbitrary physical network.

Moreover, at least one of the first header/channel information and the second header/channel information includes an isochronous channel number or a register offset indicating an isochronous channel of the IEEE 1394 bus, so that it becomes possible-for the relay device to directly convert the isochronous channel number of the IEEE 1394 bus to the header/channel information (virtual connection identifier, isochronous channel number, MAC address, etc.) of the (another) second physical network (or vice versa). Consequently, especially in a case where the end-to-end data transfer by the datalink layer switching is desired as in a case of the transfer of data that requires the communication quality, it becomes possible to realize this data transfer by using the isochronous channel of the IEEE 1394 bus and using the channel number in a similar manner as the virtual connection identifier (such as VPI/VCI of the ATM).

Also, in this aspect of the present invention, said another physical network may be an Ethernet or a token ring or a FDDI, and the second header/channel information may indicate a MAC address.

Also, in this aspect of the present invention, said one physical network may be an Ethernet or a token ring or a FDDI, and the first header/channel information may indicate a MAC address.

In these cases, it becomes possible to recognize the header value and its attribute and communication quality on the 1394 bus side by providing the correspondence table and the conversion table based on the MAC address value, or conversely, to recognize the header information value (header/channel information depending on the second physical network) on the second physical network (another physical network) side and its attribute and communication quality by providing the table based on the header information value of the 1394 bus. Consequently, it becomes possible to carry out the data forwarding to the facing network side by the datalink layer processing alone, and the fast forwarding processing becomes possible. For this reason, it becomes possible to use the various frame schemes using MAC address as the transmission scheme of the second physical network.

Also, in this aspect of the present invention, said another physical network may be an ATM network, and the second header/channel information may indicate a VPI/VCI.

Also, in this aspect of the present invention, said one physical network may be an ATM network, and the first header/channel information may indicate a VPI/VCI.

In these cases, it becomes possible to recognize the header value and its attribute and communication quality on the 1394 bus side by providing the correspondence table and the conversion table based on the VPI/VCI value, or conversely, to recognize a value of the VPI/VCI value (header/channel information depending on the second physical network) and its attribute and communication quality by providing the table based on the header information value of the 1394 bus. Consequently, it becomes possible to carry out the data forwarding to the facing network side by the datalink layer processing alone, and the fast forwarding processing becomes possible. For this reason, it becomes possible to use the ATM as the transmission scheme of the second physical network (another physical network).

According to another aspect of the present invention, there is provided a data transmitting node connected with a network, comprising: a first transmission unit for transmitting a control message in a case of transmitting information data to a receiving node connected with another network, the control message including a first MAC address information of a data transmission destination, and a second MAC address information to be attached to the information data; and a second transmission unit for transmitting the information data containing the second MAC address information, to the receiving node.

In this aspect of the present invention, it becomes possible to explicitly notify a transfer target of the received data to a network connection device on a communication path, in such a manner that the information data entering with that second MAC address at the physical network interface to which this control message is entered will be data destined to that data transmission destination first MAC address.

In addition, it also becomes possible to explicitly notify that, for the information data entered with that second MAC address, the similar control message exchange is to be carried out at the subsequent hops and the packet/frame routing should be carried out by referring to the MAC address alone.

Also, in this aspect of the present invention, the control message may command to a network inter-connection node for connecting said network and a next network a registration of a correspondence between the second MAC address information and a header/channel information dependent on the next network.

This defines the operation of the control message in this aspect of the present invention.

Also, in this aspect of the present invention, the data transmitting node may further comprises: a reception unit for receiving digital video and/or digital audio data; wherein the second transmission unit transmits the digital video and/or digital audio data received by the reception unit as the information data, by formatting the digital video and/or digital audio data into a transmission format for said network.

In this aspect of the present invention, in a case of receiving the raw or MPEG coded video/speech data and forwarding the received data to a specific receiving node, as in a case of a set-top box for the digital satellite broadcast, the digital CATV, or the digital terrestrial broadcast, it becomes possible to realize this data forwarding by formatting the received data into a format of a physical network.

According to another aspect of the present invention, there is provided a network inter-connection node for transmitting information data received from one network to another network, comprising: a reception unit for receiving a first control message from said one network, the first control message containing a first MAC address information of a data transmission destination, and a second MAC address information; a first transmission unit for transmitting a second control message to said another network when the reception unit receives the first control message, the second control message containing the first MAC address information, and a third MAC address information which is obtained from the first MAC address information; a memory unit for storing a correspondence between the second MAC address information and the third MAC address information; and a second transmission unit for obtaining the third MAC address information corresponding to the second MAC address information according to the correspondence stored in the memory unit when the information data containing the second MAC address information is received from said-one network, attaching the third MAC address information to the information data, and transmitting the information data to said another network.

In this aspect of the present invention, in the bridge network in which two or more physical networks are interconnected, it is possible to ascertain the header information (the destination MAC address in the first physical network) of the first physical network (one physical network) to which the data will be transferred later and the destination address of its destination node (the MAC address information: the final destination MAC address), from the neighboring node of the previous hop. Then, from this information, it is possible to notify a correspondence between the header information (the destination MAC address in the second physical network) to be used at the second physical network (another physical network) and the destination address (the MAC address information: the final destination MAC address), to the neighboring node.

In addition, by referring to the header information (the destination MAC address in the first physical network) of said physical network alone, it becomes possible to transfer the data by attaching (or converting) the header information (MAC address) of the second physical-network, so that the considerably fast processing becomes possible even between different types of networks. Here, the MAC address may be used as a logical value, that is, as the virtual connection identifier.

According to another aspect of the present invention, there is provided a network inter-connection node for connecting at least two physical networks, comprising: a request receiving unit for receiving from a first physical network an address resolution request for resolving a datalink layer address from a network layer address; a forwarding unit for forwarding the address resolution request with respect to a connected physical network other than the first physical network; a response receiving unit for receiving from a second physical network a first address resolution response corresponding to the address resolution request forwarded by the forwarding unit; a registration unit for registering a correspondence between the network layer address and the second physical network into a routing table, by referring to a network layer source address or a network address contained in the first address resolution response; and a response transmitting unit for transmitting to the first physical network a second address resolution response corresponding to the address resolution request received by the request receiving unit, by inserting a datalink layer address of said network inter-connection node device as a resolved address.

In this aspect of the present invention, when the first physical network and the second physical network are the networks using different address systems (such as the Ethernet and the IEEE 1394, for example), or when they are networks using the same address system which are however connected without using a bridge connection, it becomes possible to carry out a delivery of a packet to a desired node by specifying an address of this network inter-connection node as a packet destination with respect to a node which transmitted the address resolution request and carrying out the routing of a packet received at this network inter-connection node.

In addition, in this aspect of the present invention, the network layer address learning function is provided, so that it is possible to deal with a case where an entry or withdrawal of a node with respect to a network is to be made dynamically.

Also, in this aspect of the present invention, the network inter-connection node device may further comprises a transfer unit for transferring a received packet to a physical network registered in the routing table, according to a network layer destination address of the received packet.

Also, in this aspect of the present invention, the response transmitting unit may activate the forwarding unit when a network layer address contained in the address resolution request received from the first physical network is not a network layer address of said network inter-connection node device and not registered in the routing table, and transmit the second address resolution response otherwise.

Also, in this aspect of the present invention, the first physical network and the second physical network may be operated by different datalink protocols.

According to another aspect of the present invention there is provided a communication device connected with a network of broadcast type (such as IEEE 1394), comprising: a reception unit for receiving a first message which is a control message for bandwidth reservation with respect to a network layer data flow, including a first identifier for identifying the network layer data flow, from a second communication device connected with the network; an establishing unit for establishing a broadcast type channel (such as isochronous channel or asynchronous stream of IEEE 1394) on the network according to the first message received by the reception unit; and a transmission unit for transmitting a second message which contains at least a correspondence between a second identifier of the broadcast type channel established by the establishing unit and the first identifier of the network layer data flow, to the second communication device.

In this aspect of the present invention, in a control protocol for bandwidth reservation with respect to a network layer data flow such as RSVP in Internet, a node which received a control message (first message, which is PATH message or RESV message in the case of RSVP) reserves a broadcast type channel (such as isochronous channel or asynchronous stream of IEEE 1394) on that network, so that it is possible to reserve the required communication resource in a form of the broadcast type channel, and it becomes possible to realize communication with end-to-end communication resource reserved as should be realized by the network layer level signaling protocol.

In addition, the second message can also be used for realizing transfer to a next hop network without requiring a routing processing in the network layer, by referring only to a datalink transfer at a network boundary, that is an identifier of a datalink layer (such as an identifier of the broadcast type channel), and indirectly recognizing the network layer flow transferred by a channel having that identifier. The second message can also be used by a downstream node to prepare for receiving of the network layer flow from that channel, or by an upstream node to prepare for transmission of the network layer flow to that channel.

Also, in this aspect of the present invention, the first message may be a message for requesting bandwidth reservation, which is transmitted from the second communication device connected to a downstream direction of the network layer data flow.

In this case, an upstream side node of the network layer flow can realize the bandwidth reservation in a form of bandwidth resource reservation for the broadcast type network. Namely, an upstream side node of the network layer flow can realize this bandwidth reservation in response to a bandwidth reservation request from a downstream direction, as in a case of receiving RESV of RSVP as the first message.

Also, in this aspect of the present invention, the first message may be a message for notifying bandwidth to be used, which is transmitted from the second communication device connected to an upstream direction of the network layer data flow.

In this case, a downstream side node of the network layer flow can realize the bandwidth reservation in a form of bandwidth resource reservation for the broadcast type network. Namely, a downstream side node of the network layer flow can realize this bandwidth reservation in response to a control message for bandwidth reservation from an upstream direction, as in a case of receiving PATH of RSVP as the first message.

Also, in this aspect of the present invention, the communication device may further comprises: a second transmission unit for transmitting a message for requesting bandwidth reservation to the second communication device which is connected to an upstream direction of the network layer data flow.

In this case, it becomes possible to transmit a message for bandwidth reservation in the network layer such as RESV message of RSVP to the second communication device of the upstream side, so that it becomes possible to realize the end-to-end bandwidth reservation.

Also, in this aspect of the present invention, the transmission unit may transmit the second message in a form of writing into a register provided at the second communication device.

In this case, it becomes possible to realize a notification of the correspondence between the identifier of the established broadcast type channel and the identifier of the network layer data flow in a form of writing into register, which is a generally known means for transmitting control information in a network of broadcast type such as IEEE 1394. This correspondence is an information regarding the datalink layer channel, so that it is appropriate to use a register for transmitting datalink layer control information, and it becomes unnecessary to provide a mechanism for receiving and interpreting this correspondence in the network layer.

According to another aspect of the present invention, there is provided a communication device connected with a network of broadcast type, comprising: a register for registering a correspondence between an identifier of a broadcast type channel established on the network which is to be used in transmitting and receiving a network layer data flow and an identifier of the network layer data flow; and a transmission and/or reception unit for transmitting and/or receiving the network layer data flow through the broadcast type channel according to the correspondence registered in the register.

In this aspect of the present invention, it becomes possible to notify to another node or obtain from another node a correspondence between a broadcast type channel identifier of a broadcast type network (such as IEEE 1394) described in this register and an information regarding a flow that passes through that channel. This correspondence is an information regarding the datalink layer channel, so that it is appropriate to use a register for transmitting datalink layer control information, and it becomes unnecessary to provide a mechanism for receiving and interpreting this correspondence in the network layer.

By using this register, when a node having this register is a transmitting node, it becomes possible for another node of the broadcast type network to recognize which flow is going to be transferred through the broadcast type channel of the broadcast type network described in this register (which flow is to be transmitted by the transmitting node), by referring to this register.

Also, when a node having this register is a transmitting node, it becomes possible for this transmitting node to recognize which flow is going to be transferred through the broadcast channel of the broadcast type network described in this register (which flow is to be transmitted by the transmitting node), as another node of the broadcast type network writes the correspondence into this register.

Also, when a node having this register is a receiving node, it becomes possible for this receiving node to recognize which flow is going to be transferred through the broadcast channel of the broadcast type network described in this register (which flow is to be received by the receiving node), as another node of the broadcast type network writes the correspondence into this register.

Also, this register may have a field for distinguishing transmission and reception. By means of this, it becomes possible to clearly indicate whether this register is to be used by the transmitting node or the receiving node.

According to another aspect of the present invention, there is provided a communication device connected with a network of broadcast type, comprising: a reception unit for receiving a subscription request for a network layer multicast address from a second communication device connected with the network; an establishing unit for establishing a broadcast type channel on the network in response to the subscription request received by the reception unit; a notification unit for notifying at least a correspondence between an identifier of the broadcast type channel established by the establishing unit and the network layer multicast address, to the second communication device; and a transmission unit for transmitting data destined to the network layer multicast address to the broadcast type channel established by the establishing unit.

In this aspect of the present invention, the isochronous channel for transmitting the corresponding network layer multicast is established by an IGMP router which receives the subscription request for that multicast address, so that it becomes possible to prevent communication resource within the network from being wasted by establishing a plurality of channels with respect to the identical multicast address.

Also, by notifying the correspondence between the identifier of the established broadcast type channel and the network layer multicast address to the second communication device, it becomes possible to notify a channel from which the multicast data can be received to the second communication device (receiving terminal), and in addition it becomes possible to accommodate a plurality of receiving terminals through a single channel because the broadcast type channel is used.

Also, in this aspect of the present invention, the communication device may further comprises: a second reception unit for receiving from the second communication device a request for reservation of bandwidth required in receiving the data destined to the network layer multicast address from the second communication device; and a reservation unit for reserving bandwidth of the broadcast type channel established by the establishing unit in response to the request received by the second reception unit.

In this case, it becomes possible to realize the transmission in a form that guarantees communication quality of the multicast.

According to another aspect of the present invention, there is provided a communication device, connected with a network of broadcast type, for transmitting data destined to a network layer multicast address, comprising: a reservation unit for reserving bandwidth for a broadcast type channel; a first transmission unit for transmitting the data destined to the network layer multicast address by using a period or connection for which the bandwidth of the broadcast type channel on the network is not reserved; and a second transmission unit for transmitting the data destined to the network layer multicast address by switching the period or connection used in the first transmission unit to a period or connection for which the bandwidth of the broadcast type channel is reserved, when the bandwidth is reserved for the broadcast type channel by the reservation unit.

In this aspect of the present invention, in a case of switching the network layer multicast packet transmission from a form of not reserving bandwidth to a form of reserving bandwidth, it becomes unnecessary to request the reservation of both the broadcast type channel and the bandwidth to a manager which is managing communication resource (such as isochronous resource manager in IEEE 1394) again, as required conventionally. Namely, it is possible to realize this switching by simply sending packets for the broadcast type channel that is already reserved as communication resource into the first transmission unit. The same also applies to the switching in the reserve direction (from a form of reserving bandwidth to a form of not reserving bandwidth).

Also, in this aspect of the present invention, an identifier of the broadcast type channel to which the data are outputted from the second transmission unit when the bandwidth is reserved by the reservation unit may be identical to an identifier of the broadcast type channel to which the data are outputted from the first transmission unit when the bandwidth is not reserved.

In this case, it becomes possible to prevent wasteful use of the broadcast type channel. In particular, for the datalink in which channel resource is relatively limited such as IEEE 1394, it becomes possible to share the same channel among the network layer multicast packets to be transmitted in a form of reserving bandwidth and multicast packets to be transmitted in a form of not reserving bandwidth, so that the efficient utilization of communication resource can be realized.

Other features and advantages of the present invention will become apparent from the following description taken in conjunction with the accompanying drawings.

BRIEF DESCRIPTION OF THE DRAWINGS

FIG. 11 is a diagram showing one example of a routing table provided in a FANP node in the communication network of FIG. 1.

FIG. 19 is a diagram showing one example of a correspondence table provided in a 1394 switch unit in the 1394 gateway of FIG. 14.

FIG. 20 is a diagram showing one example of a format for a VCID exchange message used in the communication network of FIG. 1.

FIG. 23 is a diagram showing one example of a format for a flow exchange message used in the operation sequence of FIG. 22.

FIG. 24 is a diagram showing one example of a format for a flow exchange message (offer message) used in the operation sequence of FIG. 22.

FIG. 25 is a diagram showing one example of a format for a flow exchange message (pending message) used in the operation sequence of FIG. 22.

FIG. 27 is a diagram showing one example of a format for a VCID exchange message (re-direct message) on a 1394 bus used in the operation sequence of FIG. 22.

FIG. 35 is a diagram showing one example of a correspondence table (for a case of transmitting data received from a 1394 side to an Ethernet side) provided in a 1394/Ethernet transfer unit in the half gateway of FIG. 34.

FIG. 36 is a diagram showing one example of a correspondence table (for a case of transmitting data received from an Ethernet side to a 1394 side) provided in a 1394/Ethernet transfer unit in the half gateway of FIG. 34.

FIG. 62 is a diagram showing an exemplary correspondence table stored by the connection device in the system of FIG. 58.

FIG. 75 is a diagram showing an exemplary format of a FANP OFFER message that can be used in the system of FIG. 68.

DETAILED DESCRIPTION OF THE PREFERRED EMBODIMENTS

First Embodiment

Referring now to FIG. 1 to FIG. 32, the first embodiment of the present invention will be described in detail.

Figure 1:
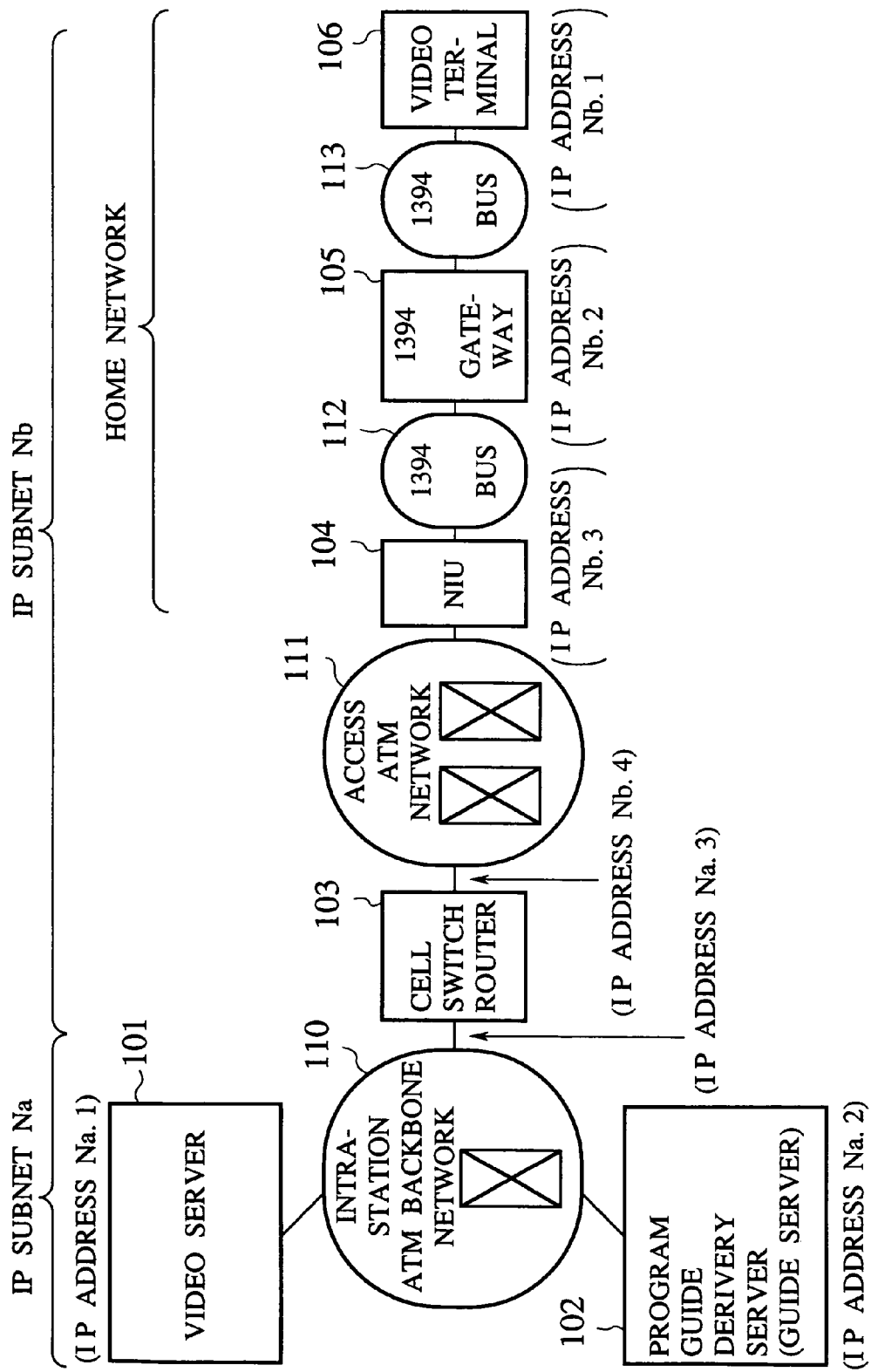
FIG. 1 is a block diagram showing an exemplary overall configuration of a communication network according to the first embodiment of the present invention.

FIG. 1 shows an exemplary configuration of a communication network system according to this first embodiment, which is formed by a CATV network and a home network connected thereto, for example.

As shown in FIG. 1, the communication network system of this first embodiment comprises a video server 101, a program guide delivery server (referred hereafter as a guide server) 102, an intra-station ATM backbone network 110, a cell switch router (CSR) 103, an access ATM network 111, an NIU (network Interface Unit) 104, a first IEEE 1394 bus 112, a 1394 gateway 105, a second IEEE 1394 bus 113, and a video terminal 106. The whole system (or at least a part of a group of devices constituting this system) is assumed to be subscribed to the Internet.

The video server 101, the guide server 102, the intra-station ATM backbone network 110 and the cell switch router 103 are the CATV head-end equipments, and located inside the CATV station. They are assumed to be belonging to an IP (Internet Protocol) subnet Na.

The video server 101 receives a control from the guide server 102, and delivers a specified video with respect to a specified address. Here, the specified address may be given by the IP address.

The guide server 102 delivers-the Web-based (i.e., HTTP-based) program guide through the Internet. The guide server 102 also has a function to notify the content, the attributes, the delivery destination, etc., of a requested program to the video server 101 and control the video server 101. The guide server 102 also has a function for authenticating and charging users.

The intra-station ATM backbone network 110 is an ATM network constituting the backbone inside the CATV station.

The cell switch router 103 is a device as disclosed in Japanese Patent Application No. 7-58196 (1995), and contains an IP processing unit and an ATM switch therein. By using the FANP (Flow Attribute Notification Protocol) to be described below, the cell switch router 103 is operated by carrying out the protocol exchanges between neighboring FANP nodes (nodes that can carry out the FANP processing). More specifically, the datalink layer connection information (VPI/VCI of ATM, etc.) with a starting point (ending point) at this cell switch router 103 is exchanged between the neighboring FANP nodes, and both connections are coupled by the ATM switch inside this cell switch router 103 so as to realize the ATM switching.

Note that, in the present invention, functions of the FANP are upgraded and modified from those disclosed in Japanese Patent Application No. 7-58196 (1995), so that the FANP used in the present invention will be considered as having a version number [2] in contrast to the FANP used in Japanese Patent Application NO. 7-58196 (1995) which is considered as having a version number [1], in a sense that the former is the upgraded version of the latter.

The access ATM network 111 connects the CATV station with the home. More specifically, it suffices for this part to use the ATM as the datalink scheme, and the subscriber line form can be any suitable form such as FTTH (Fiber To The Home), HFC (Hybrid Fiber Coax), coaxial cable, ADSL (Asymmetric Digital Subscriber Line), etc.

The NIU 104, two 1394 buses 112 and 113, the 1394 gateway 105 and the video terminal 106 are devices or networks provided inside the home.

The NIU 104 has a function to terminate the access ATM network 111 and a function to make an inter-connection with the home network. As described below, this node is also the FANP node.

Two 1394 buses 112 and 113 are home networks formed by high speed buses called IEEE 1394. In FIG. 1, the first 1394 bus 112 is connected only with the NIU 104 and the 1394 gateway 105 while the second 1394 bus 113 is connected only with the 1394 gateway 105 and the video terminal 106, but in practice, these 1394 buses may also be connected with various other digital devices such as PC, printer, DVD, etc.

The 1394 gateway 105 is a device having a function to connect two (or more) 1394 buses together. Also, the 1394 gateway 105 in this first embodiment is the FANP node as will be described below.

The video terminal 106 is a terminal having a video reception function and an IP processing function.

Here, it is assumed that the cell switch router 103 and the group of devices or networks within the home are belonging to one IP subnet. Namely, it is assumed that one (or more) IP subnet is assigned to each-home. In this first embodiment, it is assumed that this IP subnet is assigned with the subnet address Nb.

Also, as shown in FIG. 1, it is assumed that the IP address of the video server is Na. 1, the IP address of the guide server 102 is Na. 2, the IP address of the intra-station ATM backbone network 110 side interface of the cell switch router 103 is Na. 3, and the IP address of the access ATM network 111 side interface of the cell switch router 103 is Nb. 4. Also, it is assumed that the IP address of the NIU 104 is Nb. 3, the IP address of the 1394 gateway 105 is Nb. 2, and the IP address of-the video terminal 106 is Nb. 1. Here, each of the NIU 104 and the 1394 gateway 105 can have only one IP address even though more than one network interfaces are provided therein.

Figure 2:
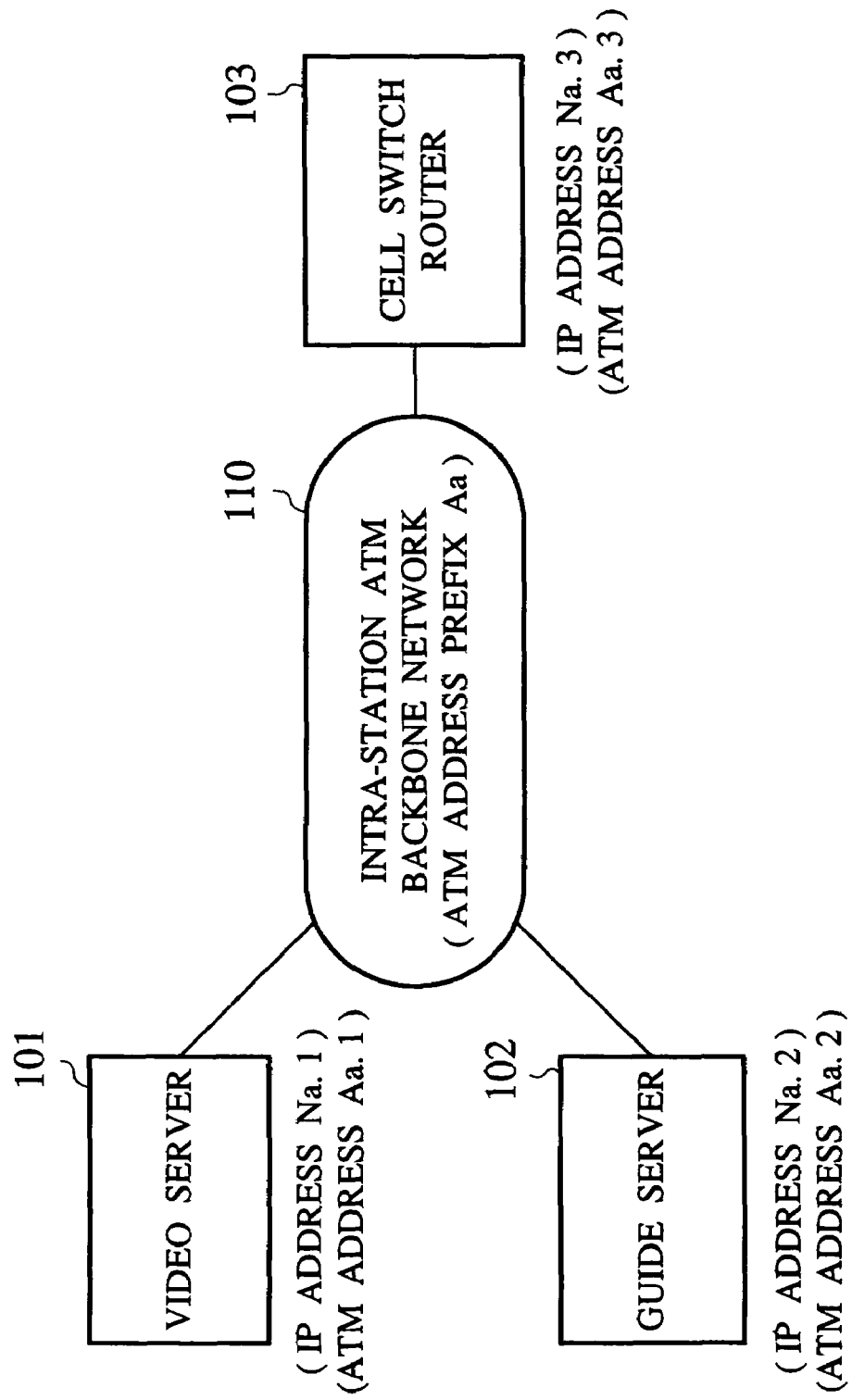
FIG. 2 is a diagram showing an exemplary correspondence between IP addresses and datalink layer addresses (ATM addresses) on an IP subnet Na side in the communication network of FIG. 1.

FIG. 2 shows a correspondence between the addresses on the IP subnet Na side, that is, the IP addresses within the intra-station ATM backbone network 110, and the datalink layer addresses (ATM addresses). Here, it is assumed that the ATM address prefix of the intra-station ATM backbone network 110 is Aa.

Figure 3:
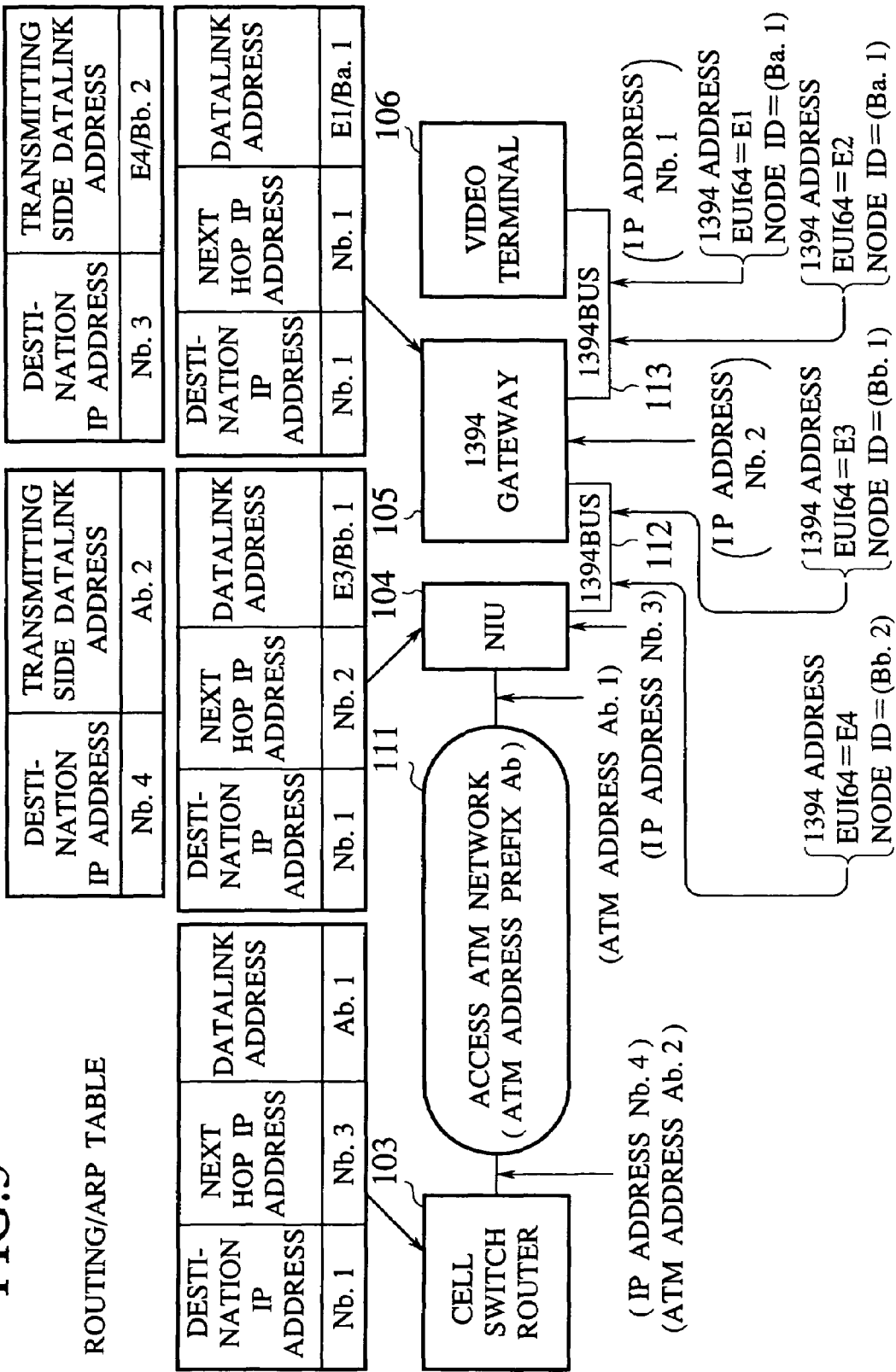
FIG. 3 is a diagram showing an exemplary correspondence between IP addresses and datalink layer addresses (ATM addresses) on an IP subnet Nb side in the communication network of FIG. 1.

Similarly, FIG. 3 shows a correspondence of the addresses on the IP subnet Nb side.

Here, it is assumed that the ATM address prefix of the access ATM network 111 is Ab, the bus ID of the first 1394 bus 112 is Bb, and the bus ID of the second 1394 bus 113 is Ba.

A terminal connected to each 1394 bus has two 1394 addresses. One is the address called EUI64 whose value remains unchanged by the bus reset, and the other is the node ID whose value may be changed by the bus reset. Here, the node ID is expressed by an expression format of (Bus ID, Physical ID).

Next, the operation of the entire system of FIG. 1 in a case of video transmission will be described with reference-to the flow chart of FIG. 4.

First, the video terminal 106 receives the program guide transmitted from the guide server 102.

This program guide is produced by the HTML (HyperText Markup Language) and its transmission protocol is the HTTP (HyperText Transfer Protocol), for example. Namely, the video terminal 106 is in a form of the Web terminal (browser), and the program guide itself is transmitted through the IP (Internet Protocol).

Here, the mechanism by which a general IP packet is transmitted will be described for each part of the entire system. Note that, the general IP packet is an IP packet for which the best-effort transmission is to be carried out, which is not belonging to a specific flow (that is, a set of a series of mutually significant IP packets such as a specific video stream) specified by a user or a device.

Figure 5:
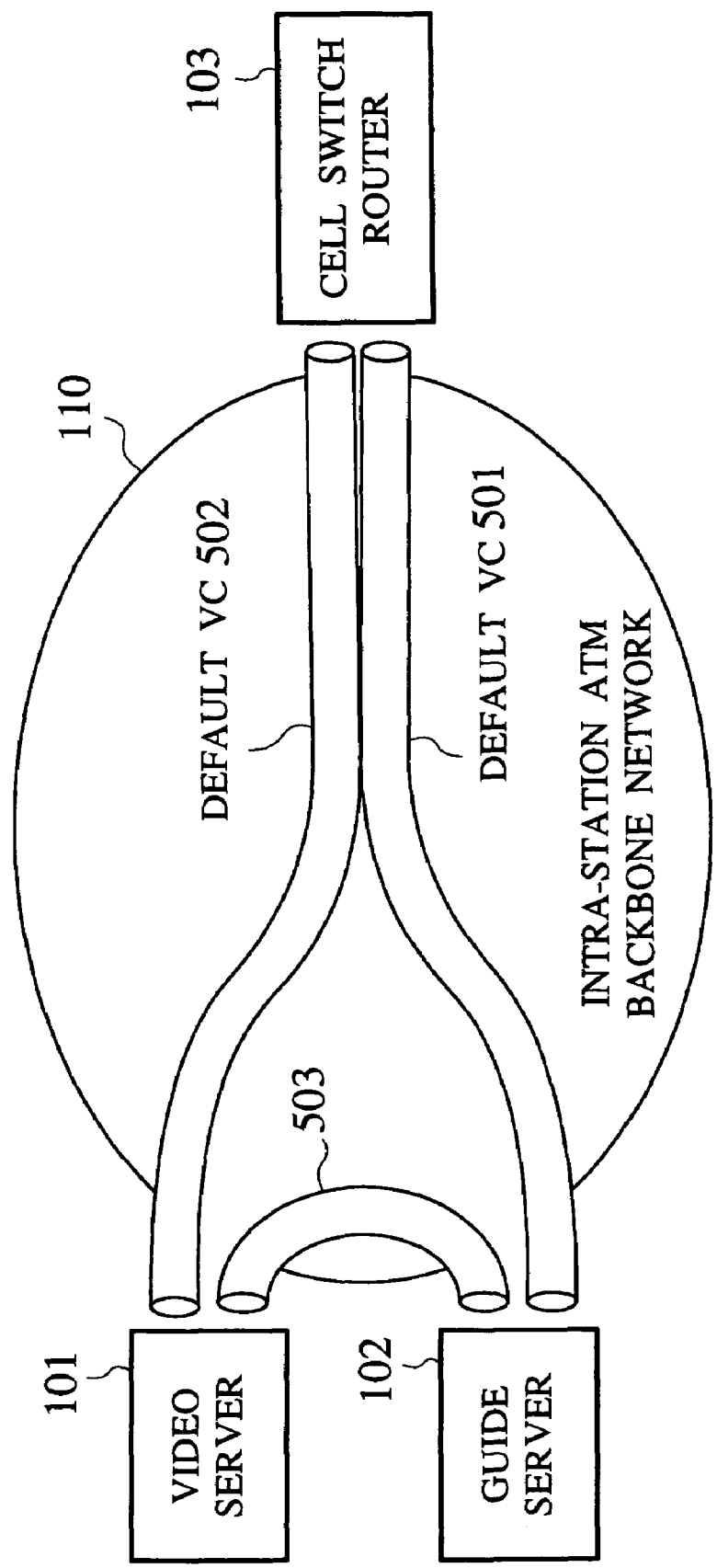
FIG. 5 is a block diagram showing default VCs in an intra-station ATM backbone network in the communication network of FIG. 1.

As shown in FIG. 5, a VC (Virtual Connection) 501 for IP packet transmission is set up in advance between the guide server 102 and the cell switch router 103. Also, the similar VC 502 is set up in advance between the video server 101 and the cell switch router 103, and the similar VC 503 is set up in advance between the video server 101 and the guide server 102. When there is no specific specification (by the FANP), these VCs are VCs set up by the default function for the purpose of transferring IP packets therethrough. These VCs will be referred hereafter as the default VCs.

The default VC may be a VC which is established by the ATM-ARP (ATM-Address Resolution Protocol) inside the intra-station ATM backbone network 110. This will now be described.

At a time of transmitting the IP packet (program guide packet) toward the video terminal 106, the guide server 102 applies the ATM-ARP inside the intra-station ATM backbone network 110. Note that the ATM-ARP server is not shown in the figures.

Assuming that the IP address of the video terminal 106 is Nb. 1. this video terminal 106 belongs to the IP subnet Nb rather than the IP subnet Na inside the CATV station, so that this resolution address (ATM address) is going to be the address of a router pointing toward the IP subnet Nb, that is, the address (ATM address) of the cell switch router 103.

When it is detected that the ATM connection pointing toward the resolution ATM address is already set up (VC 501), the guide server 102 transmits that IP packet through this VC 501.

The cell switch router 103 receives this IP packet through the default VC 501.

Figure 6:
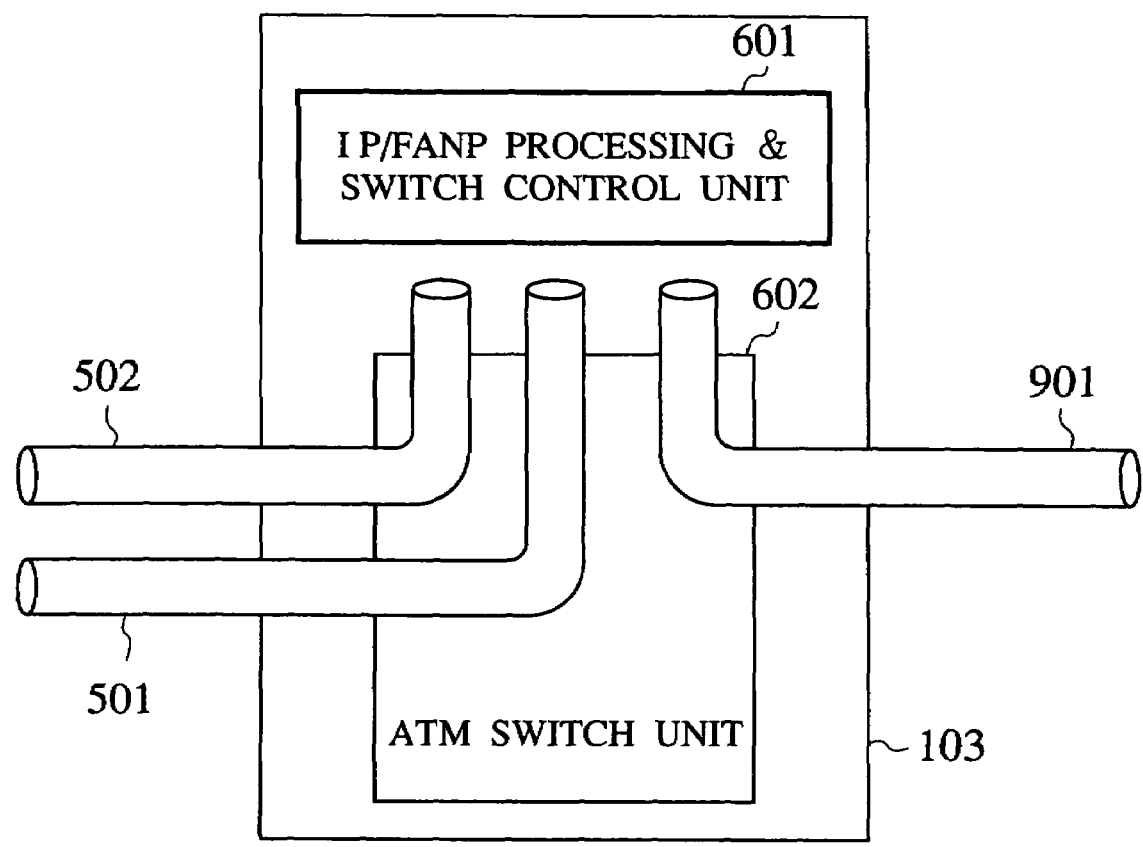
FIG. 6 is a block diagram showing an exemplary internal configuration of a cell switch router in the communication network of FIG. 1.

FIG. 6 shows an exemplary internal configuration of the cell switch router 103. As shown in FIG. 6, the cell switch router 103 comprises an IP/FANP processing and switch control unit 601 and an ATM switch unit 602.

The IP/FANP processing and switch control unit 601 has a function for processing the received IP packet or FANP packet, and a function for controlling the setting of the ATM switch unit 602 according to the FANP processing result. Note that, among the VCs from the connected ATM network, for each of the VCs 501 and 502 which is the default VC set up from the beginning for the purpose of IP packet transfer, a VC terminal point is always the IP/FANP processing and switch control unit 601 inside this cell switch router 103.

The ATM switch unit 602 comprises an ATM switch. Among output ports of the ATM switch, at least one is set at the IP/FANP processing and switch control unit 601.

Here, the setting is made so that the IP packet transmitted through the default VC will be always forwarded to the IP processing unit (IP/FANP processing and switch control unit 601) of the nodes at two ends of that default VC.

When it is confirmed that the received IP packet is destined to the video terminal 106 (by confirming that the destination IP address of this IP packet is the IP address Nb. 1 of the video terminal 106), the IP processing unit (IP/FANP processing and switch control unit 601) of the cell switch router 103 carries out the routing according to the internal IP routing table so as to determine the output physical port.

At the output physical port, the cell switch router 103 carries out the ATM-ARP with respect to the access ATM network 111 so as to determine the VC for transmitting this IP packet. Note that, in FIG. 1, the ATM-ARP server to be used here is also not shown.

The ATM-ARP is carried out with respect to the entire access ATM network 111, and eventually the ATM address of the NIU 104 will be resolved.

The ATM address to be resolved here is that of the NIU 104 and not that of the video terminal 106. Namely, this address resolution is the proxy resolution, that is, the deputy resolution. In a case where the ATM network and the other network (such as the Ethernet or the 1394 bus 112 or 113 of this embodiment) are inter-connected, the address to be resolved in response to the address resolution request from inside the ATM network should be an ATM address, but a resolution target terminal may not necessarily be present on the ATM network, so that the ATM address of the NIU 104 will be resolved in this case.

Figure 7:
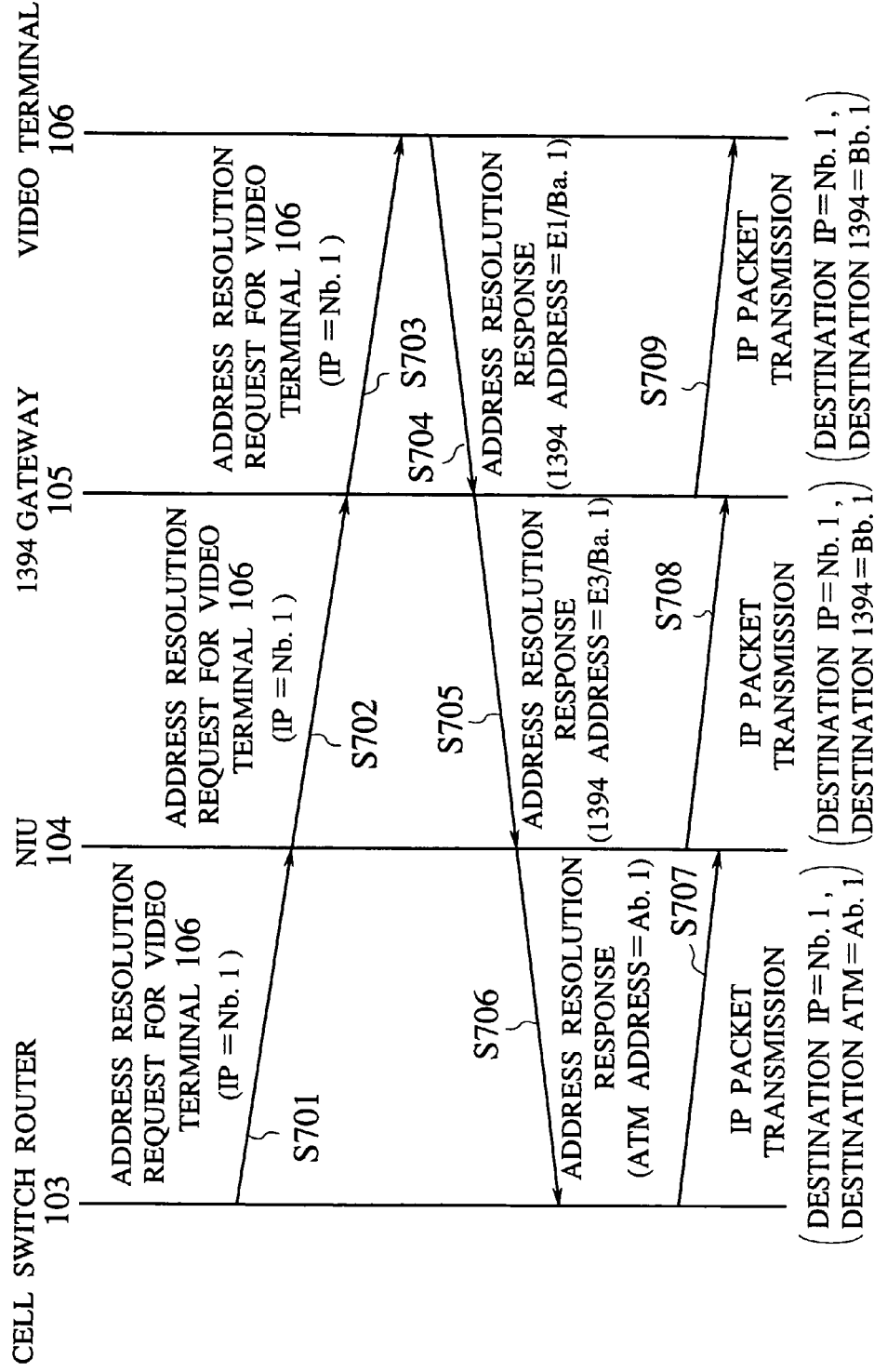
FIG. 7 is a sequence chart for an address resolution sequence between a cell switch router and a video terminal in the communication network of FIG. 1.

In the system of this embodiment, as will be described below, the cell switch router 103, the NIU 104 and the 1394 gateway 105 are the FANP nodes, so that the ARP is terminated once at each of these nodes and the responded by proxy. Namely, the address resolution is carries out sequentially in time series as shown in FIG. 7. (Step S701): The address resolution request for the address of the video terminal 106, from the cell switch router 103 to the access ATM network 111.

(Step S702): The address resolution request for the address of the video terminal 106, from the NIU 104 that received the address resolution request of the step S701 to the first 1394 bus 112.

(Step S703): The address resolution request for the address of the video terminal 106, from the 1394 gateway 105 that received the address resolution request of the step S702 to the second 1394 bus 113.

(Step S704): The address resolution from the video terminal 106 to the 1394 gateway 105 (where the resolved address is the 1394 address of the video terminal 106).

(Step S705): The address resolution from the 1394 gateway 105 to the NIU 104 (where the resolved address is the 1394 address of the 1394 gateway 105).

(Step S706): The address resolution from the NIU 104 to the cell switch router 103 (where the resolved address is the ATM address of the NIU 104).

When the above procedure is finished, the IP packet transmission sequence is carried out (steps S707, S708 and S709).

Figure 8:
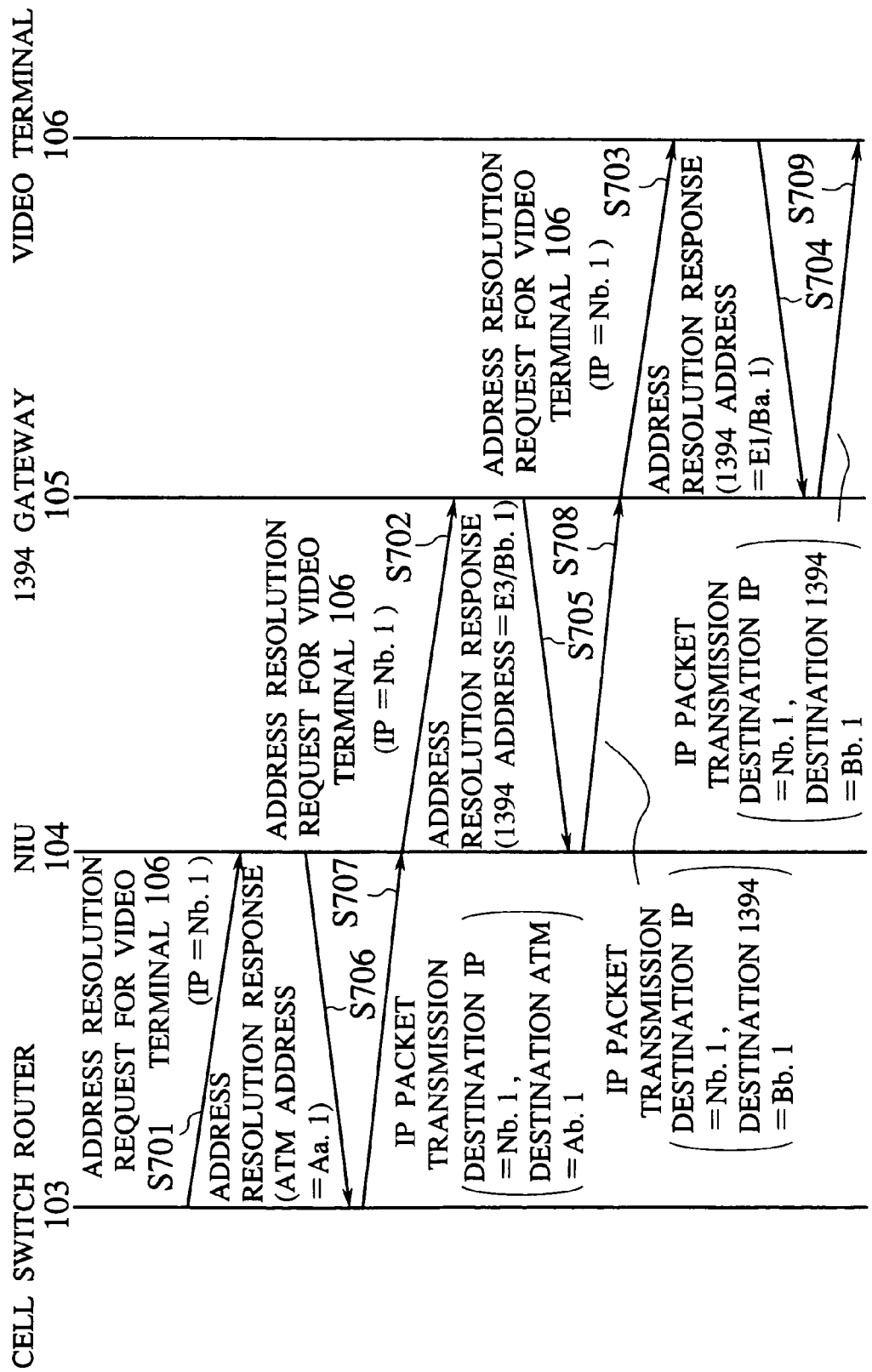
FIG. 8 is another sequence chart for an address resolution sequence between a cell switch router and a video terminal in the communication network of FIG. 1.

The procedure shown in FIG. 7 is a scheme in which the address resolution is carried out sequentially from an end, and the IP packet transmission is started at a timing where all the datalink layer addresses are resolved. However, it is also possible to use a scheme as shown in FIG. 8 in which the address resolution is carried out hop by hop, and the IP packet is forwarded sequentially every time the address is resolved.

Figure 9:
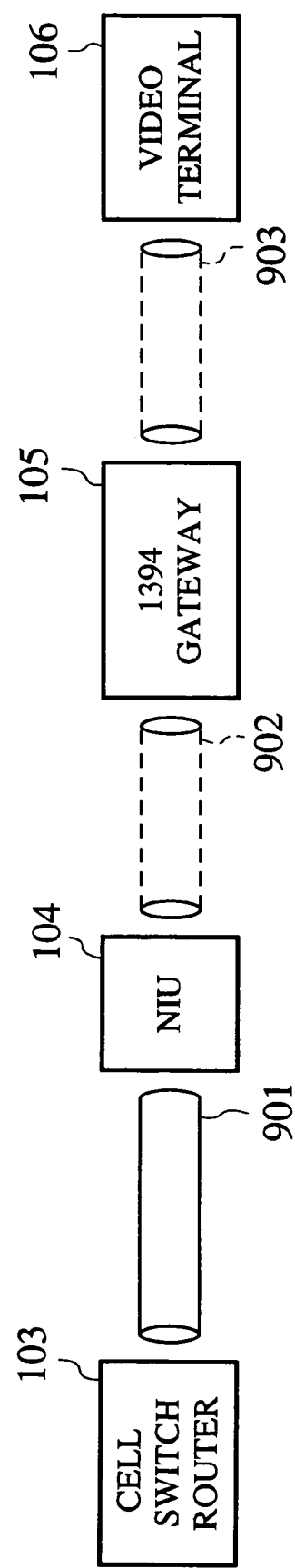
FIG. 9 is a diagram showing one example of a channel used for exchanging ARP packets in the communication network of FIG. 1.

Now, according to the resolved ATM address (the ATM address of the NIU 104), the cell switch router 103 checks whether there is an ATM-VC (a default VC 901) that is established with respect to this ATM address or not. Here, if it is not established yet, it is established, as indicated in FIG. 9.

Thereafter, the cell switch router 103 transmits the IP packet through the VC 901, and this IP packet reaches to the NIU 104.

Figure 10:
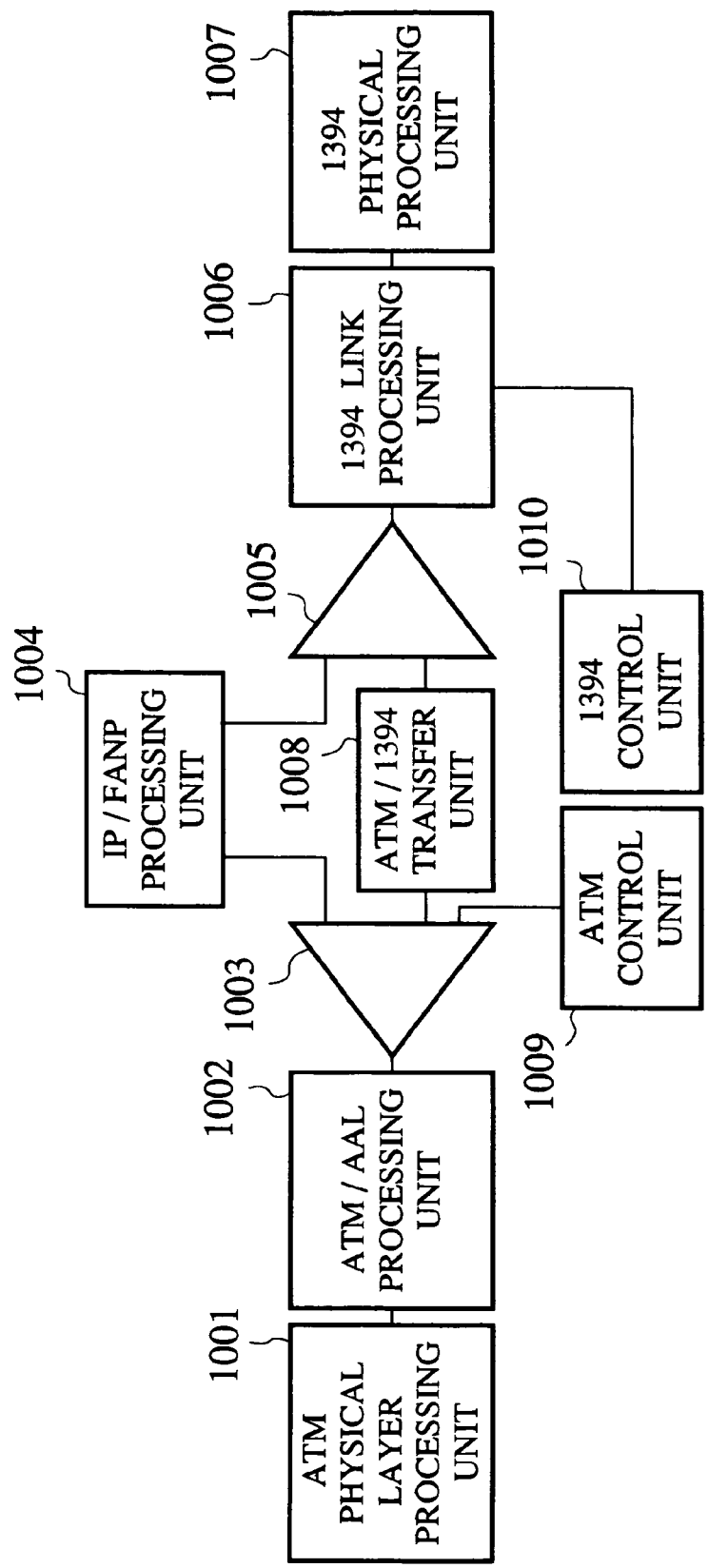
FIG. 10 is a block diagram showing an exemplary internal configuration of a NIU (Network Interface Unit) in the communication network of FIG. 1.

FIG. 10 shows an exemplary internal configuration of the NIU 104. As shown in FIG. 10, the NIU 104 comprises an ATM physical layer processing unit 1001, an ATM/AAL processing unit 1002, a first MUX/DEMUX 1003, an IP/FANP processing unit 1004, a second MUX/DEMUX 1005, a 1394 link processing unit 1006, a 1394 physical processing unit 1007, an ATM/1394 transfer unit 1008, an ATM control unit 1009, and a 1394 control unit 1010.

The ATM physical layer processing unit 1001 has a function for terminating the ATM transmission path from the external, carrying out the ATM physical layer processing, and forwarding the ATM cell to the neighboring ATM/AAL processing unit 1002, and a function for applying the ATM physical layer processing with respect to the ATM cell flow from the ATM/AAL processing unit 1002 and transmits it to the external.

The ATM/AAL processing unit 1002 applies the ATM layer processing and the AAL processing to the ATM cell flow received from the ATM physical layer processing unit 1001, takes out the AAL-SDU (AAL Service Data Unit: IP packet, MPEG frame, etc.), and transmits it to the IP/FANP processing unit 1004, the ATM/1394 transfer unit 1008, or the ATM control unit 1009 (in a case of the signaling packet, etc.) through the first MUX/DEMUX 1003, by referring to the VCI value, according to the mechanism to be described below. Also, the ATM/AAL processing unit 1002 has a function for assembling ATM cells by applying the AAL (ATM Adaptation Layer) processing to data (IP packet, MPEG frame, etc.) from the first MUX/DEMUX 1003 and assembling ATM cells, and transmitting them to the neighboring ATM physical layer processing unit 1001 by applying the ATM layer processing.

The first MUX/DEMUX 1003 has a function for distributing data from the ATM/AAL processing unit 1002 into the IP/FANP processing unit 1004, the ATM/1394 transfer unit 1008, and the ATM control unit 1009, according to the VCI value, and a function for collecting data from the IP/FANP processing unit 1004, the ATM/1394 transfer unit 1008, and the ATM control unit 1009 into the ATM/AAL processing unit 1002.

The IP/FANP processing unit 1004 has a function for terminating the IP packets or the FANP packets transmitted from the ATM side or the 1394 side, and applying the IP processing and the FANP processing. Hence, the IP packets (including the FANP packets) transmitted through the default VCs (the asynchronous channels or asynchronous writes for the 1394 side as described below) from the ATM side and the 1394 side will be forwarded to this IP/FANP processing unit 1004. The IP/FANP processing unit 1004 also has a function for carrying out a series of ARP procedures such as the address resolution from the IP address to the datalink address (the ATM address, the 1394 address).

At this IP/FANP processing unit 1004, the packet routing processing (a processing for determining the physical port to which the IP packet is to be transmitted) is carried out according to the destination IP address of the IP header, but unlike the general router, the so called IP routing protocol processing is not carried out at this part.

The second MUX/DEMUX 1005 has a function for collecting data from the IP/FANP processing unit 1004 and the ATM/1394 transfer unit 1008 into the neighboring 1394 link processing unit 1006, and a function for distributing data from the 1394 link processing unit 1006 into the IP/FANP processing unit 1004 and the ATM/1394 transfer unit 1008, by referring to the channel number, etc.

The 1394 link processing unit 1006 and the 1394 physical processing unit 1007 carry out the link layer processing and the physical layer processing of the IEEE 1394, respectively. Namely, they provide a function for receiving data from the second MUX/DEMUX 1005 at the 1394 link processing unit 1006, forming 1394 frames from it, and transmitting them to the 1394 link, in cooperation with the 1394 control unit 1010 described below, and a function for applying the respective 1394 layer processings to 1394 frames (containing both isochronous ones and asynchronous ones) from the 1394 link in cooperation with the 1394 control unit 1010, and transmitting them to the second MUX/DEMUX 1005.

The ATM/1394 transfer unit 1008 has a function for setting data from the ATM side and the 1394 side into conformity with the respective formats, carrying out the datalink conversion, and forwarding them. The-data that pass through here are going to flow between the ATM side and the 1394 side without passing through the IP/FANP processing unit 1004 described above. Hence, the data forwarding without the IP/FANP processing by the IP/FANP processing unit 1004 can be realized directly through this ATM/1394 transfer unit 1008, according to the VPI/VCI of the ATM or the channel number or the destination address of the specific register offset of the 1394, regardless of the type of information such as IP packet, MPEG frame, etc., so that a considerable simplification of processing and improvement of processing time can be expected. It also becomes possible to reduce the processing of the IP/FANP processing unit 1004. Here, the register offset is a region that can be allocated node by node, which is given by the last 48 bits address space of the IEEE 1394 address mapping.

The ATM control unit 1009 carries out the control of the ATM related part, the signaling processing, etc.

The 1394 control unit 1010 mainly carries out the IEEE 1394 transaction layer processing and the serial bus management. The 1394 control unit 1010 has a function for carrying out data exchange with the 1394 link processing unit 1006 by applying the above processing, for the necessary data to/from the IP/FANP processing unit 1004.

Now, the procedure according to FIG. 7 will be described.

The setting is made in advance at the NIU 104 so that, among data entered from the default VC (901 of FIG. 9) established by the ATM side, the received IP packets will be forwarded to the IP/FANP processing unit 1004 provided therein.

At first, the NIU 104 (actually not only the NIU 104 but also the FANP nodes such as the 1394 gateway 105) has a routing table as shown in FIG. 11 therein, by which an information as to which IP terminal exists at the physical port of which direction is provided. This is realized in a form of providing a routing table at a time of carrying out the source routing for each IP terminal (i.e., an entry is registered in the routing table for each IP address one by one). It is also possible to realize it similarly as the learning bridge so that whenever an IP address which is not yet registered in the routing table is detected, such an IP address is registered into the routing table sequentially. It is also possible to realize it such that an IP address for which the passing of a IP packet cannot be detected for a certain period of time will be deleted from the routing table.

Now, the processing procedure at the step S701 of FIG. 7 will be described.

Figure 12:
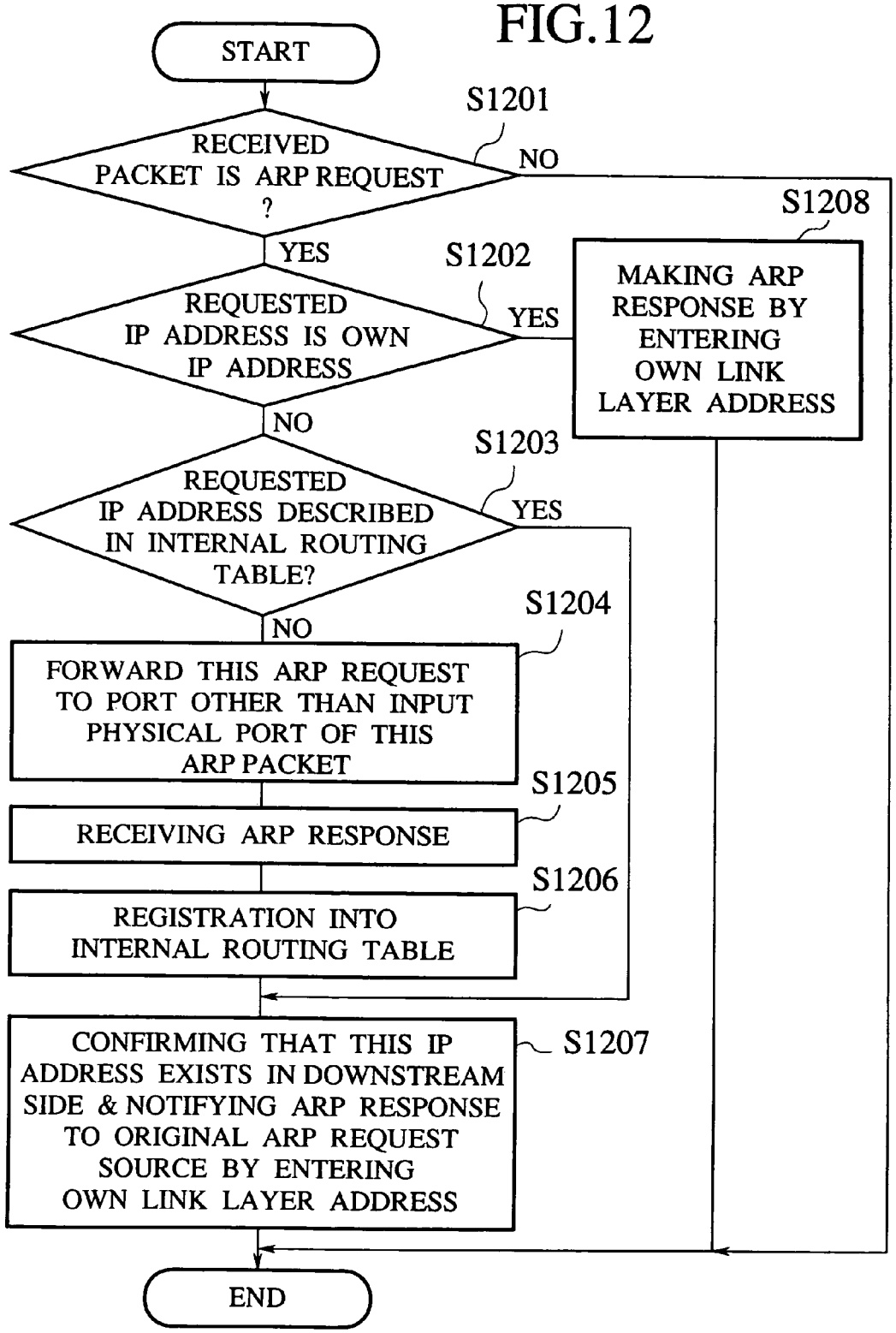
FIG. 12 is a flow chart for an ARP processing sequence in the communication network of FIG. 1.

As shown in FIG. 12, at the IP/FANP processing unit 1004 of the NIU 104, when it is confirmed that the received packet is the ARP request (step S1201), that the ARP requested IP address is not the own IP address (step S1202), and that this IP address is not registered in the routing table provided therein (step S1203), this ARP request is forwarded to the other physical port provided therein, such as the physical port of the first 1394 bus (network) 112 of FIG. 1 in this embodiment, for example. At this point, the own (NIU 104's) 1394 address is written into the source address of the ARP request packet to be transmitted.

Figure 13:
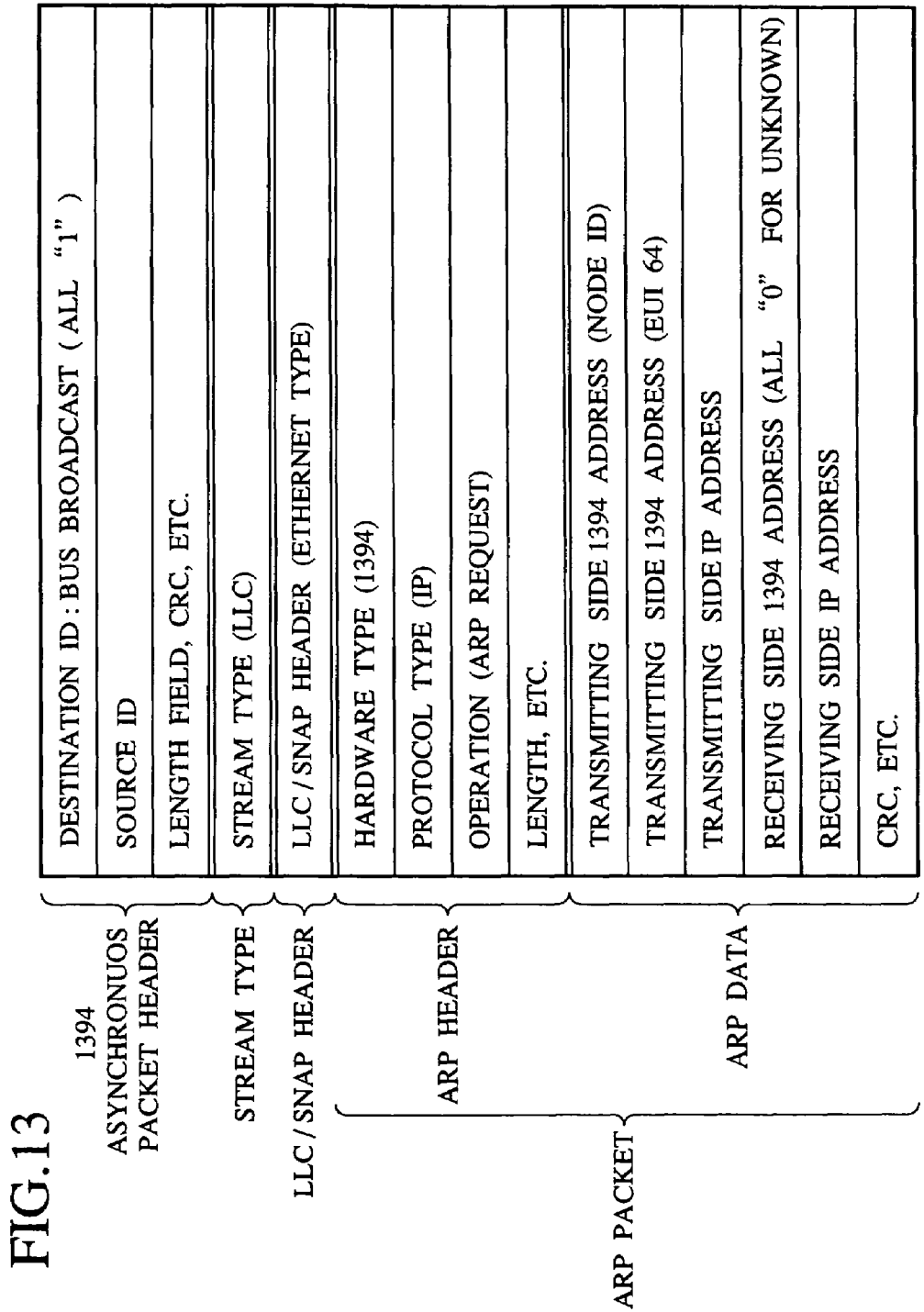
FIG. 13 is a diagram showing one example of a format for an ARP request packet on a 1394 bus in the communication network of FIG. 1.

FIG. 13 shows one exemplary frame/packet format for the ARP request to be transmitted from the NIU 104 to the first 1394 bus 112. In this way, the ARP request is transmitted to the asynchronous channel, i.e., 902 of FIG. 9, in a form of having the ARP packet encapsulated within the 1394 frame.

This ARP request is transmitted to be broadcasted to the first 1394 bus 112, so that it is transmitted with the destination ID of the 1394 frame in a form of "bus ID=local bus, physical ID=broadcast" or "bus ID=ID of the bus it belongs to, physical ID=broadcast" or "channel number=assigned asynchronous stream channel". The own node ID is entered into the source ID. Note that, in a case where the 1394 buses are inter-connected through the 1394 bridge which is expected to be standardized in future at the IEEE, it is also possible to consider a method for activating the ARP by using the destination ID in a form of "broadcast bus ID" by which it is transmitted toward all the 1394 buses, instead of using the method here, within the 1394 part. In this case, the destination 1394 address is directly resolved so that the reservation of the isochronous channel up to the destination terminal may be made by the internal protocol (such as IEC 61883, for example) of the 1394.

Returning to the description of FIG. 13, in the 1394 data portion, the ARP packet is entered into a region following the LLC/SNAP region. For the ARP packet to be encapsulated, an IEEE 1394 number is entered as the hardware type, an IP is entered as the protocol type, and the length indication and the fact that this packet is the ARP request are described in the ARP header. In addition, in the data portion, it is also possible to describe the own two 1394 addresses, that is, an. ID called EUI64 which is unchanged by the bus reset (which is the ID to be imprinted at a time of shipment by the hardware vender) and an address in the 1394 address space at that point (a node ID and a memory/register address). For example, in a case of the NIU 104, EUI64 will be E4, and the node ID will be (Bb, 2).

Moreover, the own (NIU 104's) IP address is also described. Here, a dummy value is entered for the unresolved destination 1394 address, so that only the destination IP address (resolution requested IP address Nb. 1) is entered.

The 1394 frame as shown in FIG. 13 is transmitted to the first 1394 bus 112 through the asynchronous channel. This frame will be received by all the nodes which are connected to the first 1394 bus 112. Among them, a terminal which cannot understand the LLC/SNAP as well as a terminal which does not have the IP processing function and the FANP processing function will discard this frame immediately. Even at a terminal which has the IP processing function, if this terminal does not have the router function or the FANP function and the own IP address is not the resolution requested IP address of the ARP, this frame will be ignored.

At the first 1394 bus 112, there is no IP terminal which has the IP address (Nb. 1), while the 1394 gateway 105 has the FANP function.

Figure 14:
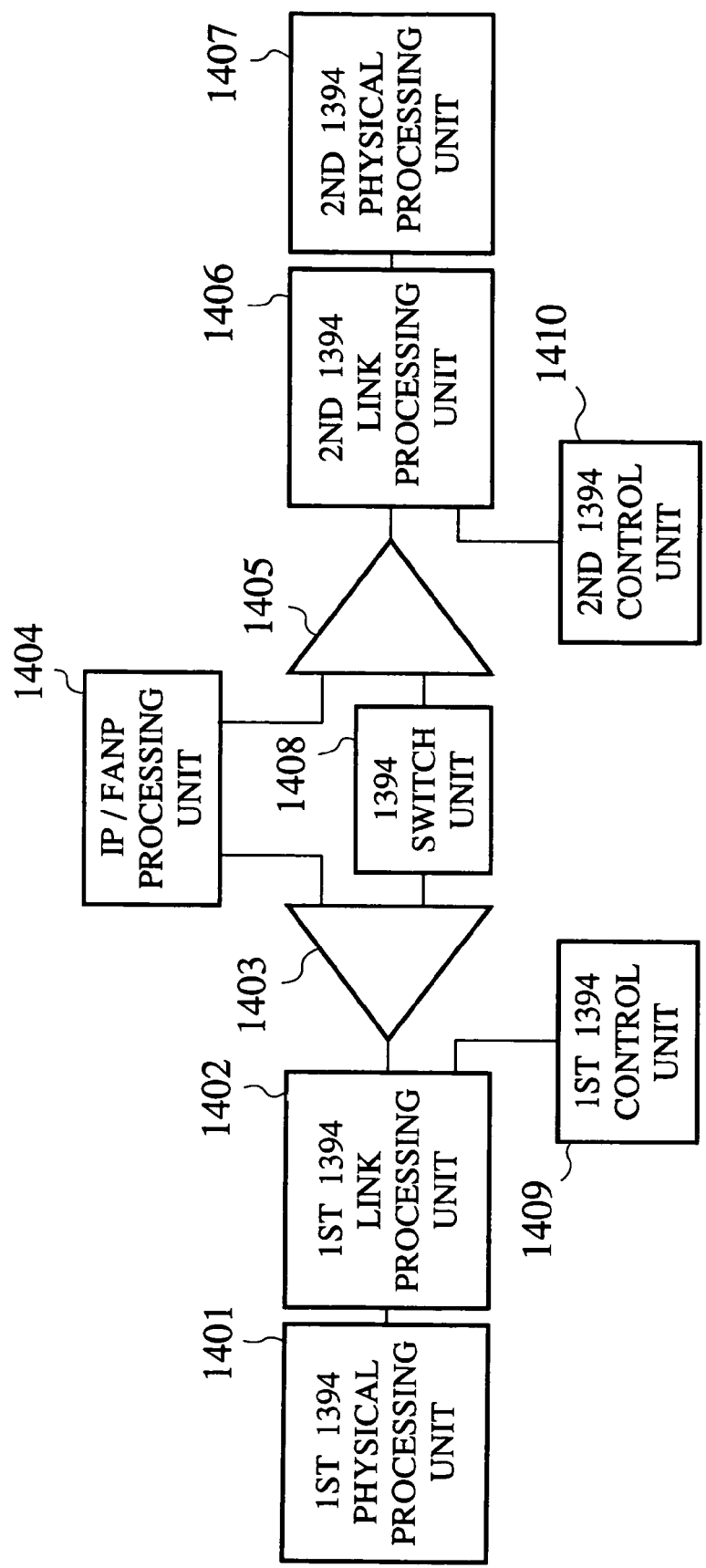
FIG. 14 is a block diagram showing an exemplary internal configuration of a 1394 gateway in the communication network of FIG. 1.

FIG. 14 shows an exemplary internal configuration of the 1394 gateway 105. As shown in FIG. 14, the 1394 gateway 105 comprises a first 1394 physical processing unit 1401, a first 1394 link processing unit 1402, a first MUX/DEMUX 1403, an IP/FANP processing unit 1404, a second MUX/DEMUX 1405, a second 1394 link processing unit 1406, a second 1394 physical processing unit 1407, a 1394 switch unit 1408, a first 1394 control unit 1409, and a second 1394 control unit 1410.

The first 1394 physical processing unit 1401, the first 1394 link processing unit 1402, and the first 1394control unit 1409 provide the physical layer, link layer, and the transaction layer/serial bus management functions of the IEEE 1394 on the first 1394 bus 112 side, so as to carry out the data forwarding from the isochronous channel to the asynchronous channel with respect to the IP/FANP processing unit 1404 or the 1394 switch unit 1394 bidirectionally, according to the channel number of the 1394 or the destination ID or the destination ID with the specific register offset, through the first MUX/DEMUX 1403.

The second 1394 physical processing unit 1407, the second 1394 link processing unit 1406, and the second 1394 control unit 1410 also provide the similar functions on the second 1394 bus 113 side.

The IP/FANP processing unit 1404 has the same functions as the IP/FANP processing unit 1004 in the NIU 104 of FIG. 10 as described above.

The 1394 switch unit 1408 is a device for carrying out data exchange directly among plural 1394 ports, without using the processing at the IP/FANP processing unit 1404, between the first MUX/DEMUX 1403 and the second MUX/DEMUX 1405. This 1394 switch unit 1408 plays a role of buffer in a case of transferring from one 1394 bus to another 1394bus. Also, whenever necessary, this 1394 switch unit 1408 carries out the processing like the re-stamping of the timestamp of the MPEG stream, for example. In such a case, there is provided a correspondence table as shown in FIG. 19 for directly indicating a correspondence of the channel number or the destination address with the specific register offset of the 1394 bus on one side with the attribute, the destination physical port, and the channel number after conversion, etc.

Next, the processing procedure of the step S702 of FIG. 7 will be described.

Here, the setting is also made in advance at the 1394 gateway 105 so that, the IP packet arrived at the 1394gateway 105 will be forwarded to the IP/FANP processing unit 1404 provided therein, after receiving the LLC/SNAP analysis.

Similarly as in FIG. 12, at the IP/FANP processing unit 1404 of the 1394 gateway 105, when it is confirmed that the received packet is the ARP request, that the ARP requested IP address is not the own IP address, and that this IP address is not registered in the routing table provided therein (steps S1201 to S1203), this ARP request is forwarded to the other physical port provided therein, such as the physical port of the second 1394 bus 113 in this embodiment. At this point, the own (1394 gateway 105's) 1394 address E2/(Ba, 2) on the second 1394 bus 113 side is written into the source address of the ARP request packet to be transmitted.

This ARP request is also broadcasted on the second 1394 bus 113. The video terminal 106 which received this ARP request recognizes that it is the ARP request destined to itself, and returns the ARP response (step S704 of FIG. 7).

Figure 15:
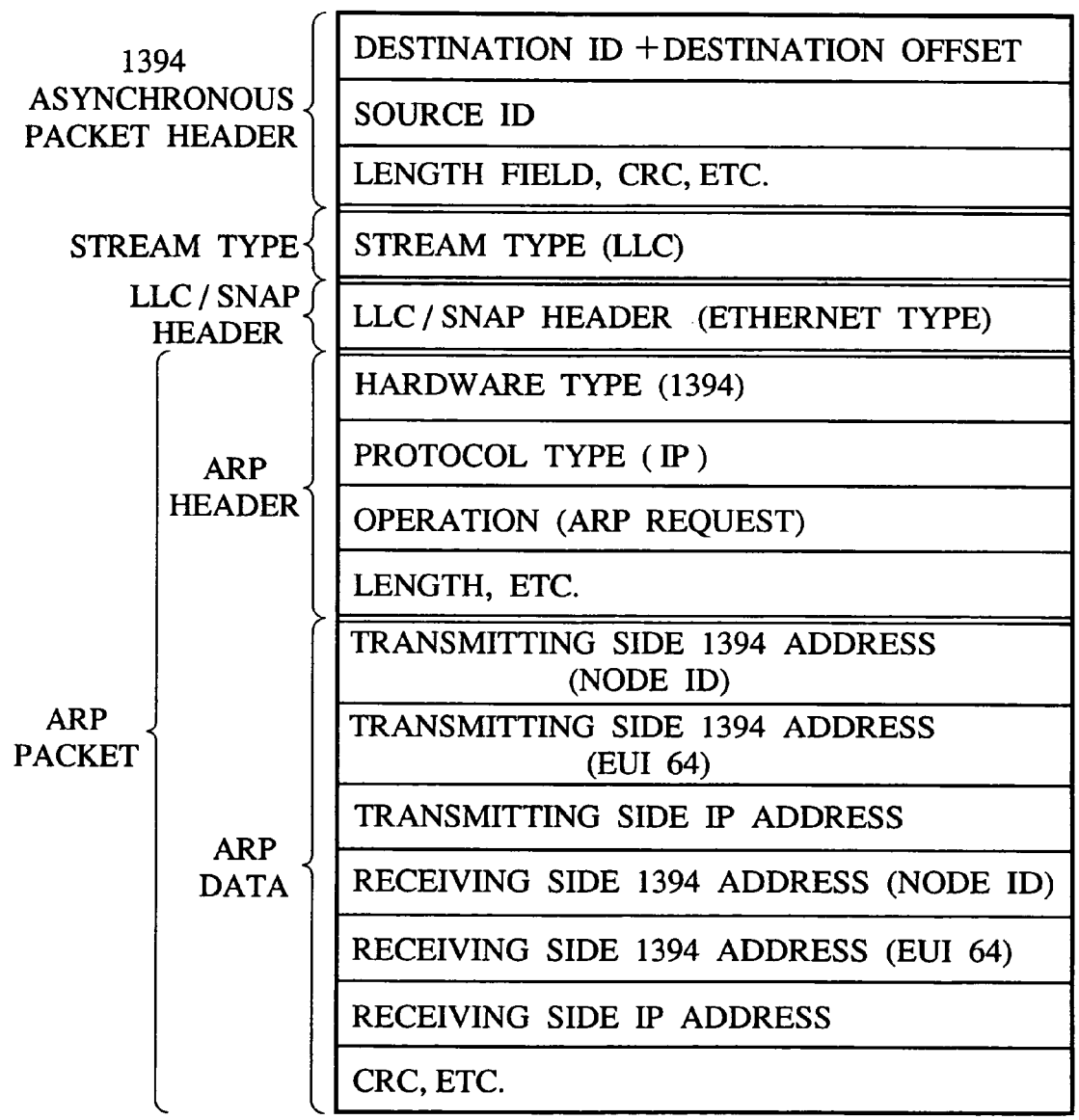
FIG. 15 is a diagram showing one example of a format for an ARP response packet on a 1394 bus in the communication network of FIG. 1.

At this point, as shown in FIG. 15, the ARP response packet is generated by interchanging the source address and the destination address within the ARP packet and entering the own IP address (Nb. 1) and 1394 address (E1/Ba, 1). Then, the 1394 frame is generated by setting the destination address of (Ba, 2), i.e., that of the 1394gateway 105, and this 1394 frame is transmitted to the asynchronous channel or asynchronous write (903 of FIG. 9) of the second 1394 bus 113.

When this 1394 frame is received, the 1394 gateway 105 registers that the IP terminal Nb. 1 exists on the second 1394 bus 113 side into the internal routing table, and registers the IP address (Nb. 1) of the video terminal 106 as well as the table of correspondence with the 1394 address as shown in FIG. 11 into the internal ARP table (steps S1205 to S1206 of FIG. 12). Here, the ARP table and the routing table may be formed integrally, and FIG. 11 shows the integrally formed one.

The 1394 gateway 105 has already recognized that the ARP request with respect to the video terminal 106 has come from the NIU 104 of the first 1394 bus 112 side, so that the 1394 gateway 105 continues to return the ARP response to it (step S705 of FIG. 7 and step S1207 of FIG. 12). At this point, the response 1394 address is answered as the 1394 address (E3/Bb, 1) of the 1394 gateway 105. In other words, this is also the deputy response.

Similarly, the NIU 104 also transmits the deputy response for the ARP (in which the NIU 104's own ATM address Ab. 1 is described as the resolved ATM address) to the cell switch router 103 through the access ATM network 111 (steps S706 of FIG. 7 and step S1207 of FIG. 12). At this point, the VC 901 is used.

At this point, at the 1394 gateway 105, the fact that the IP address (Nb. 1) of the video terminal 106 exists on the second 1394 bus 113 side is registered in the internal routing table, and its 1394 address (the 1394 address (E1/Ba, 1) of the video terminal 106) is registered in the internal ARP table. Also, at a time of the ARP request packet processing, the IP address Nb. 3 of the NIU 104 and its 1394 address (E4/Bb, 2) are also registered in the routing table and the ARP table, respectively on the first 1394 bus 112 side (see FIG. 3).

Also, at the NIU 104, the fact that the IP address (Nb. 1) of the video terminal 106 exists on the first 1394 bus 112 side is registered in the internal routing table, and as its 1394 address, the 1394 address of the 1394 gateway 105 (the 1394 address (E3/Bb, 1) on the first 1394 bus 112 side) is registered in the internal ARP table because of the deputy response. Also, at a time of the ARP request packet processing, the IP address Nb. 4 of the cell switch router 103 and its ATM address are registered in the routing table and the ARP table respectively, on the access ATM network 111 side (see FIG. 3).

Also, at the cell switch router 103, the fact that the IP address (Nb. 1) of the video terminal 106 exists on the access ATM network 111 side is registered in the internal routing table, and as its ATM address, the ATM address Ab. 1 of the NIU 104 is registered in the internal ARP table because of the deputy response (see FIG. 3). At this point, it becomes possible for the cell switch router 103 to transmit the IP packet destined to the video terminal 106. Namely, the cell switch router 103 transmits this IP packet through the default VC 901 (which will be established if not already established at this point) that is established between the NIU 104 and the cell switch router 103.

The default VC is established to be connected to the IP/FANP processing unit 1004 of the NIU 104.

When this IP packet reaches to the NIU 104, it is conveyed to the IP/FANP processing unit 1004. Here, the IP/FANP processing unit 1004 recognizes that the destination IP address of Nb. 1 exists on the first 1394 bus 112 side by referring to the routing table, and recognizes its 1394 address (actually the 1394 address Bb. 1 of the 1394 gateway 105) by referring to the internal ARP table, so that the IP/FANP processing unit 1004 encapsulates this IP packet within the 1394 frame destined to the 1394 gateway 105 and transmits this 1394 frame to the first 1394 bus 112 through the asynchronous channel.

Figure 16:
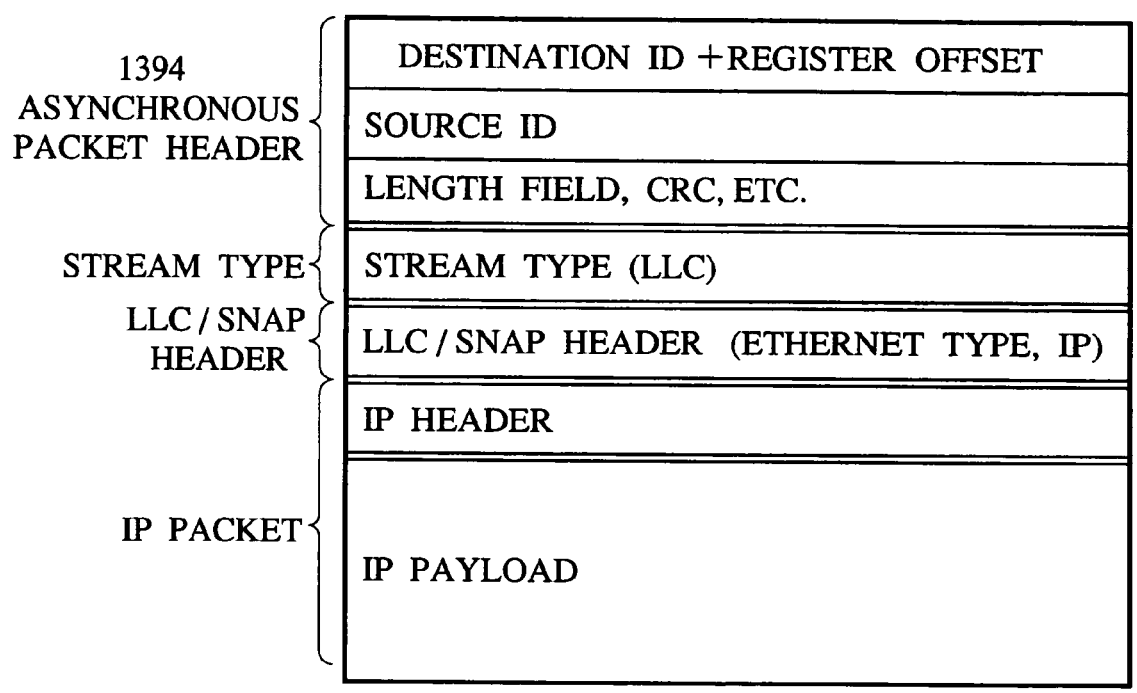
FIG. 16 is a diagram showing one example of a format for an IP packet transmitted on a 1394 bus in the communication network of FIG. 1.

FIG. 16 shows a format of the IP packet transmitted on the 1394 bus. As shown in FIG. 16, the IP packet is basically transmitted to the asynchronous write of the 1394, and encapsulated within the asynchronous frame of the 1394.

Because of the setting made in advance according to which the IP packets and FANP packets that arrive at the 1394 gateway 105 through the asynchronous channel or asynchronous write of the 1394 are to be connected to the IP/FANP processing unit 1404 upon referring to the LLC/SNAP header, when this IP packet arrives at the 1394 gateway 105, it is conveyed to the IP/FANP processing unit 1404. Here, the IP/FANP processing unit 1404 recognizes that the destination IP address of Nb. 1 exists on the second 1394 bus 113 side by referring to the routing table, and recognizes its 1394 address (Ba, 1) by referring to the internal ARP table, so that the IP/FANP processing unit 1404 encapsulates this IP packet within the 1394 frame destined to the video terminal 106 and transmits this 1394 frame to the second 1394 bus 113 through the asynchronous channel.

Figure 4:
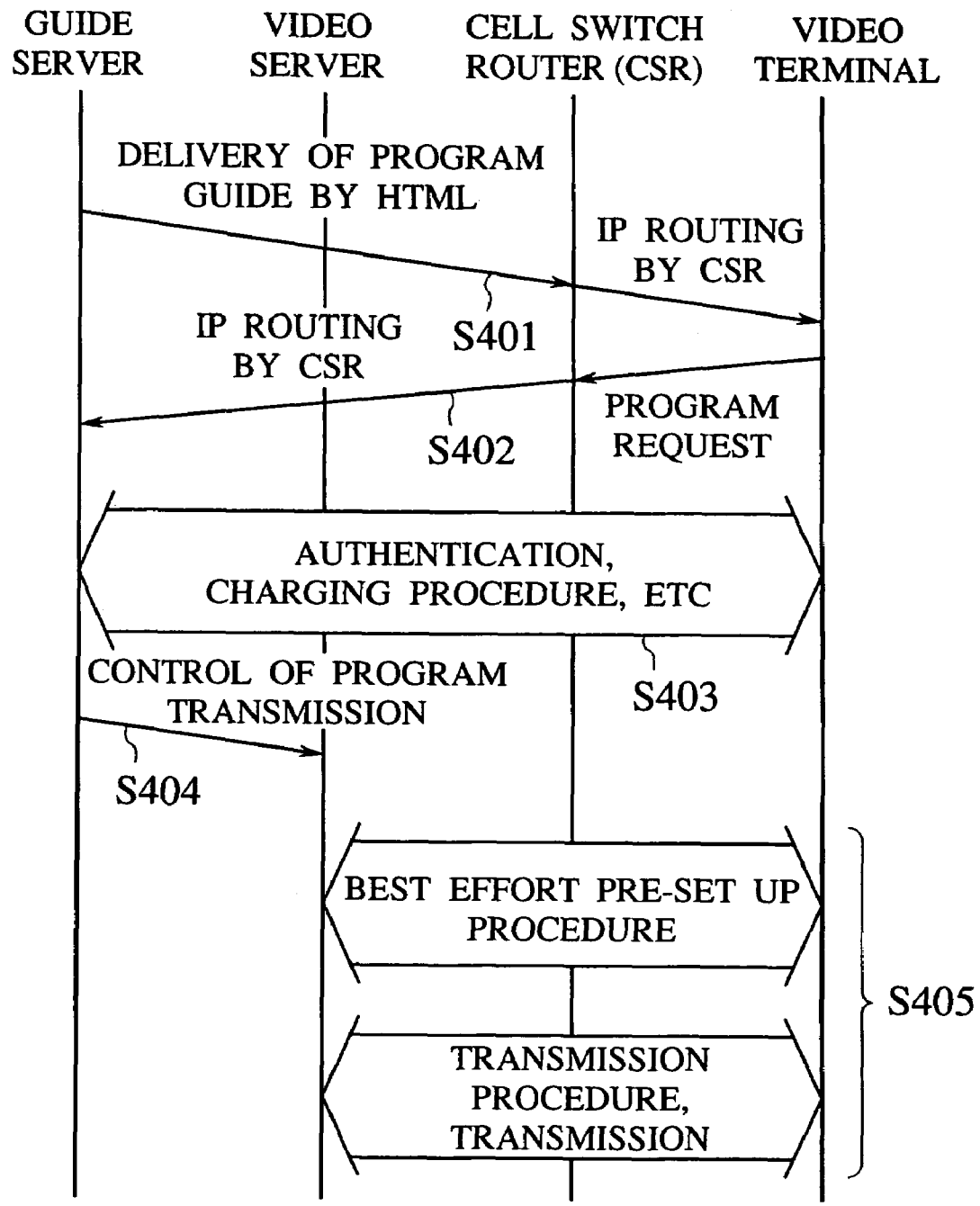
FIG. 4 is a sequence chart for an operation sequence between a guide server and a video terminal in the communication network of FIG. 1.

In this manner, the IP packet reaches to the video terminal 106 (steps S707 to S709 of FIG. 7 and step S401 of FIG. 4).

Thereafter, the packet destined to the video terminal 106 that is transmitted from the guide server 102 can be routed to the video terminal 106 without requiring the ARP procedure.

At the video terminal 106, the program guide transmitted through these IP packets is displayed-through the browser on the video terminal 106. The user makes the request for a desired program through this browser. This request is also made by using the IP/HTTP (step S402 of FIG. 4). Of course, there is no need for the user to be conscious of facts like what communication protocol is being used.

Thereafter, various control procedures are carried out in order to carry out the video service such as the user authentication, the charging procedure, etc., between the guide server 102 and the user (video terminal 106) (step S403 of FIG. 4). These control procedures are also carried out by using IP/HTTP.

When these procedures are finished, the operation proceeds to a procedure for the purpose of video delivery. First, a control signal for program transmission is transmitted from the guide server 102 to the video server 1-1 (step S404 of FIG. 4). This control signal exchanges the basic information concerning the video transmission such as which program is transmitted for how long and to whom. This control signal exchange is carried out through the default VC 203 between the guide server 102 and the video server 101. This operation may be realized through the CGI and the like of the guide server. There is also a case in which the procedure is carried out directly with respect to the video server 1-1 by using the language such as JAVA.

After that, the exchanges for procedures that should be done prior to the video transmission are carried out between the video server 101 and the video terminal 106. For example, the confirmation of the coding scheme, the confirmation of the reception possible bandwidth value, etc., are carried out (step S405 of FIG. 4). These exchanges may be carried out through IP/HTTP similarly as described above. When the agreement between the video server 1-1 and the video terminal 106 is made, the operation proceeds to a procedure for establishing a datalink connection for guaranteeing the bandwidth from the video server toward the video terminal.

Next, this procedure will be described with references to FIG. 17 and FIG. 18.

Consider a case of deliverying video by a certain bandwidth (4 Mbps, for example) with respect to the video terminal 106 (IP address Nb. 1). The video server 101 carries out the address resolution for the IP address Nb. 1 (step S1701), and then carries out the ATM call set up between the video server 101 and the cell switch router 103 so as to establish an ATM connection having the bandwidth of 4 Mbps between the video server 101 and the cell switch router 103 that corresponds to the resolved address (step S1702).

Here, for the detailed parameters required in a case of the call set up, appropriate values are set up in advance at the video server side, and these values are to be utilized as they are.

When the call set up is completed and the ATM connection 2101 of 4 Mbps is established between the video server 101 and the cell switch router 103, the video server 101 starts the processing determined by the FANP by using this ATM connection 2101.

The datalink connection established in this manner for the purpose of some specific flow transmission between the FANP nodes will be called a dedicated datalink connection.

The FANP is a protocol for notifying (ID of) the connection with the datalink and a relation with respect to the information to be sent through that connection to the neighboring node. In the following, this procedure will be described in detail. Note that the present invention uses the FANP function which is modified from the conventional FANP function, and such a modified FANP function will be referred to as an extended FANP function hereafter. In the following, the detailed descriptions will be given for such modified portions.

Figure 17:
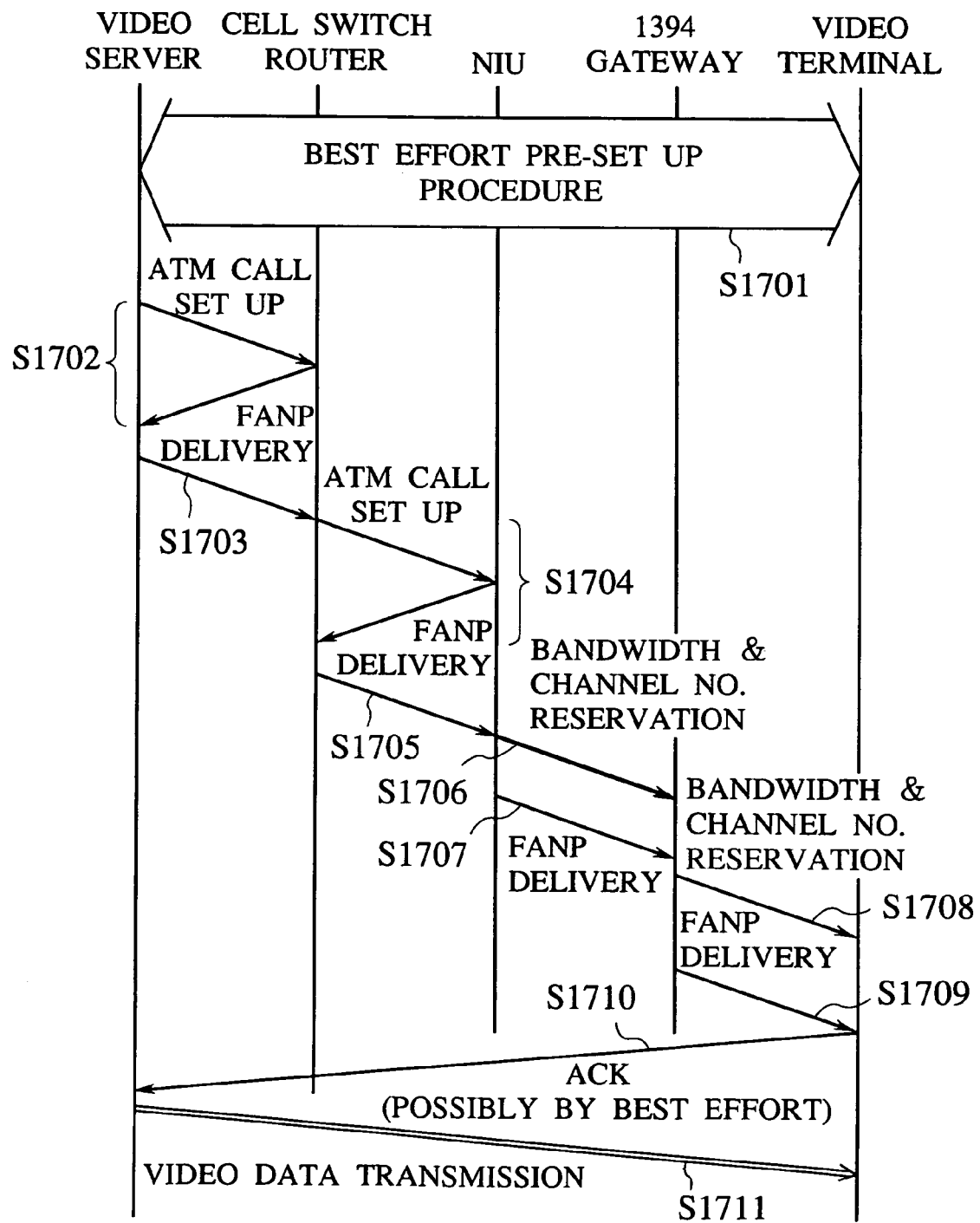
FIG. 17 is a sequence chart for a sequence of a video transmission from a video server to a video terminal in the communication network of FIG. 1.
Figure 21:
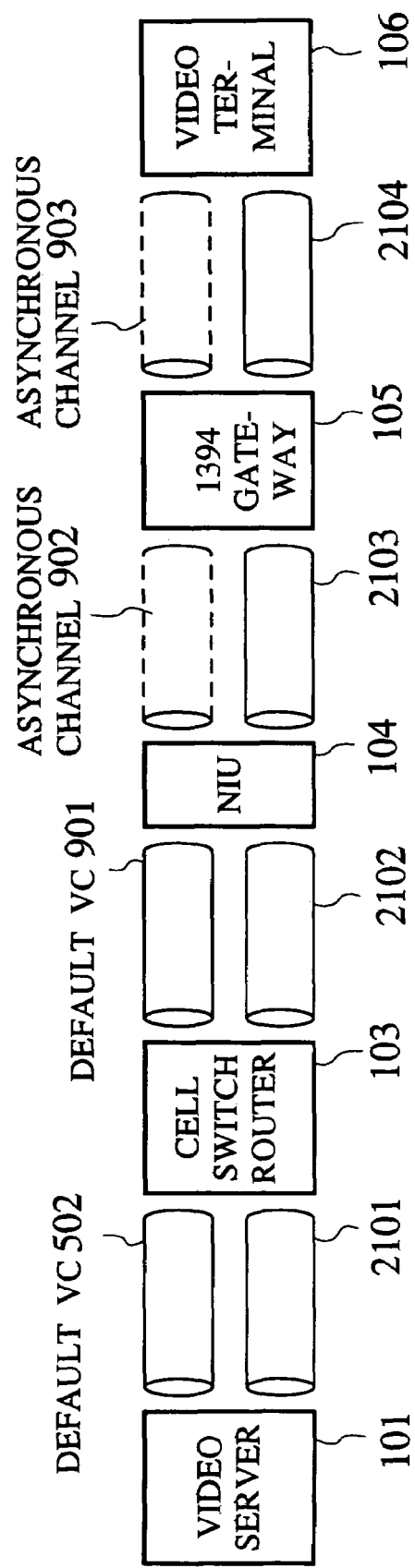
FIG. 21 is a diagram showing one example of a default data connection (VC) and a dedicated data connection between a video server and a video terminal in the communication network of FIG. 1.

At the step S1703 of FIG. 17, first, the video server 101 exchanges the VCID exchange messages through the established ATM connection 2102 as shown in FIG. 21. Through this message exchange, the devices on both ends share the meaning of the VCID value (which will be described below). This operation is carried out through the exchange of the VCID exchange messages of the FANP (see FIG. 22).

FIG. 20 shows an exemplary format of a message to be exchanged here. This message format is almost the same as the format of the ARP packet in the ATM-LAN. The hardware type is set to be ATM, the protocol type is set to be IP, the sender IP address is set to be the IP address of the video server 101, the target IP address is set to be the IP address of the video terminal 106, and the VCID (Virtual Connection ID) is set to be a globally unique address (MAC address of the ATM board) of the video server 101 and a sequence number appropriately determined by the video server 101.

The VCID is an identifier that can be commonly recognized at both ends of the VC, which is provided because the VPI/VCI is generally different at both ends of the VC in the ATM.

Figure 22:
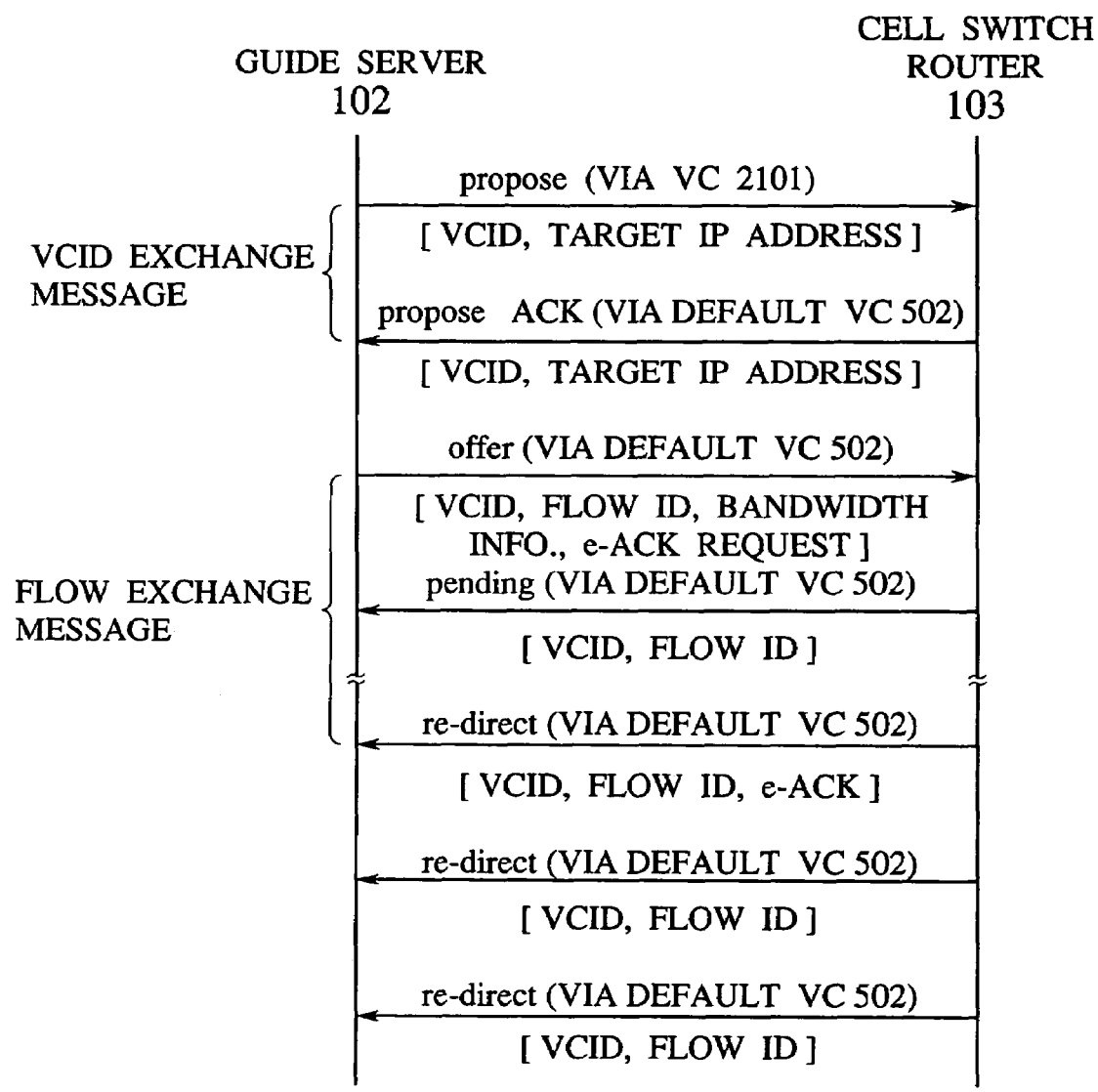
FIG. 22 is a sequence chart for an operation sequence of FANP message exchanges between a guide server and a cell switch router in the communication network of FIG. 1.

Also, as the VCID exchange messages, ACK and NACK are provided, and they are to be distinguished by the operation code. This ACK/NACK is sent through the default VC 502 as shown in FIG. 22. Here, when ACK is returned, it implies that the agreement on the VCID value is made between the devices at both ends. When NACK is returned, it implies that no agreement is made.

In a case where the FANP node is a router, the ACK message is returned by simply changing the operation code value. A case where the FANP node is not a router will be described below.

When the agreement on the VCID is made, the video server 1-1 starts the exchange of the flow exchange message next as indicated in FIG. 22.

In the present invention, the reservation of the dedicated datalink connection is requested to the next hop node through this flow exchange message. Namely, the information on the destination IP address, a desired bandwidth to be reserved, the communication attribute, etc. are attached to this flow exchange message and this flow exchange message is sent to the next hop FANP node, so as to request the next hop FANP node to set up an end-to-end connection connected to the target terminal.

The FANP node reserves the necessary datalink connection (dedicated datalink connection) that satisfies the sequentially requested conditions between the neighboring nodes, and relates this dedicated datalink connection with the dedicated datalink connection notified from the previous hop. This relating operation is carried out on the VCI table. After this relating operation is carried out, values of the reserved bandwidth, the attribute (indicating that data flowing therethrough is the MPEG video, etc.), the output port, the output header (VPI/VCI), etc., can be ascertained implicitly by simply referring to the value of the VPI/VCI.

This operation is carried out sequentially up to the destination terminal (the video terminal 106 in this embodiment), and eventually the end-to-end connection is established.

FIG. 23 shows an exemplary format of the flow exchange message. By the operation code portion of this flow exchange message, the type of the flow exchange message is indicated.

The flow exchange message includes an offer message (operation code=1), a re-direct message (operation code=2), an error message (operation code=3), a release message (operation code=4), a release ACK message (operation code=5), and a pending message (operation code=6). For details, see Japanese Patent Application No. 7-58196 (1995).

In this embodiment, the value "1" is fixedly entered into the VCID type. When the VCID type=1, an ESI (End System ID, which is usually the MAC address of the end system) and a sequence number are entered into the VCID.

This VCID has the meaning that-there is an agreement that "let's call this VC (isochronous channel) by the VCID value at the FANP nodes of both ends". (Note that, when a different scheme for expressing the VCID appears, another value will be allocated.)

The flow ID type specifies a scheme for expressing the flow ID. Here, the flow is a specific meaningful information (a specific set of mutually meaningful information transmitted toward a specific destination from a specific source). The flow ID is an ID for uniquely identifying a certain flow. This flow ID will be described in further detail below.

The other parameters are optional, and given by TLV (Type, Length, Variable) based descriptions. In this embodiment, the communication quality information, the end-to-end ACK (e-ACK), and the communication attribute are entered there.

To the communication quality information, a value of communication quality to be required to the connection to be established will be entered. For this value, a T-spec value of int-serv of IETF may be entered, for example. In this embodiment, it suffices to enter a value which indicates 4 Mbps which is a value of the required bandwidth.

The e-ACK flag is a flag for requesting the transmission of an ACK signal from the final point to the transmission point. This end-to-end ACK signal will provide a clue for the transmission device (the video server 101 in this embodiment) to ascertain whether the connection establishing up to the final point (the video terminal 106 in this embodiment) has been successful or not.

The video server 101 sends the offer message among the flow exchange messages to the cell switch router 103 which is the neighboring FANP node, as indicated-in FIG. 22. This message sending is carried out through the default VC 502 between the video server 101 and the cell switch router 103.

This message contains the operation code indicating that it is the offer message, the VCID, the flow ID, the communication attribute, the communication quality (bandwidth information), and the e-ACK flag, as indicated in FIG. 24. The last three of these are options expressed in the TLV format.

To the VCID, the MAC address of the video server 101 and the sequence number assigned by the video server 101 are entered.

To the flow ID, basically a value such as the destination IP address is entered, as will be described below.

To the communication attribute, an indication that the data to be transmitted is the MPEG stream is entered.

The bandwidth information indicates the bandwidth of that video stream (4 Mbps in this embodiment), and the e-ACK flag is ON because the video server 101 requests the end-to-end ACK.

At the cell switch router 103 which is the neighboring FANP node that received this message, the received packet is processed by the IP/FANP processing and switch control unit 601.

By looking at the e-ACK flag, it can be understood that the transmitting side requests the reservation of the end-to-end connection. Therefore, in order to establish the end-to-end connection, the forwarding of the FANP message toward the direction of the destination IP address (the video terminal 106) and the pending message for the purpose of notifying "please wait for awhile until the connection is established (or the processing load becomes lower)" to the transmitting side (the video server 101) are defined (see FIG. 25).

The pending message is transferred after the VCID and the flow ID possessed by the corresponding offer message are attached thereto.

At the video server 101 that received the pending message, a response to the earlier transmitted offer message will be awaited for awhile.

Also, the cell switch router 103 forwards this FANP message toward the direction of the video terminal 106 so as to establish the end-to-end datalink connection, and tries to transmit the offer message toward the direction of the video terminal 106.

At this point, the resolved address of the video terminal 106 is the ATM address of the NIU 104, so that the ATM connection with the bandwidth (4 Mbps) described in the offer message is established between the cell switch router 103 and the NIU 104 (step S1704 of FIG. 17). Namely, as shown in FIG. 21, the ATM connection 2102 for video transmission is established in addition to the default VC 901.

When this ATM connection 2102 is established, the cell switch router 103 transmits the VCID exchange message through the ATM connection 2102 similarly as in a case of the video server 101 (step S1705 of FIG. 17). Note that the setting is made in advance so that the data transmitted through this ATM connection 2102 will be transmitted to the IP/FANP processing unit 1004 of the NIU 104.

At the NIU 104 that received this message, it is ascertained that the destination IP address of the FANP message is not its own, and it is directed to the video terminal 106 (IP address=Nb. 1), from this VCID exchange message. Assuming that the subsequently arriving FANP message (such as the offer message) is destined to the IP address (Nb. 1) of the video terminal 106, the IP/FANP processing unit 1004 of the NIU 104 cannot confirm that this is the FANP packet unless the protocol type and the port number of the IP packet are checked, so that either the FANP processing cannot be carried out or else the protocol type and the port number must be checked for all packets destined to the IP/FANP processing unit 1004 in order to carry out the FANP processing.

In order to avoid this, the fact that the neighboring FANP node is not the video terminal 106 but the NIU 104 is notified to the cell switch router 103 which is the neighboring FANP node. To this end, the own IP address (Nb. 3) is entered into a field for the target IP address in the VCID exchange message, and the propose ACK message is returned (see FIG. 20).

In this way, the cell switch router 103 can ascertain that the next hop FANP node is not the video terminal 106 but the NIU 104 (IP address=Nb. 3) in the routing path toward the video terminal 106, and recognize that it suffices to transmit the subsequent FANP message (the FANP message toward the video terminal 106) about that VCID value to the NIU 104.

After that, the cell switch router 103 transmits the offer message of the flow exchange messages to the NIU 104. Hence, by the ARP table search, this offer message will be transmitted through the default VC 901. The destination IP address of this offer message is the IP address Nb. 3 of the NIU 104.

The NIU 104 can ascertain the final target IP address (the IP address of the video terminal 106) by looking at the flow ID portion (which will be described below). The others including the communication attribute, the communication quality, the e-ACK flag, etc. are forwarded as they are.

At the NIU 104 that recognized the need to set up a connection of 4 Mbps to the video terminal 106 in this way, the fact that the video terminal 106 exists in the direction of the first 1394 bus 112 is recognized by referring to the internal routing table, and the establishing of an isochronous channel of 4 Mbps on the first 1394 bus 112 is carried out.

This operation is done as the NIU 104 appropriately sets up the isochronous resource manager register, and sequentially carries out the reservation of the bandwidth and the reservation of the channel number (step S1706 of FIG. 17).

Next, the NIU 104 carries out the sending of the VCID exchange message (step S1707 of FIG. 17), and there are several methods for realizing this operation.

The first method is a method in which the earlier acquired isochronous channel number is notified to the 1394 gateway 105 by the protocol of the 1394 itself, and the setting is made in advance so that this channel will be connected to the IP/FANP processing unit 1404. Else, the setting may be made such that the established isochronous channel will be connected to the IP/FANP processing unit 1404 by default. It is also possible to make the setting in which the fact that this is the IP/FANP packet is recognized by referring to the LLC/SNAP header, and then this is transferred to the IP/FANP processing unit 1404.

The FANP node may have the setting by which the IP/FANP processing unit 1404 distinguishes the input packet as either the IP packet or the FANP packet and carries out the FANP processing only if it is the FANP packet.

Figure 26:
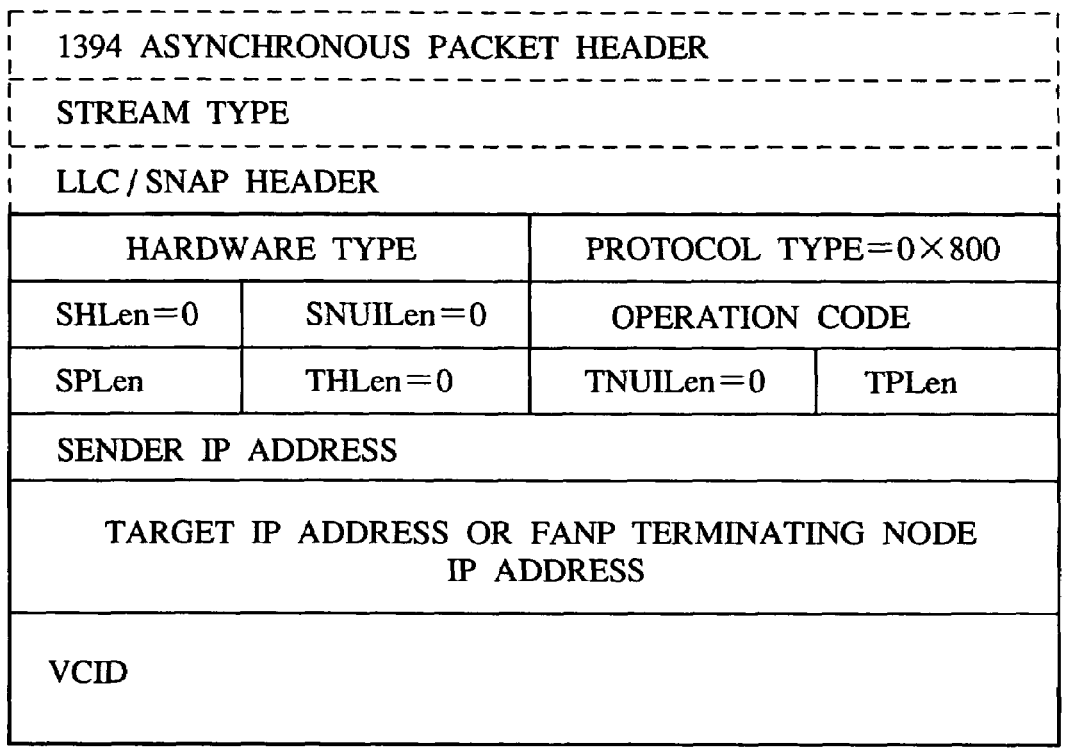
FIG. 26 is a diagram showing one example of a format for a VCID exchange message on a 1394 bus used in the operation sequence of FIG. 22.

After that, the VCID exchange message as shown in FIG. 26 is sent to that isochronous channel. At the IP/FANP processing unit 1404 of the 1394 gateway 105 that received this VCID exchange message, the own IP address (Nb. 2) is entered into the ACK message and this ACK message is returned to the NIU 104 through the asynchronous channel or asynchronous write.

Figure 18:
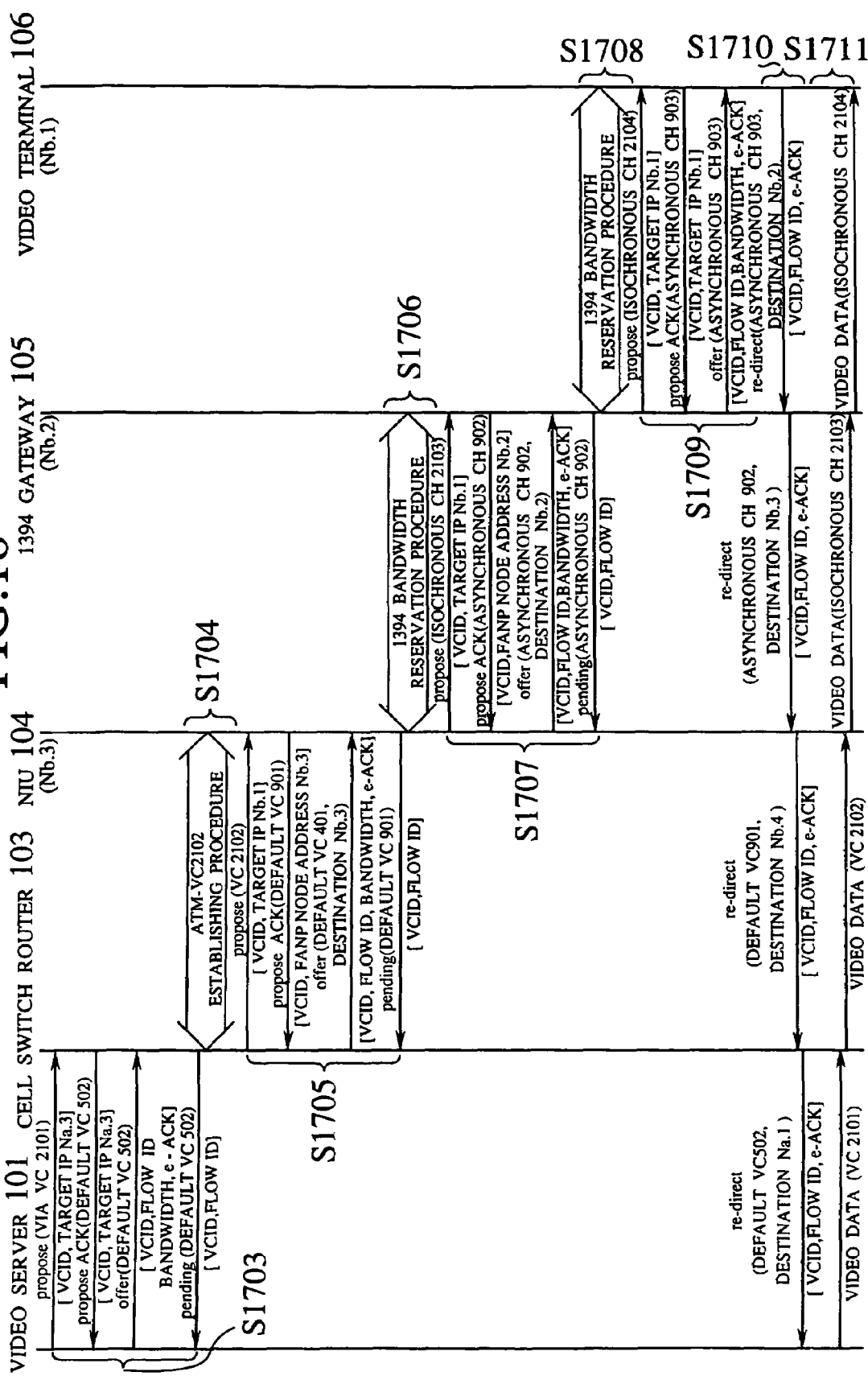
FIG. 18 is a further detailed sequence chart for a sequence of a video transmission from a video server to a video terminal in the communication network of FIG. 1.

The sequence shown in FIG. 18 shows the sequence shown in FIG. 17 in further detail according to the first method as described above.

The second method is a method for sending the VCID exchange message toward the 1394 gateway 105 by using the asynchronous channel or asynchronous write. The resolved address of the video terminal 106 is set to be the 1394 address of the 1394 gateway 105. The setting is made such that this VCID exchange message reaches to the IP/FANP processing unit 1404 of the 1394 gateway 105. One method -for realizing the above setting is to make the setting in advance such that the VCID exchange message automatically reaches to the IP/FANP processing unit 1404. Another method for realizing the above setting is a method in which the NIU 104 carries out the RARP and the like from the 1394 address of the 1394 gateway 105 to check the IP address Nb. 2 of the 1394 gateway 105 in advance, and sends the VCID exchange message toward this IP address Nb. 2.

The third method is a method for a case in which the setting is made in advance such that the message is conveyed to the IP/FANP processing unit 1404 by the LLC/SNAP. The 1394 gateway 105 that received this message attaches the own IP address to the ACK of the VCID exchange message and returns this ACK to the NIU 104, similarly as in a case of the NIU 104. In this way, the NIU 104 can also recognize that the next hop FANP node leading to the video terminal 106 is the 1394 gateway 105 (IP address=Nb. 2), so that it becomes possible to send the subsequent FANP packet (flow exchange message) with respect to the 1394 gateway 105, rather than sending it directly to the video terminal 106.

The above described is an exemplary case of reserving the isochronous channels, but in a case of using the register offset in the asynchronous mode, an agreement is made on a value of the register offset to be used at a time of communication between the NIU 104 and the 1394 gateway 105. Thereafter, in the FANP message, this register offset value is transmitted instead of the isochronous channel number.

The operation at the 1394 gateway 105 after that is the similar to the operation at the NIU 104 described above. Namely, the flow exchange message is received, and the need to establish the reservation of the bandwidth of 4 Mbps between the 1394 gateway 105 and the video terminal 106 is recognized. The pending message is sent to the NIU 104 which is the previous hop FANP node, while the isochronous channel of 4 Mbps and its channel number are reserved on the second 1394 bus 113 with respect to the video terminal 106 (step S1708 of FIG. 17), and the VCID exchange message is sent toward the video terminal 106 by the method similar to those described above (step S1709 of FIG. 17).

In response to the VCID message (propose message), if it is acceptable, the video terminal 106 returns ACK (propose ACK). Then, the flow exchange message of the FANP is received through the asynchronous channel or asynchronous write, and recognizes that this is a message destined to this video terminal 106. The fact that the contained data is the MPEG stream can be recognized according to the communication attribute field, but this can also be done by the other methods. As an example, the video terminal 106 may be made so that it is possible to ascertain the attribute of data that will be arriving from this channel according to the flow ID value.

For example, this can be realized by implicitly entering an information as to which port numbers are the transport stream of MPEG2, etc. in advance. Also, as the e-ACK flag is erected, the need to transmit the end-to-end ACK message indicating that the FANP message was accepted, with respect to the transmission terminal (i.e., the video server 101), can also be recognized.

When it is acceptable, a re-direct message as shown in FIG. 27 is returned to the previous hop 1394 gateway 105 as the exchange of the flow exchange message.

The re-direct message is sent to the 1394 gateway 105 by using the asynchronous channel or asynchronous write of the second 1394 bus 113.

As shown in FIG. 27, the re-direct message has values of the VCID and the flow ID entered therein, so that the 1394 gateway 105 that received this message can recognize the offer message that was earlier transmitted from it to which this re-direct message corresponds.

It is also possible to use a scheme in which the end-to-end ACK signal is contained in this re-direct message, and as described below, when the FANP node that received this end-to-end ACK transmits to the re-direct message to the upstream side, that FANP node also transmits this re-direct message by erecting the end-to-end ACK signal.

In this way, it becomes possible to return the end-to-end ACK from the final terminal (the video terminal 106 in this embodiment) to the transmission terminal (the video server 101). Note that there is no need to mount this end-to-end ACK on every re-direct message, and it is possible to use a scheme in which it is also transmitted to the upstream side only when it is received from the downstream side, for example.

The 1394 gateway 105 that received the re-direct message interprets that the earlier transmitted offer message was accepted. At this point, the 1394 gateway 105 recognizes that, hereafter, when the MPEG video for example is entered from the isochronous channel 2103 of the first 1394 bus 112, it is necessary to transmit it further to the isochronous channel 2104 of the second 1394 bus 113. Consequently, the IP/FANP processing unit 1404 makes the necessary setting (the initialization of the internal queue, the setting of the correspondence table of FIG. 19, etc.) by which the data from the isochronous channel 2103 will be forwarded to the 1394 switch unit 1408 at the first MUX/DEMUX 1403, and this data will be transmitted at the 1394 switch unit 1408 to the second MUX/DEMUX 1405 by applying only the datalink layer processing (that is, the switching of the 1394 frames among the 1394 buses by checking only the channel number or the destination address with the specific register offset).

In addition, the setting is also made with respect to the second MUX/DEMUX 1405 so that this data will be transmitted to the isochronous channel 2104 of the second 1394 bus 113.

Moreover, the re-direct message is also transmitted to the previous hop NIU 104.

At this point, when the e-ACK is erected in the re-direct message from the downstream side, the e-ACK is also erected there.

These steps are repeated up to the video server 101. Note that the NIU 104 has the setting (the setting of the correspondence table for enabling the direct conversion from the VPI/VCI value of the ATM to the channel number of the 1394) for the ATM/1394 transfer unit 1008 by which it is possible to carry out the data forwarding at the datalink layer (without using the processing at the IP/FANP processing unit) from the ATM connection 2102 to the isochronous channel 2103 of the first 1394 bus 112 simply by the datalink switching from the ATM to the 1394.

Figure 28:
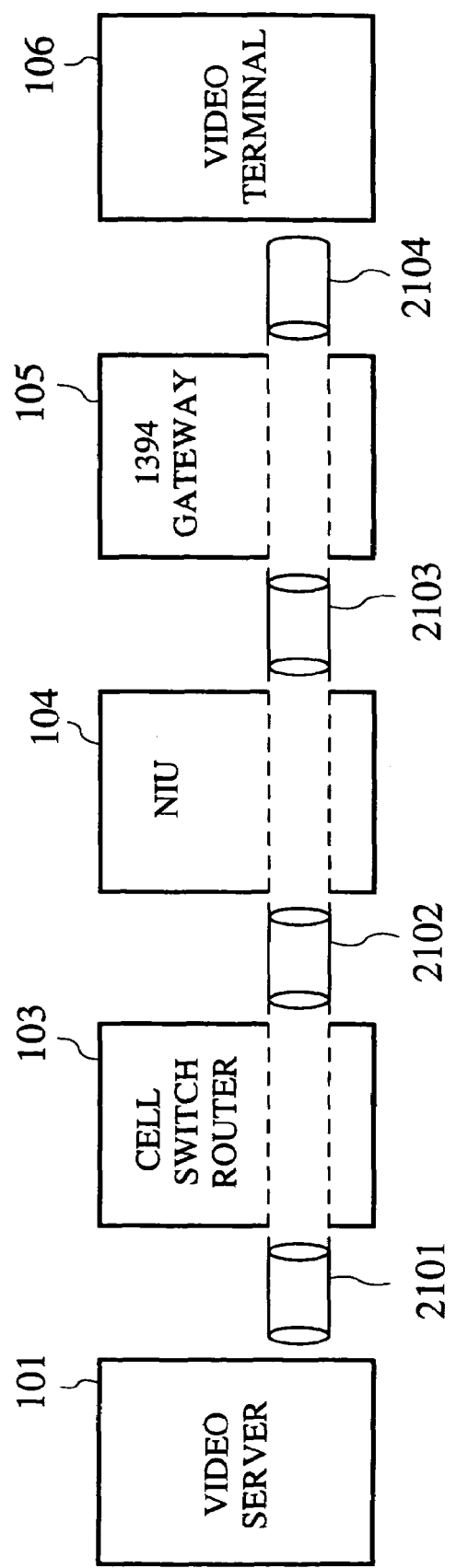
FIG. 28 is a diagram showing one example of a datalink connection from a video server to a video terminal in the communication network of FIG. 1.

Also, at the cell switch router 103, the direct ATM layer connection (the setting of the VCI table) is made for the ATM connection 2101 and the ATM connection 2102 by the internal ATM switch 602. At this point, all the datalink connections from the video server 101 to the video terminal 106 are established. This is shown in FIG. 28.

In addition, by the arrival of the end-to-end ACK, it is indicated that the video reception preparation is ready at the video terminal 106 which is the target terminal (step S1710 of FIG. 17).

Here, prior to the connection establishing, the video server 101 can start transmitting video data to the VC 2101 by which the FANP message exchange was carried out. The transmitted video data reaches to the video terminal 106 basically without receiving any intermediate IP layer processing, along the connection of FIG. 28.

Note that the data to be transmitted can be either raw MPEG data or MPEG data encapsulated within IP packets (that is, the so called MPEG-over-IP).

In the former case, the MPEG data will be transmitted according to the MPEG-over-ATM specification standardized by the ATM forum (SAAVer. 1 specification) while the MPEG data are transmitted on the ATM, and according to the MPEG-over-1394 specification standardized by the digital VTR conference while the MPEG data are transmitted on the 1394. Also, in this case, at the ATM/1394 transfer unit 1008 of the NIU 104, the transfer and the format conversion between the MPEG-over-ATM and the MPEG-over-1394 will be carried out. In this case, the end-to-end datalink layer connection set up for the purpose of the raw MPEG video data transfer is made by using the FANP. In this case, the triggering of these processings can be done by the VPI/VCI value which is the datalink layer header.

As described, according to this first embodiment, the following effects can be realized.

(1) Even under the environment in which different types of network technologies (datalink technologies) such as ATM and IEEE 1394 are mixedly present, it becomes possible to carry out the data transfer by establishing the end-to-end datalink layer connection.

(2) In a case of carrying out the data transfer at the datalink connection point, there is a degree of freedom in that it is possible to control the inter-connecting device such that the datalinks can be connected directly, without using the processing by the IP/FANP processing unit, so that it becomes possible to carry out the high speed data transfer wherever necessary.

(3) Even if the data to be transmitted is not the IP packet, it is possible to realize the route setting for it by using the IP/FANP for the control of the connection establishing, so that it becomes possible to realize any desired data transfer with respect to any desired location.

(4) In the FANP node, the routing protocol such as OSPF is not operated unlike the conventional router, so that there is basically no need to support the dynamical routing, and therefore the processing load is lighter compared with the conventional router.

Now, once the directly connected connections are established as shown in FIG. 28, these end-to-end datalink layer connections can be maintained fixedly.

In this case, as long as the explicit connection release control message does not come, these connections will be continued permanently so that the connections will be maintained in a hard state. In this case, at the end of the communication, the sender, the receiver, or the intermediate node transmits the connection release message among the flow exchange messages of the FANP, so as to urge the connection release to each FANP node.

Here, the case in which the sender requests the connection release can arise at the end of the program, or when the reserved time is over. Also, the case in which the receiver requests the connection release can arise when the user wishes to disconnect that connection voluntarily, or due to the reception terminal setting (such as the timer reservation). Also, the case in which the intermediate node requests the connection release can arise when a cable disconnection, a power supply disruption, etc. is detected at an intermediate location.

Figure 29:
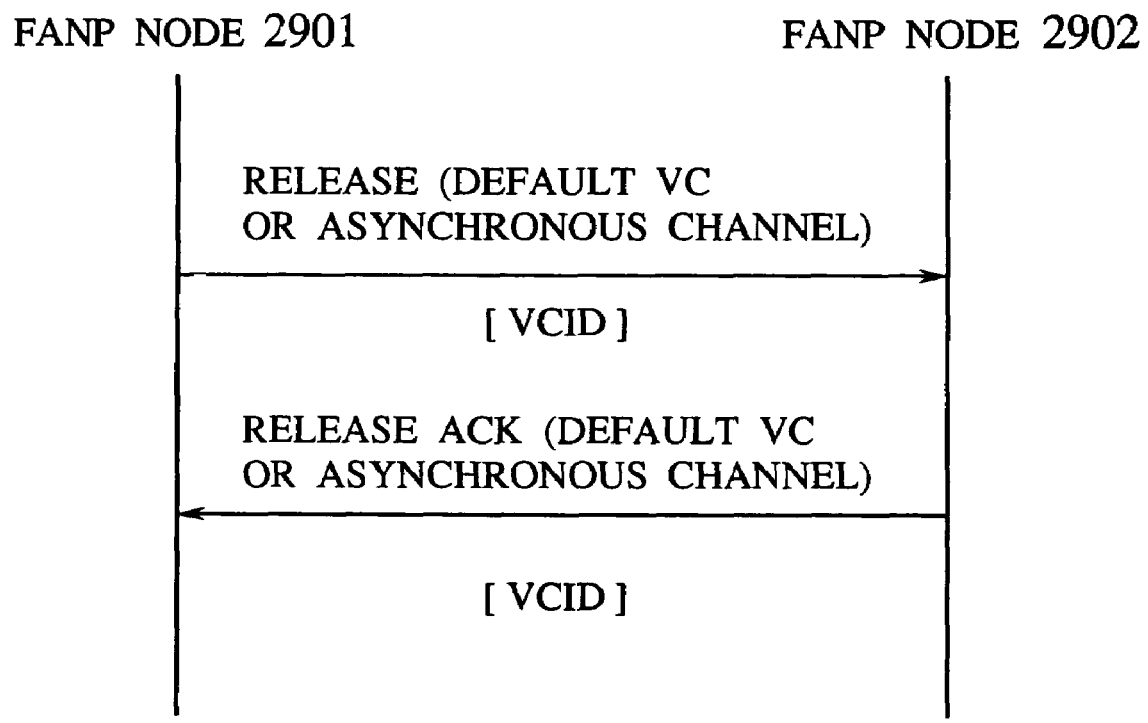
FIG. 29 is a sequence chart for a datalink connection release sequence in the communication network of FIG. 1.

As shown in FIG. 29, the connection release is carried out by the exchange of the release message and the release ACK message among the flow exchange messages.

The node 2901 that carries out the connection release transmits the release message to the neighboring FANP node 2902, and the FANP node 2902 that received this message transmits the release ACK message. Here, the connection release is merely the releasing of the "datalink connections inter-connected" state at the FANP node (the releasing of a pipe indicated by dashed lines in FIG. 28), and the releasing of the VC in the ATM network or the datalink layer connection such as the isochronous channel in the IEEE 1394 is not absolutely necessary.

When some node receives the connection release request from the upstream or downstream side, and judges that it is meaningless to maintain the connection to its downstream or upstream side from the overall viewpoint (because the data transfer beyond there will be no longer maintained due to that connection release), that node will continue to make (forward) the connection release request further to its downstream or upstream side.

Figure 30:
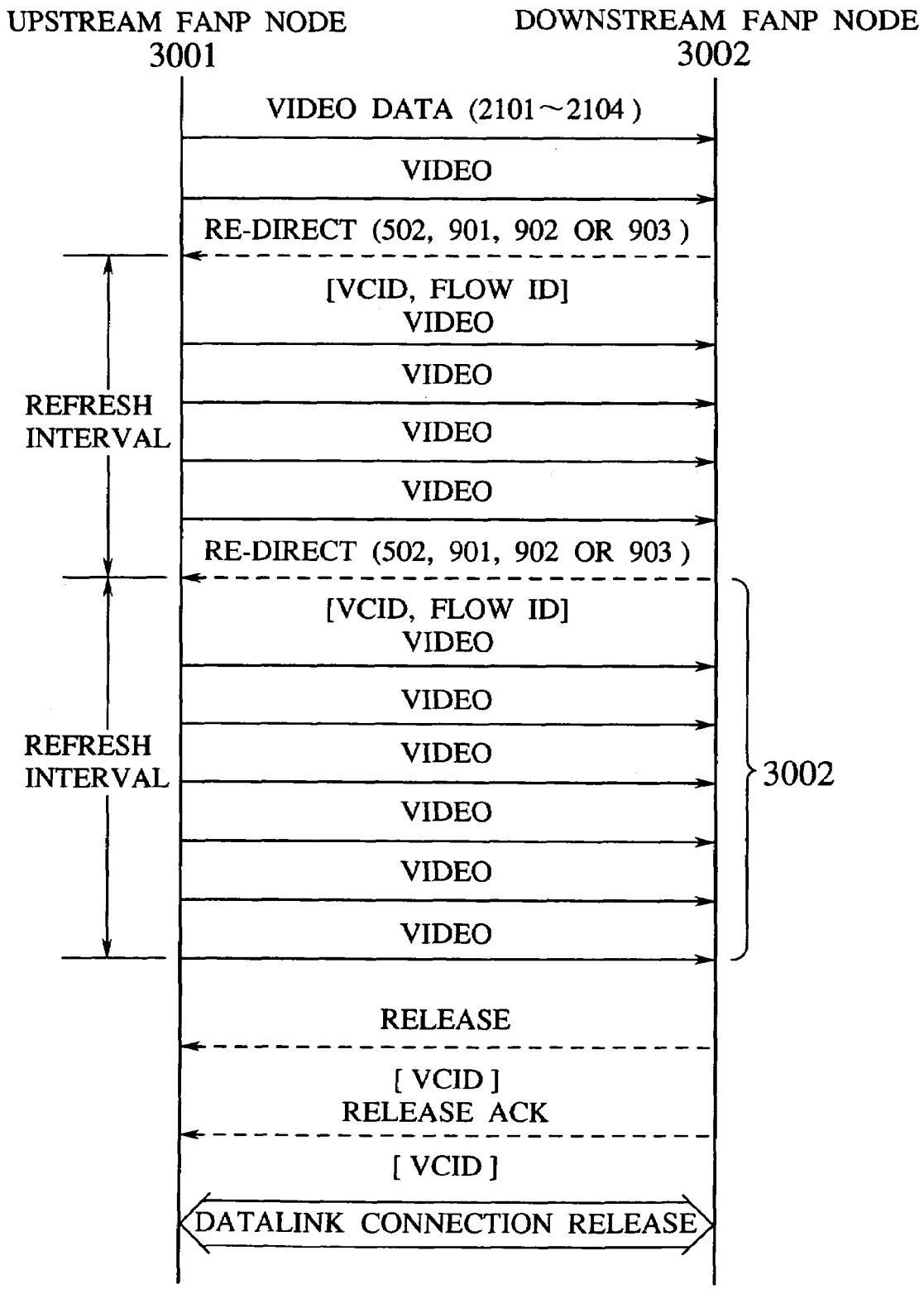
FIG. 30 is a sequence chart for an operation sequence in a case of maintaining and releasing a datalink connection in a soft state in the communication network of FIG. 1.

Also, as shown in FIG. 30, the connection may be maintained in a soft state. In the soft state, the downstream node regularly transmits the re-direct message to the upstream node so that the upstream node recognizes that the downstream node is capable of continuing to receive data at a corresponding datalink connection, and continues to send data into that datalink connection. This transmission of the re-direct message is carried out at the prescribed refresh interval as indicated in FIG. 30. Then, when the re-direct message did not reach to the upstream node after the prescribed refresh period elapsed (a state indicated as 3002 in FIG. 30), the upstream node judges that the downstream node became impossible to receive data at that datalink connection so that the upstream node stops the data transfer to that datalink connection.

The downstream node transmits the re-direct message regularly to the upstream node as long as data is flowing in that datalink connection. The re-direct message is transmitted at the refresh interval indicated by the offer message. When no data is flowing, the re-direct message is not transmitted.

By transmitting the re-direct message in this manner, it is possible for the upstream node to confirm that the datalink connection (2101, 2102, 2103 or 2104) related to that re-direct message is operating normally and that the downstream node is active.

Here, when the upstream node is broke down for some reasons, in order to avoid leaving the downstream node in a state of having that datalink connection set up, this datalink connection is released from the downstream node when a state of having no data flowing in that datalink connection continues for a certain period of time at the downstream node.

Also, when the data transferred by that datalink connection is the IP packet, in conjunction with the end of the IP packet transfer by that datalink connection, it is also possible to carry out the switching of that IP packet transfer from that dedicated datalink connection to the default VC (default channel=asynchronous channel or asynchronous write).

Next, a method for using the flow ID as described above will be described.

In a case of transmitting the IP packets through the datalink layer connections established according to the present invention, a typical method is to use the flow ID given-by "IP address of the transmitting terminal+IP address of the receiving terminal" or "IP address of the transmitting terminal+port number of the transmitting terminal+IP address of the receiving terminal+port number of the receiving terminal".

In a case of entering the IP packets into the datalink layer connections which are directly connected by this method, it suffices for the intermediate FANP node to distinguish the IP flows to be entered by entering only those IP packets which have a specific set of "source address+destination address" or "source address+source port number+destination address+destination port number" among the IP packets. Note that this operation may be done by any intermediate FANP node (usually a router). Also, this directly connected connections may be interrupted anywhere. As such, what value is to be used as the flow ID value can be ascertained by each FANP node according to the flow ID type number.

Next, a case of entering the raw data (such as MPEG data, for example) rather than the IP packets into the directly connected datalink layer connections will be considered.

First, consider a case of entering "destination IP address+destination port number" as the flow ID. If the both sides of the transmitting and receiving terminals acknowledge in advance a rule like "when a value in a certain range is used as a value of the destination port number, raw data rather than IP packets will be entered into the directly connected datalink layer connections", then by looking at the destination port number of the flow ID, the FANP node can recognize that data that will subsequently flow in are not the IP packets. In this case, there may be no need to transmit the information regarding the communication attribute.

Next, consider a case of entering "destination IP address+a unique ID determined by the transmitting terminal" as the flow ID. Here, this "unique ID determined by the transmitting terminal" is a unique ID that is determined and used by the transmitting terminal by attaching some meaning. Similarly as in the previous case, it is also possible to consider a method in which both sides of the transmitting and receiving terminals acknowledge in advance a rule like "when a value in a certain range is used as a value of the unique ID, specific raw data will be entered into the directly connected datalink layer connections".

The flow ID will be flowing from each source when the information outputted from two or more sources (which may not be outputted simultaneously) are merged at some FANP node and outputted at the identical datalink layer connection from that FANP node.

It is also possible to consider a method in which an identical flow ID can be attached to the information (flow) to be entered into that datalink, and used as an identifier by means of which the information from different sources can be collected into one datalink layer connection.

Figure 31:
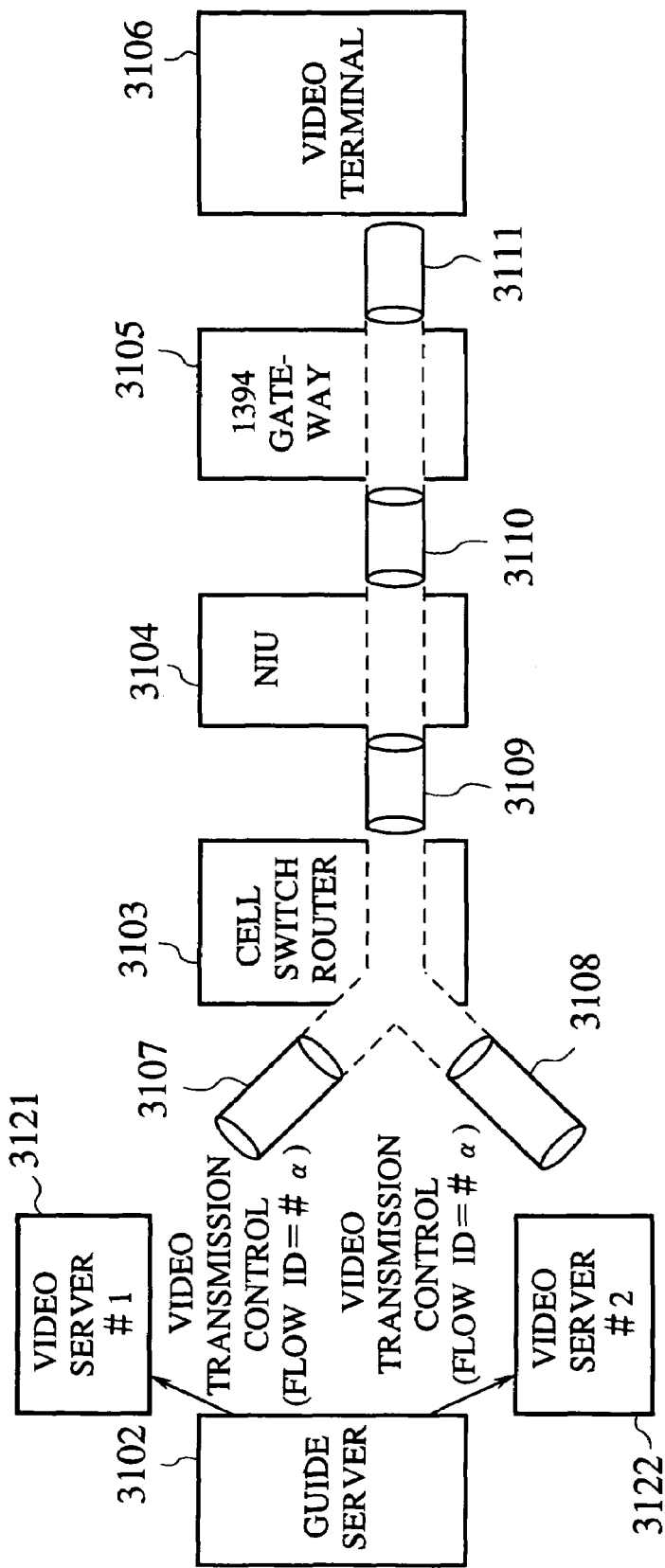
FIG. 31 is a diagram for explaining a manner of using a flow ID in a case of merging information data flows from two or more sources into an identical datalink connection in the communication network of FIG. 1.

This case will be described in detail with reference to FIG. 31, which shows the network that has basically the similar configuration as that of FIG. 1 (and therefore the descriptions of the constituent elements will be omitted here), but it differs from the network of FIG. 1 in that a plurality of video servers (two video servers 3121 and 3122 in FIG. 31, for example) are provided.

The video data delivery from these video servers is also controlled by the program guide delivery server (guide server) 3102. At this point, the guide server 3102 notifies some specific number to either one of the video servers 3121 and 3122 for carrying out the delivery, as a control of the video data delivery with respect to the same video terminal 3106 at the same connection time, in a sense of "use this number as the flow ID (or its part)". Here, the video data delivery from different video servers at the same connection time occurs in such a case where a user of the video terminal 3106 changes the video channel number (program) to be watched, or a case in which the different video servers provide different programs respectively.

In such a case, when the plural video servers throw the identical flow ID (or its part), it becomes possible for the FANP node (the cell switch router 3103 in this case) to ascertain that both of these flows are to be forwarded to the identical datalink connection 3109. Consequently, even in a case where the channel switching by the user (that is, the changing of the video server) occurs, there is no need to establish a new datalink layer connection at the downstream side of that FANP node (the cell switch router 3103 in this case), and it becomes possible to transmit the respective data to appropriate datalink layer connections.

Note that, in this case, when the re-direct message comes from the downstream side, there is a need to transmit it to a plurality of upstream side FANP nodes (the video servers 3121 and 3122 in this case) which are related by the FANP.

Also, it is necessary for a switch that connect the datalink layers together (The ATM switch within the cell switch router 3103 in this case) to have a connection form of multiple-to-one (that is, a form by which data from different input datalink connections are to be collectively outputted to one output datalink connection). It is also possible to presuppose that data will not be transmitted from a plurality of transmitting terminal simultaneously.

In addition, a portion described as the 1394 bus in the above description may be replaced by 1394 networks inter-connected by 1394 gateways or 1394 bridges.

Moreover, the router has been described above a something which is provided at the CATV head-end outside the home, but of course it is also possible to place it inside the home.

In this embodiment, the description has been given for an exemplary case in which the reservation of the bandwidth from the video server 101 to the video terminal 106 is made by using the extended FANP. In contrast, it is also possible to carry out the bandwidth reservation control in the existing router (the cell switch router 103 in this embodiment) by using the signaling protocol in the network layer such as the RSVP (Resource Reservation Setup Protocol) or ST2 (Stream Transport Protocol-2), and carry out the bandwidth reservation control by using the extended FANP of the present invention within the IP subnet, that is, between the cell switch router 103 to the video terminal 106. The sequence in this case is shown in FIG. 32.

Figure 32:
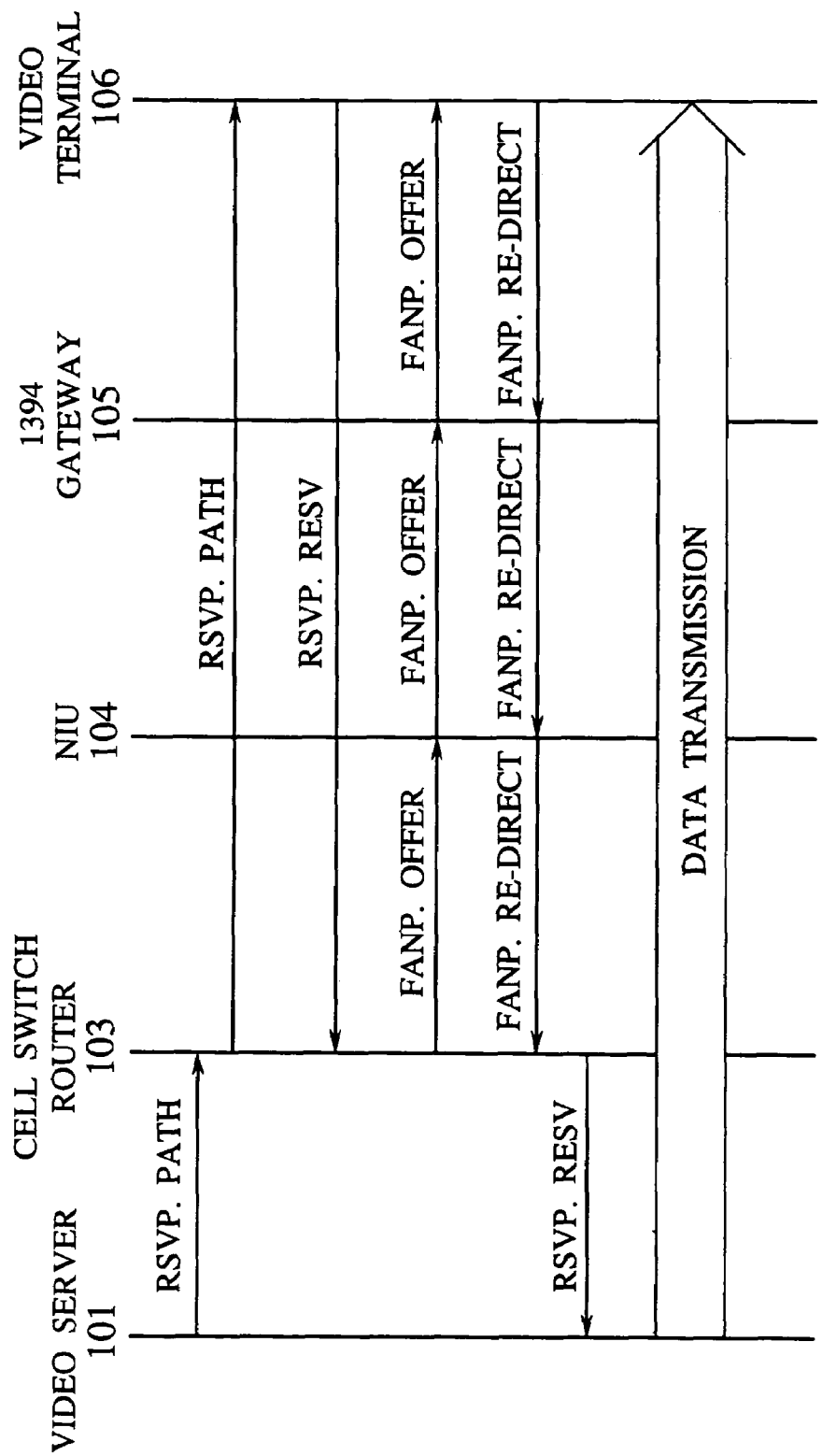
FIG. 32 is a sequence chart for an operation sequence in a case of carrying out a bandwidth reservation control between a cell switch router and a video terminal by using an extended FANP in the communication network of FIG. 1.

FIG. 32 shows an exemplary case in which the RSVP is used as the signaling protocol in the network layer. Note that, in FIG. 32, the detailed message exchanges such as those for the propose message and the pending message are omitted for simplicity.

For the bandwidth reservation control among the transmitting terminal (video server 101), the router (cell switch router 103) and the video terminal 106, the signaling protocol such as RSVP or ST2 is used, and the bandwidth reservation control within the subnet among them is carried out by using the extended FANP of the present invention. Namely, the extended FANP of the present invention is used for the purpose of the datalink connection control between the RSVP nodes. By means of this, the existing router becomes the de facto standard between the internet routers, and the widely used bandwidth reservation protocol between the terminal and the router or between one router and another such as ST2 or RSVP can be used, so that it becomes possible to realize the bandwidth reservation within the subnet that has not been used conventionally, in particular the bandwidth control in the subnet under the heterogeneous environment in which the virtual connection type networks are mixedly present, by using the extended FANP of the present invention.

Second Embodiment

Next, with references to FIG. 33 to FIG. 44, the second embodiment of the present invention will be described in detail.

This second embodiment is directed to a communication network system formed by two or more 1394 buses, nodes called half gateways which are connected to respective buses, and a various type of network for connecting these half gateways.

Figure 33:
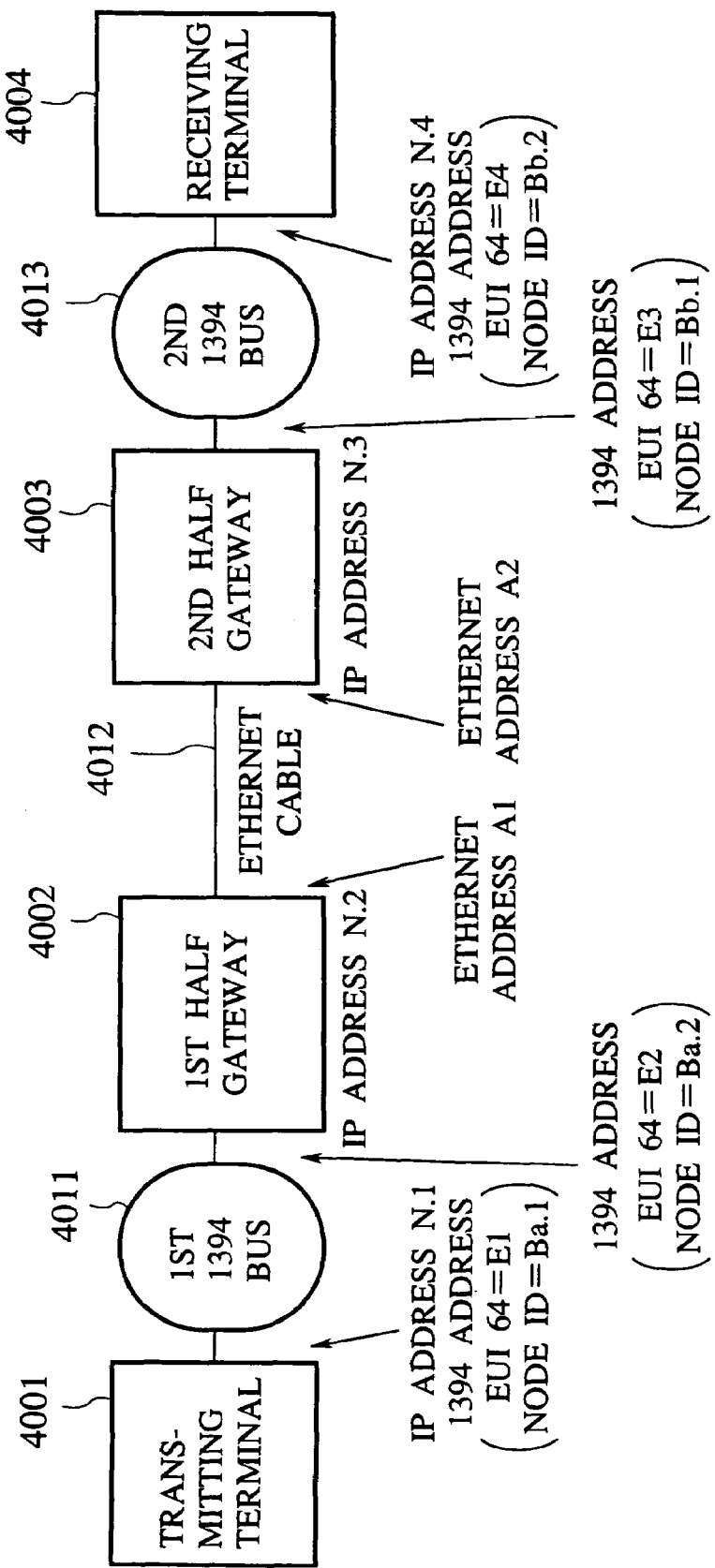
FIG. 33 is a block diagram showing an exemplary overall configuration of a communication network according to the second embodiment of the present invention.

FIG. 33 shows an exemplary overall configuration of a communication network system (a home network system for connecting various electric devices inside the home, for example) according to this second embodiment. As shown in FIG. 33, this communication network system comprises a transmitting terminal 4001, a first half gateway 4002, a second half gateway 4003, a receiving terminal 4004, a first 1394 bus 4011, an Ethernet cable 4012, and a second 1394 bus 4013.

Here, it is assumed that the entire system constitutes a home network within the same home, similarly as in the first embodiment. Consequently, among the devices contained in this system, those which are the IP nodes are assumed to be belonging to the same IP subnet. Here, this IP subnet is assumed to have an IP subnet address N, and the IP addresses of the nodes are assumed to be N. 1 for the transmitting terminal 4001, N. 2 for the first half gateway 4002, N. 3 for the second half gateway 4003, and N. 4 for the receiving terminal 4004.

Also, the 1394 addresses and the Ethernet addresses of these nodes are as shown in FIG. 33.

Each of the transmitting terminal 4001, the first half gateway 4002, the second half gateway 4003 and the receiving terminal 4004 of this embodiment is the FANP node as described in the first embodiment which has the extended FANP function of the present invention.

The transmitting terminal 4001 is also the IP terminal as well, and has functions for exchanging IP packets with the receiving terminal 4004 and delivering video with respect to the receiving terminal 4004.

The video delivery may be carried out by mounting the video information on the IP packets, or by transmitting the video data directly into the specified 1394 isochronous channel. Further details in this regard will be described below.

The first half gateway 4002 and the second half gateway 4003 are devices for connecting the 1394 buses together. Namely, they are devices to be used in connecting the first 1394 bus 4011 and the second 1394 bus 4013. Such a situation may arise when the first 1394 bus 4011 and the second 1394 bus 4013 are far apart from each other so that it is difficult to unify them into a single 1394 bus, for example.

Namely, according to the specification of the 1394, it is not preferable for the 1394 buses to use a long cable.

In such a case, the half gateways of the present invention can be connected to the respective 1394 buses and these half gateways can be connected together by a dedicated cable, so as to realize the connection between the 1394 buses. Further details in this regard will be described below.

The receiving terminal 4004 is also the IP terminal as well, and has functions for exchanging IP packets with the transmitting terminal 4001, and receiving video delivered from the transmitting terminal 4001.

The first half gateway 4002 and the second half gateway 4003 are connected by the Ethernet cable 4012. Namely, in this embodiment, the data exchanges between two half gateways are to be carried out in terms of the Ethernet frames.

Figure 34:
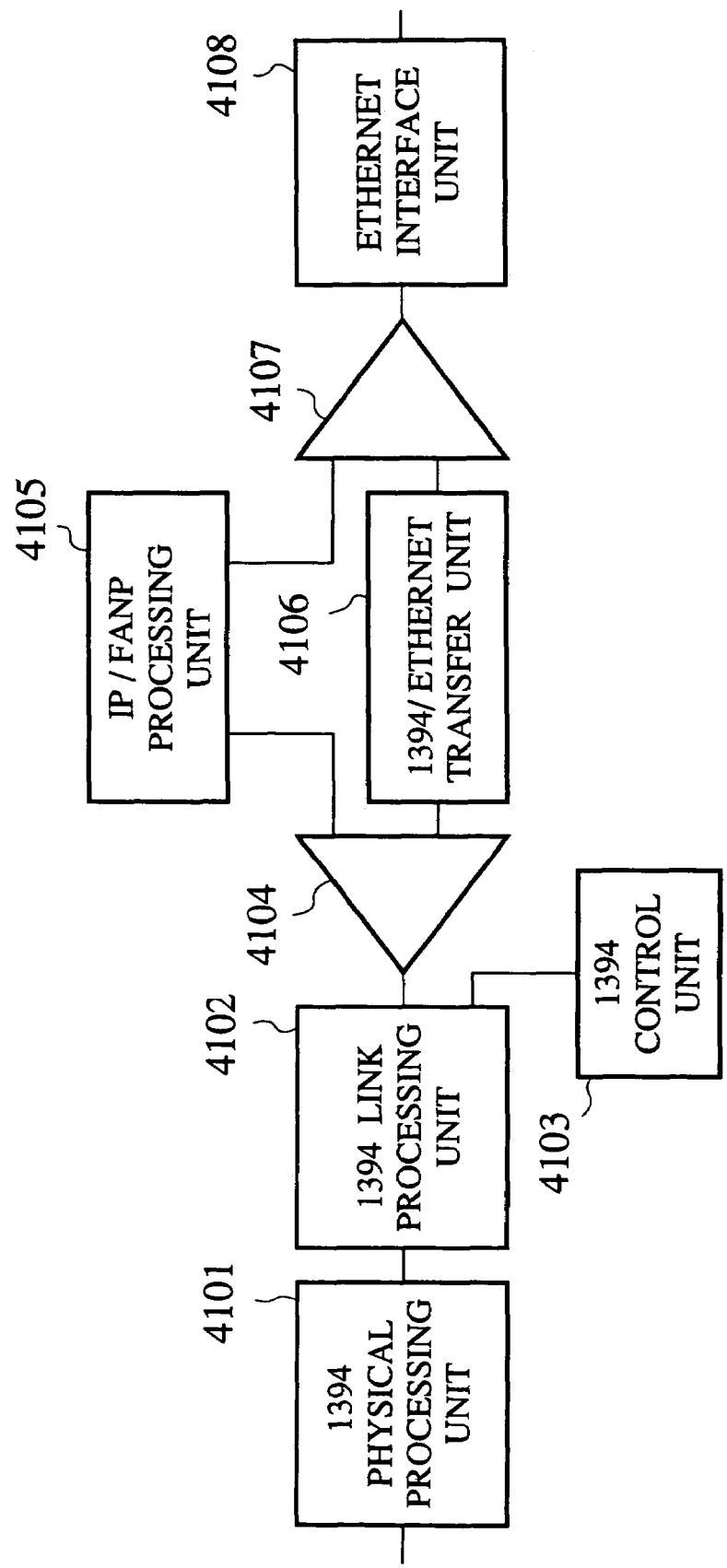
FIG. 34 is a block diagram showing an exemplary internal configuration of a half gateway in the communication network of FIG. 33.

FIG. 34 shows an exemplary internal configuration of the half gateway 4002 or 4003.

As shown in FIG. 34, this half gateway comprises a 1394 physical processing unit 4101, a 1394 link processing unit 4102, a 1394 control unit 4103, a first MUX/DEMUX 4104, an IP/FANP processing unit 4105, a 1394/Ethernet transfer unit 4106, a second MUX/DEMUX 4107, and an Ethernet interface unit 4108.

The 1394 physical processing unit 4101, the 1394 link processing unit 4102, and the 1394 control unit 4103 carry out the physical layer processing, the link layer processing, and the bus management and the transaction layer processing, respectively, for the connected 1394 bus (4011 or 4013), as well as the exchanges of data (PDU from a viewpoint of 1394) with the IP/FANP processing unit 4105 or the 1394/Ethernet transfer unit 4106, using the 1394 frames to be transmitted or received that are passing through the first MUX/DEMUX 4104 and the second MUX/DEMUX 4107.

The IP/FANP processing unit 4105 has functions for carrying out the routing based on the IP address, the routing table management, the FANP processing, the ARP processing, etc., for the received IP packets, FANP packets, ARP packets, etc.

The 1394/Ethernet transfer unit 4106 has a function for attaching a specific Ethernet header to data received from the 1394 side, especially data received through the isochronous channel, by using its isochronous channel number or the specific register offset on the destination address as a key, and transmitting it to the Ethernet side, and a function for transmitting data received from the Ethernet side to a specific isochronous channel or the specific address offset on the 1394 side by using its header information as a key. Namely, the data forwarding at this processing unit is carried out by using only the datalink layer processing without using the IP layer processing.

For example, a table of correspondence between the MAC address value and the channel number of the isochronous channel of the 1394 bus is produced in a form of a correspondence table as shown in FIG. 35 (in a case of transmitting data received from the 1394 side to the Ethernet side) or FIG. 36 (in a case of transmitting data received from the Ethernet side to the 1394 side), for example. Here, the mapping for each correspondence table is made by the IP/FANP processing unit 4105. A similar correspondence table can be configured between the MAC address value and the 1394 destination address with a specific register offset value.

The Ethernet interface unit 4108 is an interface with respect to the physically connected Ethernet, and carries out the encapsulation and decapsulation of data to be exchanged with the second MUX/DEMUX 4107 and the Ethernet frames.

Next, for an exemplary case of transmitting video from the transmitting terminal 4001 to the receiving terminal 4004, the operation sequence in time order will be described with references to FIG. 37 and FIG. 38.

Figure 37:
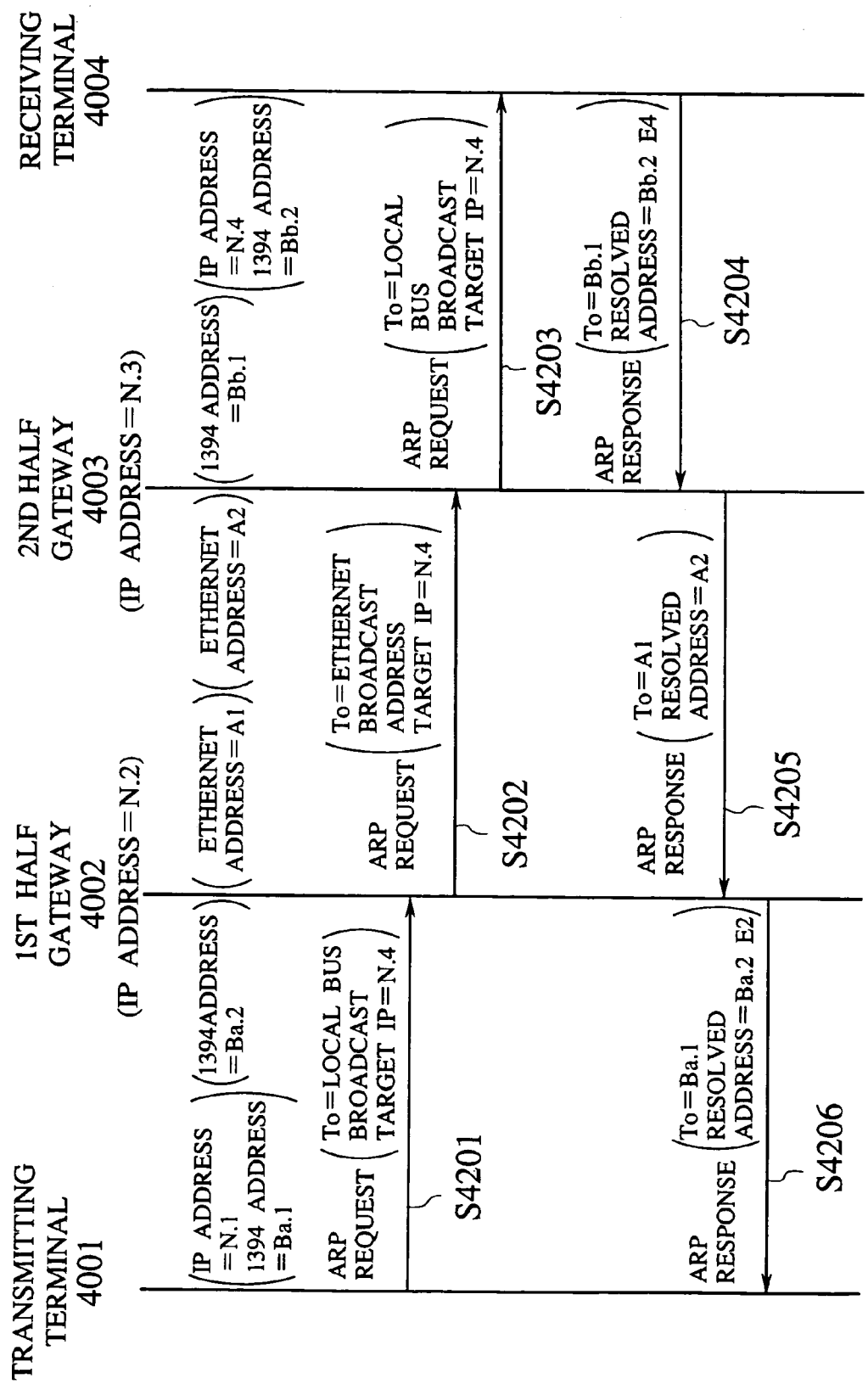
FIG. 37 is a sequence chart for an ARP sequence in the communication network of FIG. 33.
Figure 38:
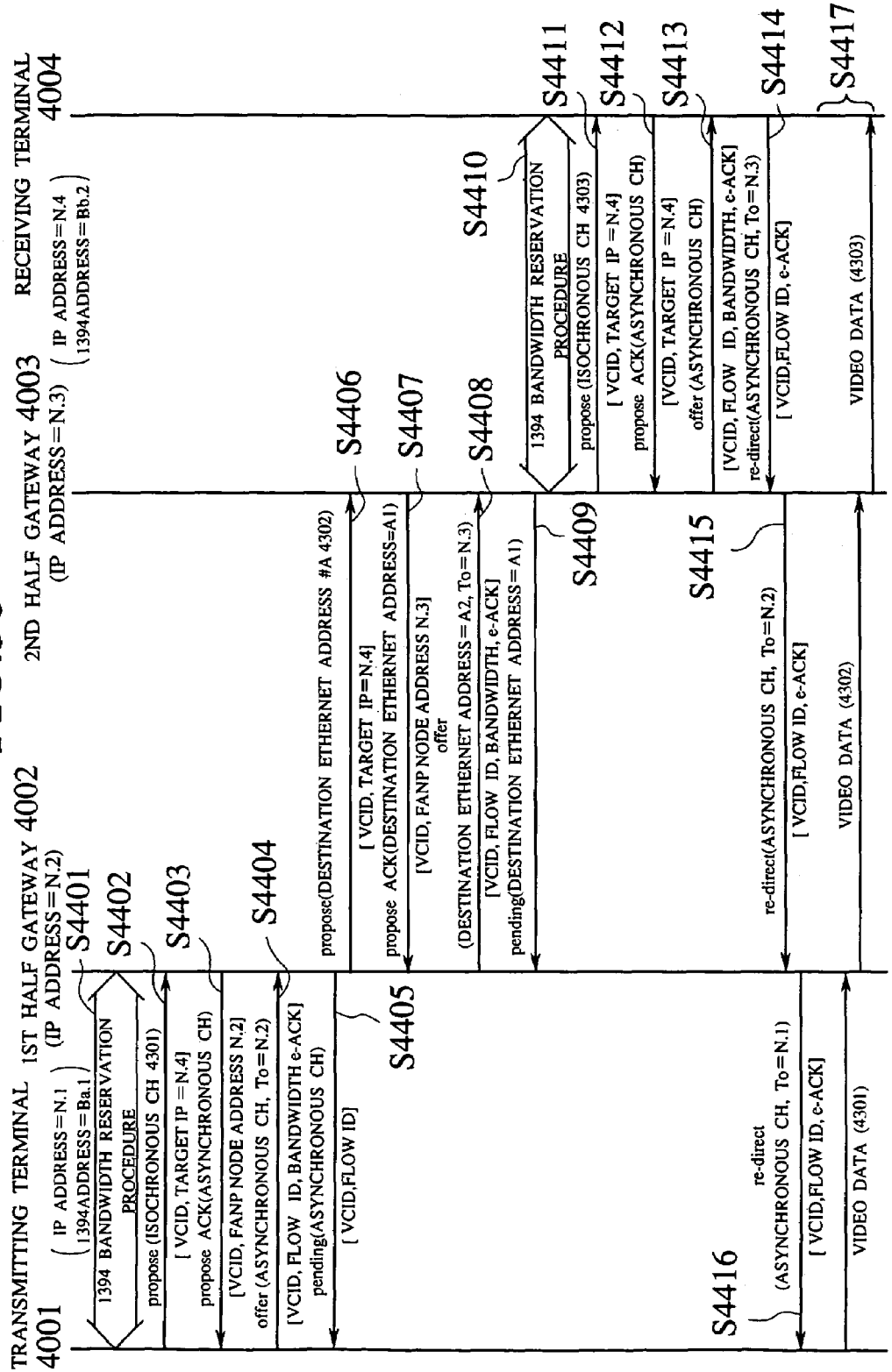
FIG. 38 is a sequence chart for an operation sequence up to a video transmission in the communication network of FIG. 33.

FIG. 37 shows a sequence for the ARP (Address Resolution Protocol).

First, the transmitting terminal 4001 transmits the ARP request packet to the first 1394 bus 4011 in order to carry out the address resolution for ascertaining the datalink layer address of the receiving terminal 4004 from its IP address (step S4201). As described in the first embodiment, this ARP request is broadcasted on the local bus (that is, the first 1394 bus 4011).

The first half gateway 4002 which is the FANP node that received this ARP request forwards this ARP request to the Ethernet cable 4012, upon confirming that the requested address is not the own address and that another port (that is, the Ethernet cable 4012) different from the port through which this ARP is entered (that is, the first 1394 bus 4011) is connected (step S4202). Here, the destination Ethernet address is the Ethernet broadcast address.

The second half gateway 4003 that received this ARP request also forwards this ARP request to the second 1394 bus 4013 through a procedure in which the procedure of the first half gateway 4002 is reversed (step S4203). At this point, this ARP request may be transmitted in a form of the broadcast to the "local bus".

The receiving terminal 4004 that received this ARP request enters the own 1394 address (EUI64 and "bus ID+physical ID") into this packet and returns this packet to the second 1394 bus 4013 as the ARP response (step S4204). At this point, the destination address of this ARP response is the 1394 address of the second half gateway 4003.

The second half gateway 4003 which received this ARP response enters the own Ethernet address into a field for the resolved address, so as to carry out the deputy response with respect to the first half gateway 4002 (step S4205). At this point, the destination is the Ethernet address of the first half gateway 4002. Also, the second half gateway 4003 recognizes that a terminal having the IP address of the receiving terminal 4004 exists on the second 1394 bus 4013 side, and registers this fact into the internal routing table.

The first half gateway 4002 that received this ARP response enters the own 1394 address into a field for the resolved address, and carries out the deputy response with respect to the transmitting terminal 4001 (step S4206). At this point, the destination is the 1394 address of the transmitting terminal 4001. Also, the first half gateway 4002 recognizes that a terminal having the IP address of the receiving terminal 4004 exists on the Ethernet 4012 side, and registers this fact into the internal routing table.

In this manner, the transmitting terminal 4001 can ascertain that it suffices to transmit the IP packets destined to the receiving terminal 4004 with respect to (the 1394 address of) the first half gateway 4002.

Note that FIG. 37 shows a case of the address resolution in which the ARP request reaches to the target node once and then the ARP response is sequentially returned backwards from there, but it is not necessarily limited to this case, and it is also possible to use a case of the address resolution in which the intermediate node directly carries out the address resolution when the intermediate node already has an information on the target node.

Now, the transmitting terminal 4001 already recognizes that it is the FANP node itself and that what is to be transmitted from now on with respect to the receiving terminal 4004 is the video. Consequently, the transmitting terminal 4001 intends that the video to be transmitted from now on will be forwarded by the datalink processing alone without using the IP processing at the intermediate FANP nodes.

To this end, after the confirmation of the initial setting and the coding scheme using the IP packets and the confirmation of the video reception capability with respect to the receiving terminal 4004, the transmitting terminal 4001 proceeds to the video transmission preparation. FIG. 38 shows the sequence for this operation.

Figure 39:
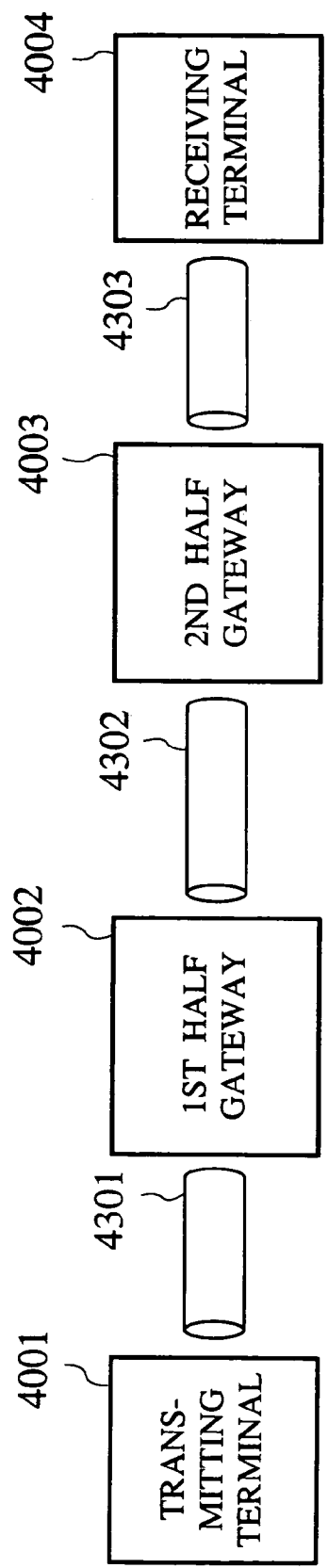
FIG. 39 is a diagram showing one example of a video transmission route from a transmitting terminal to a receiving terminal in the communication network of FIG. 33.

First, the transmitting terminal 4001 accesses the register of the isochronous resource manager on the first 1394 bus 4011 to reserve the bandwidth necessary for the video transmission and acquire the isochronous channel number, between the transmitting terminal 4001 and the first half gateway 4002 (step S4401). FIG. 39 shows the isochronous channel 4301 obtained at this point.

Then, the transmitting terminal 4001 transmits the propose message of the FANP with respect to the first half gateway 4002 through that isochronous channel 4301. This propose message is transmitted by entering the own ESI and sequence number as the VCID and the IP address (N. 4) of the receiving terminal 4004 as the target IP address (step S4402).

The first half gateway 4002 that received this propose message recognizes that it is the FANP packet (propose message), confirms the final destination IP address (the receiving terminal 4004) from the target IP address, and confirms that this address exists on the Ethernet cable 4012 side by referring to the internal routing table. Then, the first half gateway 4002 enters the own IP address into the propose ACK message and returns it to the asynchronous channel or asynchronous write of the first 1394 bus 4011 (step 4403).

The transmitting terminal 4001 that received this propose ACK message transmits the offer message to the asynchronous channel or asynchronous write of the first 1394 bus 4011, by entering the IP address of the first half gateway 4002 as the destination IP address, entering the VCID described above, entering the IP address of the receiving terminal 4004 which is the final destination into the flow ID similarly as in the first embodiment, and containing the necessary bandwidth value and the end-to-end ACK request (step S4404). At this point, the destination 1394 address is obviously the 1394 address of the first half gateway 4002.

The first half gateway 4002 that received this offer message recognizes that it is the FANP packet, confirms the final destination IP address (the receiving terminal 4004) from the flow ID, and re-confirms that this address exists on the Ethernet cable 4012 side.

Here, in order to make it possible for the second half gateway 4003 to transmit the data to be transmitted directly to the isochronous channel or the destination address with the specific register offset value on the 1394 bus 4013 by only confirming the Ethernet header value, a value different from the Ethernet address "A2" unique to the second half gateway 4003 is used as the destination address of the Ethernet frame to be transmitted. This value can be any value as long as it is different from values of the Ethernet addresses of the first half gateway 4002 and the second half gateway 4003, that is, the address not used on the Ethernet cable, and it is different from values currently used for the direct forwarding at the datalink layer for the other flows.

For example, when the Ethernet address value selected by the first half gateway 4002 here is "#A", only the video information directed to the receiving terminal 4004 will be mounted on every subsequent Ethernet frame which has "#A" as the destination Ethernet address. This is equivalent to having the virtual connection with "#A" as VCI established between the first half gateway 4002 and the second half gateway 4003. This is shown in FIG. 39 as the connection 4302.

Note that the half gateways 4002 and 4003 have the initial setting by which a frame destined to any Ethernet address will be handed to the IP/FANP processing unit 4105 once along with its destination Ethernet address value, except when it is a frame which passes through the 1394/Ethernet transfer unit 4106. By this setting, it becomes possible for the IP/FANP processing unit 4105 to make the setting according to the content of the FANP packet by which the switching at the datalink layer is carried out by making appropriate setting to the 1394/Ethernet transfer unit 4106, for the necessary Ethernet address.

The first half gateway 4002 transmits the propose message of the FANP through the connection 4302 of FIG. 39 (step S4406). This propose message is transmitted by entering the own ESI and sequence number as the VCID and the IP address (N. 4) of the receiving terminal 4004 as the target IP address.

The second half gateway 4003 that received this propose message recognizes that it is the FANP packet (propose message), confirms the final destination IP address (the receiving terminal 4004) from the target IP address, and confirms that this address exists on the second 1394 bus 4013 side by referring to the internal routing table. Then, the second half gateway 4003 returns the propose ACK message to the Ethernet cable 4012, by entering the own IP address as the target IP address and the Ethernet address of the first half gateway 4002 as the destination address (step S4407).

As can be seen from this description, a case of transmission using the usual Ethernet address as the destination header of the Ethernet frame corresponds to a case of transmission by the "default VC" in the FANP.

The first half gateway 4002 that received this propose ACK message transmits the offer message onto the Ethernet cable 4012, by entering the IP address of the second half gateway 4003 as the destination IP address, entering the VCID described above, entering the IP address of the receiving terminal 4004 which is the final destination into the flow ID, and containing the necessary bandwidth value and the end-to-end ACK request (step S4408). At this point, the destination Ethernet address is the Ethernet address of the second half gateway 4003.

The second half gateway 4003 that received this offer message recognizes that it is the FANP packet, confirms the final destination IP address (the receiving terminal 4004) from the flow ID, and re-confirms that this address exists on the second 1394 bus 4013 side.

Then, the second half gateway 4003 reserves the bandwidth and the isochronous channel number or the destination address with the specific register offset by the setting in the register of the isochronous resource manager of the second 1394 bus, in order to transmit the video signals by reserving the necessary bandwidth up to the receiving terminal 4004 (step S4410). FIG. 39 shows the isochronous channel 4303 obtained at this point.

Then, the second half gateway 4003 transmits the propose message of the FANP through this isochronous channel 4303 (step S4411).

The receiving terminal 4004 that received this propose message transmits the propose ACK message to the second half gateway 4003 if it is acceptable (step S4412).

Then, the second half gateway 4003 transmits the offer message of the FANP to the receiving terminal 4004 (step S4413).

When the reception is possible, the receiving terminal 4004 transmits the re-direct message to the upstream FANP node (the second half gateway 4003 in this case) by setting the end-to-end ACK flag ON (step S4414). This setting of the end-to-end ACk flag is the processing related to the fact that the end-to-end ACK request is contained in the offer message of the FANP transmitted to the receiving terminal 4004 and that this terminal is the final terminal.

The second half gateway 4003 that received this re-direct message judges that the preparation for the isochronous channel use on the downstream side (the receiving terminal 4004 in this case) is ready, and makes the setting by which the direct datalink layer forwarding can be carried out for the SDU (Service Data Unit) of the frame that arrives with the Ethernet address #A (4302) without using the processing by the IP/FANP processing unit 4105 at the 1394/Ethernet transfer unit 4106 inside the second half gateway 4003. By this setting, for a frame that arrives with the specific Ethernet address "#A", its SDU can be transmitted to the isochronous channel 4303 directly by referring to the correspondence table as shown in FIG. 36, so that the efficiency and the speed of the data forwarding processing can be improved considerably.

Also, the above described processing does not use the processing at the IP/FANP processing unit 4105 so that the reduction of the load on the IP/FANP processing unit 4105 and the load distribution can be realized simultaneously. In addition, it is also possible to transmit data which is not an IP packet.

The second half gateway 4003 transmits the re-direct message to the upstream FANP node (the first half gateway 4002 in this case) (step S4415). At this point, the end-to-end ACK flag is erected in the re-direct message from the downstream side so that the end-to-end ACK flag is set ON.

In this manner, the re-direct message is delivered to the transmitting terminal 4001 through the second half gateway 4003 and the first half gateway 4002.

At the first half gateway 4002, the isochronous channel 4301 and the direct conversion into the Ethernet frame 4302 with the Ethernet address "#A" are set to the 1394/Ethernet transfer unit 4106. Also, at a time of forwarding the re-direct message, the re-direct message is delivered by using the asynchronous channel or asynchronous write of each 1394 bus or the formal Ethernet address "A1" on the Ethernet.

When the re-direct message with the end-to-end ACK flag erected is received at the transmitting terminal 4001 in this manner (step S4416), the transmitting terminal 4001 can confirm that the isochronous channel 4301 was directly connected at the datalink layer level up to the receiving terminal 4004. Then, the transmitting terminal 4001 starts the video data transmission through the isochronous channel 4301 (step S4417).

The video data can be transmitted through the connection 4302 and the isochronous channel 4303 to the receiving terminal 4004 by the datalink layer processing alone, without using the processing by the IP/FANP processing unit 4105 at the intermediate nodes of the half gateways 4002 and 4003

Note that the video information to be transmitted here may be the video data encapsulated within the IP packet similarly as in the first embodiment, or the video data directly mounted on the 1394 isochronous channel (or the Ethernet frame 4302 with the destination Ethernet address "#A"). Also, the video information may be transmitted in a form of the 1394 frame directly mounted on the Ethernet frame.

When the maintaining of the connection is realized by maintaining the soft state similarly as in the first embodiment, the above described re-direct message is regularly transmitted to the upstream direction. When this re-direct message does not arrive for a certain period of time or when an explicit message for disconnecting the connection (the release message) comes from the upstream direction, this soft state is released and the setting of the 1394/Ethernet transfer unit 4106 regarding that direct datalink layer connection is also cleared.

As described, by using a plurality of half gateways (4002, 4003) and the Ethernet cable (4012) that connects them, it becomes possible to carry out the communication by inter-connecting a plurality of 1394 buses by the half gateways.

Figure 40:
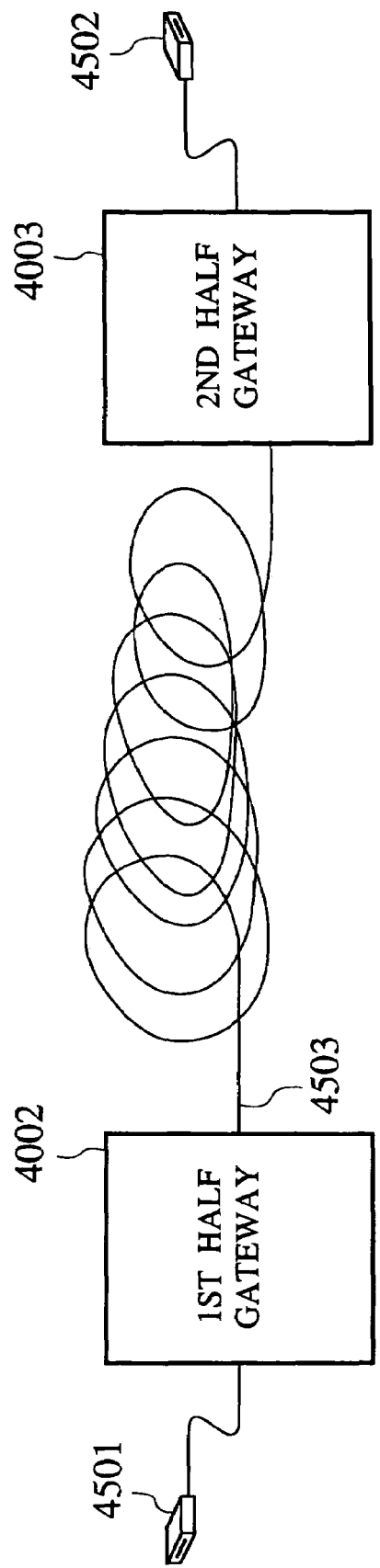
FIG. 40 is a diagram showing one example of a physical shape of a 1394 inter-connection cable, in a case of using an Ethernet cable as a cable for connecting two half gateways.

FIG. 40 shows an exemplary style of using the half gateways and the Ethernet cable. As shown in FIG. 40, a 1394 inter-connection cable has a physical shape in which a long Ethernet cable 4503 is connected between two half gateways 4002 and 4003 in advance. This cable portion may be connected by an electric cable such as UTP5 or coaxial cable, or by an optical cable such as a plastic optical fiber. It should be noted however that the transmission scheme of the physical layer is supposed to obey the Ethernet standard.

Also, to the respective half gateways, the 1394 connectors 4501 and 4502 are connected through relatively short cables (dedicated 1394 cables). Here, the dedicated 1394 cables are connected so that the power supply to the half gateways 4002 and 4003 can be made through the respective 1394 connectors 4501 and 4502 and this 1394 cable. Consequently, the system of FIG. 40 requires no special power supply. From a viewpoint of a user who wishes to inter-connect two 1394 buses, this implies that the connection is basically completed by simply connecting one end (4501) of the cable to the first 1394 bus 4011 and the other end (4502) of the cable to the second 1394 bus 4013, so that the convenience regarding the connecting operation can be improved remarkably.

Also, the 1394 cable basically has an upper limit of 4.5 m in length, but according to the present invention, a long cable (such as that of several hundred meters, for example) can be used as a cable for connecting the half gateways 4002 and 4003, so that it is very useful in a case of connecting the 1394 buses which are far apart from each other.

Figure 41:
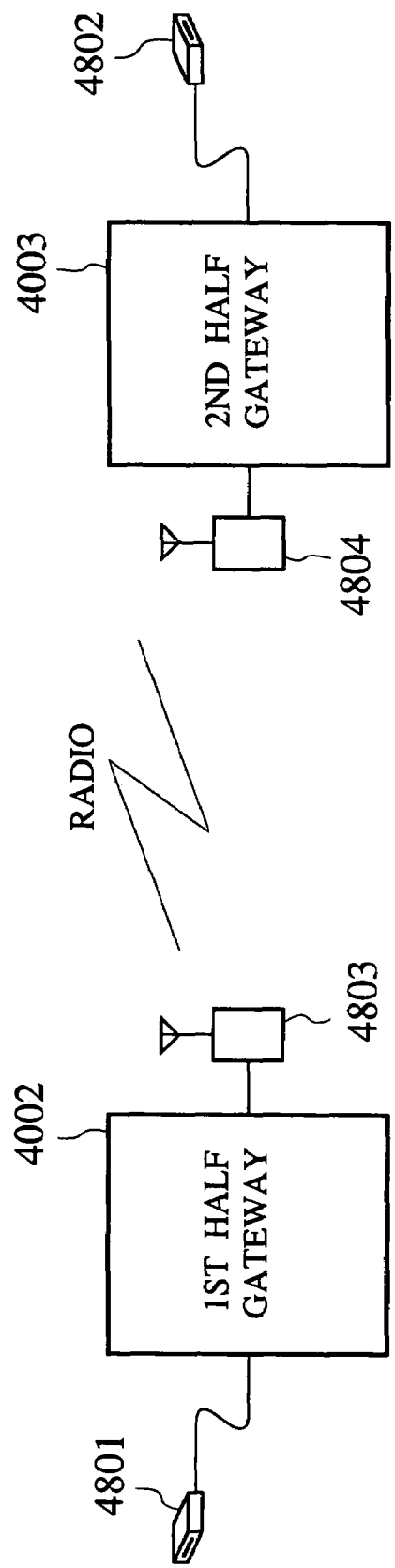
FIG. 41 is a diagram showing another example of a physical shape of a 1394 inter-connection cable, in a case of connecting two half gateways by radio transmission path.

In the above, an example using a long cable has been described, but as shown in FIG. 41, it is also possible to connect the half gateways 4002 and 4003 by radio. In FIG. 41, 4801 and 4802 are 1394 connectors while 4803 and 4804 are radio transceiver devices used for the inter-connection by radio.

In a case of using the MAC frame as the radio transmission scheme, the scheme of this second embodiment is basically applicable directly. When the radio interface is provided between the half gateways in this manner, this connection becomes wireless so that a user can arrange the wiring easily.

Note that the 1394 inter-connection cable is not only applicable to a case of forming the connection between the 1394 half gateways as described above and shown in FIG. 40 and FIG. 41, but also to a case of realizing the usual 1394 bridge in the half bridge configuration. In that case, the function of the 1394 bridge can be realized by changing those portions of the above description which are described as "specifying the destination IP address" to the processing of the 1394 address.

Figure 42:
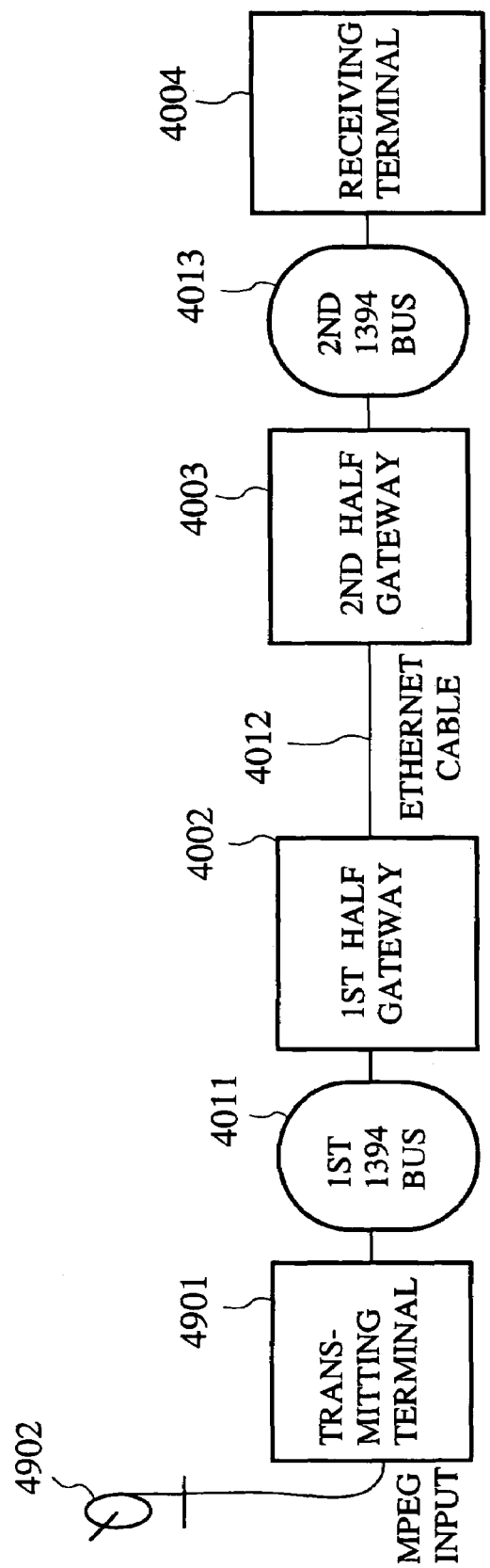
FIG. 42 is a block diagram showing an exemplary configuration of a home network with a transmitting terminal having a function for receiving MPEG video from a digital satellite broadcast (or digital CATV).

Note also that, as shown in FIG. 42, at the transmitting terminal, the MPEG video from the digital satellite broadcast (or the digital CATV) can be received and this MPEG video can be re-formatted into the MPEG-over-1394 format or converted into the raw video data by the MPEG decoder and then transmitted as the data on the isochronous channel of the 1394.

When this implementation is used, even for the video data (or speech data, usual data, etc.) which is not accommodated originally by the transfer packets used at the home such as those of the network layer like the IP packets, the datalink layer frames like those of the IEEE 1394, etc., the data transfer in the home network becomes possible so that it becomes possible to realize the data distribution to the home network without requiring the cable wiring change for the purpose of the video broadcasting.

Figure 43:
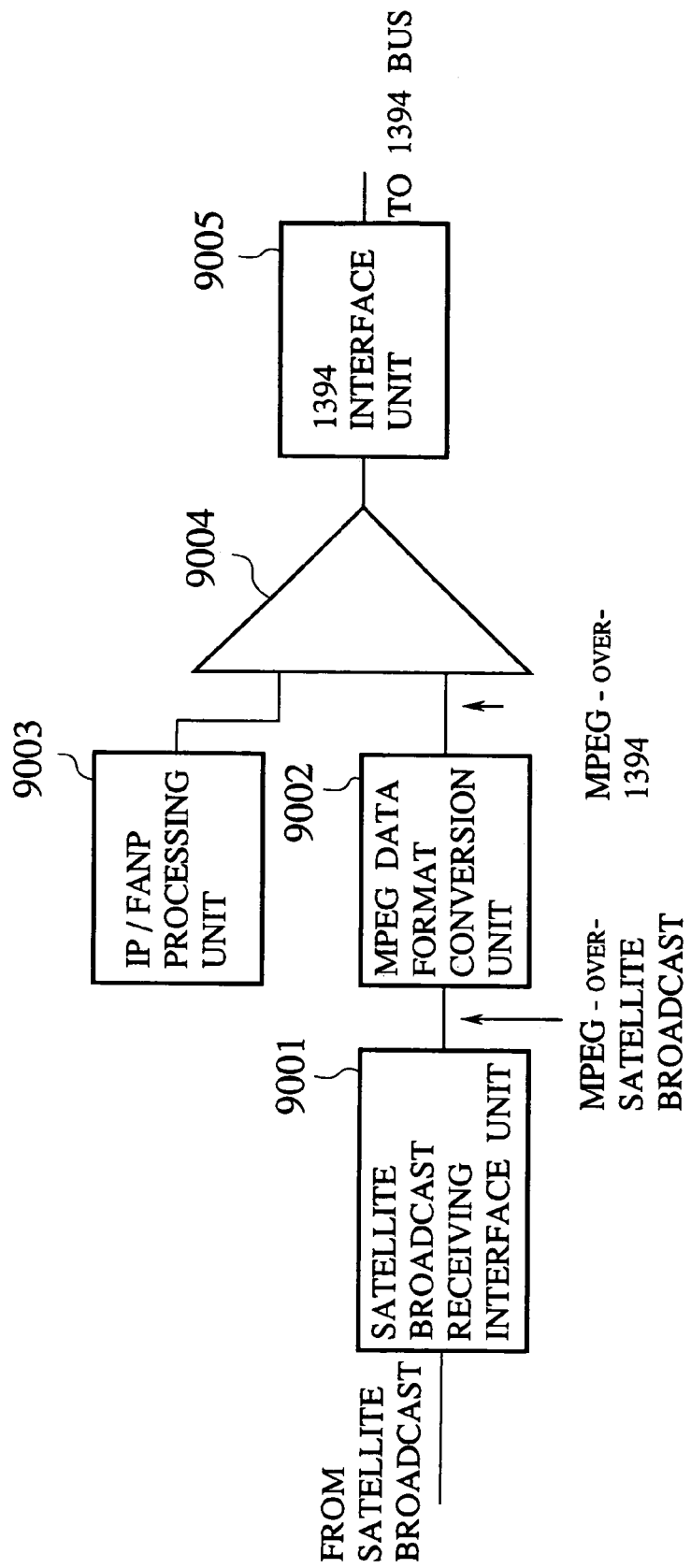
FIG. 43 is a block diagram showing an exemplary internal configuration of a transmitting terminal in the home network of FIG. 42.

FIG. 43 shows an exemplary internal configuration of the transmitting terminal 4901 for realizing this implementation. In FIG. 43, the transmitting terminal 4901 comprises a satellite broadcast receiving interface unit 9001, an MPEG data format conversion unit 9002, an IP/FANP processing unit 9003, a MUX/DEMUX 9004, and a 1394 interface unit 9005.

The satellite broadcast receiving interface unit 9001 is an interface for receiving data from the satellite broadcast, which transmits the data after the data formatting to the MPEG data format conversion unit 9002.

The MPEG data format conversion unit 9002 converts the transmitted MPEG data from the MPEG data format suitable for the satellite broadcast to the MPEG data format on the IEEE 1394, i.e., the MPEG-over-1394, and transmits it to the MUX/DEMUX 9004. Here, the de-scrambling processing, etc. may also be carried out in addition.

The IP/FANP processing unit 9003 and the 1394 interface processing unit 9005 have the similar functions as those described above so that their description will be omitted here.

At the MPEG data format conversion unit 9002, the appropriate format conversion is applied to the transmitted MPEG data so that the MPEG data from the satellite broadcast can be transmitted to the video terminal through the 1394.

Figure 44:
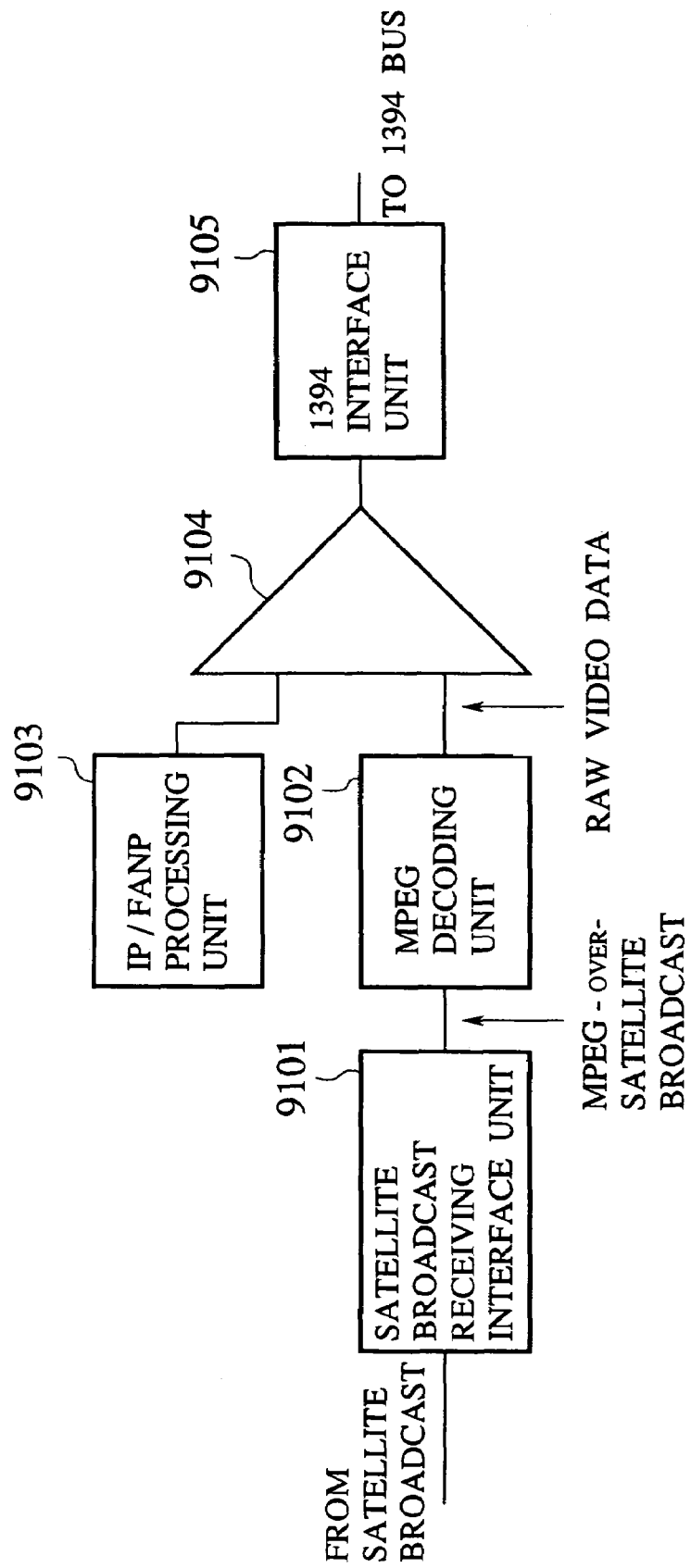
FIG. 44 is a block diagram showing another exemplary internal configuration of a transmitting terminal in the home network of FIG. 42.

FIG. 44 shows an exemplary internal configuration of the transmitting terminal 4901 in a case of decoding the MPEG data received from the satellite broadcast at the transmitting terminal 4901, and forwarding the raw video data to the video terminal through the 1394 bus.

FIG. 44 differs from FIG. 43 in that the MPEG decoding is carried out at the MPEG decoding unit 9102 so that the raw video data is transmitted to the 1394 bus.

When the MPEG decoding unit 9102 or the MPEG data format conversion unit 9002 is equipped with a function for processing several channels simultaneously, it becomes possible to realize the distribution of the video information in several channels simultaneously to the home network, so that it is very useful in a case where it is desirable to watch a plurality of video programs as in a case where a plurality of family members watch the television simultaneously.

Note here that the MPEG decoding unit 9102 and the MPEG data format conversion unit 9002 may or may not carry out the encapsulation of the video data within the IP packet.

It is to be noted that the "transmitting terminal" in the above description can be provided in a form of what is generally known as "set-top box".

It is also to be noted that this second embodiment has been described for an exemplary case of using the IEEE 1394 bus, but this second embodiment is also applicable to the other datalink layer technology such as the ATM, for example. In such a case, it suffices to use the VPI/VCI value instead of the channel number.

Third Embodiment

Next, with references to FIG. 45 to FIG. 50, the third embodiment of the present invention will be described in detail.

This third embodiment is directed to a communication network system formed by two or more 1394 buses, that is a communication network system formed by nodes called half gateways which are connected to the respective 1394 buses, and a network for connecting these half gateways. Here, an exemplary case of using the Ethernet as a network for connecting the half gateways, and providing an Ethernet switch having a plurality of FANP functions between the half gateways will be described.

Figure 45:
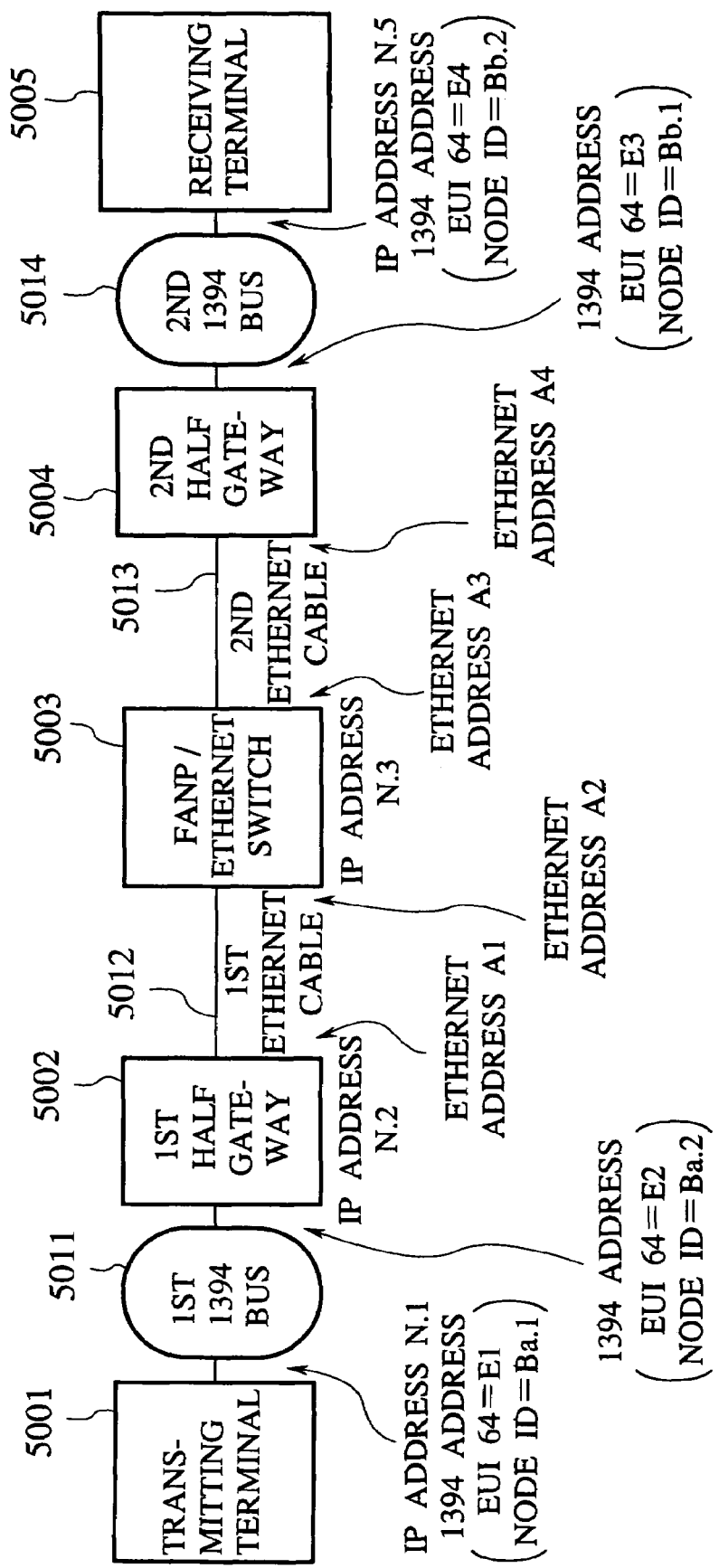
FIG. 45 is a block diagram showing an exemplary overall configuration of a communication network according to the third embodiment of the present invention.

FIG. 45 shows an exemplary overall configuration of a communication network system (a home network system for connecting various electric devices inside the home, for example) according to this third embodiment. As shown in FIG. 45, this communication network system comprises a transmitting terminal 5001, a first half gateway 5002, a FANP Ethernet switch 5003, a second half gateway 5004, a receiving terminal 5005, a first 1394 bus 5011, a first Ethernet cable 5012, a second Ethernet cable 5013, and a second 1394 bus 5014.

Here, it is assumed that the entire system constitutes a home network within the same home, similarly as in the first embodiment. Consequently, among the devices contained in this system, those which are the IP nodes are assumed to be belonging to the same IP subnet. Here, this IP subnet is assumed to have an IP subnet address N, and the IP addresses of the nodes are assumed to be N. 1 for the transmitting terminal 5001, N. 2 for the first half gateway 5002, N. 3 for the FANP Ethernet switch 5003, N. 4 for the second half gateway 5004, and N. 5 for the receiving terminal 5005.

Also, the 1394 addresses and the Ethernet addresses of these nodes are as shown in FIG. 45.

Each of the transmitting terminal 5001, the first half gateway 5002, the FANP Ethernet switch 5003, the second half gateway 5004 and the receiving terminal 5005 of this embodiment is the FANP node as described in the first embodiment which has the extended FANP function of the present invention.

Here, the transmitting terminal 5001, the first half gateway 5002, the second half gateway 5004 and the receiving terminal 5005 have the same functions as the corresponding elements in the second embodiment described above so that their detailed description will be omitted here.

In this embodiment, the first half gateway 5002 and the second half gateway 5004 are connected by the Ethernet cables 5012 and 5013. Namely, in this embodiment, the data exchanges between two half gateways are to be carried out in terms of the Ethernet frames.

The FANP Ethernet switch 5003 is an Ethernet switch having the FANP functions, and as will be described below, it has a function for taking the entered FANP packet into the internal IP/FANP processing unit (which is realized by looking at the protocol type of the Ethernet frame), and a function for rewriting the Ethernet address of a frame before and after the input/output of the frame, as set up in the internal table in advance, and outputting this frame. The latter function is provided for carrying out the similar operation as the rewriting of the VPI/VCI at the ATM switch node before and after the input/output of an ATM cell.

In this embodiment, the FANP Ethernet switch 5003 (or the internal switch) is in a two-port physical configuration, but it is also possible to construct a multi-port FANP Ethernet switch by the similar construction method and mechanism.

Figure 46:
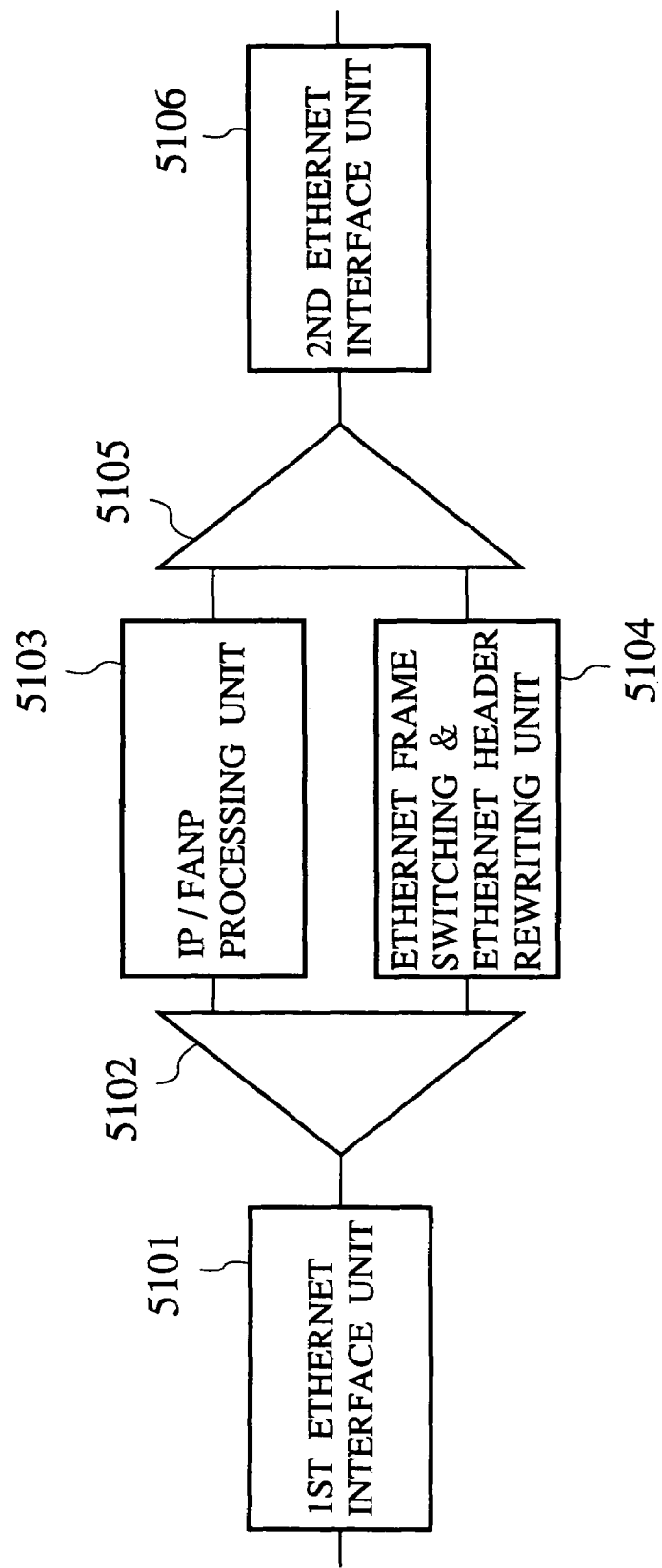
FIG. 46 is a block diagram showing an exemplary internal configuration of a FANP node in the communication network of FIG. 45.

FIG. 46 shows an exemplary internal configuration of the FANP Ethernet switch 5003. As shown in FIG. 46, the FANP Ethernet switch 5003 comprises a first Ethernet interface unit 5101, a first MUX/DEMUX 5102, an IP/FANP processing unit 5103, an Ethernet frame switching and Ethernet header rewriting unit 5104, a second MUX/DEMUX 5105, and a second Ethernet interface unit 5106.

The Ethernet interface units 5101 and 5106 are interfaces with respect to the physically connected Ethernets, and carries out the encapsulation and decapsulation of data to be exchanged with the MUX/DEMUXs 5102 and 5105 and the Ethernet frames.

The IP/FANP processing unit 5103 has functions for carrying out the routing based on the IP address, the routing table management, the FANP processing, the ARP processing, etc., for the received IP packets, FANP packets, ARP packets, etc., as well as a function for making appropriate setting to the Ethernet frame switching and Ethernet header rewriting unit 5104.

The Ethernet frame switching and Ethernet header rewriting unit 5104 has a function for switching an Ethernet frame received from either interface to an appropriate output port by referring to its destination Ethernet address, and a function for rewriting at least a part of the Ethernet address at a time of the above switching according to the setting from the IP/FANP processing unit 5103. To this end, the Ethernet frame switching and Ethernet header rewriting unit 5104 may have a header conversion table provided therein similarly as in the ATM switch. The Ethernet frame switching and Ethernet header rewriting unit 5104 also has a function for learning the Ethernet address, which functions to refer to a source address of an entered Ethernet frame and store it along with an input port for a certain period of time.

Note that the Ethernet frame that passes through this Ethernet frame switching and Ethernet header rewriting unit 5104 can pass without being applied with the processing by the IP/FANP processing unit 5103.

Next, for an exemplary case of transmitting video from the transmitting terminal 5001 to the receiving terminal 5005, the operation sequence in time order will be described with references to FIG. 47 and FIG. 48.

Figure 47:
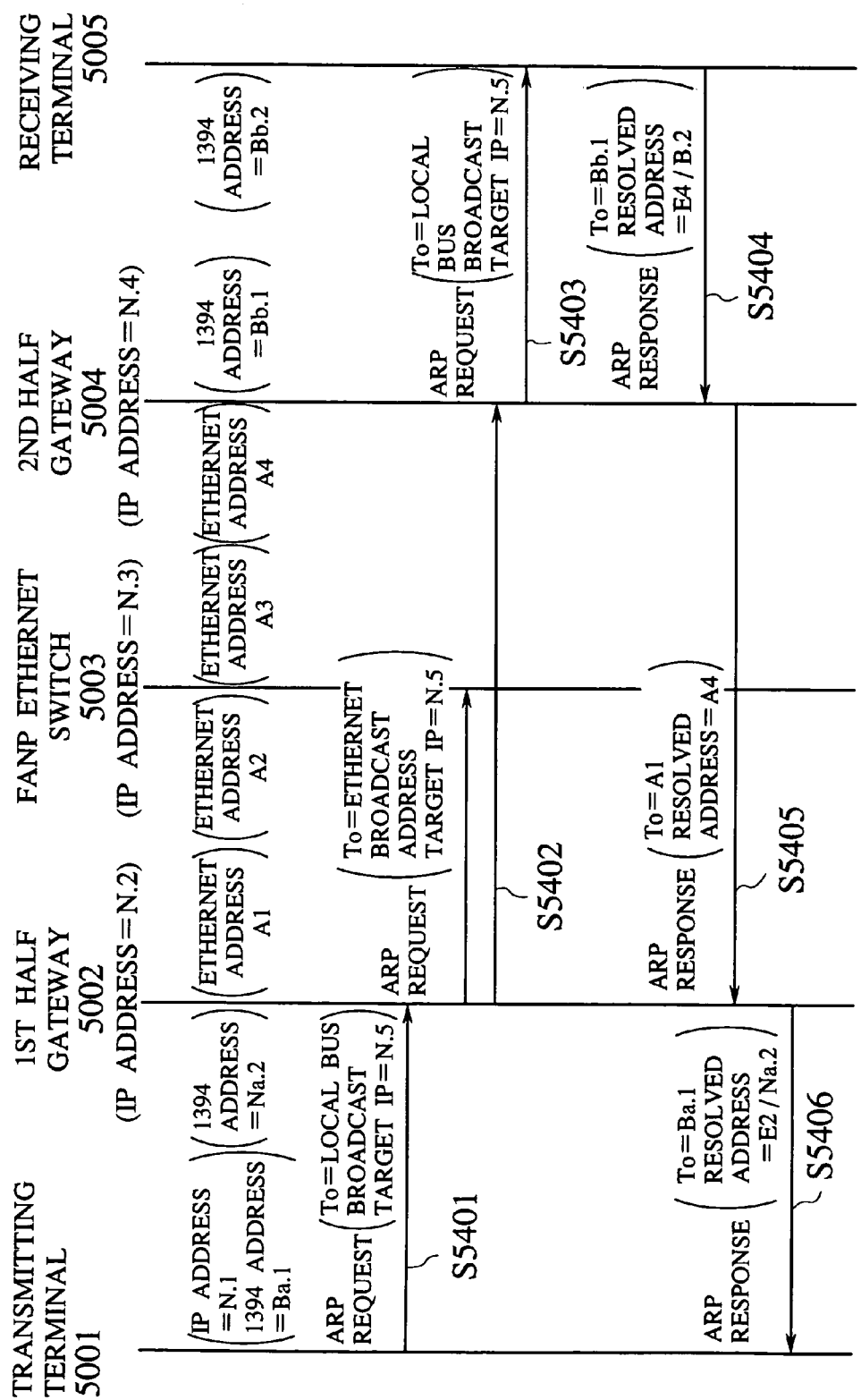
FIG. 47 is a sequence chart for an ARP sequence in the communication network of FIG. 45.
Figure 48:
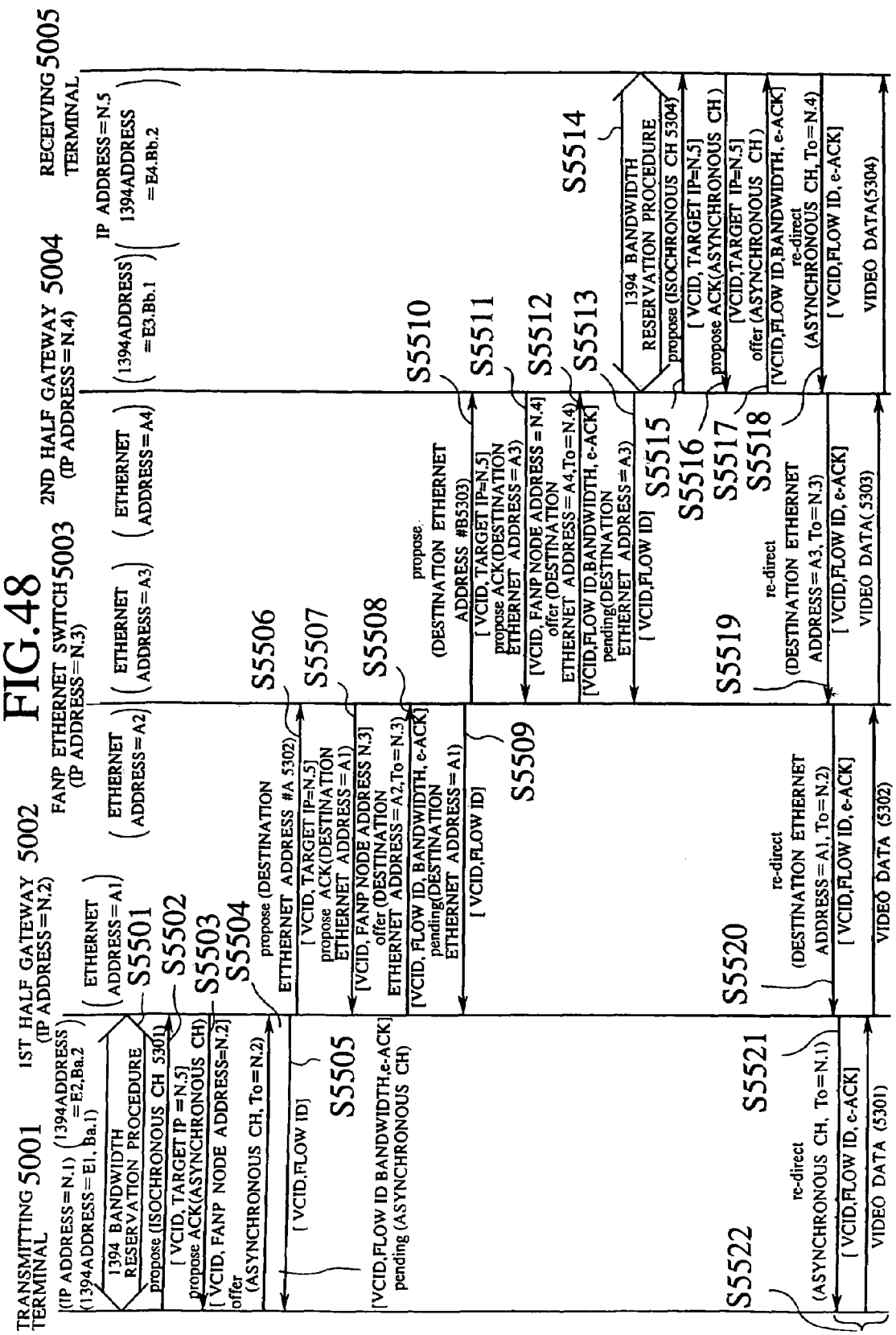
FIG. 48 is a sequence chart for an operation sequence up to a video transmission in the communication network of FIG. 45.

FIG. 47 shows a sequence for the ARP (Address Resolution Protocol).

First, the transmitting terminal 5001 transmits the ARP request packet to the first 1394 bus 5011 in order to carry out the address resolution for ascertaining the datalink layer address of the receiving terminal 5005 from its IP address (step S5401). As described in the second embodiment, this ARP request is broadcasted on the local bus (that is, the first 1394 bus 5011).

The first half gateway 5002 which is the FANP node that received this ARP request operates similarly as in the second embodiment. As a result, this ARP request is forwarded to the Ethernet cable 5012 by setting the Ethernet broadcast address as the destination address (step S5402).

The FANP Ethernet switch 5003 also receives this ARP request, but as it does not have the corresponding IP address, the ARP response will not be sent from there.

Also, this ARP request is forwarded to the second Ethernet cable 5013 through the Ethernet frame switching and Ethernet header rewriting unit 5104. Note that, in this case (a case where the destination address is the broadcast address), the rewriting of the Ethernet address is not carried out so that the ARP request is forwarded as it is.

The second half gateway 5004 and the receiving terminal 5005 that received this ARP request also operate similarly as in the second embodiment (step S5403). Namely, the receiving terminal 5005 that received this ARP request enters the own 1394 address (EUI64 and "bus ID+physical ID") into this packet and returns this packet to the second 1394 bus 5014 as the ARP response (step S5404), and this ARP response reaches to the FANP Ethernet switch 5003. At this point, the destination address of the Ethernet frame is the Ethernet address "A1" of the first half gateway 5002.

As described above, the FANP Ethernet switch 5003 has the learning function, and holds the Ethernet address of the first half gateway 5002 and its physical port direction (that is, the first Ethernet cable 5012 side) as a table at a time of the ARP request, so that this ARP response is the Ethernet header, a value different from the Ethernet address unique to the second half gateway 5004 is used as the destination address of the Ethernet frame to be transmitted. This value can be any value as long as it is different from values of the Ethernet addresses of the first half gateway 5002 and the second half gateway 5004.

Figure 49:
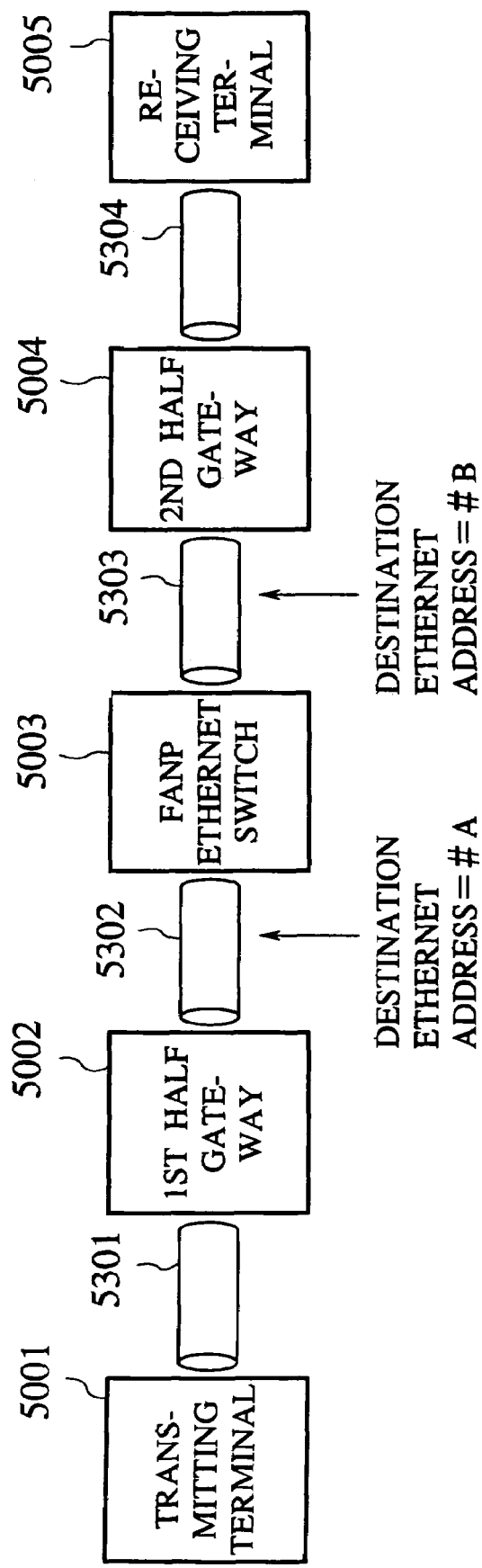
FIG. 49 is a diagram showing one example of a video transmission route from a transmitting terminal to a receiving terminal in the communication network of FIG. 45.

For example, when the Ethernet address value-selected by the first half gateway 5002 here is "#A", only the video information directed to the receiving terminal 5005 will be mounted on every subsequent Ethernet frame which has "#A" as the destination Ethernet address. This is equivalent to having the virtual connection with "#A" as VCI established between the first half gateway 5002 and the next hop FANP node (more specifically, the FANP Ethernet switch.5003). This is shown in FIG. 49 as the connection 5302.

The first half gateway 5002 transmits the propose message of the FANP through this connection 5302 (step S5506). At this point, a number indicating the FANP is to be entered into the protocol type of the Ethernet frame. Also, this propose message is transmitted by entering the own ESI and sequence number as the VCID and the IP address of the receiving terminal 5005 as the target IP address.

The FANP Ethernet switch 5003 that received this propose message recognizes that it is the FANP packet (propose message) by referring to the protocol type field of the Ethernet frame, and transfers it to the internal IP/FANP processing unit 5103. Then, the FANP Ethernet switch 5003 confirms that the destination Ethernet address of this Ethernet frame exists on the second half gateway 5004 side, and registers this in relation to the final destination IP address (the receiving terminal 5005) in the internal routing table. Then, the FANP Ethernet switch 5003 returns the propose ACK message to the first Ethernet cable 5012, by entering the own IP address as the target IP address and the Ethernet address of the first half gateway switched by the Ethernet frame switching and Ethernet header rewriting unit 5104 and reaches to the first half gateway 5002 (step S5405).

Then, as the first half gateway 5002 returns the ARP response (deputy response) (step S5406), this ARP response eventually reaches to the transmitting terminal 5001.

In this manner, the transmitting terminal 5001 can ascertain that it suffices to transmit the IP packets destined to the receiving terminal 5005 with respect to (the 1394 address of) the first half gateway 5002.

Next, similarly as in the second embodiment, the transmitting terminal 5001 intends that the video to be transmitted from now on will be forwarded by the datalink processing alone without using the IP processing at the intermediate FANP nodes, and after the confirmation of the initial setting and the coding scheme using the IP packets and the confirmation of the video reception capability with respect to the receiving terminal 5005, the transmitting terminal 5001 proceeds to the video transmission preparation. FIG. 48 shows the sequence for this operation which will now be described.

Among the operations of the transmitting terminal 5001 and the first half gateway 5002, the operations for the exchanges of the messages between them (up to the transmission of the pending message of the FANP) are the same as in the second embodiment (step S5501 to step S5505).

The first half gateway 5002 that received the offer message from the transmitting terminal 5001 recognizes that it is the FANP packet, confirms the final destination IP address (the receiving terminal 5005) from the flow ID, and confirms that this address exists on the Ethernet cable 5012 side. Here, in order to make it possible for the next hop FANP node to carry out the direct datalink layer switching of the data to be transmitted by only confirming 5002 as the destination address (step S5507).

The first half gateway 5002 that received this propose ACK message transmits the offer message onto the first Ethernet cable 5012, by entering the IP address "N. 3" of the FANP Ethernet switch 5003 as the destination IP address, entering the VCID described above, entering the IP address "N. 5" of the receiving terminal 5005 which is the final destination into the flow ID, and containing the necessary bandwidth value and the end-to-end ACK request (step S5508). At this point, the destination Ethernet address is the Ethernet address "A2" of the FANP Ethernet switch 5003. In this case, a number indicating the FANP may also be entered into the protocol type of the Ethernet frame.

The FANP Ethernet switch 5003 that received this offer message recognizes that it is the FANP packet, and transfers it to the IP/FANP processing unit 5103. Here, the FANP Ethernet switch 5003 also confirms the final destination IP address (the receiving terminal 5005) from the flow ID, and confirms that this address exists on the second Ethernet cable 5013 side. Here, also, in order to make it possible for the next hop FANP node (more specifically, the second half gateway 5004) to carry out the direct datalink layer switching of the data to be transmitted by only confirming the Ethernet header, a value different from the Ethernet address unique to the second half gateway 5004 is used as the destination address of the Ethernet frame to be transmitted.

For example, when the Ethernet address value selected by the FANP Ethernet switch 5003 is "#B", it is equivalent to having the virtual connection with "#B" as VCI established between the FANP Ethernet switch 5003 and the second half gateway 5004 which is the next hop FANP node. This is shown in FIG. 49 as the connection 5303.

The FANP Ethernet switch 5003 transmits the propose message of the FANP through this connection 5303 (step S5510). Thereafter, the procedure is the same as in the second embodiment.

The FANP Ethernet switch 5003 that received the re-direct message from the downstream side (step S5519) Judges that the preparation for the dedicated virtual channel use on the downstream side (the second half gateway 5004 in this case) is ready, and makes the setting by which the direct datalink layer forwarding (Ethernet switching) can be carried out for the Ethernet frame that arrives with the Ethernet address #A from the first Ethernet cable 5012 side without using the processing by the IP/FANP processing unit 5103 at the Ethernet frame switching and Ethernet header rewriting unit 5104 inside the FANP Ethernet switch 5003. At this point, the setting is also made in the internal Ethernet header conversion table so that the destination Ethernet address will be converted from "#A" to "#B" and this Ethernet frame will be switched to an appropriate output port (the second Ethernet cable 5013 in this embodiment).

By this setting, a frame that subsequently arrives with the specific Ethernet address "#A" from the first Ethernet cable 5012 can be transmitted to the second Ethernet cable 5013 by the direct Ethernet switching upon converting the destination Ethernet address to "#B" and after the Ethernet header conversion is carried out, so that the efficiency and the speed of the data forwarding processing can be improved considerably.

Also, the above described processing does not use the processing at the IP/FANP processing unit 5103 so that the reduction of the load on the IP/FANP processing unit 5103 and the load distribution can be realized simultaneously.

In addition, it becomes possible to introduce a concept similar to the virtual connection into the Ethernets 5012 and 5013, so as to enable the above described data forwarding.

In this manner, the FANP Ethernet switch 5003 transmits the re-direct message to the upstream FANP node (the first half gateway 5002 in this case) (step S5520). At this point, the end-to-end ACK flag is erected in the re-direct message from the downstream side so that the end-to-end ACK flag is set ON.

In the subsequent operations, the re-direct message with the end-to-end ACK flag erected is sent to the transmitting terminal 5001 similarly as in the second embodiment (step S5521).

The transmitting terminal 5001 can confirm that the isochronous channel 5301 was directly connected at the datalink layer level up to the receiving terminal 5005. Then, the transmitting terminal 5001 starts the video data transmission through the isochronous channel 5301 (step S5522).

The video data can be transmitted through 5302, 5303 and 5304 to the receiving terminal 5005 by the datalink layer processing alone, without using the processing by the IP/FANP processing unit at the intermediate nodes including the half gateways 5002 and 5004 and the FANP Ethernet switch 5003, so that the guaranteed real-time video information transfer becomes easier.

Note that, similarly as in the second embodiment, the video information to be transmitted here may be the video data encapsulated within the IP packet or the video data directly mounted on the 1394 isochronous channel (or the Ethernet frame with the destination Ethernet address given by "#A" or "#B"). Also, the Ethernet frame may be in a form in which the 1394 isochronous channel frame is mounted directly (or after appropriate processing is applied).

Also, the re-direct message can be used for the purpose of maintaining the soft state similarly as in the second embodiment.

As described, in this third embodiment, by using a plurality of half gateways (5002, 5004) and the Ethernet cables (5012, 5013) and the FANP Ethernet switch 5003 that connect them, it also becomes possible to carry out the communication by inter-connecting a plurality of 1394 buses. In addition, it is also possible to connect three or more half gateways to the FANP Ethernet switch 5003, for example.

Figure 50:
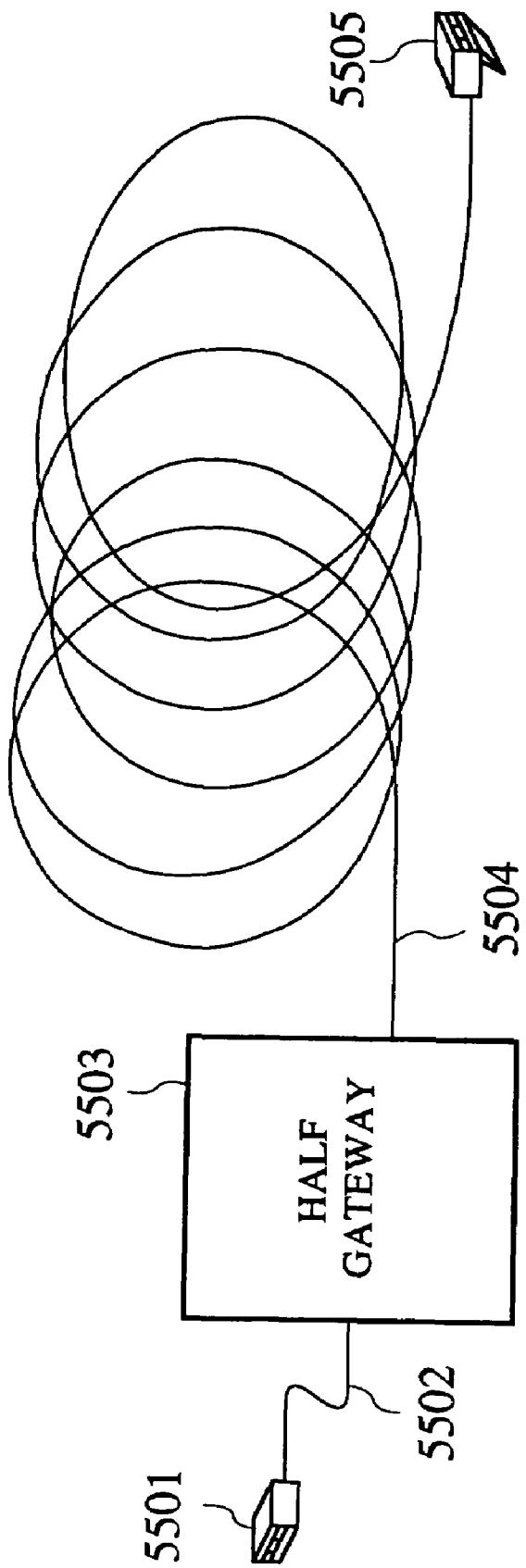
FIG. 50 is a diagram showing still another example of a physical shape of a 1394 inter-connection cable, in a case of using a relatively short dedicated 1394 cable and a long Ethernet cable.

FIG. 50 shows another exemplary style of using the half gateways and the Ethernet cables. A 1394 inter-connection cable shown in FIG. 50 has a physical shape in which a 1394 connector 5501 is connected to a half gateway 5503 by being connected through a relatively short dedicated 1394 cable 5502. Also, a long Ethernet cable 5504 is connected from the half gateway 5503 in advance. This cable portion may be connected by an electric cable such as UTP5 or coaxial cable, or by an optical cable such as a plastic optical fiber. It should be noted however that the transmission scheme of the physical layer is supposed to obey the Ethernet standard. A connector 5505 at a free end of the long Ethernet cable 5504 is a connector in compliance with that physical layer transmission scheme.

This 1394 inter-connection cable is used by connecting the 1394 connector 5501 to a desired 1394 bus to be connected, and connecting the FANP Ethernet switch 5003 at the connector 5505 side. The FANP Ethernet switch 5003 may have a plurality of connector insertion ports.

As described above, the 1394 connector 5501 is connected to the half gateway 5503 through the relatively short dedicated 1394 cable 5502, so that the power supply to the half gateway 5503 can be made through the 1394 connector 5501 and the 1394 cable 5502. Consequently, the system of FIG. 50 requires no special power supply (although the power supply to the FANP Ethernet switch 5003 is basically necessary). From a viewpoint of a user who wishes to inter-connect two 1394 buses, this implies that the connection is basically completed by simply connecting one end (5501) of the cable to a desired 1394 bus to be connected and the other end (5505) of the cable to the FANP Ethernet switch 5003, so that the convenience regarding the connecting operation can be improved remarkably.

Also, a long cable (such as that of several hundred meters, for example) can be used as a cable for connecting the half gateway 5503 and the FANP Ethernet switch 5003, so that it is very useful in a case of connecting the 1394 buses which are far apart from each other.

It should be apparent that the above described 1394 inter-connection cable is not only applicable to a case of forming the connection between the 1394 half gateways as described above, but also to a case of realizing the usual 1394 bridge in the half bridge configuration. In that case, the function of the 1394 bridge can be realized by using the 1394 address instead of the IP address, similarly as in the second embodiment.

It is also to be noted that, in the second and third embodiments, the transmission scheme between the half gateways using the Ethernet has been described, but it is also possible to realize a case of using the other network such as token ring, FDDI, etc., without changing the above described mechanism.

Fourth Embodiment

The second and third embodiments are directed to a case of the transmission scheme using the Ethernet, in which the datalink layer forwarding to the next hop FANP node (that is, the data forwarding/data switching to the next hop node by referring only to the datalink layer header) is carried out by using the destination Ethernet address as a virtual connection ID on this Ethernet.

It is also possible to use the similar scheme in a case of using the ATM as the data transmission scheme between the half gateways. Here, however, unlike the case of using the Ethernet as the transmission scheme in which the destination Ethernet address is used as a virtual connection ID, the VPI/VCI of the ATM is to be used as a virtual connection ID.

Figure 51:
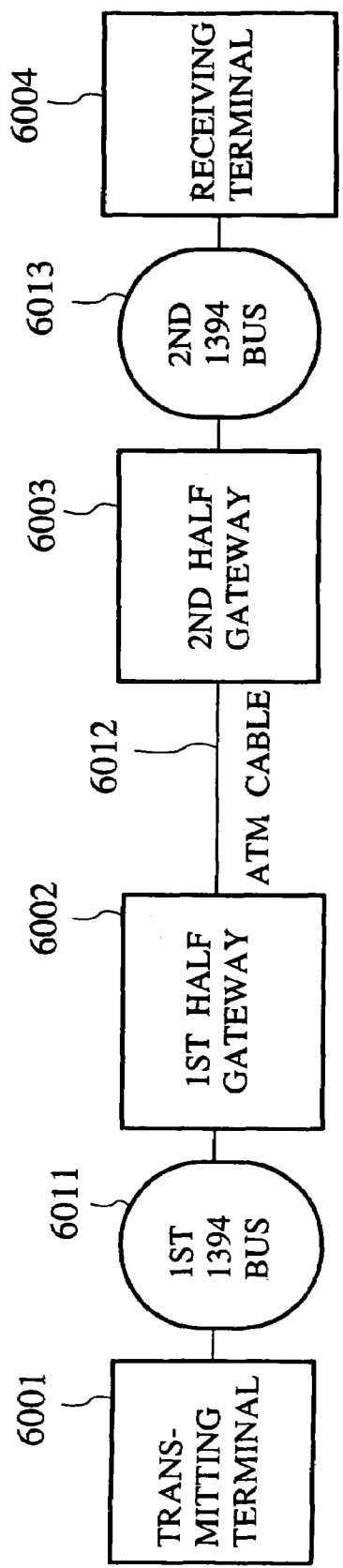
FIG. 51 is a block diagram showing an exemplary overall configuration of a communication network according to the fourth embodiment of the present invention, in a case of connecting two half gateways through an ATM communication path.

FIG. 51 shows a case of connecting the half gateways by the ATM transmission scheme in the home network system similar to that of the second embodiment shown in FIG. 33. Also, FIG. 52 shows an exemplary internal configuration of each of the half gateways 6002 and 6003 in FIG. 51.

Figure 52:
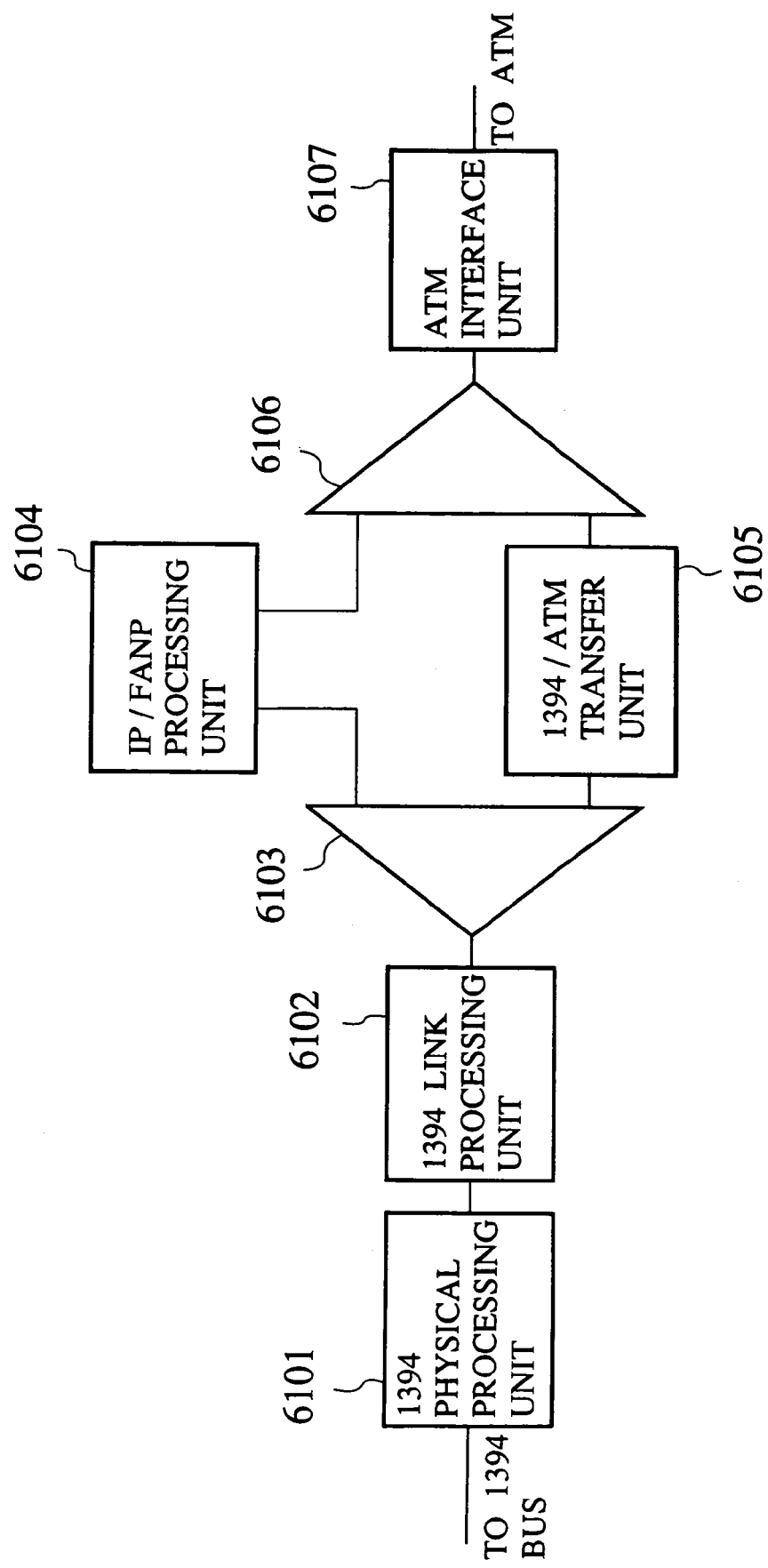
FIG. 52 is a block diagram showing an exemplary internal configuration of a half gateway in the communication network of FIG. 51.

FIG. 51 and FIG. 52 differ from those of the second embodiment in that the connection between the half gateways 6002 and 6003 is realized by the ATM transmission scheme so that VPI/VCI value is used as the virtual connection ID, that an originally defined VPI/VCI value recognized by both of the half gateways is reserved as the default VC (the meaning of which is the same as in the first embodiment), and that there is no limit on a length of the ATM cable.

Figure 53:
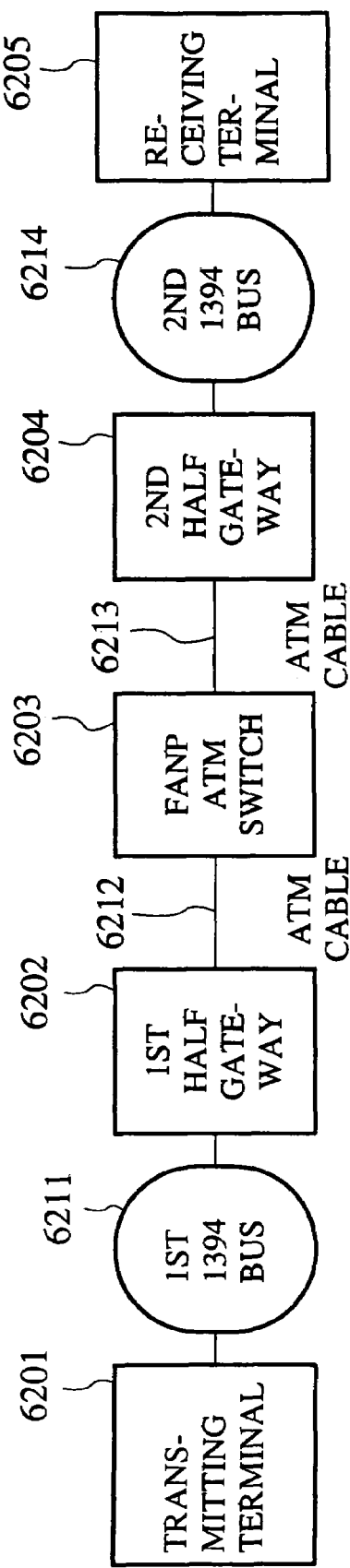
FIG. 53 is a block diagram showing another exemplary overall configuration of a communication network according to the fourth embodiment of the present invention, in a case of connecting two half gateways through a FANP-ATM switch.

FIG. 53 shows a case of connecting the half gateways by the ATM transmission scheme in the home network system similar to that of the third embodiment shown in FIG. 45. FIG. 53 differs from FIG. 45 in that a FANP ATM switch 6203 is provided instead of the FANP Ethernet switch 5003. Also, FIG. 54 shows an exemplary internal configuration of the FANP ATM switch 6203 in FIG. 53.

Figure 54:
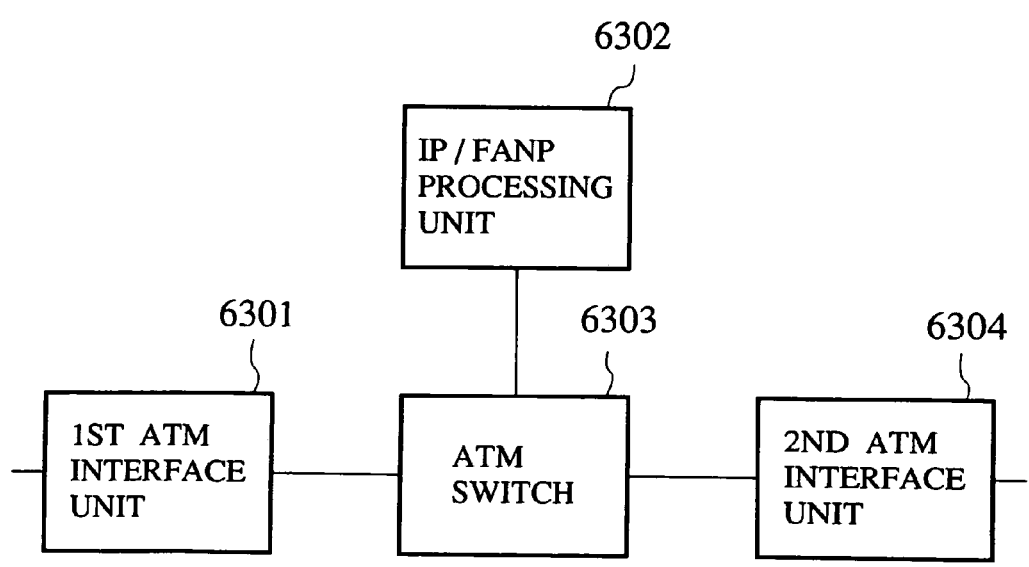
FIG. 54 is a block diagram showing an exemplary internal configuration of a FANP-ATM switch in the communication network of FIG. 53.

FIG. 53 and FIG. 54 differ from those of the third embodiment in that the connection between the half gateways 6202 and 6203 is realized by the ATM transmission scheme so that VPI/VCI value is used as the virtual connection ID, that an originally defined VPI/VCI value recognized by both of the half gateways is reserved as the default VC (the meaning of which is the same as in the first embodiment), and that there is no limit on a length of the ATM cable. In addition, an architecture of the FANP ATM switch 6203 is new.

Here, the default VC is terminated at the IP/FANP processing unit 6302 (see FIG. 54), and cells will pass through an ATM switch 6303 before they reaches to the IP/FANP processing unit 6302.

Consequently, in order to establish a direct datalink layer connection, that is an ATM connection, between ATM interface units 6301 and 6304, the IP/FANP processing unit 6302 is required to have a function for making an appropriate setting for values of the header conversion table inside the ATM switch 6303, and a function for directly connecting a specific ATM-VC of an ATM cable 6212 and a specific ATM-VC of an ATM cable 6213 at the ATM layer.

Note also that the realization of the connection between the half gateways according to the present invention encompasses not only the transmission schemes such as the Ethernet and ATM, but also the general connection-less and connection-oriented transmission schemes as well.

Fifth Embodiment

Next, with references to FIG. 55 to FIG. 57, the fifth embodiment of the present invention will be described in detail.

This fifth embodiment is directed to a case of applying the scheme of the present invention as described above to the route setting and the bandwidth reservation using the MAC address.

Figure 55:
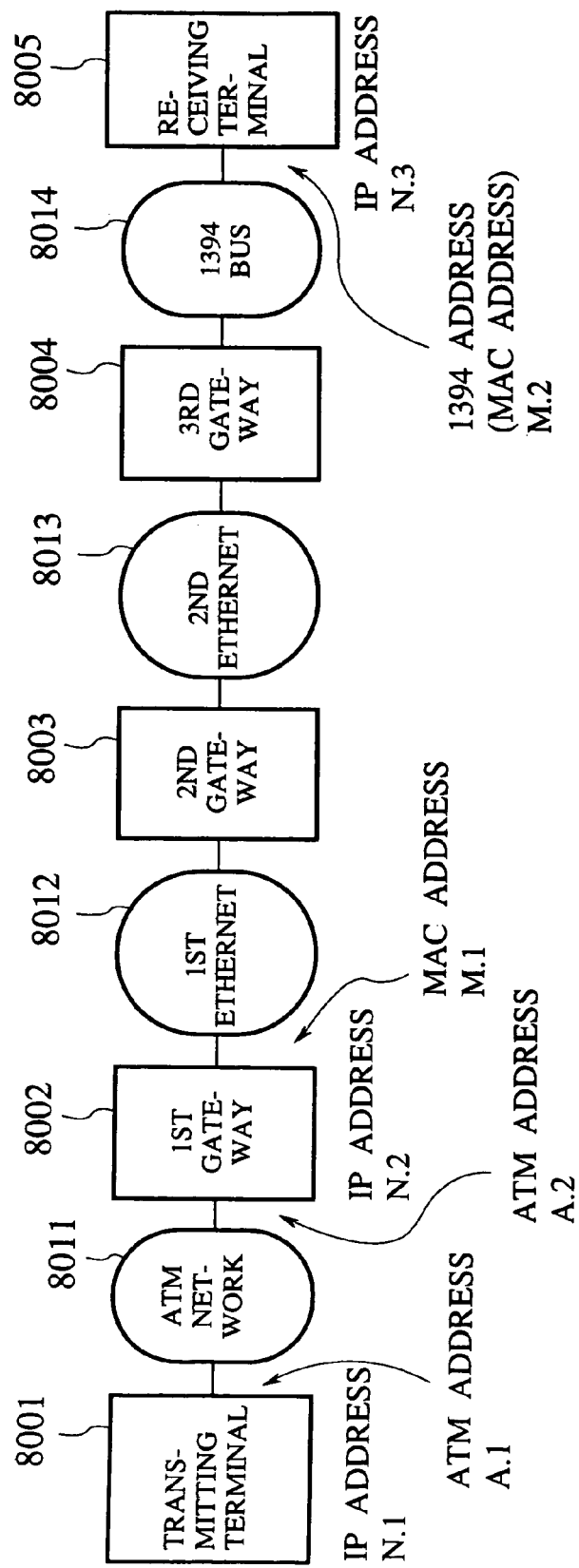
FIG. 55 is a block diagram showing an exemplary overall configuration of a communication network according to the fifth embodiment of the present invention.

FIG. 55 shows an exemplary overall configuration of a communication network system according to this fifth embodiment. As shown in FIG. 55, this communication network system comprises a transmitting terminal 8001, a first gateway 8002, a second gateway 8003, a third gateway 8004, a receiving terminal 8005, an ATM network 8011, a first Ethernet 8012, a second Ethernet 8013, and a 1394 bus 8014.

Here, it is assumed that the entire system constitutes a home network within the same home, similarly as in the first embodiment. Consequently, among the devices contained in this system, those which are the IP nodes are assumed to be belonging to the same IP subnet. Here, this IP subnet is assumed to have an IP subnet address N. However, unlike the second embodiment, two gateways (the second gateway 8003 and the third gateway 8004) for connecting the first Ethernet, the second Ethernet and the 1394 bus are bridges, so that they may not necessarily have IP addresses (and they may not necessarily have IP processing units). The IP addresses of the nodes are assumed to be N. 1 for the transmitting terminal 8001, N. 2 for the first gateway 8002, and N. 3 for the receiving terminal 8005. Also, the 1394 addresses and the Ethernet addresses of these nodes are as shown in FIG. 55.

Here, the nodes (the third gateway 8004 and the receiving terminal 8005) connected with the 1394 bus 8014 are also allocated with the MAC addresses. This can happen in several cases including the following.

(1) A case in which the 1394 bus 8014 is emulating the IEEE 802 type network such as the Ethernet.

(2) A case in which the MAC address is expressed by using a part of a region for the 1394 address.

Namely, this embodiment uses the expression scheme in which "a value of EUI64 is expressed by the MAC address", for example. As such, it suffices to have a situation in which a node on the 1394 bus 8014 can be uniquely identified by using the MAC address.

Each of the transmitting terminal 8001, the first gateway 8002, the second gateway 8003, the third gateway 8004 and the receiving terminal 8005 of this embodiment is the FANP node which has the extended FANP function of the present invention, but it differs from the FANP node of the first embodiment in that it is also capable of carrying out the route setting and the bandwidth (communication resource) reservation by using the MAC address rather than the IP address. This feature will now be described in detail.

The transmitting terminal 8001 has the same functions as the transmitting terminal 4001 of the second embodiment except that it is connected to the ATM network, so that its detailed description will be omitted here.

The first gateway 8002 is a FANP node for inter-connecting the ATM network 8011 and the first Ethernet 8012, which has the same functions as the half gateway (4002, 4003) of the second embodiment except that it transmits or receives FANP control messages in terms of the MAC addresses with respect to the direction of the first Ethernet 8012.

The second gateway 8003 inter-connects the Ethernets while the third gateway 8004 inter-connects the Ethernet and the 1394 bus, and they crucially differ from the first gateway 8002 in that they are capable of carrying out the route setting and the bandwidth reservation by the MAC addresses rather than the IP addresses. Namely, the second gateway 8003 and the third gateway 8004 are MAC address compatible FANP relay nodes.

Each of the second gateway 8003 and the third gateway 8004 is a learning bridge having a function for learning the MAC address, which functions to refer to an input address of an entered frame (Ethernet frame, 1394 asynchronous frame), and store it along an input port for a certain period of time.

The receiving terminal 8005 is the IP terminal as well, and has functions for exchanging IP packets with the transmitting terminal 8001, and receiving video delivered from the transmitting terminal 8001. It differs from the receiving terminal 4004 of the second embodiment in that this terminal also has a function for terminating the MAC address compatible FANP.

Figure 56:
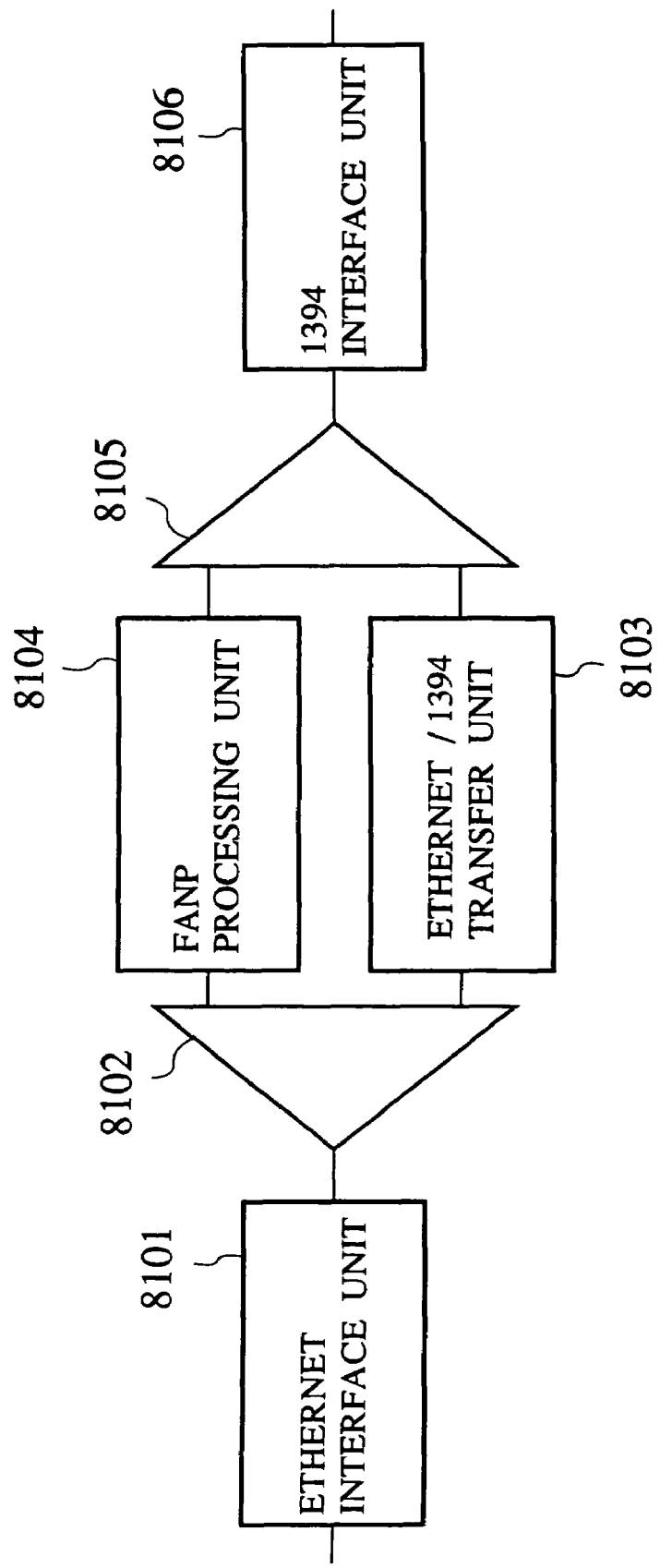
FIG. 56 is a block diagram showing an exemplary internal configuration of a third gateway in the communication network of FIG. 55.
Figure 57:
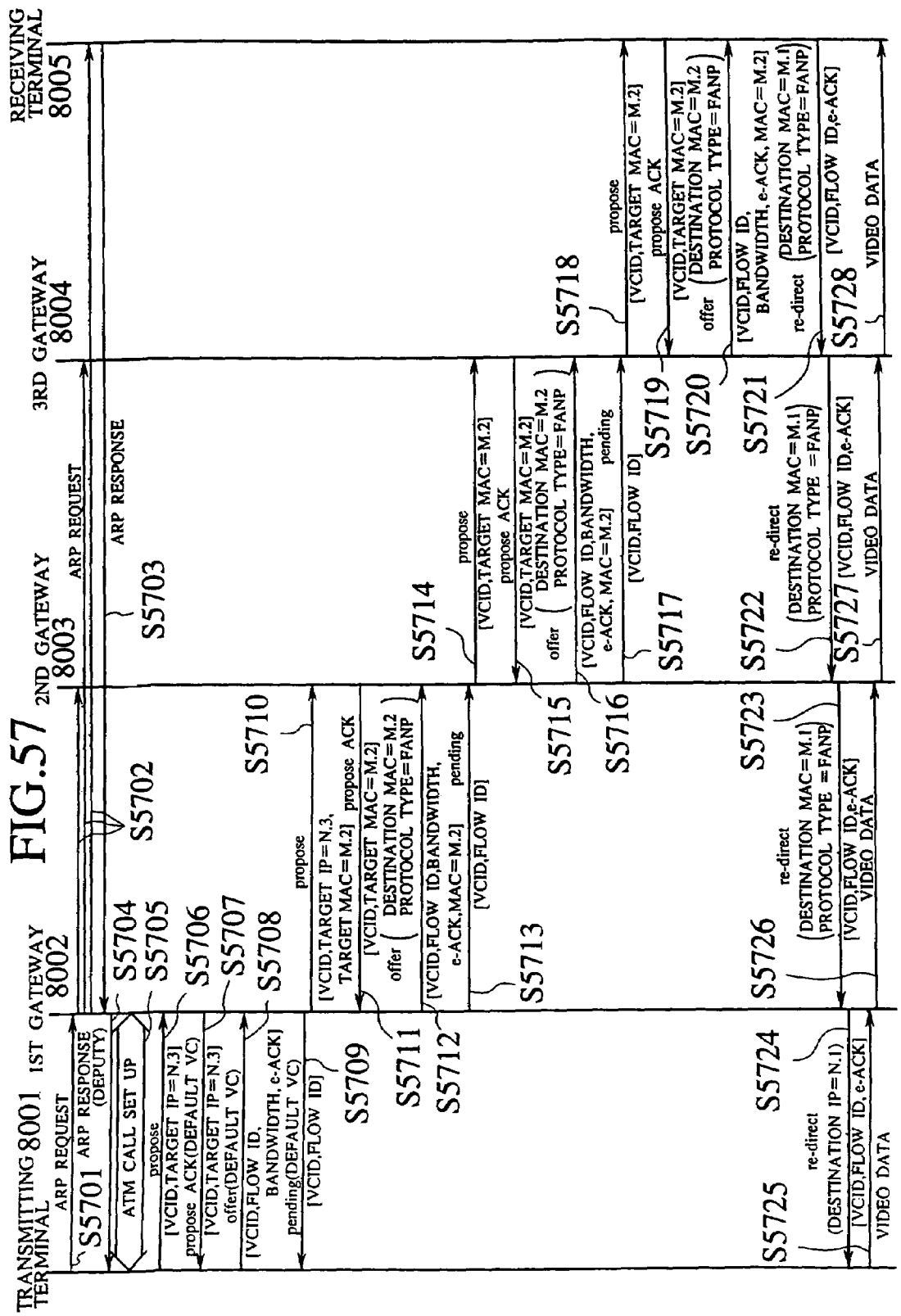
FIG. 57 is a sequence chart for an operation sequence from an ARP up to a video transmission in the communication network of FIG. 55.

FIG. 56 shows an exemplary internal configuration of the third gateway 8004. As shown in FIG. 56, the third gateway 8004 comprises an Ethernet interface unit 8101, a first MUX/DEMUX 8102, an Ethernet/1394 transfer unit 8103, a FANP processing unit 8104, a second MUX/DEMUX 8105, and an 1394 interface unit 8106.

The Ethernet interface unit 8101 is an interface with respect to the physically connected Ethernet, and carries out the encapsulation and decapsulation of data to be exchanged with the first MUX/DEMUX 8102 and the Ethernet frames.

The first MUX/DEMUX 8102 has a function for referring to the protocol type field of the received. Ethernet frame and transferring this frame to the FANP processing unit 8104 if it is described as the FANP frame in the protocol type field, or to the Ethernet/1394 transfer unit 8103 otherwise.

The FANP processing unit 8014 has functions for carrying out the routing based on the MAC address, the FANP processing, etc., for the received FANP packets, by referring to a table of correspondence between the MAC address and the output port provided inside the Ethernet/1394 transfer unit 8103.

The Ethernet/1394 transfer unit 8104 has a function for attaching a specific Ethernet header to data received from the 1394 side, especially data received through the isochronous channel, by using its isochronous channel number or the destination address with the specific register offset as a key, and transmitting it to the Ethernet side, and a function for transmitting data received from the Ethernet side to a specific isochronous channel or the destination address with the specific register offset on the 1394 side by using its header information as a key, as well as a function of the learning bridge for forwarding frames according to the destination addresses (MAC addresses) of the frames while constantly updating the internal table of correspondence between the MAC address and the output port. Namely, the data forwarding by this Ethernet/1394 transfer unit 8104 is carried out by the datalink layer processing alone. Also, the correspondence table formed here becomes identical to that of FIG. 35 or FIG. 36.

The 1394 interface unit 8106 carries out the physical layer processing, the link layer processing, the bus management, and the transaction layer processing of the 1394 with respect to the connected 1394 bus, and the exchanges of data (PDU from a viewpoint of the 1394) with the FANP processing unit 8104 or the Ethernet/1394 transfer unit 8103 by passing the 1394 frames to be transmitted or received through the second MUX/DEMUX 8105.

Note that the second MUX/DEMUX 8105 has a function for transferring the 1394 frame received from the 1394 interface unit 8106 to the FANP processing unit 8104 if an information indicating that it is the FANP frame is described in that 1394 frame.

Next, a case of transmitting video from the transmitting terminal 8001 to the receiving terminal 8005 will be described with reference to FIG. 57.

First, the transmitting terminal 8001 transmits the ARP request packet to the ATM network 8011 in order to carry out the address resolution for ascertaining the datalink layer address of the receiving terminal 8005 from its IP address (step S5701). This ARP request is processed as the ATM-ARP within the ATM network 8011.

This ARP request is forwarded to the first Ethernet 8012 by the first gateway 8002. The first Ethernet 8012, the second Ethernet 8013 and the 1394 bus 8014 are bridge connected so that this ARP request is broadcasted within these bridge connected networks and directly reaches to the receiving terminal 8005 (step S5702).

The receiving terminal 8005 makes the ARP response directly to the first gateway 8002, and the first gateway 8002 makes the deputy ARP response to the transmitting terminal 8001. At this point, the first gateway 8002 stores that the receiving terminal 8005 exists on the first Ethernet 8012 side (step S5703 and step S5704).

Now, the transmitting terminal 8001 already recognizes that it is the FANP node itself and that what is to be transmitted from now on with respect to the receiving terminal 8005 is the video. Consequently, the transmitting terminal 8001 intends that the video to be transmitted from now on will be forwarded by the datalink processing alone without using the IP processing at the intermediate FANP nodes.

To this end, after the confirmation of the initial setting and the coding scheme using the IP packets and the confirmation of the video reception capability with respect to the receiving terminal 8005, the transmitting terminal 8001 proceeds to the video transmission preparation.

First, the transmitting terminal 8001 carries out the ATM signaling so as to acquire an appropriate VC (step S5705). Then, the transmitting terminal 8001 carries out the FANP exchanges with respect to the first gateway 8002 through that VC. Here, the exchanges to be carried out are the same as in the first embodiment (step S5706 to step S5709).

Now, the first gateway 8002 describes both the destination IP address and the destination MAC address in the propose message (step S5710).

The second gateway 8003 which is the receiving FANP node here is the FANP node compatible only with the MAC address, so that the second gateway 8003 refers to the MAC address field. Then, in order to notify that it is the FANP node compatible only with the MAC address, the second gateway 8003 returns the propose ACK message to the first gateway 8002 by describing only the MAC address (step S5711).

The first gateway 8002 that received this propose ACK message can ascertain that the downstream side FANP node wishes the FANP by the MAC address. Consequently, the first gateway 8002 transmits the offer message containing the destination MAC address to the second gateway 8003 which is the neighboring FANP node. This operation may be realized by setting the MAC address of the receiving terminal 8005 as the destination MAC address of the offer message, or by providing a new optional field in the FANP message (step S5712).

The second gateway 8003 takes the FANP message into the FANP processing unit by referring to the protocol type field of the Ethernet frame.

In this manner, the FANP processing is sequentially carried out up to the receiving terminal 8005 and the re-direct message is transmitted backwards sequentially, so as to complete the set up at each gateway. Finally, the transmitting terminal 8001 which received the re-direct message starts the video data transmission. By the above procedure, the reservation of the communication resource in the intermediate routes is carried out similarly as in the first to fourth embodiments, so that it becomes possible to realize the video data delivery while guaranteeing the communication quality.

Here, the At the first Ethernet 8012 and the second Ethernet 8013, the dedicated MAC address for video may be acquired as in the second embodiment, but it is also possible to carry out the bandwidth reservation by directly using the original MAC address (M. 2 in this case). In such a case, at the first Ethernet 8012 and the second Ethernet 8013, all the Ethernet frames with the MAC address destined to the receiving terminal 8005 described in the destination field will be frames for which the communication quality requested by the intermediate bridges (the second gateway 8003 and the third gateway 8004) is guaranteed.

Namely, the present invention uses a mechanism which is capable of reserving the necessary communication quality for each destination MAC address, even in a simple bridge connection type network. Also, this mechanism is a very flexible one in that the routing control and the communication quality reservation as well as the corresponding datalink layer control and connection can be realized end-to-end, in an environment in which the bridges and the routers, the IP address compatible FANP nodes, etc., are mixedly present (as in the first or fifth embodiment).

Note that the five embodiments described above are mainly directed to the control based on the IP address. However, it should be apparent that the present invention is equally applicable to any address system that can bundle all kinds of networks, such as E.164, Colba, JAVA and extended OLE.

Sixth Embodiment

Referring now to FIG. 58 to FIG. 67, the sixth embodiment of the present invention will be described in detail.

Figure 58:
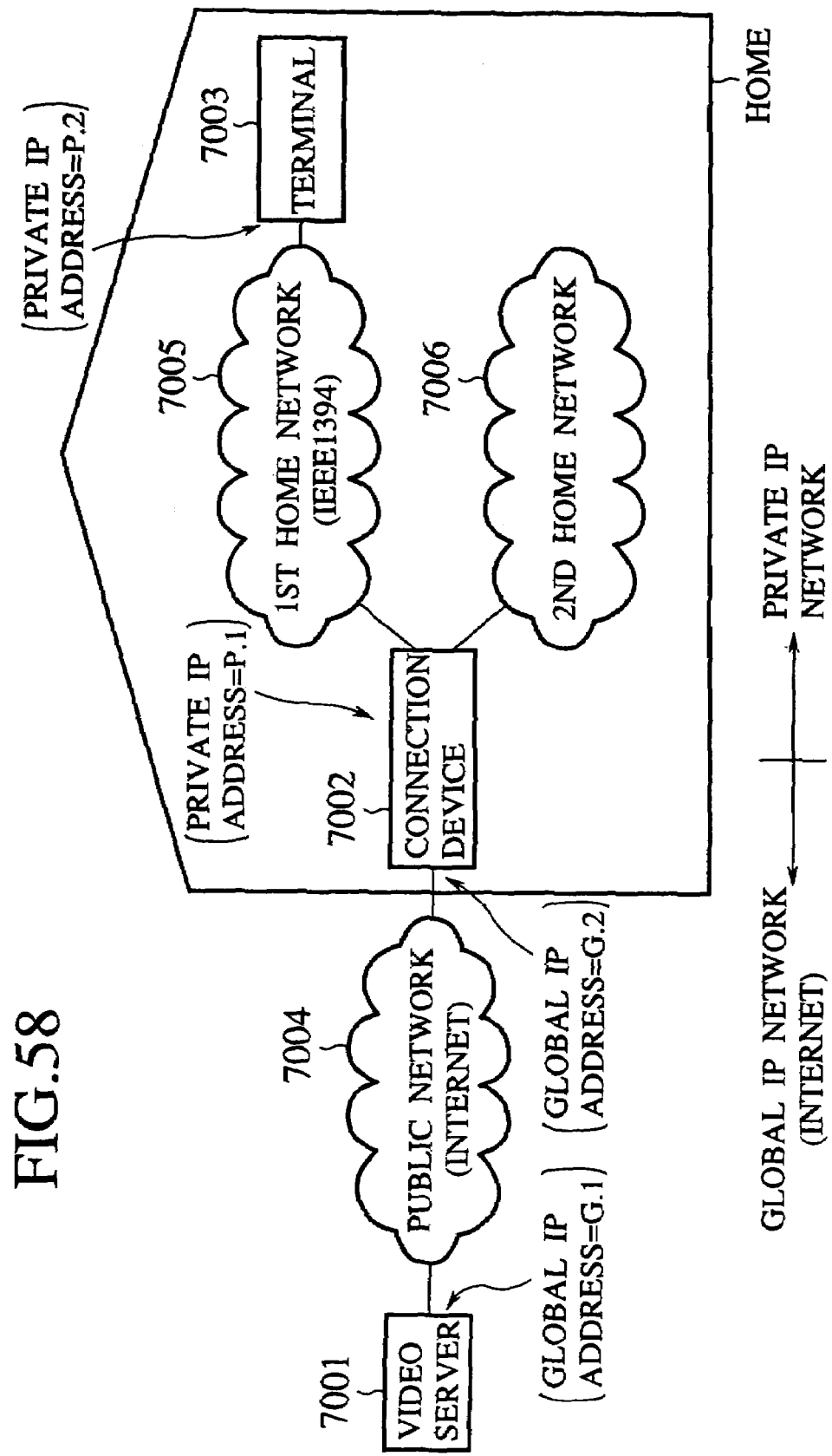
FIG. 58 is a block diagram showing an exemplary overall configuration of a network system according to the sixth embodiment of the present invention.

FIG. 58 shows an exemplary overall configuration of a network system according to the sixth embodiment, for an exemplary case of taking data from a video server that is providing a video service into a home network through a public network such that the video service is received at a terminal connected to the home network.

As shown in FIG. 58, this network system comprises a video server 7001, a public network (Internet) 7004, a connection device 7002, a first home network (IEEE 1394) 7005, a second home network 7006, and a terminal 7003 connected to the first home network 7005. Note that FIG. 58 shows an exemplary case of connecting only one terminal 7003 to the first home network 7005, but it is possible to connect various types of terminals or inter-networing connection device and the like to both of the home networks 7005 and 7006 in practice.

The public network 7004 can be provided in various forms including CATV network, ISDN/B-ISDN network, ATM-PON network, high speed radio access network, ADSL/HDSL network, etc., but it is assumed in this sixth embodiment that the video service provides MPEG video data through Internet (MPEG-over-IP). Consequently, an interface through which this service is provided is assumed to be a digital interface.

In the following description, it is assumed that this digital network adopts ATM scheme as its datalink scheme, but the present invention is not limited to this particular case of using ATM scheme alone. For example, a datalink layer identifier such as VPI/VCI of ATM appearing in the following description corresponds to a B-channel identifier in the case of ISDN, or a frequency in the case of CATV. Thus the present invention encompasses those cases where VPI/VCI of ATM is replaced by any such other datalink layer identifier.

The video server 7001 can be a dedicated video server or a server that is capable of transmitting video signals such as a video handling WWW server for example. Here, "capable of transmitting video signals" does not necessarily implies a capability of real time transmission. For example, a case of delivering video data by best effort rather than real time delivery can be included.

The public network 7004 and the home networks 7005 and 7006 are connected at a dedicated connection device 7002. In this case, the connection device 7002 has a function for terminating the public network 7004, a function for terminating the home networks 7005 and 7006, an IP processing function, a NAT (Network-Address Translation) function which is standardized by RFC 1631, as well as an IP multicast handling function, an IP signaling function, a datalink layer level switch capable of realizing real time data transfer between the public network 7004 and the home networks 7005 and 7006, and an address notification function, as will be described in detail below.

Next, IP subnet configuration and address assignment on the network system of FIG. 58 will be described. As shown in FIG. 58, in this sixth embodiment, one IP subnet (with a network address P) is formed by the home networks as a whole (first and second home networks 7005 and 7006), and in addition, private addresses standardized by RFC 1597 are utilized on the home networks. Also, a global IP address (G.2) is assigned to the public network side of the connection device 7002.

The reason for adopting such an address configuration is that acquisition of a plurality of global IP addresses requires higher cost compared with acquisition of one global IP address and there is a worldwide shortage of IP addresses. Namely, it is practically almost impossible to assign new global IP addresses to connection terminals of home networks as a number of terminals and a number of addresses for home networks are expected to grow very rapidly.

Note that the first home network 7005 and the second home network 7006 may belong to different subnets provided that they use different private address systems. In such a case the connection device 7002 for inter-connecting them will be a router. In the following description, it is assumed that the first home network 7005 and the second home network 7006 belongs to the same subnet as described above.

Figure 59:
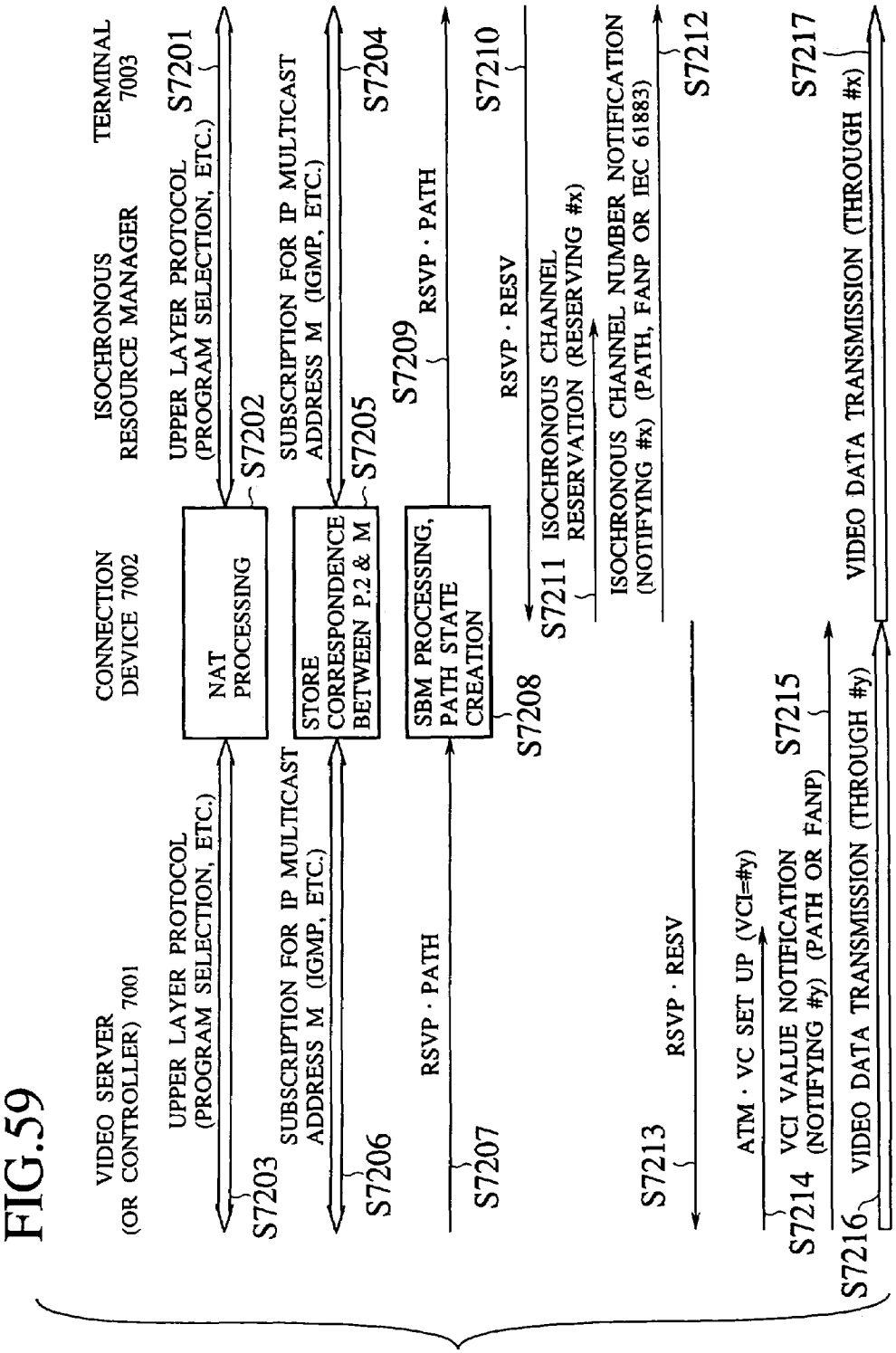
FIG. 59 is a sequence chart for a processing in the system of FIG. 58 in a case of video transfer from a video server to a terminal.
Figure 60:
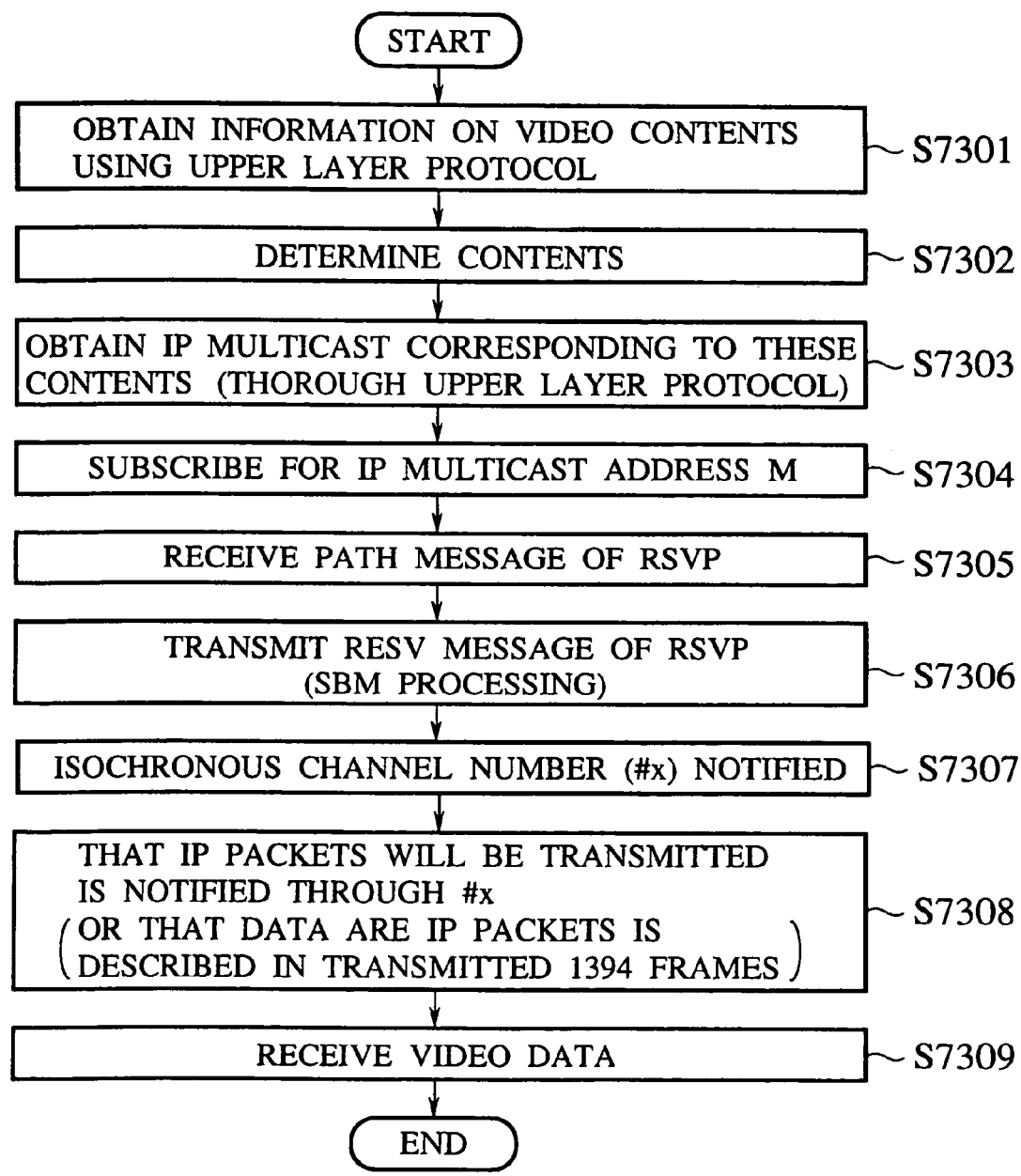
FIG. 60 is a flow chart for the operation by a terminal in the system of FIG. 58 during the processing of FIG. 59.
Figure 61:
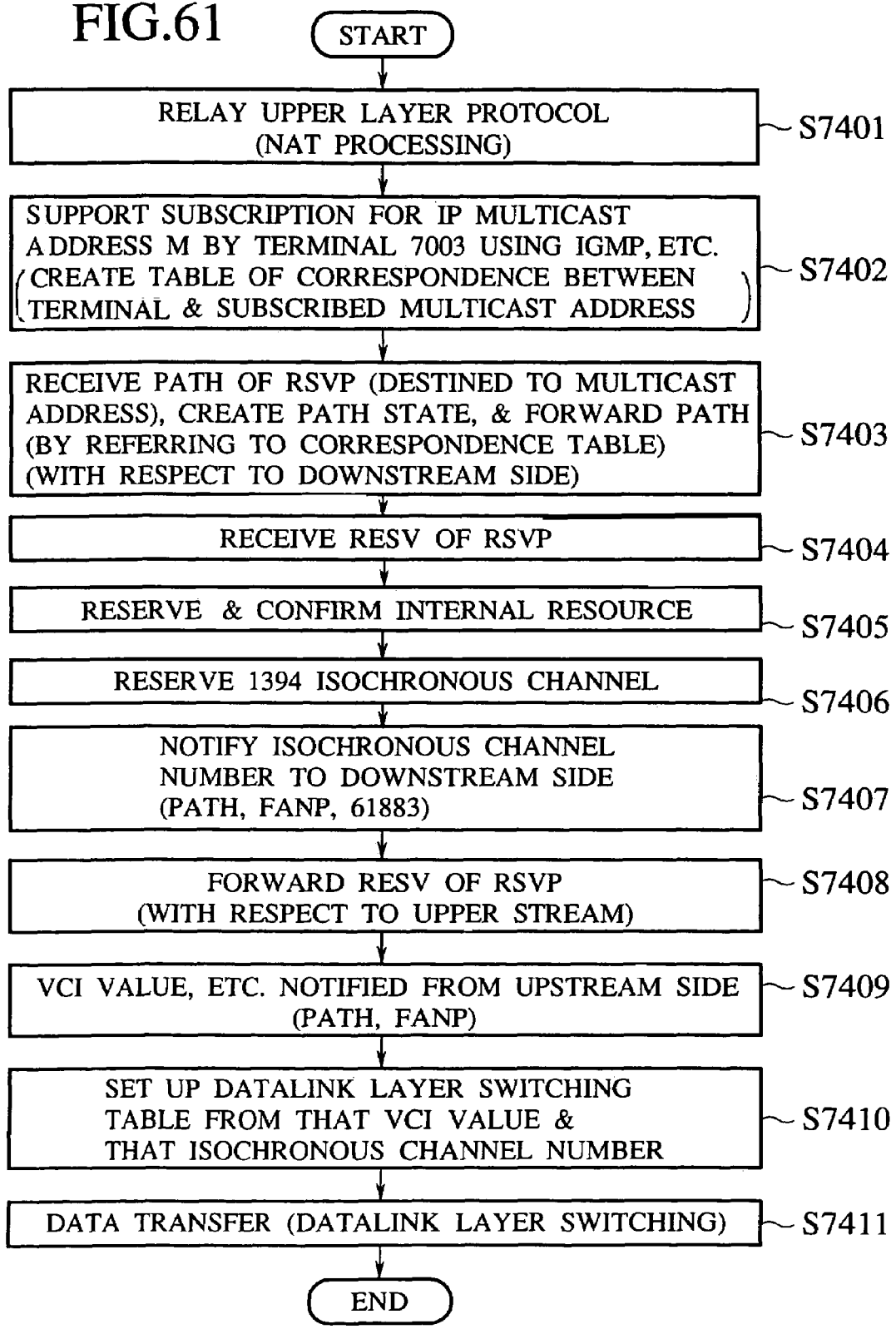
FIG. 61 is a flow chart for the operation by a connection device in the system of FIG. 58 during the processing of FIG. 59.

FIG. 59 shows a processing sequence in a case of carrying out video transfer from the video server 7001 to the terminal 7003 through the connection device 7002 and the public network 7004, while FIG. 60 shows a processing sequence of the terminal 7003 in that case and FIG. 61 shows a processing sequence of the connection device 7002 in that case.

As described in detail below, FIG. 59, FIG. 60 and FIG. 61 are sequences in a case where the connection device 7002 is an SBM (Subnet Bandwidth Manager) and this mechanism is used for reservation of communication resource. Here, SBM is a unit for carrying out reservation of communication resource within subnet by using RSVP, which is discussed in the IntServ working group of IETF.

First, the terminal 7003 obtains information on a desired video using a protocol above layer 5 among seven layers standardized by OSI (steps S7201, S7203). This can be realized in various manners such as a negotiation using DSM-CC of MPEG/DAVIC or corresponding protocol, an information selection for selecting information from the WWW server on Web using RTSP, etc. In this sixth embodiment, these various manners are collectively referred to as an upper layer protocol, and it is assumed that the exchange of this information is realized by using IP packets.

Note here that this upper layer protocol may be communicated while being applied with NAT processing at the connection device 7002 (step S7202). Namely, in a case of forwarding an IP packet from a private IP network to Internet, it is not allowed to transmit a private IP address to Internet side, so that the connection device 7002 applies the NAT processing for translating a private IP address into a global IP address (G.2) of the connection device 7002 itself. For more detail of the NAT processing, see Japanese Patent Application No. 8-316552 (1996) for example.

In this sixth embodiment, the video service from the video server is assumed to be provided through IP multicast. In this case, when a video to be selected is determined using the upper layer protocol, there is a need to obtain an IP multicast address for transferring that video. There are several possible schemes that can be used for this broadcasting (delivery).

For example, there is a broadcasting scheme in which different IP multicast addresses are assigned to different videos (different video contents). This is a case of IP multicast address assignment in which a broadcast from a broadcast station A is assigned with an IP multicast address="#1", a broadcast from a broadcast station B is assigned with an IP multicast address="#6" and so on, for example.

The video server 7001 notifies a multicast address "M" to be used for video transfer to the terminal 7003 through the upper layer protocol. Then, the terminal 7003 transmits a REPORT message for the multicast address "M" to be subscribed for, in response to a QUERY message received from Internet side, according to the IP multicast protocol (such as IGMP (Internet Group Management Protocol) (RFC 1112) for example) (step S7204).

Upon receiving this message, the connection device 7002 stores a correspondence between the private address "P.2" of the terminal 7003 and the requested multicast address "M" (step S7205), and notifies the REPORT message to the upstream side router (step S7206). At this point, the source address is set to be the global IP address "G.2" of the connection device 7002 itself. FIG. 62 shows an example of a correspondence table stored by the connection device 7002.

When the subscription for the multicast address "M" succeeds, the connection device 7002 stores the fact that the terminal 7003 has subscribed for the multicast address "M" (step S7205), and notifies this fact to the terminal 7003.

Next, the terminal carries out the reservation of communication resource in order to receive this video in good quality. There are several possible methods that can be used for this communication resource reservation including:
 (a) Method using SBM;
 (b) Method using RSVP (Resource Reservation Setup Protocol); and
 (c) Method using IEC 61883.

Note that SBM (Subnet Bandwidth Manager) is a scheme for reserving bandwidth within subnet which is proposed in IETF, the standardization organization for Internet, in which the bandwidth reservation within subnet is carried out by using RSVP. FIG. 59 shows an exemplary case of using SBM.

In this case, the connection device 7002 is an SBM node so that the routing protocol is not operating thereon. Note that the connection device 7002 of this embodiment has a NAT function so that it also has a global IP address (G.2), but even when there are plural physical interfaces on the home network side, there is no need for the connection device 7002 to have IP address (private address) for each physical interface separately. For example, it suffices for the connection device 7002 to have one private address in addition to the global IP address. In this embodiment, the connection device 7002 is assumed to have a private IP address "P.1".

The terminal 7003 may urge the video server 7001 to transmit a PATH message of RSVP, by means of the upper layer protocol and the like. The PATH message will be transmitted with the multicast address "M" as destination, and arriving at the connection device 7002. (step S7207).

The connection device 7002 creates a PATH state of RSVP. (step S7208), and transmits this PATH message with the multicast address "M" as destination so that it eventually arrives at the terminal 7003 (step S7209). Here, the connection device 7002 already recognizes that the terminal 7003 belongs to the multicast address "M" from the correspondence table of FIG. 62, so that the connection device 7002 can forward this PATH message to the terminal 7003.

In the connection device 7002, the PATH state is created. Here. the connection device 7002 is an SBM node. The terminal 7003 transmits an RESV message of RSVP to the connection device 7002 of the upstream side so as to reserve communication resource such as bandwidth (step S7210).

Upon receiving this RESV message, the connection device 7002 makes an access to an IEEE 1394 isochronous resource-manager of the first home network (IEEE 1394) 7005 and reserves necessary bandwidth and isochronous channel number, so as to reserve communication resource between the connection device 7002 and the terminal 7003 (step S7211). An isochronous channel number reserved here is assumed to be "#x".

At this point, the connection device 7002 may notify an information indicating 'isochronous channel that should be used for transmitting the requested program' to the terminal 7003 (step S7212).

There are several possible methods that can be used for this notification including the following.

Figure 63:
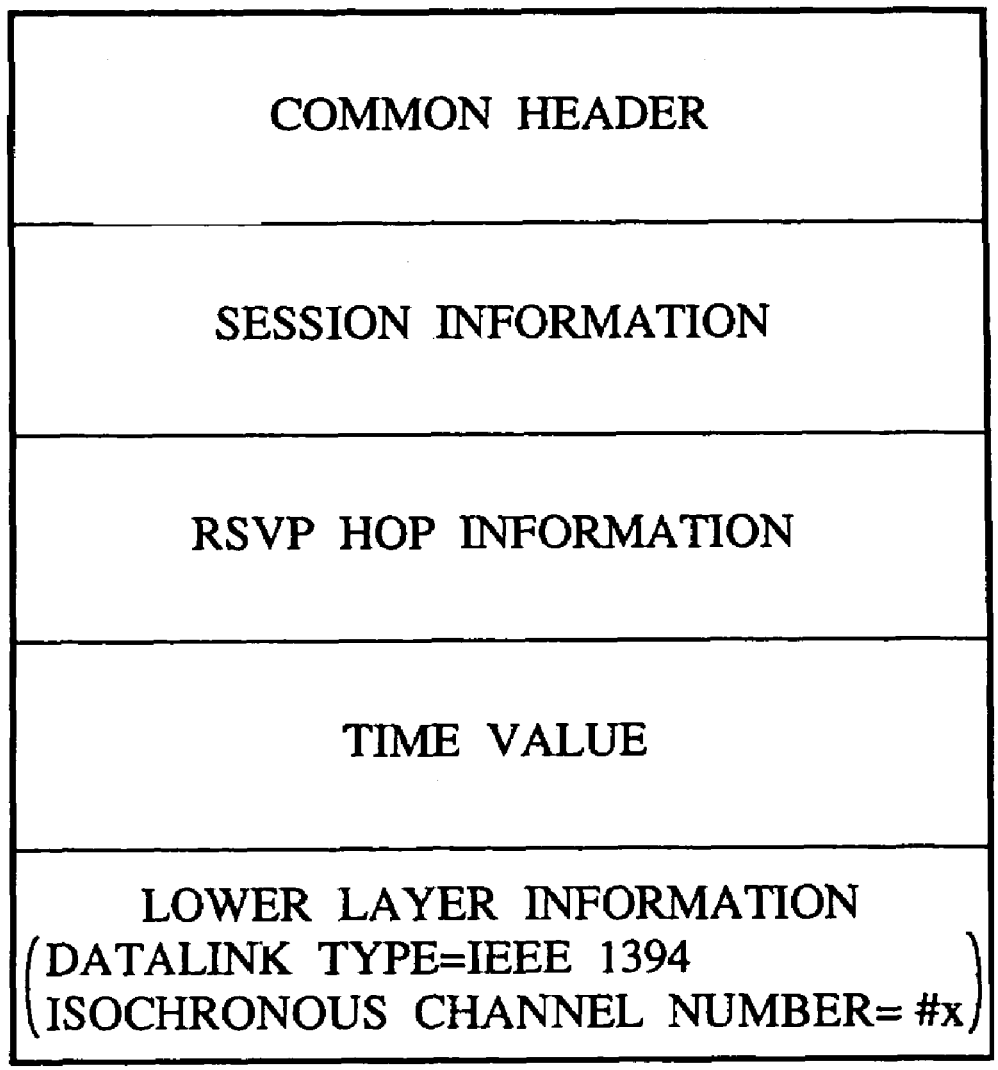
FIG. 63 is a diagram showing an exemplary format of a PATH message of RSVP that can be used in the system of FIG. 58.

The first notification method is a method using a PATH message of RSVP in a format shown in FIG. 63. In this method, as shown in FIG. 63, an information indicating that 'hereafter (or now), data (IP flow) contained in this PATH message will be transmitted by an isochronous channel number="#x"' is described within the PATH message of RSVP.

The second notification method is a method using FANP (Flow Attribute Notification Protocol) as described in the first to fifth embodiments described above. Note that FANP notifies a correspondence between IP flow and the like (IP multicast address "M", for example, in the case of this embodiment) to be transmitted and a link layer ID information (IEEE 1394 channel number reserved earlier in the case of this embodiment), among neighboring nodes (the connection device 7002 and the terminal 7003 in the case of this embodiment).

The third notification method is a method using CIP header of IEC 61883. In this method, the connection device 7002 directly writes a channel number to be used into a PCR (Plug Control Register) of the terminal 7003 by using IEC 61883, and makes the terminal 7003 recognize that the transmitted information is MPEG-over-IP by means of 1394 header or a CIP (Common Isochronous Packet) header defined by IEC 61883. For example, in a case of extending the CIP header, a value indicating that this packet is IP packet or MPEG-over-IP packet is written into an FMP (Format ID) region, such that it becomes possible for the terminal 7003 to recognize an attribute of that packet as IP packet or IP packet with MPEG mounted thereon by looking at the CIP header.

Figure 64:
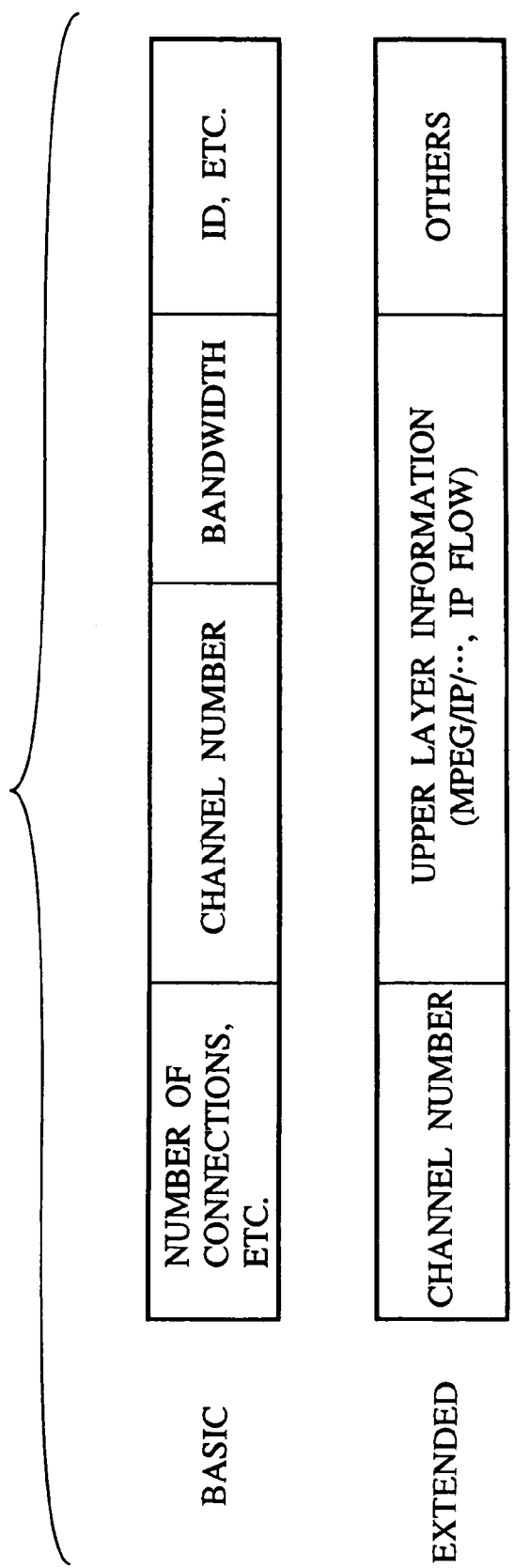
FIG. 64 is a diagram showing an exemplary description in a PCR register of IEEE 1394 that can be used in the system of FIG. 58.

The fourth notification method is a method in which PCR is extended and the meaning of a part of PCR register is set to indicate contents to be transmitted through that channel number, as shown in FIG. 64. For example, a value indicating that this packet is IP packet or MPEG-over-IP packet may be described. Alternatively, an attribute of flow to be transmitted through that channel number may be described, in a form of combination of source IP address, destination IP address, source port number, and a destination port number, for example. By providing such a register in the terminal 7003 and writing appropriate description into this register from the connection device 7002 (or controller), it becomes possible for the terminal 7003 to recognize that data to be received through that channel number is IP packet or MPEG-over-IP packet, or else p an attribute of that data.

It should be apparent that any of the first to fourth notification methods described above may be used in suitable combination.

Note also that, as far as timing is concerned, apart from the timing described here, it is also possible to carry out the above described procedure at a stage where the reservation of communication resource up to the video server 7001 is completed so that the end-to-end communication becomes possible.

Now, when the reservation of communication resource on the downstream side has succeeded, the connection device 7002 passes the RESV message of RSVP to the further upstream side (step S7213).

Upon receiving this message, a router within Internet reserves communication resource of ATM network on the downstream side by using Q.2931 and the like, for example (step S7214), and after confirming this reservation, transmits the RESV message to the further upstream side. This operation is subsequently repeated by subsequent routers.

In addition, the router transmits an information on a datalink identifier (VPI/VCI in this case as the datalink technology employed is ATM) to be used to an RSVP/SBM node of the downstream direction by using PATH or FANP, so as to notify a correspondence between IP flow to be transmitted and datalink identifier to that RSVP/SBM node (step S7215). A VCI value of ATM reserved for the connection device 7002 is assumed to be "#y".

When the end-to-end communication resource is reserved in this manner, the video transfer is started (steps S7216, S7217).

Here, the connection device 7002 already recognizes that data of MPEG-over-IP are to be transmitted from the video server 7001 through an ATM connection "#y (VCI="#y"), and that it suffices to transmit received IP packets to the terminal 7003 through an isochronous channel "#x" of IEEE 1394.

Thus the connection device 7002 transmits data received through VCI "#y" directly to the isochronous channel "#x" of IEEE 1394 without verifying header contents of IP packets, by establishing synchronization among IP packets. Namely, the connection device 7002 can carry out a direct data transfer to 1394 by verifying only VCI value without applying any IP layer processing. This can be viewed as a datalink switch since switching of data is made according to datalink layer information alone.

As a consequence, an IP layer processing, that is a series of software processing such as IP header verification, routing processing, etc., that would have been required at the IP layer otherwise can be replaced by a datalink layer switching processing, so that it becomes possible to reduce a processing time and a processing load considerably. This corresponds to a provision of effectuating SBM and then effectuating datalink switch.

Note that the above description has been directed to a case where the connection device 7002 is as an SBM node, but it is also possible to carry out the reservation of communication resource using RSVP in a case where the connection device 7002 is a router.

It is also possible to carry out the above described reservation of communication resource by means of communication resource reservation using FANP as described in the first to fifth embodiment described above.

Up to here, a case where the communication resource reservation on IEEE 1394 is carried out by an upstream side node of RSVP has been described. In contrast, the reservation of an isochronous channel on IEEE 1394 bus may be carried out by a downstream side node (the terminal 7003 in the case of this embodiment), as indicated in FIG. 65.

Figure 65:
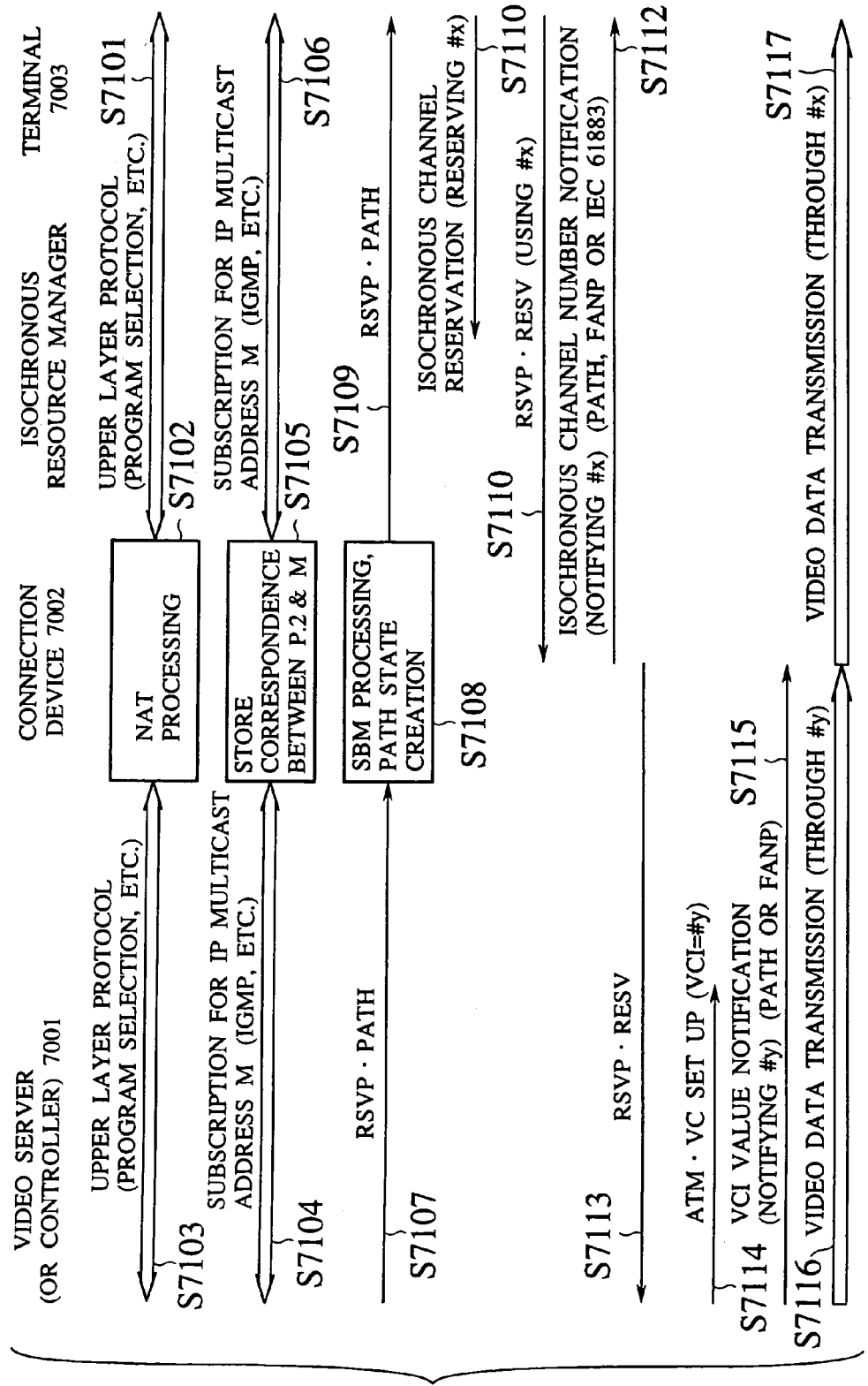
FIG. 65 is a sequence chart for a processing in the system of FIG. 58 in a case of video transfer from a video server to a terminal by reserving communication resource on IEEE 1394 from a downstream node of RSVP.

In FIG. 65, after the downstream side node carries out the reservation of an isochronous channel having necessary communication resource (step S7110), an RESV message is transmitted to an upstream side (step S7111). The rest of FIG. 65 is substantially the same as FIG. 59.

In this case, the reserved isochronous channel number and the like may be transmitted by including it in the RESV message of RSVP that is to be transmitted subsequently.

Also, the notification to the upstream side of a correspondence between an isochronous channel number and a flow for which bandwidth reservation is to be made may be realized by using a message other than the RESV message. Namely, the RESV message may be used simply for the purpose of requesting the bandwidth reservation for that flow with respect to the connection device 7002, and the notification of the correspondence between an isochronous channel number and a flow for which bandwidth reservation is to be made may be realized by using another message such as FANP message or by using PCR shown in FIG. 64. Upon receiving this notification, the connection device 7002 can obtain from this message an information as to which link layer connection, that is isochronous channel, should be used for transferring a flow for which the bandwidth reservation has been made by the RESV message.

Figure 66:
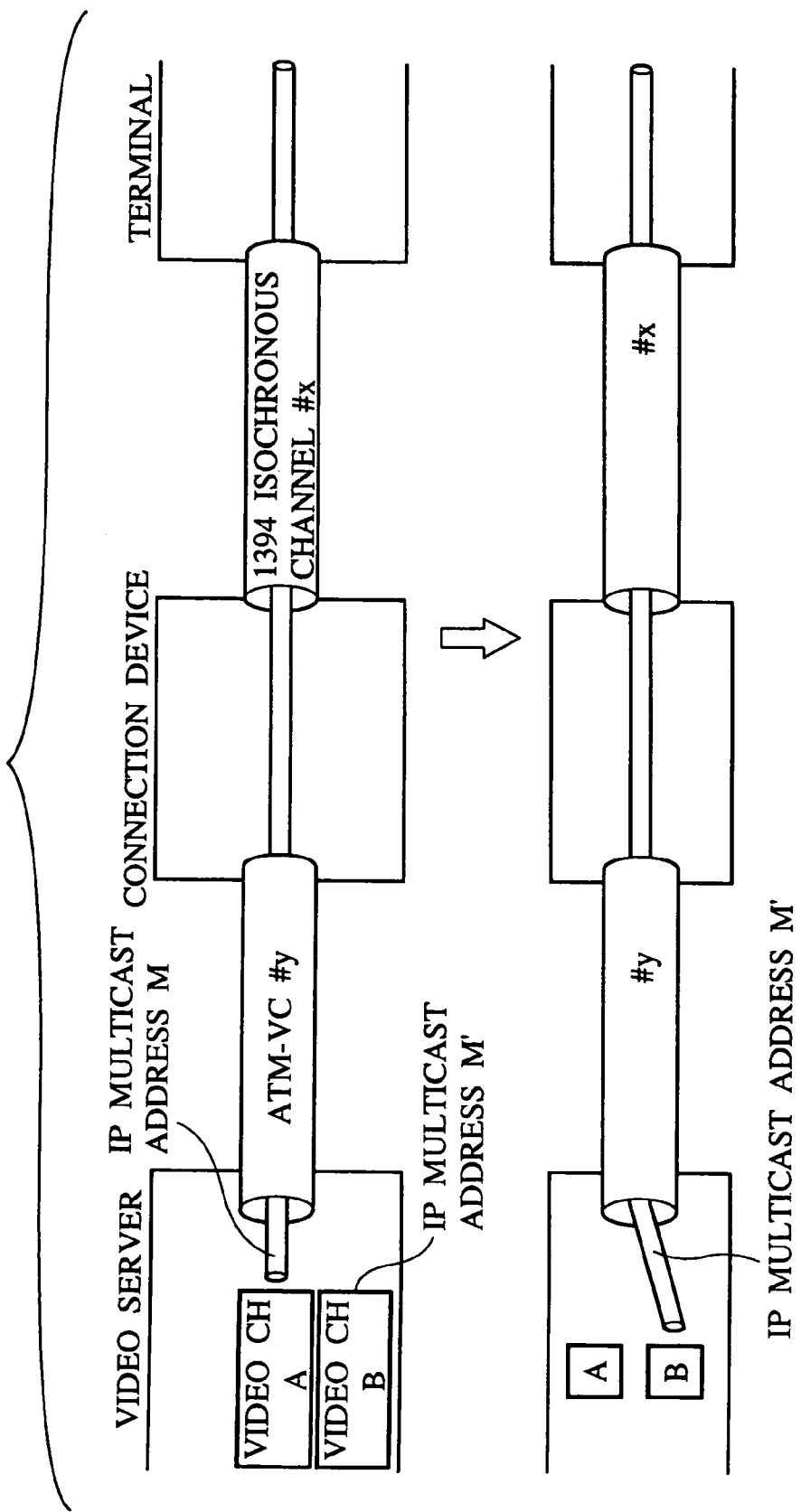
FIG. 66 is a diagram showing a case of transferring different contents by seceding from the already subscribed IP multicast address and subscribing for a different IP multicast address in the system of FIG. 58.

Now, when the user at the terminal 7003 wishes to watch a different video (a TV program on a different channel, for example), the above described procedure is going to be repeated once again. Namely, this can be realized by repeating a procedure of obtaining an IP multicast address corresponding to a new video through the upper level protocol and subscribing for that IP multicast address. At that time, it is preferable to secede from the previously subscribed IP multicast address from a viewpoint of efficient utilization of communication resource. FIG. 66 illustrates this process.

Also, when plural terminals are connected to the home network and these terminals are watching different programs, their respective data are going to pass through the public network 7004 and the connection device 7002, and it is convenient from a viewpoint of the connection device 7002 to have these data with different destination terminals transmitted through different ATM-VCs because the datalink switching is to be carried out at the connection device 7002. As for the reservation of communication resource, whether it is necessary to repeat the above described procedure using SBM, RSVP, FANP, etc. again or not depends on a manner of making reservation by RSVP/SBM. Namely, in a case of using Shared Explicit reservation, the same communication resource (VC of ATM, isochronous channel of 1394) as previously reserved can be used continually as long as the source video server is identical or as long as a new video server for transmitting a next video has been registered, and it suffices to make a subscription for IP multicast address again.

Next, a case of another broadcasting scheme in which contents can be changed while the same IP multicast address is used will be described. In this case, a plurality of video services are going to be carried out with respect to the same user using the same multicast address, and a video contents change (corresponding to a TV channel change) is going to be carried carried out by using the upper level protocol.

In this case, the same procedure as described above is also to be carried out up to the initial communication resource reservation. Here, however, the IP multicast address given through the upper layer protocol can be an IP multicast address uniquely given to that terminal in advance (IP multicast address assigned to each terminal or user by a network service provider in advance). The identification of the terminal can be realized by the upper layer protocol using an identifier assigned to each terminal by a network service provider in advance, for example.

At a time of next contents change (corresponding to TV channel change), the terminal requests this contents change by using the upper layer protocol. The video server 7001 continues to use the currently used IP multicast address without any change, and transmits the changed contents to that IP multicast address.

Figure 67:
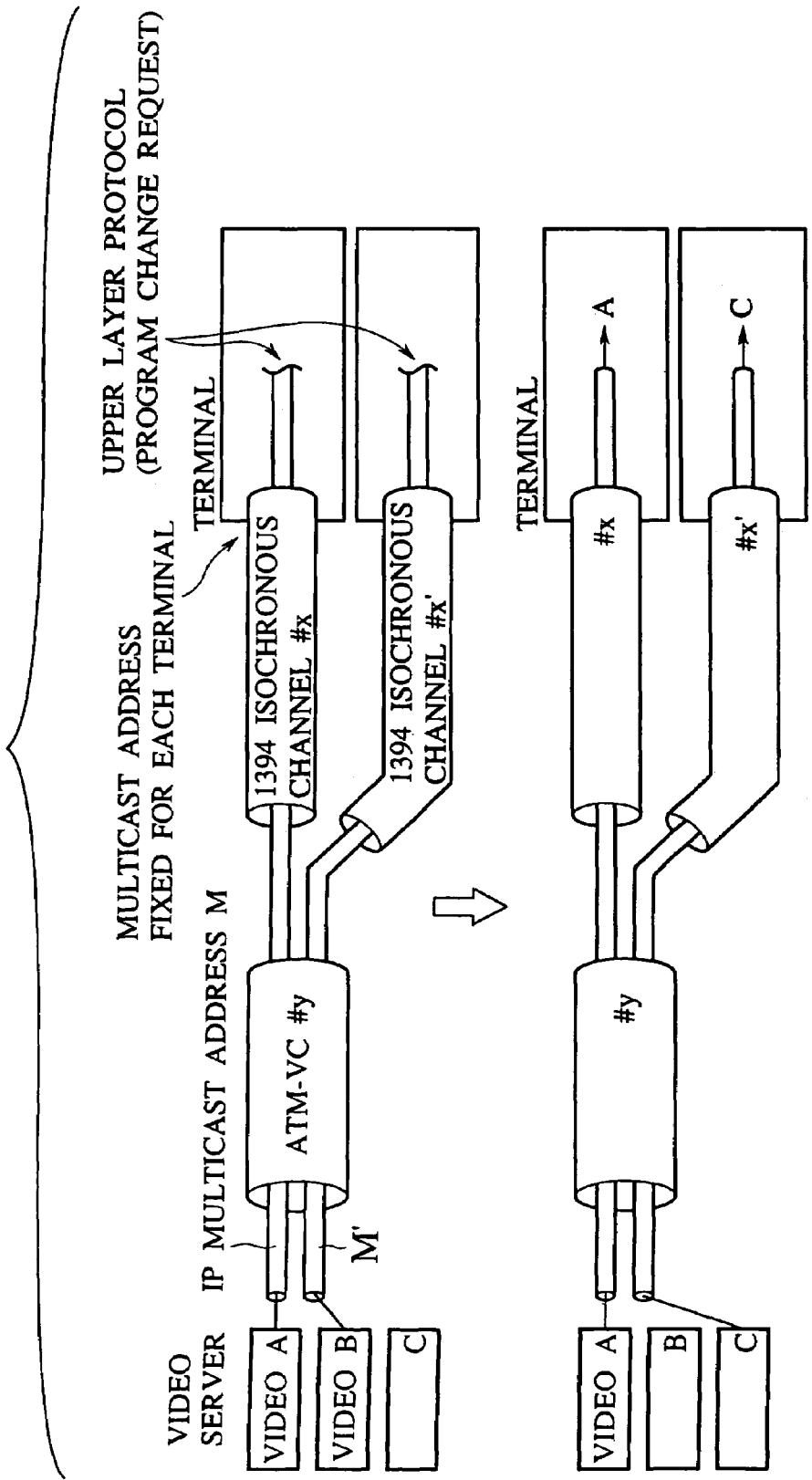
FIG. 67 is a diagram showing a case of changing contents while using the same IP multicast address in the system of FIG. 58.

Similarly as described above, it is not absolutely necessary to use this IP multicast address for the purpose of multicast, and it is possible to use this IP multicast address for contents transfer with respect to a single terminal, as illustrated in FIG. 67. Namely, one multicast address is assigned to one user (terminal) from which a video delivery request has been made, and a change of contents to be transmitted is handled by the upper layer protocol, for example.

It is also possible to trigger the judgement as to whether or not to assign different multicast addresses by looking at a difference in the port number of an IP packet transmitted from the connection device 7002.

As such, by assigning different IP multicast addresses to different users or applications, it is possible to realize dynamic assignment of IP multicast addresses with respect to terminals and therefore it becomes possible to transmit various contents to the terminal having a private address, without worrying about an overlap with the globally unique IP address, even under the private address environment.

Note that the sixth embodiment has been described for an exemplary case of realizing transfer of IP multicast data flow by reserving bandwidth using RSVP, but it should be apparent that the scheme of this sixth embodiment is equally applicable to IP uni-cast as well as to a uni-cast or multicast at another network layer.

As described, according to this sixth embodiment, a scheme for applying RSVP to IEEE 1394 bus is specified in view of the conventionally encountered problem that a scheme for operating a network layer signaling protocol such as RSVP on IEEE 1394 has not been standardized and a straightforward mapping causes no guaranteed communication quality on IEEE 1394 and no guaranteed end-to-end communication quality, so that it becomes possible to realize communication that guarantees communication quality in an inter-connected network environment even on IEEE 1394.

Seventh Embodiment

Referring now to FIG. 68 to FIG. 83, the seventh embodiment of the present invention will be described in detail.

Figure 68:
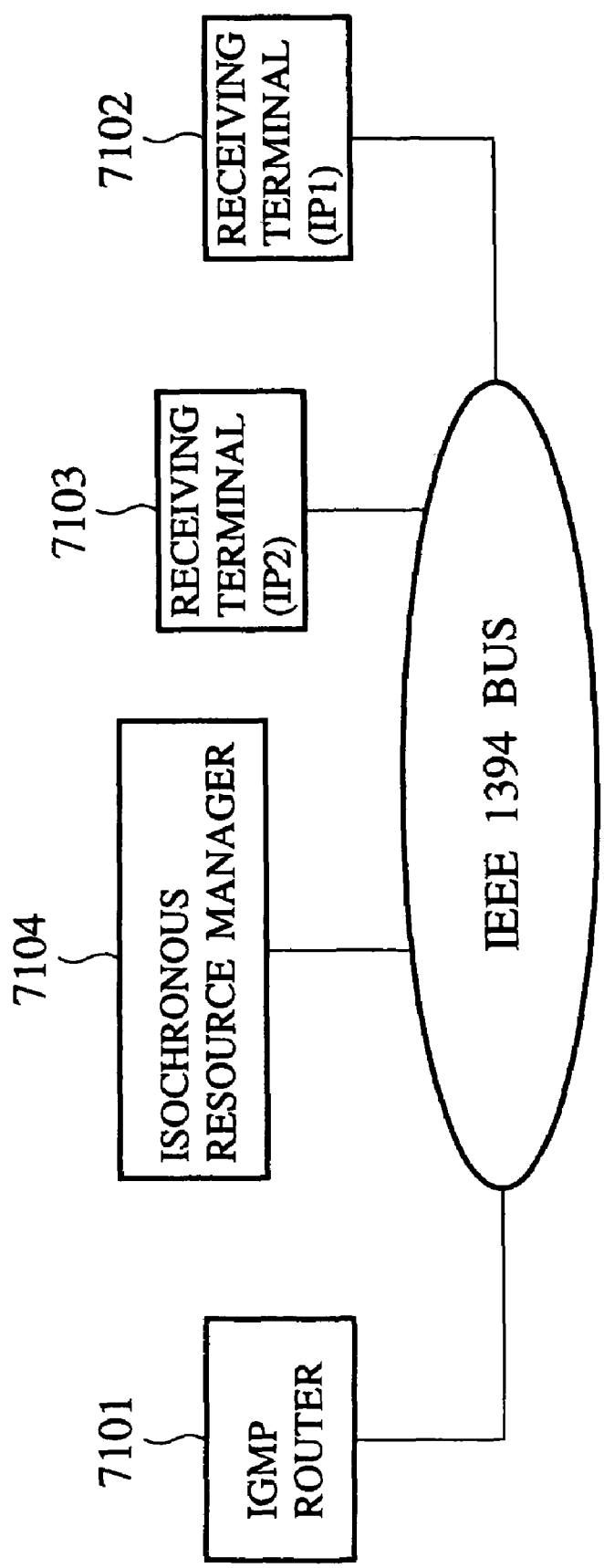
FIG. 68 is a block diagram showing an exemplary overall configuration of a network system according to the seventh embodiment of the present invention.

FIG. 68 shows an exemplary overall configuration of a network system according to the seventh embodiment, in which an IGMP (Internet Group Management Protocol) router 7101, an isochronous resource manager 7104 of IEEE 1394, and receiving terminals 7102 and 7103 are inter-connected through an IEEE 1394 bus so as to enable communications among them.

(7-1)

Now, a case where the terminals 7102 and 7103 receive multicast data by subscribing for IP multicast in the network system of FIG. 68 will be described. Here, after subscribing for IP multicast, the terminals 7102 and 7103 become receiving terminals of multicast data so that these terminals will be referred to as receiving terminals 7102 and 7103.

Figure 69:
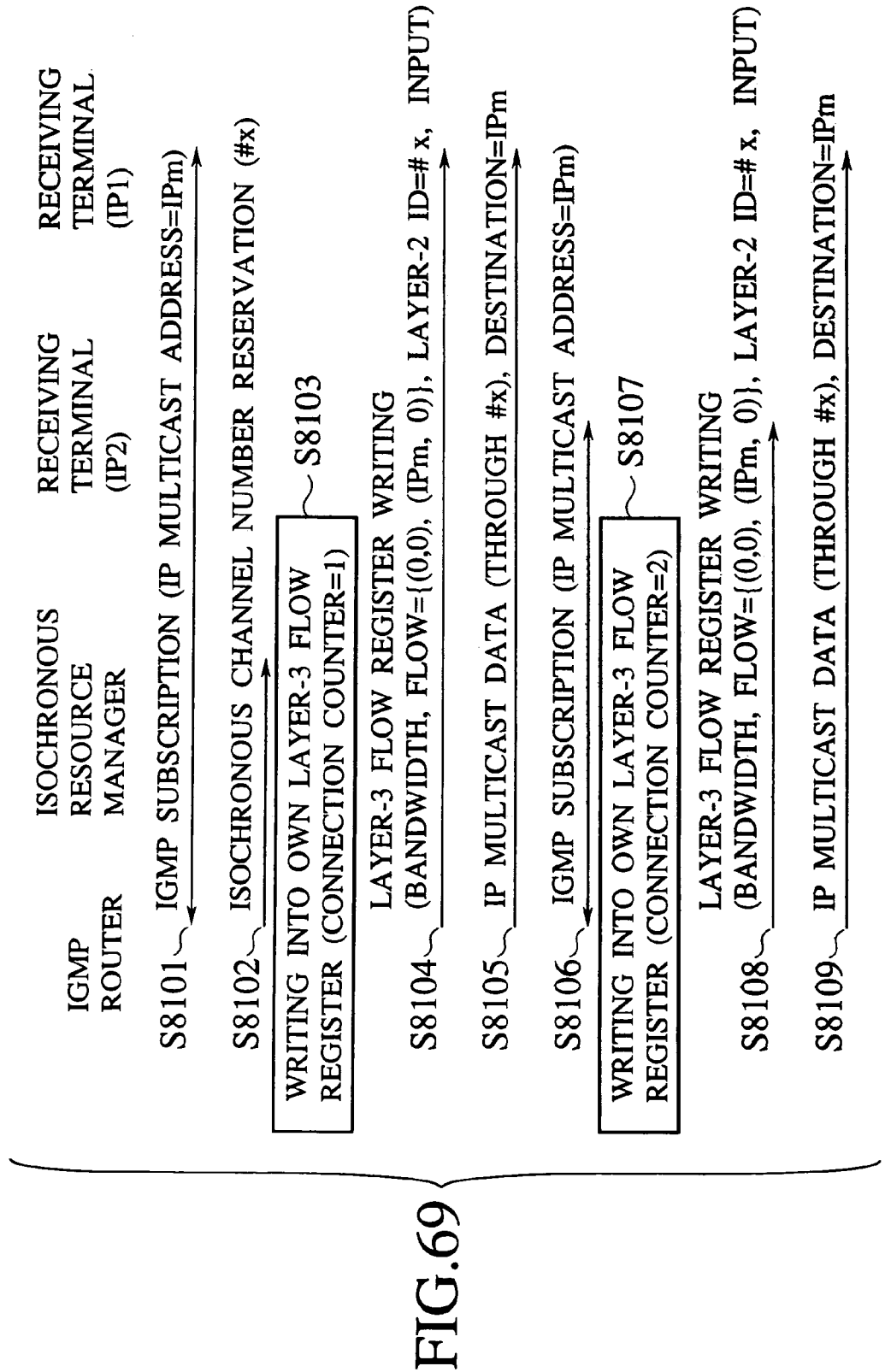
FIG. 69 is a sequence chart for a processing in a case where a terminal subscribes for IP multicast in the system of FIG. 68.
Figure 70:
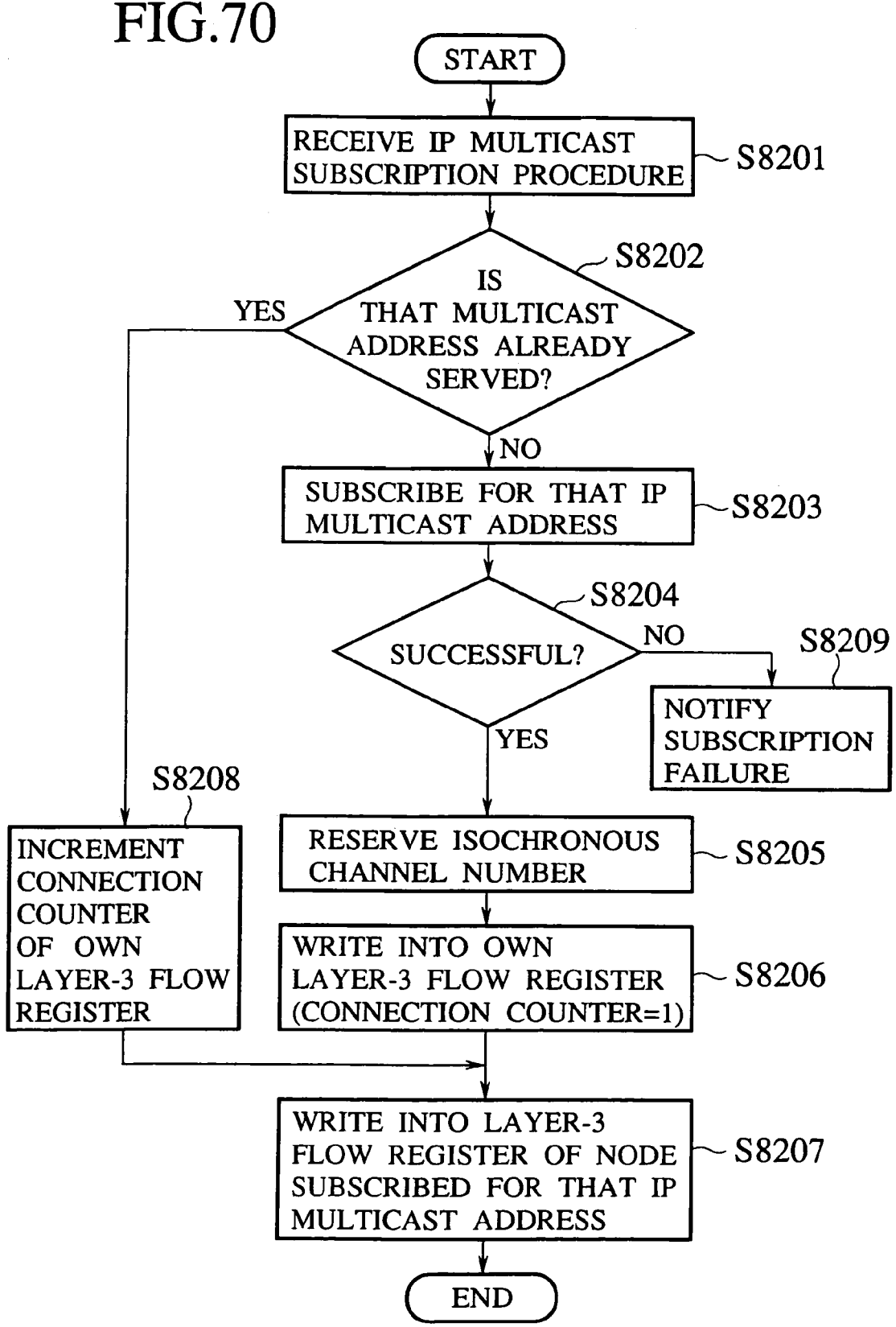
FIG. 70 is a flow chart of the operation by an IGMP router in the system of FIG. 69 in a case of subscription for IP multicast address.

FIG. 69 shows a procedure by which the receiving terminals 7102 and 7103 subscribe for IP multicast, and FIG. 70 shows a processing procedure of the IGMP router 7101 in that procedure.

As shown in FIG. 68, the IGMP router 7101, the receiving terminals 7102 and 7103, and the isochronous resource manager 7104 are connected on the IEEE 1394 bus. Here it is assumed that the receiving terminal 7102 has an IP address "IP1" and the receiving terminal 7103 has an IP address "IP2". Note that functions of the isochronous resource manager 7104 may be provided integrally within any of the other three elements of FIG. 68 (that is, any one of the IGMP router 7101 and the receiving terminals 7102 and 7103 may play a role of the isochronous resource manager). It is also assumed that the receiving terminals 7102 and 7103 already obtained an IP multicast address "IPm" in advance by some suitable means.

First, suppose that the receiving terminal 7102 is wishing to subscribe for the IP multicast address "IPm". To this end, an exchange of IGMP message (transmission and reception of IGMP QUERY, IGMP REPORT, etc.) is carried out between the IGMP router 7101 and the receiving terminal 7102, such that the receiving terminal 7102 notifies that it is wishing to subscribe for the IP multicast address "IPm" to the IGMP router 7101 (step S8101 of FIG. 69). Here, the IGMP router 7101 is assumed to be a router capable of supporting this IP multicast address "IPm". This IGMP router 7101 may be something like a set-top box. Namely, the IGMP router 7101 may be a node having a function for extracting packets destined to the appropriate IP multicast address from IP multicast packets transmitted by broadcasts, and then forwarding the extracted packets.

Upon receiving a request of subscription for the IP multicast address "IPm" from the receiving terminal 7102, the IGMP router 7101 executes the processing according to the flow chart of FIG. 70. Namely, in this seventh embodiment, a subscription request from the receiving terminal 7102 is an initial subscription request for the IP multicast address "IPm" from its subnet (IEEE 1394 bus), so that the IGMP router 7101 carries out a prescribed processing procedure for subscription for IP multicast address (steps S8201 to S8203 of FIG. 70). When this processing procedure is successfully completed, the IGMP router 7101 makes an access to the isochronous resource manager 7104 and reserves an isochronous channel number (steps S8204 and S8205 of FIG. 70, step S8102 of FIG. 69). Note that, at the step S8203 of FIG. 70, the IGMP router 7101 may carry out the procedure for subscription for this IP multicast address by acting on another IGMP router on a further upstream side. When this processing procedure for subscription fails, the IGMP router 7101 notifies that fact to the receiving terminal 7102 (step S8209 of FIG. 70).

Here, the isochronous channel number reserved by the isochronous resource manager 7104 in response to a request from the IGMP router 7101 at the step S8205 of FIG. 70 is assumed to be "#x". Note that it is not absolutely necessary to reserve bandwidth at this point because what is reserved at this point is an asynchronous stream of IEEE 1394. The asynchronous stream is a packet in an isochronous packet format which is to be transmitted at asynchronous arbitration time, for which only the isochronous channel number is reserved through the isochronous resource manager 7104. A case where it is necessary to reserve bandwidth will be described later.

Returning now to FIG. 70, when the isochronous channel number is reserved, the IGMP router 7101 writes an information on this IP multicast flow into own layer-3 flow register (step S8206 of FIG. 70, step S8103 of FIG. 69).

Figure 71:
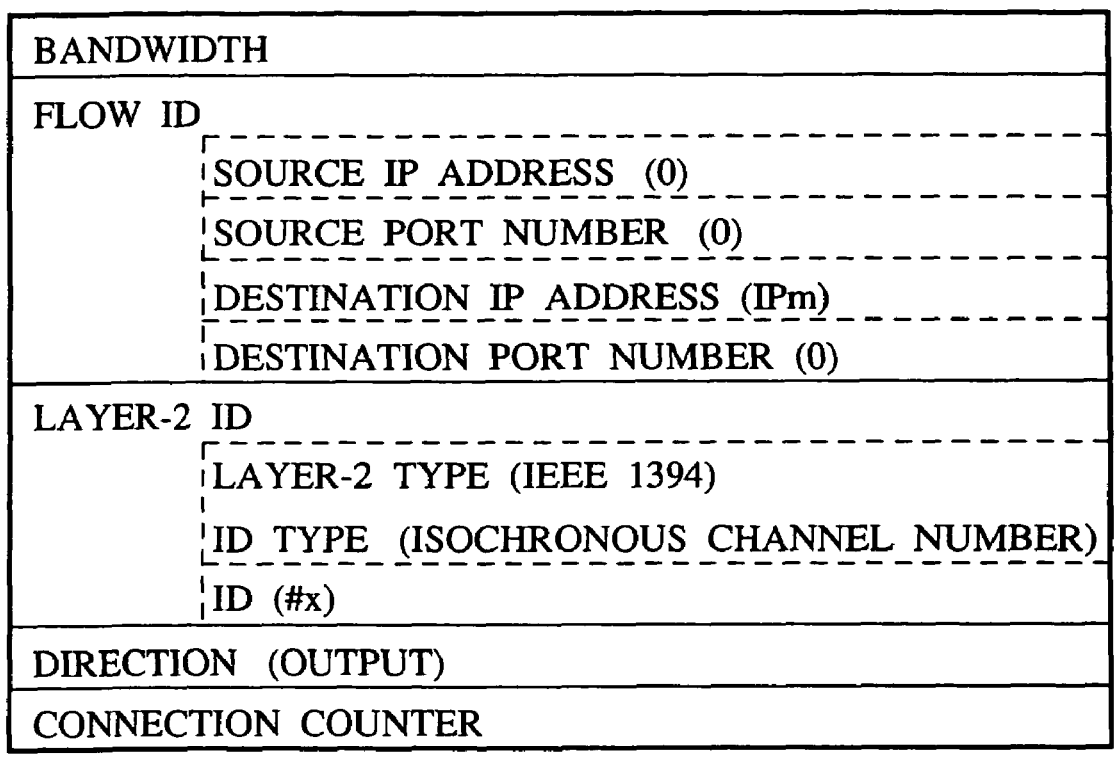
FIG. 71 is a diagram showing an exemplary format of a layer-3 flow register used in the system of FIG. 68.
Figure 72:
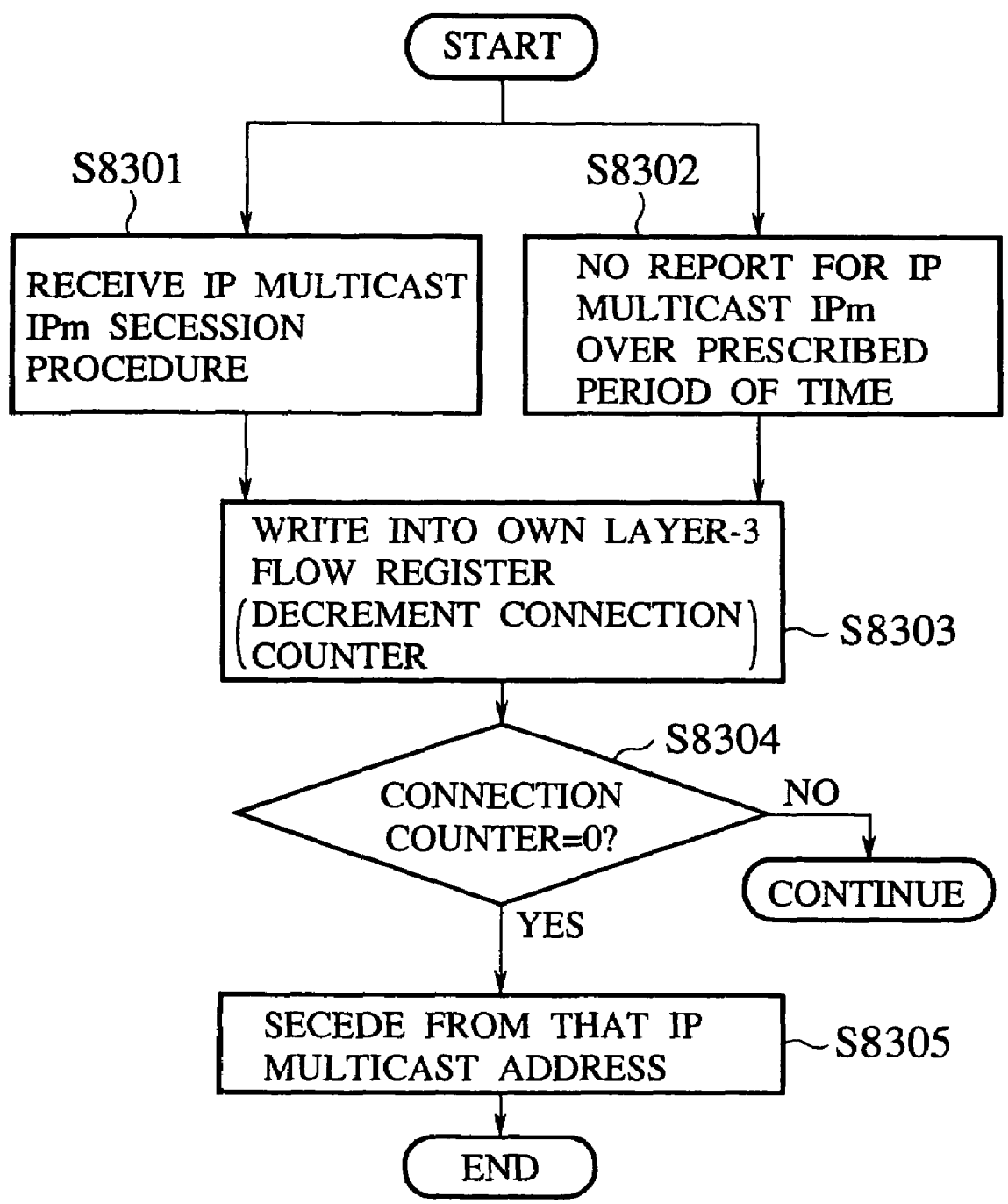
FIG. 72 is a flow chart for the operation by an IGMP router in the system of FIG. 69 in a case of secession from IP multicast address.

FIG. 71 shows an exemplary format of the layer-3 flow register. As shown in FIG. 71, the layer-3 flow register is basically a register for registering a correspondence between a layer-2 ID (an isochronous channel number in the case of this seventh embodiment) and a layer-3 flow that is going to pass through a channel indicated by that layer-2 ID. In addition to that, this register also have regions for registering an information as to whether that flow is to be inputted or outputted, an amount of bandwidth reserved for the channel indicated by that layer-2 ID, a counter for counting a number of terminals that are using that channel, etc. As shown in FIG. 71, no bandwidth is reserved for the reserved channel in this case, so that the bandwidth field of the layer-3 flow register has a value "0" entered therein, for example.

The IP flow with the IP multicast address "IPm" as destination will be flowing into this channel so that, for the flow ID, "IPm" is entered as a destination IP address and a specified port number (PORT1 for example) when an available port number is limited or a value "0" when an available port number is not limited is entered as a destination port number. In the case of this seventh embodiment, an available port number is not limited so that a value "0" is entered into the destination port number. Also, the source terminal is not specified in a case of IP multicast address, so that a value "0" is entered as a source IP address and a source port number.

For the layer-2 ID, "IEEE 1394" is entered as a layer-2 type, "isochronous channel number is entered as an ID type, and the isochronous channel number "#x" that is reserved earlier is entered as an ID in this case.

As for direction, "output" is entered on an assumption that basically this IGMP router transmits these IP multicast packets.

The connection counter is a counter for indicating a number of nodes that can be regarded as receiving this asynchronous stream. The receiving terminal 7102 is a sole receiver at this point, so that a counter value "1" is entered into the connection counter.

Note that this layer-3 flow register may be realized in a form of a combination of a plug control register used in IEC 61883 and a register for storing an information on the layer-3 flow to be transferred through that channel.

Next, the IGMP router 7101 writes the same information as that of FIG. 71 into the layer-3 flow register of the receiving terminal 7102, except that the direction parameter is changed from "output" to "input" (step S8207 of FIG. 70, step S8104 of FIG. 69).

As the correspondence between the layer-3 flow information and the layer-2 ID is written into the layer-3 flow register of the receiving terminal 7102 in this manner, it becomes possible for the receiving terminal 7102 to recognize hereafter that the channel number "#x" of the asynchronous stream is allocated for IP multicast with IP multicast address "IPm" as destination. Then, it suffices for the receiving terminal 7102 to receive the channel number "#x" of the-asynchronous stream in order to receive datagrams destined to the IP multicast address "IPm" (step S8105 of FIG. 69).

Note that, in the above, the layer-3 flow register of the receiving terminal 7102 also registers an information as to whether an IP flow coming from the asynchronous stream or the isochronous channel indicated by the channel number is to be inputted or outputted, but it is also possible to provide separate layer-3 flow registers for input and output and use them properly.

Returning now to FIG. 69, suppose that the receiving terminal 7103 is now wishing to subscribe for the same IP multicast address "IPm". Then, the processing procedure for subscription by the IGMP is carried out between the IGMP router 7101 and the receiving terminal 7103 (step S8106 of FIG. 69).

Then, the IGMP router 7101 carries out a processing shown in FIG. 70. Namely, the IGMP router 7101 already started service for this IP multicast address "IPm" so that the IGMP router 7101 increments the connection counter of the own layer-3 flow register is incremented (to a counter value "2", for example) (step S8208 of FIG. 70), and writes the same information as previously written into the layer-3 flow register of the receiving terminal 7102 now into the layer-3 flow register of the receiving terminal 7103 so as to notify the correspondence between the channel number and the IP flow (step S8207 of FIG. 70).

Note that a number of terminals subscribing for the IP multicast address "IPm" is comprehended by the IGMP router 7101 and it is not absolutely necessary for each terminal to comprehend this, so that the connection counter value written into the layer-3 flow registers of the receiving terminals 7102 and 7103 may be a value "1" for example.

Up to here, a procedure for subscribing for IP multicast address has been described. Next, the operation of the IGMP router 7101 in a case of secession will be described with reference to FIG. 72.

In the case of secession, when a procedure for secession from the IP multicast address "IPm" is received from either receiving terminal (step S8301), or when a keep alive signal IGMP REPORT indicating that receiving of the IP multicast address "IPm" is continuing from either receiving terminal is not received over a prescribed period of time (step S8302), the IGMP router 7101 judges that this terminal wishes to stop receiving the IP multicast address "IPm", and decrements the connection counter value of the own layer-3 flow register (step S8303).

The connection counter value written in the layer-3 flow register of the IGMP router 7101 indicates a number of terminals subscribing for the IP multicast address "IPm" on that IEEE 1394 bus, so that when this value becomes "0" (step S8304), the IGMP router 7101 judges that there is no terminal which is receiving the IP multicast address "IPm" on that IEEE 1394 bus, and secedes from that IP multicast address "IPm" (step S8305).

In parallel to this, in order to notify the secession to the seceded terminal, the IGMP router 7101 may carry out an operation to write all "0" values, for example, into the layer-3 flow register of the seceded terminal.

Note that by maintaining the information on the IP multicast address as well as values of the layer-3 flow register even when a bus reset is caused in the IEEE 1394 bus in a course of IP multicast address subscription or a series of processing after the subscription, it becomes possible to realize a quick recovery of the IP multicast datagram receiving.

Note also that all packets destined to the IP multicast address "IPm" are going to be transmitted and received through the asynchronous stream indicated by the channel number "#x". Here, control packets of IGMP and the like may be communicated by using the asynchronous stream corresponding to that multicast address, default asynchronous stream (ARP (Address Resolution Protocol)), or asynchronous stream channel or asynchronous broadcast allocated for the purpose of IP broadcast or the like.

Also, either default asynchronous stream or asynchronous write broadcast is to be used as a channel for transmitting control packets of IGMP and IP packets and the like with a destination address indicating all hosts such as IP address="224.0.0.1" for example, at a time of IP multicast subscription.

(7-2)

Figure 73:
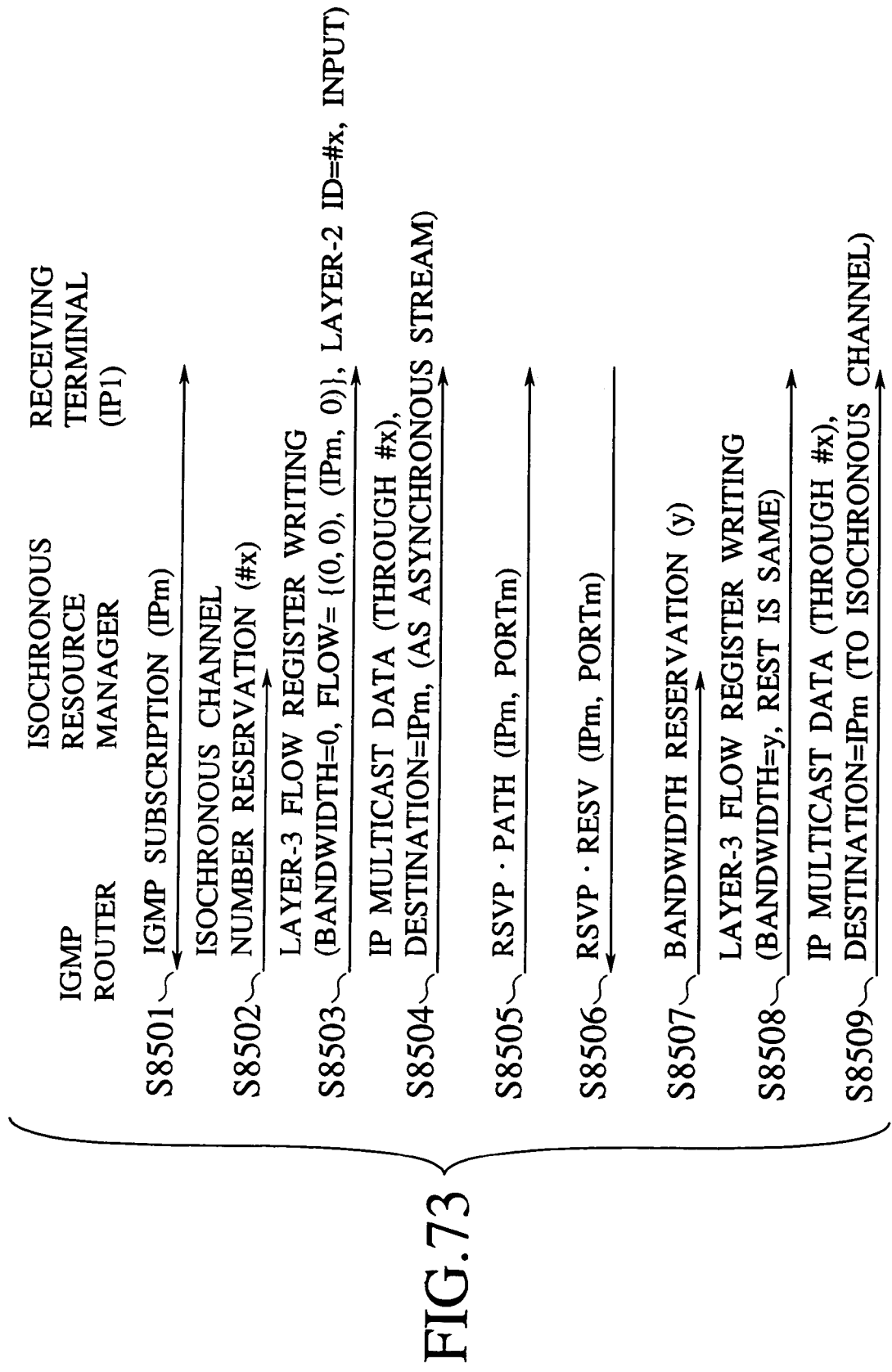
FIG. 73 is a sequence chart for a processing of reserving bandwidth for asynchronous stream reserved for IP multicast in the system of FIG. 68.

Next, a case of changing IP multicast into a state of "using bandwidth (QOS)", that is, a case of assigning bandwidth to the asynchronous stream and using it for transmission and reception, will be described with reference to FIG. 73.

Up to a point where the receiving terminal 7102 becomes capable of receiving datagrams destined to the IP multicast address "IPm" (steps S8501 to S8504), the procedure is the same as the steps S8101 to S8105 of FIG. 69 described above.

When a transmission using bandwidth is possible for this IP multicast, the IGMP router 7101 sends a PATH message of RSVP to the receiving terminal (the IP multicast address "IPm") (step S8505).

In response, the receiving terminal 7102 which wishes to receive this IP multicast in a state of "using bandwidth" sends an RESV message of RSVP to the upstream side (i.e., the IGMP router 7101) so as to request a reservation of bandwidth (step S8506).

In RSVP which is an example of bandwidth reservation protocols on IP, a transmitting host (an upstream side node) transmits a PATH message along with data. Communication bandwidth and the like are basically set up by this transmitting host. In contrast, the receiving terminal which wishes to make bandwidth reservation transmits an RESV message with the transmitting node as destination. In general, a router monitors the RESV message corresponding to the PATH message, and executes the bandwidth reservation when the RESV message is detected. Here it is assumed that the above described correspondence between the IP multicast address and the channel is already set up.

When the RESV message from the receiving terminal 7102 is detected, the IGMP router 7101 makes an access to the isochronous resource manager 7104 and reserves bandwidth. When the bandwidth is successfully reserved, an information on reserved bandwidth (an amount of bandwidth y) is entered into the layer-3 flow registers of its own and the receiving terminal 7101, so as to notify the success of bandwidth reservation (steps S8507 and S8508).

Thereafter, transfer of datagram destined to the IP multicast address "IPm" is continued using the isochronous channel (channel number "#x") for which bandwidth is reserved (step S8509).

Note that, when there are plural receiving terminals at this point, the IGMP router 7101 may rewrite a bandwidth portion of the layer-3 flow register of each receiving terminal. It is also possible to adopt a scheme in which the rewriting of the layer-3 flow register of the receiving terminal is not carried out as it becomes tedious when there are many receiving terminals, and the rewriting is carried out only in the layer-3 flow register of its own (IGMP router 7101).

As described, in a case of assigning bandwidth to the asynchronous stream, it is possible to avoid the so called double reservation of bandwidth in which plural receiving terminals reserve bandwidth for the same channel at the same time, by following the rule that the reservation of bandwidth is carried out by a node that transmits QOS packets. Moreover, it is expected that the transmitting node is usually comprehending a value of necessary bandwidth in most cases so that this rule is appropriate in view of this fact as well.

(7-3)

Now, in the above, the correspondence between the IP multicast flow and the channel number of isochronous channel or asynchronous stream through which that flow passes has been notified by using the layer-3 flow register, but it is also possible to realize this notification by using FANP. Note that FANP is a protocol for notifying a correspondence between some datalink layer channel (such as isochronous channel or asynchronous stream of IEEE 1394 or virtual channel of ATM or frame relay, etc.) and an upper layer flow (such as IP flow) that pass through that channel, by using IP datagrams.

Figure 74:
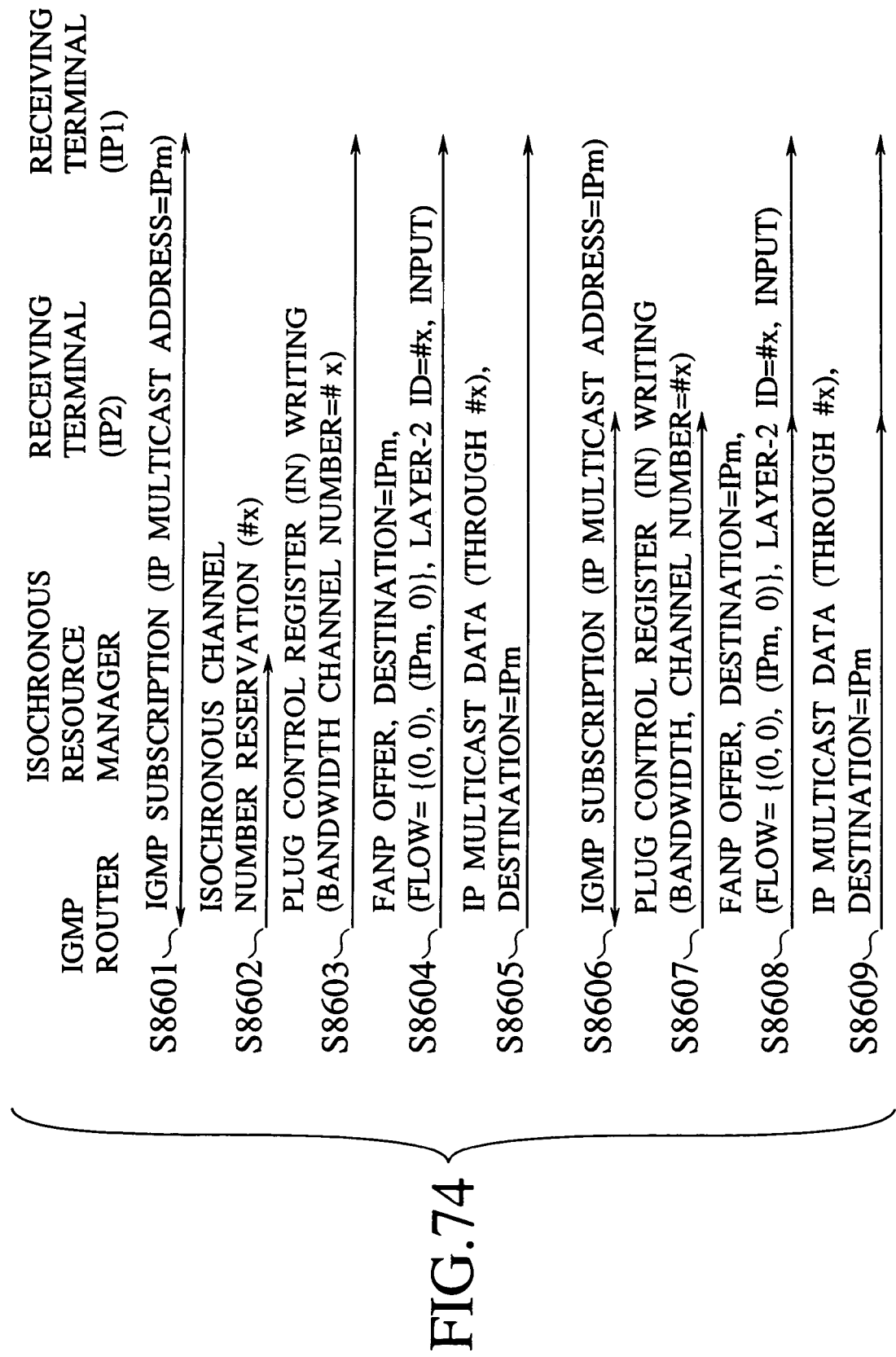
FIG. 74 is a sequence chart for a processing of notifying a correspondence between IP multicast flow and channel number by using FANP in the system of FIG. 68.

FIG. 74 shows a processing procedure in this case. When the receiving terminal 7102 wishes to subscribe for the IP multicast address "IPm", the subscription procedure using IGMP is carried out similarly as in the case of FIG. 69 between the receiving terminal 7102 and the IGMP router 7101 (step S8601). The IGMP router 7101 then makes an access to the isochronous resource manager 7104 in order to reserve a channel for this IP multicast address "IPm", and reserves the channel number "#x" (step S8602).

Next, the IGMP router 7101 uses the plug control register of IEEE 1394 and FANP in order to notify that 'IP multicast "IPm" will be offered through channel "#x"' to the receiving terminal 7102.

The plug control register is a register that has an effect of urging reception or transmission of isochronous channel/asynchronous stream provided by using some channel number, and the plug control registers for input and output are provided separately. Using this plug control register, the IGMP router 7101 urges the receiving terminal 7102 to receive the channel "#x" (step S8603). Note that, at this point, the IGMP router 7101 may carry out writing into the own plug control register as well. In such a case, a number of receiving terminals of that IP multicast address can be entered into the connection counter according to the same rule as described above. By means of this, it becomes possible to comprehend a number of nodes that are receiving that multicast from that channel.

Next, the IGMP router 7101 sends a message as shown in FIG. 75 as a FANP OFFER message to the receiving terminal 7102. This FANP message has the IP multicast address "IPm" as destination, and sent through a broadcast channel for layer-3 packets allocated to IEEE 1394 bus (packets of a specific asynchronous stream or packets with node ID=all "1" as destination, for example).

As shown in FIG. 75, the FANP OFFER message contains a flow ID and a layer-2 ID, and notifies a correspondence between the above described layer-2 ID (channel number "#x" in the case of this embodiment) and an upper layer flow provided through a channel indicated by this layer-2 ID (IP multicast address "IPm" in the case of this embodiment) (step S8604).

Thereafter, transmission of datagrams destined to the IP multicast address "IPm" is carried out through this channel "#x" (step S8605).

Similarly, when there is a subscription request from the other receiving terminal 7103 (step S8606), the notification of the correspondence can be realized by carrying out the writing into the plug control register (step S8607) and the sending of the FANP message (step S8608).

Note that the FANP message in this case is destined to the IP multicast address so that even when there are plural receiving terminals it is not absolutely necessary to send the FANP message to each one of the receiving terminals one by one, and it suffices to transmit the datagram destined to the IP multicast address "IPm" Just once, so that it is advantageous from a viewpoint of reduction of traffic on IEEE 1394 bus.

Now, in this embodiment, the correspondence between the layer-2 ID and the layer-3 flow has been notified by using the plug control register and the FANP OFFER message. Here, the notification of the above described correspondence cannot be realized unless the FANP message is used, but the receiving terminal can be made to carry out reception of data from this isochronous channel by writing into the plug control register, so that when it is not absolutely necessary to notify the above described correspondence, the above described sending of the FANP message may be omitted. Conversely, when there is a FANP message, it becomes possible for the receiving terminal to recognize which layer-3 flow is going to be inputted from which channel number, so that the above described writing into the plug control register may be omitted if desired.

(7-4)

Next, a processing procedure in a case where a plurality of flows are to be transmitted by using the same IP multicast address will be described with reference to FIG. 76.

Figure 76:
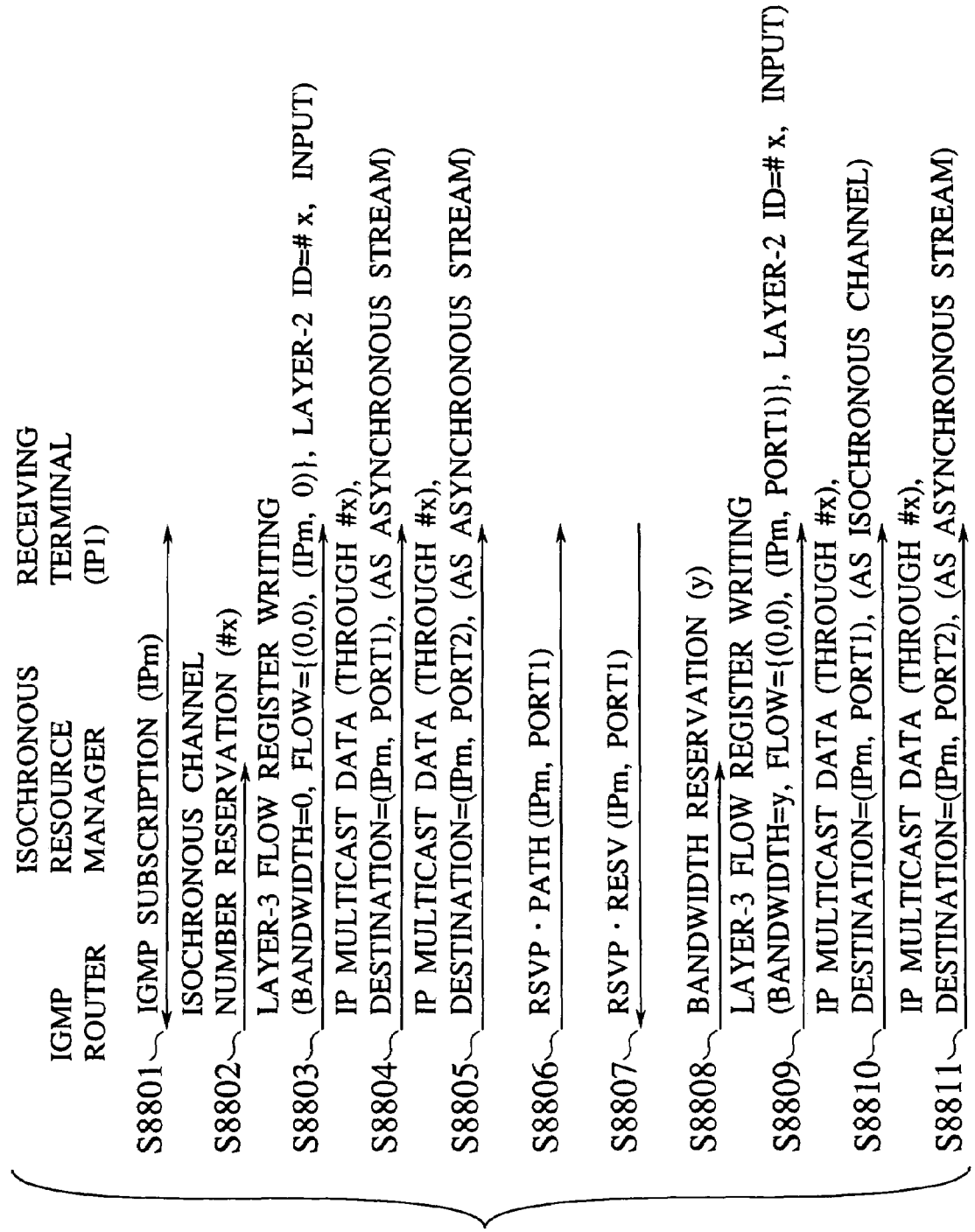
FIG. 76 is a sequence chart for a processing in a case of transmitting a plurality of flows by using the same IP multicast address in the system of FIG. 68.

FIG. 76 shows a case of transmitting multicast packets with the IP multicast address "IPm" from the IGMP router 7101 to the receiving terminal 7102, where two flows including a flow indicated by the port number "PORT1" (step S8804) and a flow indicated by the port number "PORT2" (step S8805) are to be transmitted simultaneously.

The subscription for multicast address by IGMP (step S8801) and the reservation of isochronous channel number by the IGMP router 7101 (step S8802) are the same as described above.

At a time of carrying out the writing into the layer-3 flow register at the step S8803, a flow to be transmitted by the asynchronous stream indicated by the isochronous channel number "#x" reserved at the step S8802 is not particularly specified, and only the fact that packets of the IP multicast address "IPm" are going to be transmitted is specified, so that both flows of the steps S8804 and S8805 are going to be transmitted by the asynchronous stream indicated by the channel number "#x".

Now, suppose that the IGMP router 7101 permits transmission using QOS for a flow represented by "PORT1" among these two flows. For this reason, the IGMP router 7101 sends a PATH message of RSVP with the IP multicast address "IPm" as destination (step S8806). In response, the receiving terminal 7102 sends an RESV message so as to request bandwidth reservation (step S8807). Then, the IGMP router 7101 makes an access to the isochronous resource manager 7104 and reserves necessary bandwidth specified by the RESV message. Here, the reserved amount of bandwidth is assumed to be "y" (step S8808).

Then, the IGMP router 7101 carries out the writing into the layer-3 flow register of the receiving terminal 7102 in order to notify the receiving terminal 7102 that data with the amount of bandwidth "y" are going to be transmitted through the isochronous channel number "#x" at arbitration period of the isochronous channel (step S8809). At this step S8809, the notification to the receiving terminal 7102 is not necessarily limited to the above described case of using the layer-3 flow register, and it is also possible to realize this notification by using FANP or plug control register of IEC 61883 as described above. Which scheme is to be adopted depends on requirements of the system.

Subsequently IP multicast data from the IGMP router 7101 are transmitted through the asynchronous stream for the flow represented by "PORT2" for which bandwidth is not reserved (step S8811), similarly as in the case of the step S8805, and through the isochronous channel (at arbitration period of the isochronous channel) for the flow represented by "PORT1" for which bandwidth is reserved (step S8810).

Now, at the IGMP router 7101, there is a possibility for introducing IP multicast data (IP multicast packets destined to "IPm") with bandwidth greater than the amount of bandwidth "y" reserved for the isochronous channel "#x" However, it is not preferable to let these packets flow through the isochronous channel "#x" as they are because these IP multicast packets would additionally consume as much communication resource as bandwidth which has not been reserved.

Figure 77:
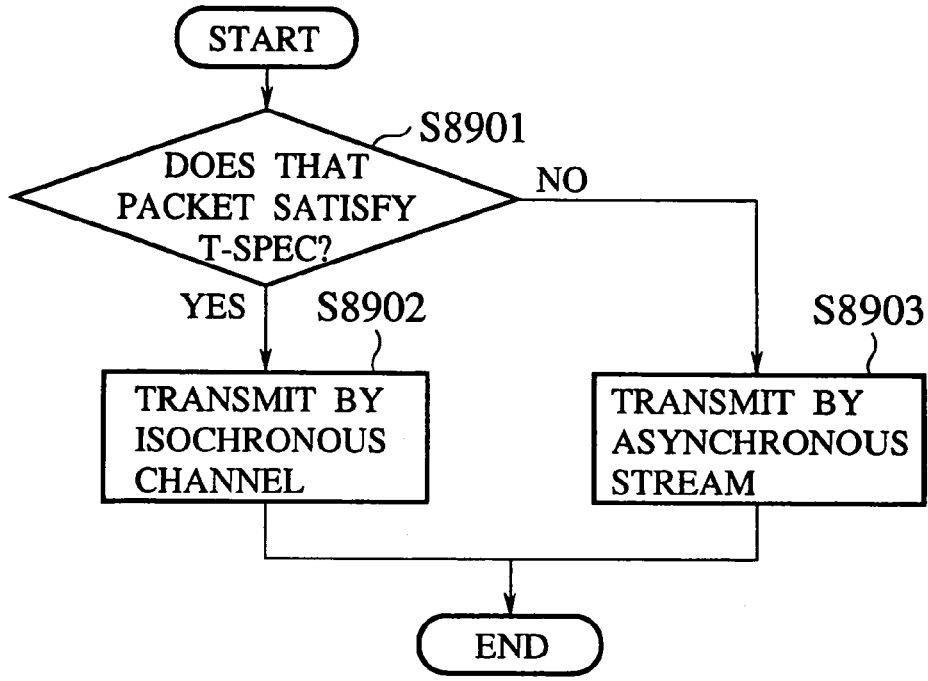
FIG. 77 is a flow chart for the operation of an IGMP router in the system of FIG. 68 in a case of transmitting IP multicast data with amount of bandwidth greater than that reserved in advance for isochronous channel.

For this reason, it is possible to use an algorithm shown in FIG. 77 which establishes a rule that a part for which bandwidth has been reserved is to be transmitted through the isochronous channel (steps S2901 and S2902) while a part for which bandwidth has not been reserved is to be transmitted through the asynchronous stream (step S2901 and S2903), so as to prevent the IGMP router 7101 to let those data with an amount of bandwidth greater than reserved one flow through the isochronous channel. In FIG. 77, "T-spec" refers to a traffic parameter specified at a time of reservation by RSVP, and it is also possible to specify a peak rate, a depth of bucket in the leaky bucket, etc.

Figure 78:
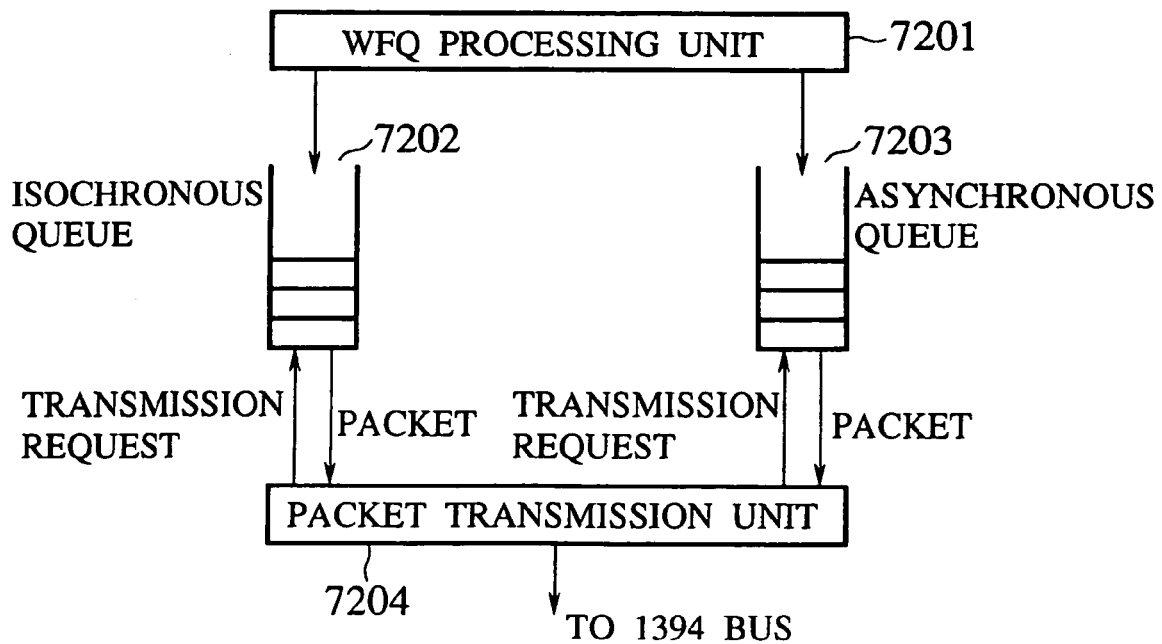
FIG. 78 is a block diagram of an exemplary configuration for realizing the operation of FIG. 77 in the system of FIG. 68.

FIG. 78 shows an exemplary configuration for realizing the mechanism of FIG. 77. Here, WFQ stands for Weighted Fair Queueing, which is a packet scheduling scheme in which a ratio of amounts of packets to be transmitted for respective flows is set equal to a ratio of values (called weights) specified for respective flows in advance, in a case where one output port is to be shared by a plurality of packets from a plurality of senders/flows.

In FIG. 78, a WFQ processing unit 7201 enters a packet which satisfies the T-spec into an isochronous queue 7202 and a packet which does not satisfy the T-spec into an asynchronous queue 7203 according to this WFQ scheduling, and data queued in the isochronous queue 7202 are transmitted at isochronous arbitration period via a packet transmission unit 7204 while data queued in the asynchronous queue 7203 are transmitted at asynchronous arbitration period via the packet transmission unit 7204.

In the above, a scheme for using the same value for the isochronous channel number continually even when bandwidth is reserved has been described. In contrast, it is also possible to adopt a scheme which reserves another *isochronous channel ("#z") different from the isochronous channel ("#x") used for the asynchronous stream, with respect to a channel for which bandwidth reservation is necessary.

A processing procedure for this case will now be described with reference to FIG. 79.

Figure 79:
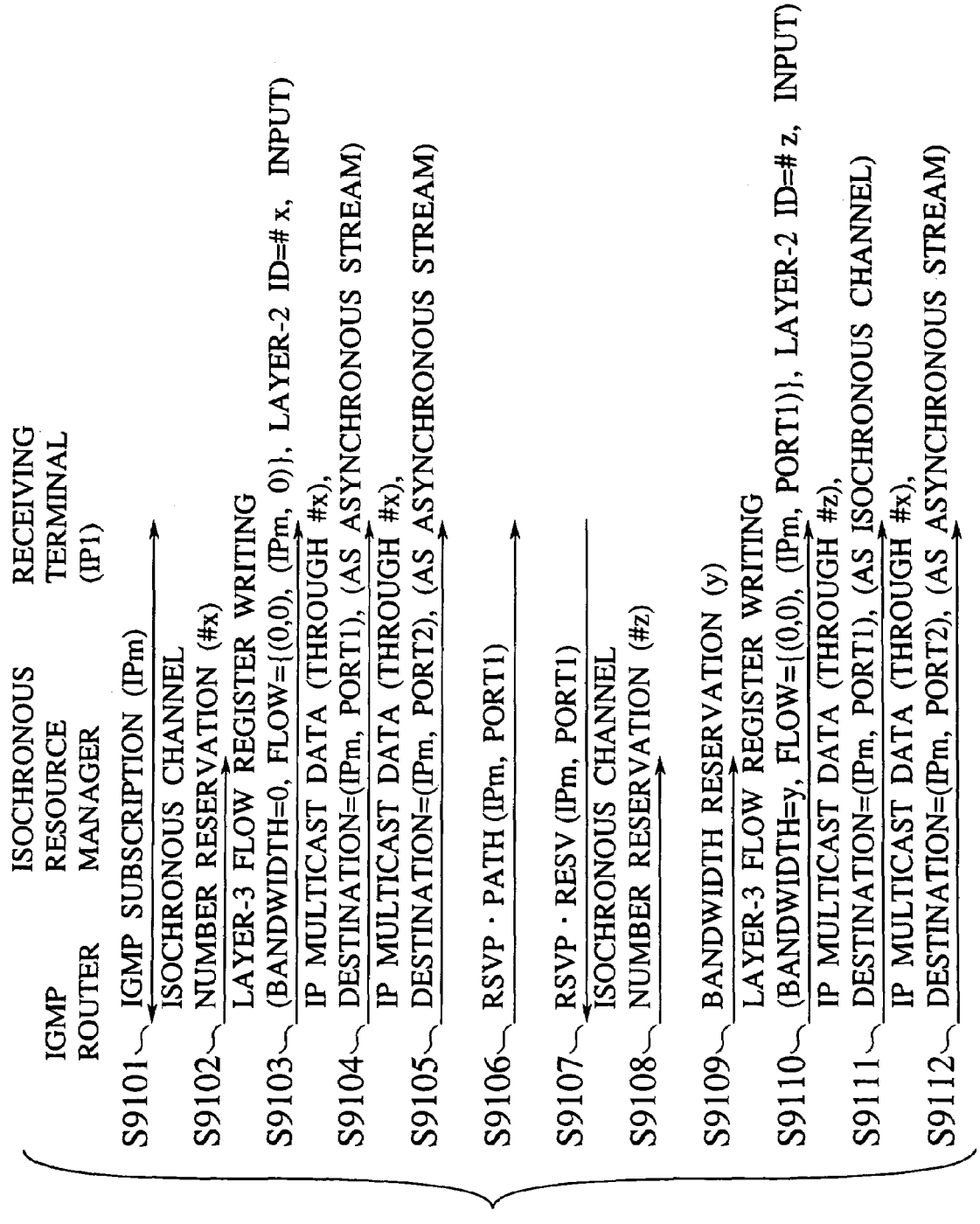
FIG. 79 is a sequence chart for a processing in a case of reserving bandwidth for asynchronous stream reserved for IP multicast and using different channel number for isochronous channel with reserved bandwidth in the system of FIG. 68.

In FIG. 79, the steps S9101 to S9107 up to a point where a request (RESV) for bandwidth reservation from the receiving terminal 7101 is received by using RESV message of RSVP are the same as the steps S8801 to 8807 of FIG. 76.

When the bandwidth reservation request is received at the step S9107, the IGMP router 7101 reserves an isochronous channel number "#z" different from the channel number "#x" of the asynchronous stream used up until then and an amount of bandwidth "y" (steps S9108 and S9019). This case also obeys the rule that "a sender (that is, the IGMP router 7101 in the case of this embodiment) reserves necessary link layer bandwidth".

Then, the IGMP router 7101 writes that a flow represented by "PORT1" will be transmitted through an isochronous channel (rather than asynchronous stream) indicated by the isochronous channel number "#z", into the layer-3 flow register of the receiving terminal 7102, so as to notify the receiving terminal 7102 (step S9110). Note that, at the step S9111, the notification to the receiving terminal 7102 is not necessarily limited to the above described case of using the layer-3 flow register, and it is also possible to realize this notification by using FANP or plug control register of IEC 61883 as described above.

Thereafter, among the packets destined to the IP multicast address "IPm", a flow represented by "PORT1" is transmitted by the isochronous channel with the isochronous channel number "#z" (step S9111) while the other flows continue to be transmitted by the asynchronous stream (step S9112).

(7-5)

Next, a case of handling plural senders of multicast data using asynchronous stream or isochronous channel indicated by one channel number will be described with reference to FIG. 80. Here, after subscribing for IP multicast, the terminals 7102 and 7103 of FIG. 68 become transmitting and receiving terminals of multicast data, and these terminals will be referred to as terminals A and B in the following.

Figure 80:
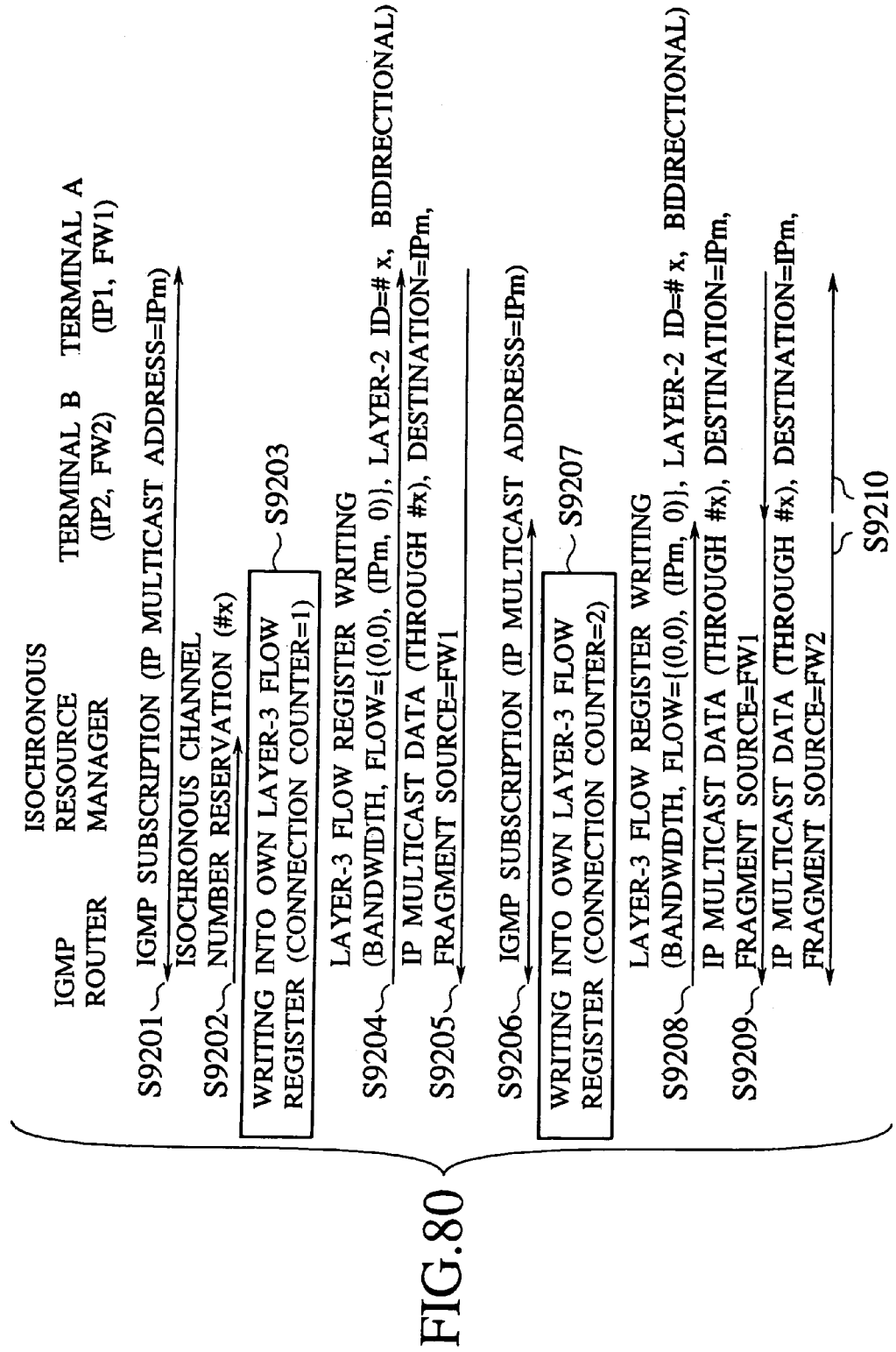
FIG. 80 is a sequence chart for a processing in a case of transmission from a plurality of senders with respect to the same IP multicast address in the system of FIG. 68.

FIG. 80 shows a case where two terminals including the terminal A (IP address "IP1", 1394 address "FW1") and the terminal B (IP address "IP2", 1394 address "FW2") are transmitting IP multicast packets with respect to the same IP multicast address "IPm". Here, the 1394 address indicates an ID by which each terminal can be uniquely identified on that IEEE 1394 bus, such as a node ID of IEEE 1394, for example.

In FIG. 80, the steps S9201 to S9204 and S9206 to S9208 for the subscription for multicast, the reservation of channel number, and the notification of the correspondence between the IP multicast address and the channel number are the same as those in FIG. 69.

What is characteristic in FIG. 80 is that each of the terminals A and B transmits an IP multicast packet by attaching an own source address ("FW1" or "FW2") through the channel indicated by the same channel number "#x" (step S9205, S9209 and S9210). This source address is written into a header called fragment header, which is a header given to each fragmented piece at a time of fragmenting an IP packet into 1394 frames.

Figure 81A:
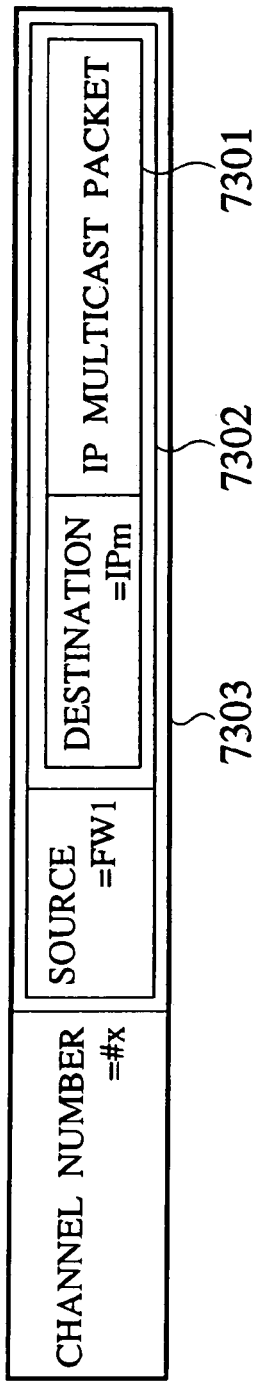
FIGS. 81A and 81B are diagrams showing exemplary configuration of IP multicast data transmitted from terminals A and B in the system of FIG. 68 during the processing of FIG. 80.
Figure 81B:
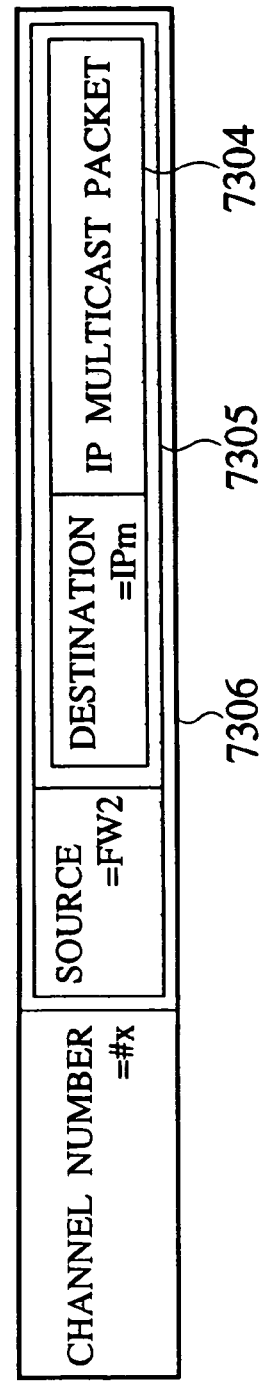

FIGS. 81A and 81B show exemplary configuration of IP multicast data transmitted from the terminals A and B, respectively. As shown in FIGS. 81A and 81B, these IP multicast data are formed by encapsulating an IP multicast packet (or its fragment) 7301 or 7304 by using a fragment header containing the source address to yield fragment data 7302 or 7305, and then housing this fragment data 7302 or 7305 inside a 1394 frame 7303 or 7306 (which is an isochronous frame in this case).

The receiver is going to receive packets from a plurality of senders out of the asynchronous stream indicated by the same channel number, but as the source address is attached to each frame as described above, it is still possible for the receiver to re-assemble each packet accurately by referring to the source address.

Up to here, a case of transmitting IP multicast packets from plural senders with respect to the same IP multicast address without using bandwidth reservation has been described. Now, a case of transmitting IP multicast packets from plural senders with respect to the same IP multicast address while using bandwidth reservation will be described with reference to FIG. 82.

Figure 82:
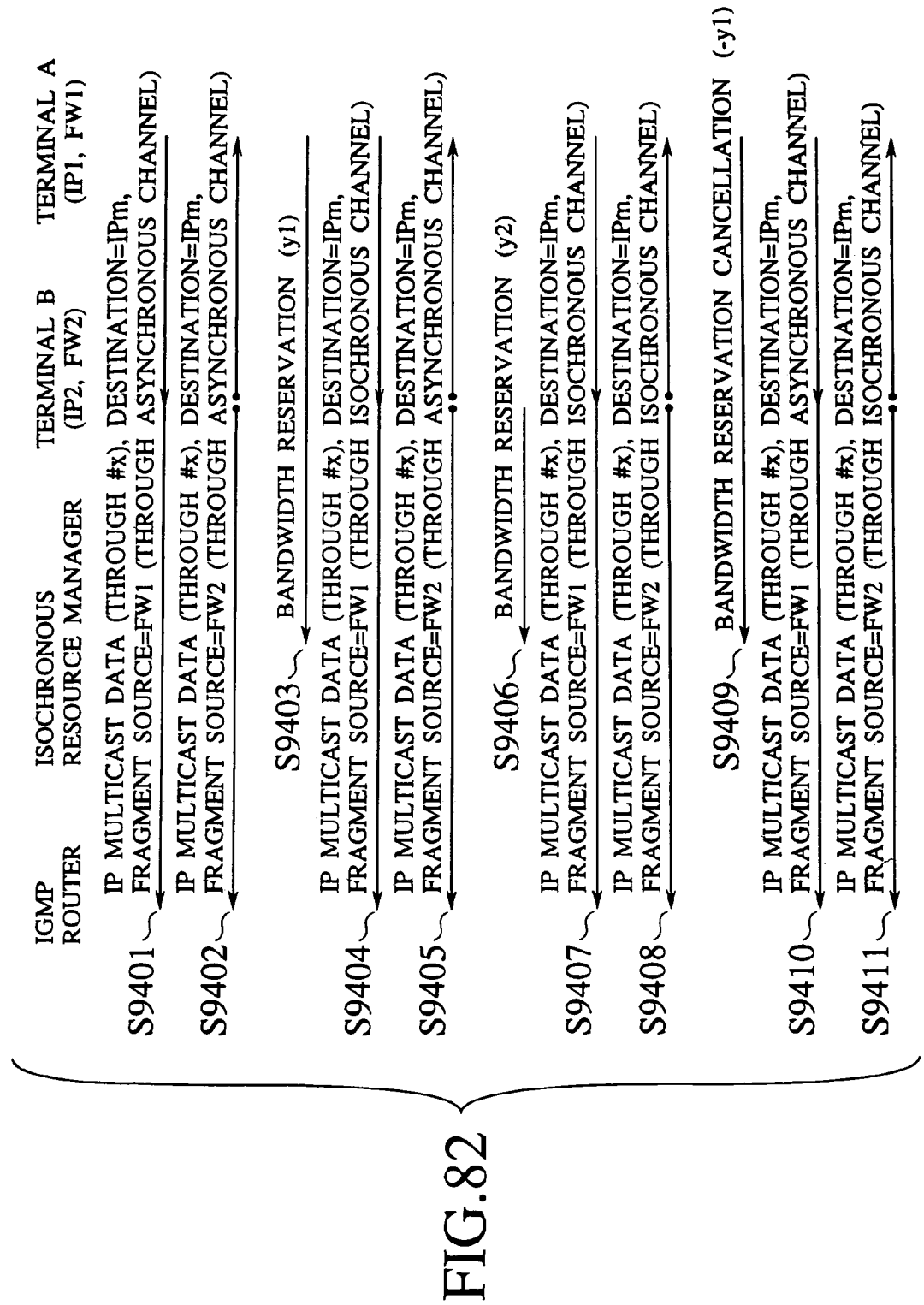
FIG. 82 is a sequence chart for a processing in a case of transmission from a plurality of senders with respect to the same IP multicast address and using bandwidth reservation in the system of FIG. 68.

In FIG. 82, it is assumed that the IP multicast packets destined to the same IP multicast address "IPm" are transmitted from two senders, i.e., the terminals A and B, in a form of asynchronous stream, as a result of completing a procedure of steps S9201 to S9210 of FIG. 80, for example (steps S9401 and S9402).

Here, when the terminal A is requested to transmit IP multicast data in a form of using bandwidth in some way (as in a case where RESV of RSVP is received, for example), or when the terminal A itself selects to transmit data in a form of using bandwidth, the terminal A makes an access to the isochronous resource manager 7104 to reserve a desired amount of bandwidth (y1) (step S9403), and thereafter the terminal A transmits IP multicast packets through the isochronous channel with the reserved amount of bandwidth y1 at the isochronous arbitration period (step S9404). Here, the terminal B that has not reserved bandwidth continues to transmit IP multicast packets by the same channel number "#x", but as the asynchronous stream at the asynchronous arbitration period (step S9405).

In a case where the terminal B also transmits IP multicast packets in a form of using bandwidth, the terminal B also makes an access to the isochronous resource manager 7104 to reserve a desired amount of bandwidth (y2) (step S9406), and transmits IP multicast packets through 20 the isochronous channel with the reserved amount of bandwidth y2 at the isochronous arbitration period (step S9408).

In a case of cancelling the previously reserved bandwidth, a request for cancellation of that bandwidth is made with respect to the isochronous resource manager 7104 (step S9409) and packet transmission at the isochronous arbitration period is stopped. If there is a packet to be transmitted, this packet is transmitted by the asynchronous stream (at the asynchronous arbitration period) (step S9410).

On the other hand, in a case of transmitting IP multicast in a form of using bandwidth, it is also possible to adopt a scheme which transmits IP multicast packets through an isochronous channel with a channel number "#z" which is different from a channel number "#x" used by the asynchronous stream. A processing procedure in this case will now be described with reference to FIG. 83.

Figure 83:
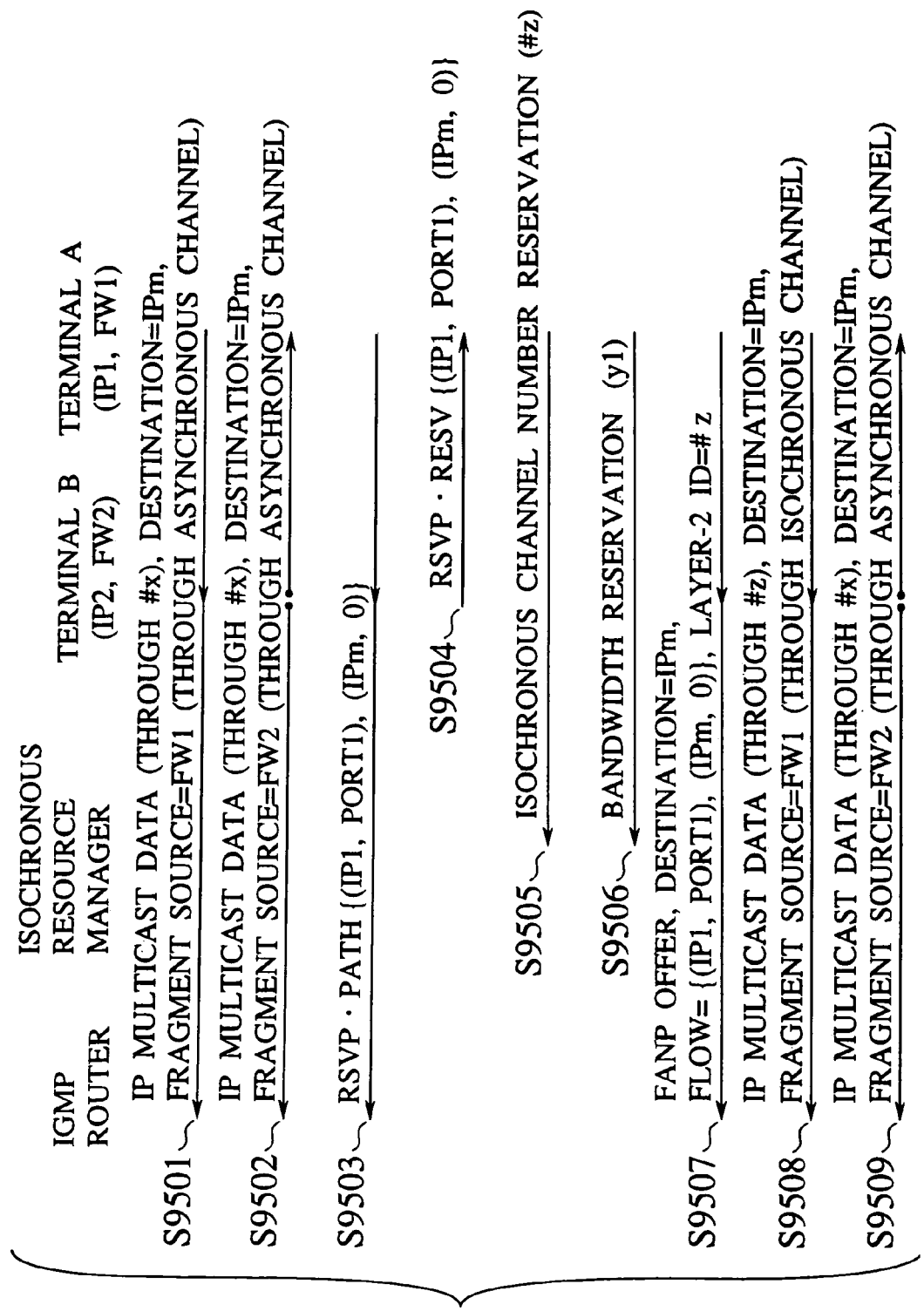
FIG. 83 is a sequence chart for a processing in a case of transmission from a plurality of senders with respect to the same IP multicast address and using bandwidth reservation and different channel numbers for isochronous channel and asynchronous stream in the system of FIG. 68.

In FIG. 83, it is assumed that the IP multicast packets destined to the same IP multicast address "IPm" are transmitted from two senders, i.e., the terminals A and B, in a form of asynchronous stream, as a result of completing a procedure of steps S9201 to S9210 of FIG. 80, for example (steps S9501 and S9502).

Here, when the terminal A is requested to transmit IP multicast data in a form of using bandwidth by means of RESV message of RSVP and the like (as in a case shown in FIG. 83 where an RESV message of RSVP is received from the terminal B in response to a PATH message of RSVP from the terminal A, for example), the terminal A makes an access to the isochronous resource manager 7104 to reserve an isochronous channel number "#z" and a desired amount of bandwidth (y1) (steps S9503 to S9506).

Then, the terminal A transmits a FANP message for notifying the correspondence between the reserved isochronous channel number and a flow to be transmitted through that isochronous channel, to that IP multicast address "IPm" through the asynchronous stream "#x" or a default asynchronous stream, for example (step S9507). A node which received this FANP message becomes possible to recognize which flow is going to be inputted in what characteristic from which isochronous channel. Note that, as described above, the notification of the correspondence is realized by using the FANP message here but it is also possible to realize this notification by using the layer-3 flow register or the plug control register of IEC 61883.

As described, according to this seventh embodiment, it becomes possible to carry out IP multicast by utilizing communication resource efficiently, and to enable recognition of correspondence between reserved channel and IP multicast address at a transmitting side and a receiving side in synchronization, in a network of broadcast type such as IEEE 1394, Note also that the present invention has been described above with the current Internet (i.e. IPv4) in mind, but it should be apparent that the present invention is equally valid in the next generation Internet (i.e. IPv6).

As described, when a network is formed by connecting the communication terminal devices, relay devices, IEEE 1394 inter-connection cable according to the present invention, it becomes possible to realize a large scale and multifarious (i.e. capable of using various networks) implementation of the home network containing the 1394 bus. Moreover, this scheme has a great affinity with the public network and the Internet.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data transmitting node connected with a physical network, comprising:

a first transmission unit for transmitting a control message in a case of transmitting information data to a receiving node connected with the physical network or another physical network, the control message including an IP (Internet Protocol) address information of a data transmission destination, a header or channel information dependent on the physical network, and an information indication a required communication resorce so as to notify a network connection device on a communication path that the information data that pass through the communication path established by the control message are requiring an indicated amount of communication resource; and a second transmission unit for transmitting the information data containing the header or channel information for which the required communication resource is reserved, to the receiving node.

2. The data transmitting node of claim 1, further comprising:

a reception unit for receiving digital video and/or digital audio data;

wherein the second transmission unit transmits the digital video and/or digital audio data received by the reception unit as the information data, by formatting the digital video and/or digital audio data into a transmission format for said physical network.

3. A data transmitting node connected with a physical network, comprising:

a first transmission unit for transmitting a control message in a case of transmitting information data to a receiving node connected with the physical network or another physical network, the control message including an IP (Internet Protocol) address information of a data transmission destination, a header or channel information dependent on the physical network, and an information on a format of the information data to be transmitted according to the header or channel information so as to notify a network connection device on a communication path that the information data that pass through the communication path established by the control message will be in the indicated format; and a second transmission unit for transmitting the information data in said format which contains the header or channel information to the receiving node.

4. The data transmitting node of claim 3, further comprising:

a reception unit for receiving digital video and/or digital audio data;

wherein the second transmission unit transmits the digital video and/or digital audio data received by the reception unit as the information data, by formatting the digital video and/or digital audio data into said format.

5. A method of data transmission at a data transmitting node connected with a physical network, comprising the steps of:

(a) transmitting a control message in a case of transmitting information data to a receiving node connected with the physical network or another physical network, the control message including an IP (Inertnet Protocol) address information of a data transmission destination, a header or channel information dependent on the physical network, and an information indicating a required communication resource so as to notify a network connection device on a communication path that the information data that pass through the communication path established by the control message are reciuiring an indicated amount of communication resource; and (b) transmitting the information data containing the headef/ehaftnel header or channel information for which the required communication resource is reserved, to the receiving node.

6. The method of claim 5, further comprising the step of:

(c) receiving digital video and/or digital audio data;

wherein the step (b) transmits the digital video and/or digital audio data received by the step (c) as the information data, by formatting the digital video and/or digital audio data into a transmission format for said physical network.

7. A method of data transmission at a data transmitting node connected with a physical network, comprising the steps of:

(a) transmitting a control message in a case of transmitting information data to a receiving node connected with the physical network or another physical network, the control message including an IP (Internet Protocol) address information of a data transmission destination, header or channel information dependent on the physical network, and an information on a format of the information data to be transmitted according to the header or channel information so as to notify a network connection device on a communication path that the information data that pass through the communication path established by the control message will be in the indicated format; and (b) transmitting the information data in said format which contains the header or channel information, to the receiving node.

8. The method of claim 7, further comprising the step of:

(c) receiving digital video and/or digital audio data;

wherein the step (b) transmits the digital video and/or digital audio data received by the step (c) as the information data, by formatting the digital video and/or digital audio data into said format.

* * * * *